(12) United States Patent
Boschert et al.

(10) Patent No.: US 12,533,408 B2
(45) Date of Patent: Jan. 27, 2026

(54) TREATMENT REGIMEN FOR THE TREATMENT OF AUTOIMMUNE DISORDERS

(71) Applicant: Merck Patent GmbH, Darmstadt (DE)

(72) Inventors: Ursula Boschert, Eysins (CH); Urs Wiedemann, Munich (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 18/748,995

(22) Filed: Jun. 20, 2024

(65) Prior Publication Data

US 2024/0335529 A1 Oct. 10, 2024

Related U.S. Application Data

(63) Continuation of application No. 18/599,308, filed on Mar. 8, 2024, which is a continuation of application No. 18/044,568, filed as application No. PCT/EP2021/074928 on Sep. 10, 2021.

(60) Provisional application No. 63/175,318, filed on Apr. 15, 2021, provisional application No. 63/149,196, filed on Feb. 12, 2021, provisional application No. (Continued)

(51) Int. Cl.
*A61K 39/25* (2006.01)
*A61K 31/7076* (2006.01)
*A61K 39/215* (2006.01)
*A61P 31/22* (2006.01)
(Continued)

(52) U.S. Cl.
CPC .......... *A61K 39/25* (2013.01); *A61K 31/7076* (2013.01); *A61K 39/215* (2013.01); *A61P 31/22* (2018.01); *A61P 37/04* (2018.01); *A61K 2039/5252* (2013.01); *A61K 2039/53* (2013.01); *A61K 2039/545* (2013.01); *A61K 2039/55* (2013.01); *C12N 2710/16734* (2013.01); *C12N 2770/20033* (2013.01)

(58) Field of Classification Search
None
See application file for complete search history.

(56) References Cited

U.S. PATENT DOCUMENTS

| 4,588,585 A | 5/1986 | Mark et al. |
| 4,737,462 A | 4/1988 | Mark et al. |

(Continued)

FOREIGN PATENT DOCUMENTS

| EP | 0 173 059 | 3/1986 |
| EP | 0227110 | 7/1987 |

(Continued)

OTHER PUBLICATIONS

Hartung et al., "COVID-19 and management of neuroimmunological disorders", Nature Reviews Neurology, vol. 16, Jul. 2020, pp. 347-348.

(Continued)

*Primary Examiner* — M Franco G Salvoza
(74) *Attorney, Agent, or Firm* — Grüneberg and Myers PLLC

(57) ABSTRACT

A novel treatment regimen is provided for the treatment of autoimmune disorders. Said novel treatment regimen provides for an efficacious treatment of autoimmune disorders with an advantageous safety profile and/or a high quality of life for the patient. Said novel treatment regimen provides for an advantageous benefit-risk ratio for patients endangered by the risk of infections.

8 Claims, 27 Drawing Sheets

Related U.S. Application Data

63/199,265, filed on Dec. 16, 2020, provisional application No. 63/198,971, filed on Nov. 25, 2020, provisional application No. 62/706,819, filed on Sep. 11, 2020, provisional application No. 62/706,795, filed on Sep. 10, 2020.

(51) Int. Cl.
*A61P 37/04* (2006.01)
*A61K 39/00* (2006.01)

(56) References Cited

U.S. PATENT DOCUMENTS

| | | | |
|---|---|---|---|
| 4,738,931 | A | 4/1988 | Sugano et al. |
| 4,879,111 | A | 11/1989 | Chong |
| 4,904,584 | A | 2/1990 | Shaw |
| 4,959,314 | A | 9/1990 | Mark et al. |
| 4,964,848 | A | 10/1990 | Bloom |
| 4,965,195 | A | 10/1990 | Namen et al. |
| 5,017,691 | A | 5/1991 | Lee et al. |
| 5,106,837 | A | 4/1992 | Carson et al. |
| 5,116,943 | A | 5/1992 | Koths et al. |
| 5,155,027 | A | 10/1992 | Sledziewski et al. |
| 5,208,327 | A | 5/1993 | Chen |
| 5,310,732 | A | 5/1994 | Carson et al. |
| 5,506,213 | A | 4/1996 | Carson et al. |
| 5,506,214 | A | 4/1996 | Beutler |
| 5,541,087 | A | 7/1996 | Lo et al. |
| 6,013,253 | A | 1/2000 | Martin et al. |
| 6,194,395 | B1 | 2/2001 | Schultz et al. |
| 7,177,411 | B1 | 2/2007 | Collette |
| 7,713,947 | B2 | 5/2010 | De Luca et al. |
| 7,888,328 | B2 | 2/2011 | Bodor et al. |
| 8,377,903 | B2 | 2/2013 | De Luca et al. |
| 8,785,415 | B2 | 7/2014 | Bodor et al. |
| 9,925,151 | B2 | 3/2018 | Brentzel, Jr. et al. |
| 10,555,913 | B2 | 2/2020 | Brentzel, Jr. et al. |
| 10,849,919 | B2 | 12/2020 | Dangond et al. |
| 2001/0049359 | A1 | 12/2001 | Wrenn, Jr. |
| 2006/0121052 | A1* | 6/2006 | Sotelo-Morales ..... A61K 39/12 424/199.1 |
| 2009/0081163 | A1 | 3/2009 | De Luca |
| 2010/0021429 | A1 | 1/2010 | Brentzel, Jr. et al. |
| 2010/0203017 | A1 | 8/2010 | De Luca et al. |
| 2017/0057983 | A1 | 3/2017 | Wiles et al. |
| 2020/0155477 | A1 | 5/2020 | Brentzel, Jr. et al. |

FOREIGN PATENT DOCUMENTS

| | | |
|---|---|---|
| EP | 0526452 A1 | 2/1993 |
| EP | 0 626 853 | 4/2000 |
| EP | 0526452 B1 | 2/2001 |
| EP | 0526452 B2 | 1/2007 |
| EP | 3 713 582 | 9/2020 |
| JP | 2008524313 | 7/2008 |
| JP | 2009537605 | 10/2009 |
| KR | 10-2007-0091662 | 9/2007 |
| WO | 91/08298 | 6/1991 |
| WO | 92/13095 | 8/1992 |
| WO | 96/19229 | 6/1996 |
| WO | 96/19230 | 6/1996 |
| WO | 97/24137 | 7/1997 |
| WO | 99/55377 | 11/1999 |
| WO | 00/23472 | 4/2000 |
| WO | 00/64198 | 10/2000 |
| WO | 00/64918 | 11/2000 |
| WO | 01/03737 | 1/2001 |
| WO | 2004/028462 | 4/2004 |
| WO | 2004/039363 | 5/2004 |
| WO | 2004/075903 | 9/2004 |
| WO | 2004/087100 | 10/2004 |
| WO | 2004/087101 | 10/2004 |
| WO | 2004/096263 | 11/2004 |
| WO | 2006/067141 | 6/2006 |
| WO | 2007/135172 | 11/2007 |
| WO | 2019/101960 | 5/2019 |
| WO | WO-2019101960 A1 * | 5/2019 ......... A61K 31/7076 |

OTHER PUBLICATIONS

International Search Report issued Dec. 22, 2021, in PCT/EP2021/074928, 4 pages.
Mateen et al., "Impact of COVID-19 on U.S. and Canadian neurologists' therapeutic approach to multiple sclerosis: a survey of knowledge, attitudes, and practices", Journal of Neurology, vol. 267, Jul. 7, 2020, pp. 3467-3475.
Written Opinion issued Dec. 22, 2021, in PCT/EP2021/074928, 9 pages.
Commission Implementing Decision of Aug. 22, 2017 granting marketing authorisation under Regulation (EC) No. 726/2004 of the European Parliament and of the Council for "MAVENCLAD—cladribine", a medicinal product for human use, Aug. 22, 2017, with Annex 1, Summary of Product Characteristics, 46 pages.
U.S. National Library of Medicine, "A Phase 2 Study of Cladribine Add-on to Interferon-beta (IFN-beta) Therapy in Multiple Sclerosis (MS) Subjects With Active Disease (ONWARD)", ClinicalTrials.gov, last updated May 27, 2013, 8 pages.
Liliemark, Jan, "The Clinical Pharmacokinetics of Cladribine", Clinical pharmacokinetics, vol. 32, No. 2, Feb. 1997, pp. 120-131.
Clinical Study Report: "Results of a 96-week phase III trial of an oral short-course dosing regimen in patients with relapsing-remitting multiple sclerosis", received at the EPO on Sep. 9, 2015, 4 pages.
Dubois et al., "Interferon beta in multiple sclerosis: experience in a British specialist multiple sclerosis centre", Short Report, J. Neurol. Neurosurg. Psychiatry, vol. 74, 2003, pp. 946-949.
EPAR summary for the public, "Mavenclad", European Medicines Agency, Science Medicines Health, last updated Aug. 2017, 3 pages.
Langtry et al., "Cladribine—A review of its use in Multiple Sclerosis", Adis Drug Evaluation, BioDrugs, vol. 9, No. 5, May 1998, pp. 419-433.
Montalban, et al., "Efficacy of Cladribine Tablets as Add-On to IFN-beta Therapy in Patients with Active Relapsing MS: Final Results from the Phase II Onward Study (P3.029)", Neurology, Apr. 4, 2016, 2 pages.
National Multiple Sclerosis Society, "What is MS, Types of MS", https://www.nationalmssociety.org/What-is-MS/Types-of-MS, retrieved Sep. 20, 2022, 5 pages.
National Multiple Sclerosis Society, "What is MS, Types of MS, Secondary Progressive MS (SPMS)", https://www.nationalmssociety.org/What-is-MS/Types-of-MS/Secondary-progressive-MS, retrieved on Sep. 20, 2022, 3 pages.
Casanova, B., et al., "High clinical inflammatory activity prior to the development of secondary progression: a prospective 5-year follow-up study", Multiple Sclerosis Journal, vol. 8, Feb. 2002, pp. 59-63.
Cursiefen, Simone, et al., "Escalating Immunotherapy with Mitoxantrone in Patients with Very Active Relapsing-Remitting or Progressive Multiple Sclerosis", European Neurology, vol. 43, No. 3, Apr. 2000, p. 186.
Burt, Richard K., et al., "Treatment of Autoimmune Disease by Intense Immunosuppressive Conditioning and Autologous Hematopoietic Stem Cell Transplantation", Blood, vol. 92, No. 10, Nov. 1998, pp. 3505-3514.
Tortorella, Carla, et al., Cladribine Ortho Biotech Inc., Current Opinion in Investigational Drugs, vol. 2, No. 12, Dec. 2001, pp. 1751-1756.
Coles, Alasdair, et al., "Campath-1H treatment of multiple sclerosis: lessons from the bedside for the bench", Clinical Neurology and Neurosurgery, vol. 106, No. 3, Jun. 2004, pp. 270-274.
"Americans Slightly Taller, Much Heavier Than Four Decades Ago", Centers for Disease Control and Prevention, National Center for Health Statistics, Press Release, Oct. 27, 2004, https://www.cdc.gov/media/pressrel/r041027.htm, 2 pages.
Food and Drug Administration, "Orange Book: Approved Drug Products with Therapeutic Equivalence Evaluations, Patent and

(56) References Cited

OTHER PUBLICATIONS

Exclusivity for: N022561", https://www.accessdata.fda.gov/scripts/cder/ob/patent_info.cfm?Product_No=001&Appl_No=022561&Appl_type=N, retrieved Oct. 5, 2022, 2 pages.

Alvarez-Gonzalez, Cesar, et al., "Cladribine to Treat Disease Exacerbation after Fingolimod Discontinuation in Progressive Multiple Sclerosis," Annals of Clinical and Translational Neurology, vol. 4, No. 7, Mar. 17, 2017, pp. 506-511.

Andrade, Chittaranjan, "Bioequivalence of Generic Drugs: A Simple Explanation for a US Food and Drug Administration Requirement," J. Clin. Psychiatry vol. 76, No. 6, 2015, pp. e742-e744.

Barkhof, F., et al., "Limited duration of the effect of methylprednisolone on changes on MRI in multiple sclerosis," Neuroradiology, vol. 36, 1994, pp. 382-387.

Chumlea, W. Cameron, et al., "Total body water data for white adults 18 to 64 years of age: The Fels Longitudinal Study," Kidney International, vol. 56, 1999, pp. 244-252.

"ClinicalTrials.gov Background," ClinicalTrials.gov, accessible at https://www.clinicaltrials.gov/ct2/about-site/background, Feb. 29, 2000, 3 pages.

Clinicaltrials.gov for NCT00313976, "Study to Compare Double-Dose Betaferon to the Approved Dose, for Patients with Early Secondary Progressive Multiple Sclerosis", last updated Dec. 18, 2008.

Filippi, M., et al., "The effect of cladribine on T1 'black hole' changes in progressive MS," Journal of Neurological Sciences, vol. 176, 2000, pp. 42-44.

Hernandez, A., et al., "The Definition of Placebo in the Informed Consent Forms of Clinical Trials," PLoS ONE, vol. 9, No. 11, e113654, Nov. 25, 2014, pp. 1-11.

Khoury, S. J., "Multiple Sclerosis: What Have We Learned From Magnetic Resonance Imaging Studies?" Archives of Internal Medicine, vol. 158, Mar. 23, 1998, pp. 565-573.

Lassmann, Hans, "Targets of therapy in progressive MS," Multiple Sclerosis Journal, vol. 23, No. 12, 2017, pp. 1593-1599.

Leist, T.P., et al., "Effect of oral cladribine on time to conversion to clinically definite multiple sclerosis in patients with a first demyelinating event (ORACLE MS): a phase 3 randomised trial," Lancet Neurology, vol. 13, Feb. 2014, pp. 257-267.

Lublin, F.D., et al., "Defining the Clinical Course of Multiple Sclerosis: The 2013 Revisions," Neurology, vol. 83, 2014, pp. 278-286.

Neuhaus, O., et al., "Immunomodulation in multiple sclerosis: from immunosuppression to neuroprotection," Trends in Pharmaceutical Sciences, vol. 24, No. 3, Mar. 2003, pp. 131-138.

Pirko, I., et al., "Pulsed Intravenous Methylprednisolone Therapy in Progressive Multiple Sclerosis: Need for a Controlled Trial," Archives of Neurology, vol. 61, Jul. 2004, pp. 1148-1149.

Polman, C.H., et al., "Diagnostic Criteria for Multiple Sclerosis: 2005 Revisions to the 'McDonald Criteria,'" Annals of Neurology, vol. 58, Dec. 2005, pp. 840-846.

Roitt, I. M., "Essential Immunology, Sixth Edition," Blackwell Scientific Publications, 1988, 41 pages.

Romine, J. S., et al., "Cladribine: Use in Therapy of Multiple Sclerosis," Biodrugs, vol. 7, No. 5, 1997, pp. 386-393.

Rudick, R.A., et al., "Management of Multiple Sclerosis," The New England Journal of Medicine, vol. 337, No. 22, 1997, pp. 1604-1611.

Sand, I.K., et al., "Diagnostic uncertainty during the transition to secondary progressive multiple sclerosis," Multiple Sclerosis Journal, vol. 20, No. 12, 2014, pp. 1654-1657.

Schreiber, K., et al., "Cladribine in the Treatment of Multiple Sclerosis," Clinical Investigation, vol. 1, No. 2, 2011, pp. 317-326.

Simsek, D., et al., "Understanding the characteristics of secondary progressive multiple sclerosis to facilitate early identification," P241, Multiple Sclerosis Journal, vol. 21, S11, 2015, pp. 77.

Skurkovich, S., et al., "Randomized study of antibodies to INF-γ and TNF-α in secondary progressive multiple sclerosis," Multiple Sclerosis, vol. 7, 2001, pp. 277-284.

Supplementary Appendix to Leist, T.P., et al., "Effect of oral cladribine on time to conversion to clinically definite multiple sclerosis in patients with a first demyelinating event (ORACLE MS): a phase 3 randomised trial," Lancet Neurology (Feb. 2014).

Weiner, H.L., et al., "Immunotherapy of Multiple Sclerosis," Annals of Neurology, vol. 23, No. 3, 1988, pp. 211-222.

Weiner, H.L., et al., "Intermittent cyclophosphamide pulse therapy in progressive multiple sclerosis: Final report of the Northeast Cooperative Multiple Sclerosis Treatment Group," Neurology, vol. 43, 1993, pp. 910-918.

Weiten, W., Psychology: Themes and Variations, Third Edition, "Chapter 3: The Biological Bases of Behavior," Brooks/Cole Publishing Company, 1995.

Whitaker, J.N., "Rationale for Immunotherapy in Multiple Sclerosis," Annals of Neurology, vol. 36, 1994, pp. S103-S107.

Willis, M.A., et al., "Progressive Multiple Sclerosis," Continuum, vol. 22, No. 3, 2016, pp. 785-798.

Wingerchuk, D.M., et al., "Biology of Disease, Multiple Sclerosis: Current Pathophysiological Concepts," Laboratory Investigation, vol. 81, No. 3, 2001, pp. 263-281.

*Merck KGaA et al. v. Accord Healthcare, Inc. et al.*, 1-22-cv-00974 (DDE) Complaint, filed Sep. 22, 2022.

EMD Serono Inc., Mavenclad® (Cladribine) Package Insert, Mar. 2019.

Immunex Corporation, Novantrone® (Mixantrone) Package Insert, Oct. 13, 2000 ("Novantrone® Package Insert").

Biogen Idec Inc., Tysarbi® (natalizumab) Package Insert, Nov. 2004.

Teva Pharms. USA, Copaxone® (glatiramer acetate for injection) Package Insert, 2001.

Serono, Inc., Rebif® (Interferon Beta-1a) Package Insert, May 2003.

Center for Disease Control, Office of Enterprise Communication, Press Release, Oct. 27, 2004, https://www.cdc.gov/media/pressrel/r041027.htm.

Docket Navigator Printout of U.S. District Court District of Delaware (Wilmington) Civil Docket for Case No. 1:22-cv-00974-GBW, *Merck KGaA et al. v. Accord Healthcare, Inc et al.*, filed Jul. 25, 2022, 4 pages.

*Merck KGaA et al. v. Accord Healthcare, Inc et al.*, 1-22-cv-00974 (DDE) Answer, filed Oct. 6, 2022.

National Library of Medicine's Record of Schreiber, K. et al., "Cladribine in the treatment of multiple sclerosis", Review: Clinical Trial Outcomes, vol. 1, No. 2, 2011, pp. 317-326.

Chiron Corporation, Betaseron® (Interferon beta-Ib) Package Insert, 1993.

Biogen, Inc., Avonex™ (Interferon Beta-1a) Package Insert, Nov. 1996.

Docket Report of U.S. District Court District of Delaware (Wilmington) Civil Docket for Case No. 1:22-cv-01365-GBW, *Merck KGaA et al. v. Hopewell Pharma Ventures, Inc.*, filed Oct. 17, 2022, 4 pages.

Docket Report of U.S. District Court District of Delaware (Wilmington) Civil Docket for Case No. 1:22-cv-00974-GBW, *Merck KGAA et al. v. Accord Healthcare, Inc.*, filed Jul. 25, 2022, 4 pages.

United States District Courts—National Judicial Caseload Profile, Jun. 2022, 95 pages.

Docket Report of U.S. District Court of Delaware (Wilmington) Civil Docket for Case No. 1:23-cv-00039-GBW, *Merck KGaA et al. v. Aurobindo Pharma USA, Inc., et al.*, filed Jan. 13, 2023, 3 pages.

Publisher's Record for Stelmasiak, Z. et al., A pilot trial of cladribine (2-chlorodeoxyadenosine) in remitting-elapsing multiple sclerosis, Medical Science Monitor, vol. 4, No. 1, Jan. 1, 1998, 3 pages.

U.S. Patent and Trademark Office, Memorandum, Interim Procedure for Discretionary Denials in AIA Post-Grant Proceedings with Parallel District Court Litigation, Jun. 21, 2022.

Order Regarding Motion to Stay, *Merck KGaA et al. v. Accord Healthcare, Inc. et al.*, Case No. 1:22-cv-00974 (D. Del.), Dec. 15, 2022.

Stipulation and [Proposed] Order Staying Litigation with Respect to *Accord Healthcare, Inc., Merck KGaA et al. v. Accord Healthcare, Inc. et al.*, Case No. 1:22-cv-00974 (D. Del.), Dec. 14, 2022.

Publisher's Record of Alvarez-Gonzalez, Cesar, et al., "Cladribine to Treat Disease Exacerbation after Fingolimod Discontinuation in

(56) References Cited

OTHER PUBLICATIONS

Progressive Multiple Sclerosis," Annals of Clinical and Translational Neurology, vol. 4, No. 7, Mar. 17, 2017, pp. 506-511.
Aaron E. Miller, "Multiple Sclerosis Should be Treated Using a Step-Down Strategy Rather than a Step-Up Strategy—Commentary", Multiple Sclerosis J., vol. 22, No. 11, Jun. 8, 2016, pp. 1402-1404.
Panakanti et al., "Impact of Excipient Interactions on Drug Bioavailability", Pharm. Res., vol. 29, May 19, 2012, pp. 2639-2659.
Krystina Mitosek-Szewczyk et al., "Impact of cladribine therapy on changes in circulating dendritic cell subsets, T cells and B cells in patients with multiple sclerosis", Journal of the Neurological Sciences, vol. 332, 2013, pp. 35-40.
Publisher's Record of Montalban, X., et al., "Efficacy of Cladribine Tablets as Add-On to IFN-beta Therapy in Patients with Active Relapsing MS: Final Results from the Phase 2 ONWARD Study (P3.029)", Neurology, vol. 86, Apr. 5, 2016, 7 pages.
Clarivate Analytics Web of Science's Record of Montalban, X., et al., "Efficacy of Cladribine Tablets as Add-On to IFN-beta Therapy in Patients with Active Relapsing MS: Final Results from the Phase 2 ONWARD Study (P3.029)", Neurology, vol. 86, Apr. 5, 2016, 7 pages.
Citation History of Montalban, X., et al., "Efficacy of Cladribine Tablets as Add-On to IFN-beta Therapy in Patients with Active Relapsing MS: Final Results from the Phase 2 ONWARD Study (P3.029)", Neurology, vol. 86, Apr. 5, 2016, 11 pages.
Publisher's Record of Schreiber, K., et al., "Cladribine in the treatment of multiple sclerosis", Review: Clinical Trial Outcomes, vol. 1, No. 2, 2011, pp. 317-326 (Abstract).
National Library of Medicine's Copy of Schreiber, K., et al., "Cladribine in the treatment of multiple sclerosis", Review: Clinical Trial Outcomes, vol. 1, No. 2, 2011, pp. 317-326.
Archived Clinicaltrials.gov Pages for NCT00213135, "CLARITY—Safety and Efficacy of Oral Cladribine in Subjects With Relapsing-remitting Multiple Sclerosis (MS)," ClinicalTrials.gov, captured by Wayback Machine on Jul. 3, 2013 (pp. 6-8), with Affidavit of Nathaniel E. Frank-White (pp. 1-3, 9).
Mavenclad FDA Approval Letter, Mar. 29, 2019.
Mavenclad European Public Assessment Report (EPAR), product Information, European Medicines Agency, Aug. 22, 2017.
Archived Clinicaltrials.gov pages for, "A Phase 2 Study of Cladribine Add-on Interferon-beta (INF-beta) Therapy in Multiple Sclerosis (MS) Subjects With Active Disease (ONWARD)," ClinicalTrials.gov, captured by Wayback Machine on Jul. 3, 2013, 4 pages.
Archived Clinicaltrials.gov pages for, "A Phase 2 Study of Cladribine Add-on Interferon-beta (INF-beta) Therapy in Multiple Sclerosis (MS) Subjects With Active Disease (ONWARD)," ClinicalTrials.gov, captured by Wayback Machine on Nov. 2, 2014, 7 pages.
Carson et al., "Antileukemic and immunosuppressive activity of 2-chloro-2'- deoxyadenosine", Proc. Natl. Acad. Sci. USA, vol. 81, Apr. 1984, pp. 2232-2236.
Cladribine, Cladribine—Wikipedia, Drug Information Portal U.S. National Library of Medicine, downloaded on Mar. 11, 2022, pp. 1-10.
Comi Giancarlo and Gianvito Martino, "MS treatment: New perspectives", Clinical Neurology and Neurosurgery, vol. 108, 2006, pp. 339-345,.
Ellison et al., "Oral Cladribine for Multiple Sclerosis", P03.070, Neurology, vol. 48, Mar. 1997, pp. A174-A175, XP008047069A.
Fox et al., "Advancing Trial design in progressive multiple sclerosis", Mult. Scler., vol. 23, No. 12, Oct. 2017, pp. 1573-1578.
Jacobs et al., "Intramuscular Interferon Beta-1a for Disease Progression in Relapsing Multiple Sclerosis", Annals of Neurology, vol. 39, Mar. 1996, pp. 285-294.
Japanese Office Action dated Oct. 31, 2022, in Japanese Application No. 2020-528327, with English translation, 6 pages.
Koch et al., "Comparative utility of disability progression measures in PPMS: Analysis of the PROMiSe date set", Neurology Neuroimmunology & Neuroinflammation, vol. 4, e358, 2017, pp. 1-7.

Liliemark et al., "Bioavailability and bacterial degradation of rectally administered 2-chloro-2'-deoxyadenosine", Journal of Pharmaceutical & Biomedical Analysis, vol. 13, Nos. 4-5, 1995, pp. 661-665.
Leary S. M., "Current Management of Multiple Sclerosis", Int. J. Clin. Pract., vol. 54, No. 3, 2000, pp. 161-169, XP-008018314.
Lublin et al., "Randomized Study Combining Interferon & Glatiramer Acetate in Multiple Sclerosis", Annals of Neurology, vol. 73, No. 3, Mar. 2013, pp. 327-340.
Montalban, X., et al., "Cladribine tablets added to IFN-β in active relapsing MS: The ONWARD study", Neurology: Neuroimmunology & Neuroinflammation, vol. 5, No. 5, Sep. 2018, pp. 1-10.
Montalban, X., et al., "Phase II randomized study of oral cladribine added to interferon-beta in patients with active relapsing disease" Clinical Study Report, p. 1.
Montgomery et al., "Stick or Twist? Cost-Effectiveness of Siponimod in the Treatment of Active Secondary Progressive Multiple Sclerosis in the UK.", POSA114, Value in Health, vol. 55, No. 1, Jan. 2022, pp. S55-S56.
Munafo, A. et al., "Pharmaceutics of oral cladribine(Mylinax®) after administration in patients with multiple sclerosis", Abstract 493, Journal of the Neurological Science, vol. 238, No. 1, pp. S225.
Murdoch et al., "Subcutaneous Recombinant Interferon-β-1a (Rebif®): A Review of its Use in Relapsing-Remitting Multiple Sclerosis", Drugs, vol. 65, No. 9, 2005, pp. 1295-1312.
Panitch et al., "Benefits of high-dose, high-frequency interferon beta-1a in relapsing-remitting multiple sclerosis are sustained to 16 months: Final comparative results of the EVIDENCE trial", Journal of the Neurological Sciences, vol. 239, 2005, pp. 67-74.
Rieckmann, P., "Escalating immunotherapy of multiple sclerosis—New aspects and practical application", Journal of Neurology, vol. 251, 2004, pp. 1329-1339.
Rieckmann, P. et al., "Escalating immunotherapy of multiple sclerosis", Therapeutic Advances in Neurological Disorders, vol. 1, No. 3, 2008, pp. 181-192.
Singapore Office Action, Invitation to Respond Written Opinion dated Apr. 14, 2022, in Singapore Application 11202004772R, 6 pages.
Shin-Yakuzaigaku-Souron (revised 3$^{rd}$ edition), Introduction to Modern Pharmaceutics, Chapter 8, Nankodo Co. Ltd., Apr. 10, 1987, pp. 240-247, Teisuke Okano.
Springer [online], retrieved on Nov. 15, 2013, retrieved from the internet, URL: http://link.springer.com/aricle/10.2165%2F00003495-200565090-00010, Murdoch, D. et al., "Subcutaneous Recombinant interferon-β-1a (Rebif®)", pp. 1-2, summary only, 2005, 2 pages.
Smith et al., "A randomized blinded trial of combination therapy with cyclophosphamide in patients with active multiple sclerosis on interferon beta", Multiple Sclerosis, 2005, vol. 11, pp. 573-582.
Tur et al., Advancing Trial Design in Progressive Multiple Sclerosis "Progressive MS trials: Lessons learned", Multiple Sclerosis Journal, vol. 23, No. 12, pp. 1583-1592.
Taiwanese Office Action dated Aug. 2, 2022, in Taiwanese Application No. 107141805 with partial English translation, 11 pages.
United Kingdom Supreme Court-2017-0214-Judgment, Hilary Term [2019] UKSC 15, On appeal from [2017] EWCA Civ 1671, Judgment, *Actavis Group PTC EHF and others (Respondents)* v. *ICOS Corporation and another (Appellants)*, Judgment given on Mar. 27, 2019.
United Kingdom Supreme Court-2017-0214-Press Summary, *Actavis Group PTC EHF and others (Respondents)* v. *ICOS Corporation and another (Appellants)*, [2019] UKSC 15, On appeal from [2017] EWCA Civ 1671, Mar. 27, 2019.
U.S. Office Action dated Aug. 3, 2009, in U.S. Appl. No. 11/722,018, filed Jun. 18, 2007.
U.S. Office Action dated Dec. 19, 2011, in U.S. Appl. No. 12/766,173, filed Apr. 23, 2010.
U.S. Final Office Action dated May 24, 2012, in U.S. Appl. No. 12/766,173, filed Apr. 23, 2010.
U.S. Notice of Allowance dated Oct. 23, 2012, in U.S. Appl. No. 12/766,173, filed Apr. 23, 2010.
U.S. Response Under 37 C.F.R. §1.116 dated Aug. 24, 2012, in U.S. Appl. No. 12/766,173, filed Apr. 23, 2010.

(56) References Cited

OTHER PUBLICATIONS

Beutler et al., "Marrow Suppression Produced by Repeated Doses of Cladribine", Acta Haematol., vol. 91, 1994, pp. 10-15.
Beutler et al., "The treatment of chronic progressive multiple sclerosis with cladribine", Proc. Natl. Acad. Sci., vol. 93, Feb. 1996, pp. 1716-1720.
Beutler et al., "Treatment of Multiple Sclerosis and other Autoimmune Diseases with Cladribine", Seminars in Hematology, vol. 33, No. 1, Suppl. 1, Jan. 1996, pp. 45-52.
David H. Mattson, "Update on the diagnosis of multiple sclerosis", Expert Rev. Neurotherapeutics, vol. 2, No. 3, 2002, pp. 319-327.
Evans et al., "The role of MRI in Clinical Trials of Multiple Sclerosis: Comparison of Image Processing Techniques", Annals of Neurology, vol. 41, No. 1, Jan. 1997, pp. 125-132.
Gasperine et al., "Emerging oral drugs for relapsing-remitting multiple sclerosis", Expert Opinion Emerging Drugs, vol. 16, No. 4, 2011, pp. 697-712.
Giovannoni et al., "A Placebo-Controlled Trial of Oral Cladribine for Relapsing Multiple Sclerosis", The New England Journal of Medicine, vol. 362, 2010, pp. 416-426.
Giovannoni et al., "Safety and Efficacy of Cladribine tablets in patients with relapsing-remitting multiple sclerosis: Results from the randomized extension trial of the CLARITY study", Multiple Sclerosis Journal, vol. 24, No. 12, 2018, pp. 1594-1604.
Grieb et al., "Effect of Repeated Treatments with Cladribine (2-Chlorodeoxyadenosine) on blood counts in multiple Sclerosis Patients", Archivum Immunologiae et Therapiae Experimentalis, vol. 43, 1995, pp. 323-327.
Janiec et al., "Effect of immunosuppressive cladribine treatment on serum leucocytes system in two-year clinical trial in patients with chronic progressive multiple sclerosis", Med. Sci. Monit., vol. 7, No. 1, 2001, pp. 93-98.
John F. Kurtzke, Rating neurologic impairment in multiple sclerosis: An expanded disability status scale (EDSS), Neurology, vol. 33, Nov. 1983, pp. 1444-1452.
Kazimierczuk et al., "Synthesis of 2'-Deoxytubercidin, 2'-Deoxyadenosine, and Related 2'-Deoxynucleosides via a Novel Direct Stereospecific Sodium Salt Glycosylation Procedure", Journal of American Chemical Society, vol. 106, 1984, pp. 6379-6382.
Lassmann et al., "Heterogeneity of multiple sclerosis pathogenesis: implications for diagnosis and therapy", Trends in Molecular Medicine, vol. 7, No. 3, Mar. 2001, pp. 115-121.
Lublin et al., "Defining the clinical course of multiple sclerosis: results of an international survey", Neurology, vol. 46, Apr. 1996, pp. 907-911.
Lucchinetti et al., "Multiple sclerosis: recent developments in neuropathology, pathogenesis, magnetic resonance imaging studies and treatment", Current Opinion in Neurology, 2001, pp. 259-269.
McDonald et al., "Recommended Diagnostic Criteria for Multiple Sclerosis: Guidelines from the International Panel on the Diagnosis of Multiple Sclerosis", Annals of Neurology, vol. 50, No. 1, Jul. 2001, pp. 121-127.
Miller et al., "Therapeutic advances in ALS", Neurology, vol. 47, Suppl. 4, 1996, pp. S217.
Noseworthy et al., "Multiple Sclerosis", The New England Journal of Medicine, vol. 343, No. 13, Sep. 28, 2000, pp. 938-952.
Poser et al., "New Diagnostic Criteria for Multiple Sclerosis: Guidelines for Research Protocols", Annal of Neurology, vol. 13, No. 3, Mar. 1983, pp. 227-231.
Rice et al., "Cladribine and Progressive MS clinical and MRI outcomes of a multicenter controlled trial", Neurology, vol. 54, Mar. 2000, pp. 1145-1155.
Romine et al., "A Double-Blind, Placebo-Controlled, randomized trial of Cladribine in relapsing-remitting multiple sclerosis", Proceedings of the Association of American Physicians, vol. 111, No. 1, Jan./Feb. 1999, pp. 34-44.
Schumacher et al., "Problems of Experimental trials of therapy in multiple sclerosis: report by the panel on the evaluation of experimental trails of therapy in multiple sclerosis", Annals New York Academy of Sciences, vol. 122, 1965, pp. 552-568.
Selby et al., "Safety and Tolerability of Subcutaneous Cladribine Therapy in Progressive Multiple Sclerosis", The Canadian Journal of Neurological Sciences, vol. 25, No. 4, 1998, pp. 295-299.
Sipe et al., "A neurologic rating scale (NRS) for use in multiple sclerosis", Neurology, vol. 34, Oct. 1984, pp. 1368-1372.
Sipe et al., "Cladribine in treatment of chronic progressive multiple sclerosis", The Lancet, vol. 344, Jul. 2, 1994, pp. 9-13.
Stelmasiak et al., "A pilot trial of cladribine (2-chlorodeoxyadenosine) in remitting-relapsing multiple sclerosis", Med. Sci. Monit., vol. 4, No. 1, 1998, pp. 4-8.
Multiple Sclerosis Association of America, "Types of Multiple Sclerosis", online information last modified Feb. 26, 2020, retrieved from internet Jul. 6, 2020, https://www.mymsaa.org/ms-information/overview/types/, 5 pages.
Patent family search list of JP2009537605A, dated Nov. 8, 2022, Espacenet, 5 pages.
Patent family search list of JP2008524313A, dated Nov. 8, 2022, Espacenet, 8 pages.
Anne Gocke, How does Progressive MS differ from Relapsing MS? Department of Neurology Johns Hopkins University, CMSC, May 28, 2014, pp. 1-13.
Flavia Nelson, MD., "Relapsing and Progressive Multiple Sclerosis: Understanding the Differences", The Neurology Hub, Jul. and Aug. 2012, 7 pages.
Ontaneda et al., "Progressive multiple sclerosis", Curr. Opin. Neurol. vol. 28, Issue 3, 2015, pp. 1-14.
Thompson et al., "Major Differences in the Dynamics of Primary and Secondary Progressive Multiple Sclerosis", Annals of Neurology, vol. 29, No. 1, Jan. 1991, pp. 53-62.
U.S. Office Action dated Nov. 15, 2023, in U.S. Appl. No. 16/949,278, 29 pages.
CPMP, "Note for Guidance on the Investigation of Bioavailability and Bioequivalence", The European Agency for the Evaluation of Medicinal Products *Evaluation of Medicines for Human Use*, EMEA, Jul. 26, 2001, 19 pages.
Cook et al., "Safety of Cladribine tablets in the treatment of patients with multiple sclerosis: An integrated analysis", Multiple Sclerosis and Related Disorders, vol. 29, Apr. 2019, pp. 157-167.
Giovannoni et al., "Pregnancy Outcomes During the Clinical Development Program of Cladribine in Multiple Sclerosis: An Integrated Analysis of Safety", Drug Safety, vol. 43, May 23, 2020, pp. 635-643.
Giovannoni et al., "067-Efficacy of cladribine tablets in patients with highly active relapsing-remitting multiple sclerosis: analysis of pooled double-blind data from the clarity and onward studies", Abstract, The Australian & New Zealand Association of Neurologist (ANZAN) 2018 ASM, May 29th-Jun. 1, 2018, Darwin Convention CentreAustralia, 2 pages, retrieved from internet: https://jnnp.bmj.com/content/89/6/A27.2.abstract.
Leist et al., "Long-term safety data from the cladribine tablets clinical development program in multiple sclerosis", Multiple Sclerosis and Related Disorders, vol. 46, Nov. 2020, pp. 102572:1-8.
Montalban, et al., "Efficacy of cladribine tablets as add-on to IFB-beta therapy in patients with active relapsing MS: final results from the phase II ONWARD study", poster, AAN, Apr. 15-21, 2016, Abstract No. 3285, 1 page.
Montalban et al., "Oral Cladribine as Add on to IFN β Therapy in Patients with Active Multiple Sclerosis: Results from the Phase II ONWARD Study (P07.099)", Supplemental-P07.099, Neurology, 07 Multiple Sclerosis: Clinical Trials Outcomes, Feb. 12, 2013, retrieved from internet: https://www.neurology.org/doi/10.1212/wnl.80.7_supplement.p07.099.
Montalban et al., "Oral Cladribine as add-on to IFN-β therapy in patients with active multiple sclerosis: results from the Phase II ONWARD Study" Poster P07.099, 65th Annual Meeting of the American Academy of Neurology (AAN), Mar. 16-23, 2013, San Diego, USA., 1 page.
Albertioni, F., et al., "On the bioavailability of 2-chloro-2'-deoxyadenosine (CdA)," European Journal of Clinical Pharmacology, vol. 44, Jan. 29, 1993, pp. 579-582.
Kottke, M.K., et al., "Tablet Dosage Forms," Chapter 10 of Modern Pharmaceutics 4th Ed., Banker, G.S., et al., eds. (2002).

(56) References Cited

OTHER PUBLICATIONS

"Biopharmaceutical Drug Delivery," BioPharm International (Aug. 1, 2004), accessible at https://www.biopharminternational.com/view/biopharmaceutical-drug-delivery-0 (last accessed Feb. 26, 2024).
Brewster, M.E., et al., "Applications of chemically-modified cyclodextrins: use of hydroxypropyl-β-cyclodextrin as an enabling excipient for brain targeting, redox-based derivatives of estradiol, A review of preclinical and clinical findings," Journal of Drug Delivery Science and Technology, vol. 14, No. 1, (2004), first publication Nov. 25, 2003, pp. 21-34.
Davis, M.E., et al., "Cyclodextrin-Based Pharmaceutics: Past, Present, and Future,"Nature Reviews, vol. 3, Dec. 2004, pp. 1023-1035.
Hellriegel, E.T., et al., "Interpatient variability in bioavailability is related to the extent of absorption: Implications for bioavailability and bioequivalence studies," Clinical Pharmacology & Therapeutics, vol. 60, No. 6, Dec. 1996, pp. 601-607.
Leuner, C., et al., "Improving drug solubility for oral delivery using solid dispersions,"European Journal of Pharmaceutics and Biopharmaceutics, vol. 50, Jul. 3, 2000, pp. 47-60.
Martinez, M.N., et al., "A Mechanistic Approach to Understanding the Factors Affecting Drug Absorption: A Review of Fundamentals,"Journal of Clinical Pharmacology, VI. 42, Jun. 2002, pp. 620-643.
Rajewski, R.A., et al., "Pharmaceutical Applications of Cyclodextrins," Journal of Pharmaceutical Sciences, vol. 85, No. 11, Nov. 1996, pp. 1142-1169.
Saven, A., et al., "Pharmacokinetic Study of Oral and Bolus Intravenous 2-Chlorodeoxyadenosine in Patients with Malignancy," Journal of Clinical Oncology, vol. 14, No. 3, Mar. 1996, pp. 978-983.
Chapters 2, 5, 6, 10 from Shargel, L., et al., Applied Biopharmaceutics & Pharmacokinetics, 4th Ed. (1999).
Loftsson, T., et al., "2-Hydroxypropyl-β-cyclodetrin: Properties and Usage in Pharmaceutical Formulations," PZ Wissenschaft, vol. 136, No. 1, Jan. 1991, pp. 5-10.
Sietsema, W.K., "The absolute oral bioavailability of selected drugs," International Journal of Clinical Pharmacology, Therapy, and Toxicology, vol. 27, No. 4, pp. 179-211 (1989), received May 16, 1988).
Hermann, R., "The Clinical Pharmacology of Cladribine Tablets for the Treatment of Relapsing Multiple Sclerosis," Clinical Pharmacokinetics, vol. 58, (2019), published Jul. 10, 2018, pp. 283-297.
*Westinghouse Air Brake Techs. Corp. v. Siemens Mobility, Inc.*, Nos. IPR2017-01669, IPR2017-02044, Paper 60 (P.T.A.B. Jan. 8, 2019).
Fred Lublin, Treatments for Multiple Sclerosis—American Academy of Neurology, Downloaded from http://journals.lww.com/continuum by68dEEPr4cd6FYwv21GyqrdapLkl+cujdMgX0Gev9r8qC1NEyUrRGEjCQZzRrpQd7l/wPH49NdEL6ucR0L1CJKuPOkBfHTSBcKX5JHPuLH6TDNC1r8g81oXHLZH7WHHzR on Jun. 13, 2024.
B. M. Greenberg et al., "Multiple Sclerosis", in Pharmacology and Therapeutics: Principles to Practice, S. A. Waldman & A. Terzic eds., 2009, pp. 685-702.
C. Krishnan et al., "Reduction of Disease Activity and Disability With High-Dose Cyclophosphamide in Patients With Aggressive Multiple Sclerosis", Archives of Neurology, vol. 65, No. 8, Aug. 2008, pp. 1044-1051.
B. Greenberg & E. M. Frohman, Defining Success in Multiple Sclerosis: Treatment Failures and Nonresponders, Proceedings, Johns Hopkins Advances Studies in Medicine, vol. 8, No. 8, Aug. 2008, pp. 274-283.
B. M. Greenberg et al., Current and Emerging Multiple Sclerosis Therapeutics, 16 Continuum Lifelong learning Neurol. vol. 16, No. 5, Oct. 2010, pp. 58-77.
P. S. Rommer et al., "Requirement for Safety Monitoring for Approved Multiple Sclerosis Therapies: An Overview", Clinical and Experimental Immunology, vol. 175, Sep. 11, 2013, pp. 397-407.
Leustatin® (cladribine) Package Insert, Oct. 2002, 3 pages.
M. Filippi et al., "Whole Brain Volume Changes in Patients with Progressive MS Treated with Cladribine", Neurology, vol. 55, Dec. 2000, pp. 1714-1718.
Reply and Amendment (Oct. 3, 2008), in File History for U.S. Pat. No. 7,888,328.
Mavenclad®(cladribine) Package Insert, Sep. 2022, 28 pages.
H. El-Moslimany et al., "Escape Therapies and Management of Multiple Sclerosis" in C. S. Raine Multiple Sclerosis a Comprehensive Text, 2008, pp. 333-352. (Excerpt).
M. J. Tullman et al., "Immunotherapy of Multiple Sclerosis—Current Practice and Future Directions", J. Rehab. Res. Dev., vol. 39, No. 2, Mar./Apr. 2002, pp. 273-285.
Transcript of video: A. Miller, What You Need to Know About Mavenclad® (https://www.nationalmssociety.org/Treating-MS/Medications/Mavenclad) (2019).
J. E. Joy et al., "Multiple Sclerosis: Current Status and Strategies for the Future", National Academy of Sciences, 2001, (Excerpt), 133 pages.
F. Lublin, "History of Modern Multiple Sclerosis Therapy", J. Neurol., vol. 252, Suppl 3, Sep. 2005, pp. III/3-III/9.
D. S. Goodin et al., "Disease Modifying Therapies in Multiple Sclerosis", Neurology, vol. 58, Jan. 2002, pp. 169-178.
R. A. Rudick et al., "Natalizumab: α4-Integrin Antagonist Selective Adhesion Molecule Inhibitors for MS", Expert Rev. Neurother., vol. 4, No. 4, Jan. 10, 2004, pp. 571-580.
R. A. Rudick et al., "Natalizumab plus Interferon Beta-1a for Relapsing Multiple Sclerosis", New Eng. J. Med., vol. 354, No. 9, Mar. 2, 2006, pp. 911-923.
L. Durelli, "Dose and Frequency of Interferon Treatment Matter", J. Neurol., vol. 250, Suppl 4, Dec. 2003, pp. IV/9-IV/14.
D. S. Alberts et al., "Disposition of Mitoxantrone in Cancer Patients", Cancer Res., vol. 45, Apr. 1985, pp. 1879-1884.
M. Caporro et al., "Two Decades of Subcutaneous Glatiramer Acetate Injection: Current Role of the Standard Dose, and New High-Dose Low-Frequency Glatiramer Acetate in Relapsing-Remitting Multiple Sclerosis Treatment", Patient Prefer. Adherence, vol. 8, Aug. 21, 2014, pp. 1123-1134.
J. C. Sipe et al., "Development of Cladribine Treatment in Multiple Sclerosis", Mult. Scler., vol. 1, 1996, pp. 343-347.
J. Noseworthy et al., "Disease-Modifying Treatments in Multiple Sclerosis" in A. Compston Mcalpine's Multiple Sclerosis, 4th edition, section 5, Dec. 2005, pp. 729-946, (Excerpt).
K. Rammohan et al., "The Development of Cladribine Tablets for the Treatment of Multiple Sclerosis: A Comprehensive Review", Drugs, vol. 80, Nov. 28, 2020, pp. 1901-1928.
G. Giovannoni et al., "Long-Term Follow-Up of Patients with Relapsing Multiple Sclerosis from the CLARITY/CLARITY Extension Cohort of CLASSIC-MS: An Ambispective Study", Mult. Scler. J., vol. 29, Feb. 12, 2023, pp. 719-730.
Merck Receives Complete Response Letter From FDA on Cladribine Tablets New Drug Application, fiercebiotech.com (Mar. 2, 2011) (https://www.fiercebiotech.com/biotech/merck-receives-complete-response-letter-from-fda-on-cladribine-tablets-new-drug- application), accessed on Dec. 20, 2023.
FDA News Release: FDA Approves New Oral Treatment For Multiple Sclerosis (Mar. 29, 2019) (https://www.fda.gov/news-events-press- announcements/fda-approves-new-oral-treatment-multiple-sclerosis), accessed on Nov. 25, 2023.
ClinicalTrials.gov publication and Record History, NCT00213135 A Safety and Efficacy Study of Oral Cladribine in Subjects With Relapsing-Remitting Multiple Sclerosis (RRMS) (CLARITY) (Feb. 7, 2014) (https://clinicaltrials.gov/study/NCT00213135; https://clinicaltrials.gov/study/NCT00213135?tab=history&a=13), accessed on Nov. 25, 2023.
M. Hoffman, K. Rammohan Interview: Short-Term Dosing Regimen Gives Cladribine an Advantage in MS, Neurologylive (Jul. 1, 2020) (https://www.neurologylive.com/view/shortcommitment-dosing- regimen-gives-cladribine-an-advantage-in-ms), accessed on Nov. 10, 2023.
J. Liliemark et al., "On the Bioavailability of Oral and Subcutaneous 2-Chloro-2'-Deoxydenosine in Humans: Alternative Routes of Administration", J. Clin. Oncol., vol. 10, No. 10, Oct. 1992, pp. 1514-1518.
U.S. Appl. No. 60/458,922, filed Mar. 28, 2003.

(56) References Cited

OTHER PUBLICATIONS

U.S. Appl. No. 60/484,756, filed Jul. 2, 2003.
U.S. Appl. No. 60/541,247, filed Feb. 4, 2004.
U.S. Pat. No. 8,785,415 File History, Response to Rule 312 Communication Post Allowance, filed on Jun. 12, 2014.
Serono Press Release, "Serono and IVAX to Develop Oral Therapy for Multiple Sclerosis" (Oct. 30, 2002).
C. Sargent, Serono Purchases Rights to Experimental MS Drug, Wall Street Journal (Oct. 31, 2002) (https://www.wsj.com/articles/SB1035995148253461151), accessed on Dec. 14, 2023.
Copaxone® (glatiramer acetate) Package Insert, Jan. 2014.
A. Liu, Better 8 Years Late Than Never: Merck KGaA Nabs FDA Nod for MS Drug Mavenclad, fiercepharma.com (Apr. 1, 2019) (https://www.fiercepharma.com/pharma/better-8-years-late-than-never-merck-kgaa-nabs-fda-nod-for-ms-drug-mavenclad), accessed on Dec. 18, 2023.
The Canadian Cooperative Multiple Sclerosis Study Group, The Canadian Cooperative Trial of Cyclophosphamide and Plasma Exchange in Progressive Multiple Sclerosis, Lancet, vol. 337, No. 8739, Feb. 23, 1991, pp. 441-446.
J. W. Hainer et al., "Dosing in Heavy-Weight/Obese Patients with the LMWH, Tinzaparin: A pharmacodynamic Study", Thromb Haemost, vol. 87, Jan. 30, 2002, pp. 817-823 (Excerpt).
B. Meibohm et al., "Clinical Pharmacodynamics & Pharmacokinetics", In: R. A. Helms, RA et al., Textbook of Therapeutics: Drug and Disease Management, 1, Edition 8th, 2006, pp. 1-30. (Excerpt).
Safety & Side Effects Learn about the possible risks of Mavenclad (https:/www.mavenclad.com/en/home/why-mavenclad/safety-and-side-effects.html#:~:text=It) (last updated Nov. 2022), accessed on Dec. 18, 2023.
D. S. Goodin et al., "Disease Modifying Therapies in Multiple Sclerosis", 58 Neurology, vol. 58, Jan. 2002, pp. 169-178, Supplementary Material, pp. 1-63 (Service Only).
Stephen Krieger et al., "Issues in the Design and Interpretation of Multiple Sclerosis Clinical Trials" in Primer on Multiple Sclerosis, B. S. Giesser, ed., 2011, pp. 435-450.
A. Miller et al., "Current and Investigational Therapies Used to Alter the Course of Disease in Multiple Sclerosis", South. Med. J. vol. 90, No. 4, Apr. 1997, pp. 367-375.
Publisher's Record of Giovannoni et al., "A Placebo-Controlled Trial of Oral Cladribine for Relapsing Multiple Sclerosis", The New England Journal of Medicine, vol. 362, Feb. 4, 2010, pp. 416-426.
A. E. Miller et al., Treatment Issues in R. C. Kalb Multiple Sclerosis: The Question You Have—The Answers You Need 43 (2d ed. 2000) (Excerpt).
McMahan, Z.H., et al., "Effects of biological and non-biological immunomodulatory therapies on the immunogenicity of vaccines in patients with rheumatic diseases", Arthritis Research & Therapy, 16, 506 (2014), pp. 1-10.
Roy et al., "Analysis of Influenza and Varicella Zoster Virus Vaccine Antibody Titers in Patients with Relapsing Multiple Sclerosis Treated with Cladribine Tablets", ACTRIMS 2021 Virtual Congress, Feb. 25, 2021, 10 pp.
Roy et al., "Analysis of Influence and Varicella Zoster Virus Vaccine Antibody Titers in Patients with Relapsing Multiple Sclerosis Treated with Cladribine Tablets", Multiple Sclerosis Journal, (2021) vol. 27, No. 1 SUPPL, pp. 43-44. Abstract No. P059, Meeting Info: Annual Americas Committee for Treatment and Research in Multiple Sclerosis Forum, ACTRIMS 2021. Virtual. Feb. 15, 2021, ISSN: 1477-1970
European Commission, Secretariat-General, "Notification Pursuant to Article 297 of the TFEU—Commission Implementing Decision (Aug. 22, 2017)," Brussels, Aug. 22, 2017, SG-Greffe(2017) D/13233, incuding Annexes I-III (2017) 5888, 44 pp.
Search Results from EMBASE Database on Nov. 14, 2025, 4 pp.
Wu et al., "Evaluating The Impact Of Cladribine Tablets On The Developement Of Antibody Titres: Interim Results from the Cock-MS Influenza Vaccine Sub-Study", ACTRIMS 2021 Virtual Congress, Feb. 25, 2021, 9 pp.
Wu et al., "Evaluating The Impact Of Cladribine Tablets On The Development Of Anti Titres: Interim Results from the Clock-MS Influenza Vaccine Sub-Study", Multiple Sclerosis Journal, (2021) vol. 27, No. 1 SUPPL, pp. 49-50. Abstract No. P071. Annual Americas Committee for Treatment and Research in Multiple Sclerosis Forum, ACTRIMS 2021. Virtual. Feb. 15, 2021, ISSN: 1477-0970.
Cook et al., "Infections during periods of Grade 3 or 4 lymphopenia in patients taking cladribine tablets 3.5 mg/kg: data from an integrated safety analysis", 4th Congress of the European Academy of Neurology, Lisbon, Portugal, 2018, 1 pp.
Cook et al., "Infections during periods of Grade 3 or 4 lymphopenia in patients taking cladribine tablets 3.5 mg/kg: data from an integrated safety analysis", Eur.J.Neurol. (2018), vol. 25, pp. AbsEPO1082, Suppl. 2. ISSN: 1351-5101 Conference: 4th Congress of the European Academy of Neurology, Lisbon, Portugal, Jun. 16, 2018.

\* cited by examiner

| | Country | Sex | Age (years) | Confirmed COVID-19 | Serious | Therapy start date | Start of most recent course | Year 1 course complete | Year 2 course complete | Last lymphocyte count (G/L) | Most recent lymphocyte count (date) | COVID-19 onset (date) | Time from most recent course to COVID-19 onset (days) | COVID-19 recovery (date) | Last status |
|---|---|---|---|---|---|---|---|---|---|---|---|---|---|---|---|
| 1 | Norway | F | 35 | Y | N | 01/02/19 | 17/02/20 | Y | N | 1.1 | NR | 08/03/20 | 20 | 18/03/20 | Recovered |
| 2 | Germany | M | 59 | Y | Y | 10/03/20 | 10/03/20 | N | N | 0.24 | NR | Mar-20 | NR | NA | Recovering |
| 3 | France | F | 57 | Y | Y | 08/10/18 | 01/10/19 | Y | Y | 0.34 | NR | 29/03/20 | 115 | 26/04/20 | Recovered |
| 4 | Netherlands | M | 49 | Y | N | 18/11/19 | 18/11/19 | Y | N | 0.87 | 13/01/20 | 01/03/20 | 104 | NA | Recovered |
| 5 | UK | M | 29 | N | N | 01/10/18 | 01/10/19 | Y | Y | 0.5 | 18/03/20 | 24/03/20 | 175 | NA | Recovered |
| 6 | UK | F | 38 | N | N | 09/11/18 | 15/11/19 | Y | Y | 1.2 | 26/01/20 | 13/03/20 | 119 | NA | Recovered |
| 7 | UK | F | 53 | N | N | NR | NR | Y | Y | 0.7 | Mar-20 | NR | NR | NA | Recovered |

F, female; M, male; N, no; NA, not available; NR, not reported; Y, yes

FIG. 1

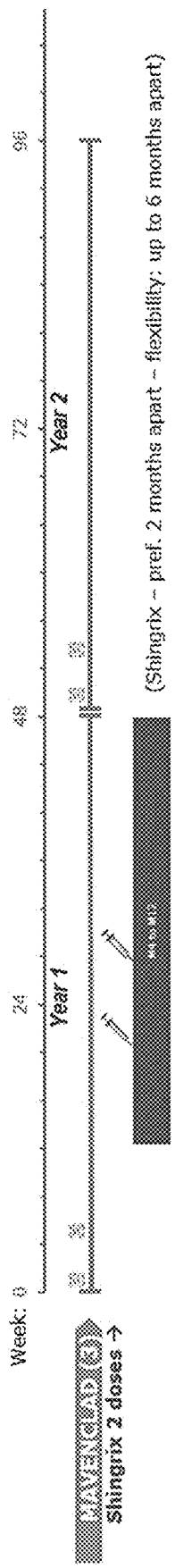
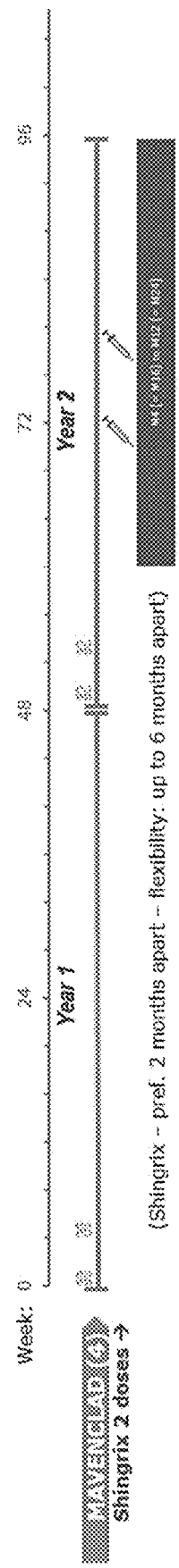
MAVENCLAD: (1) Week 1 (or Month 1, week 1), (2) Week 5 (or Month 2, week 1), (3) Week 49 (or Month 13, week 1), (4) Week 53 (or Month 14, week 1)
Vaccination: 1st dose: Week 12-40, pref. Week 16-32, 2nd dose: Week 20-48, pref. Week 24-40
MAVENCLAD: (1) Week 1 (or Month 1, week 1), (2) Week 5 (or Month 2, week 1), (3) Week 49 (or Month 13, week 1), (4) Week 53 (or Month 14, week 1)
Vaccination: 1st dose: Week 60-88, pref. Week 64-80, 2nd dose: Week 68-96, pref. Week 72-88
FIG. 5

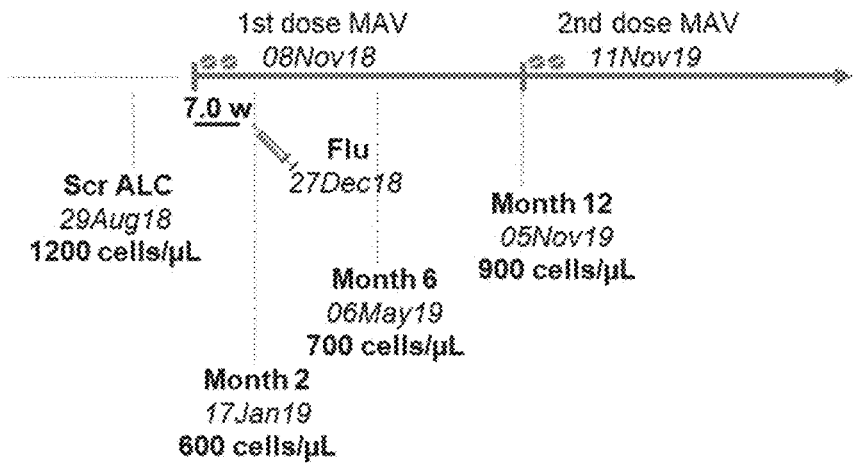
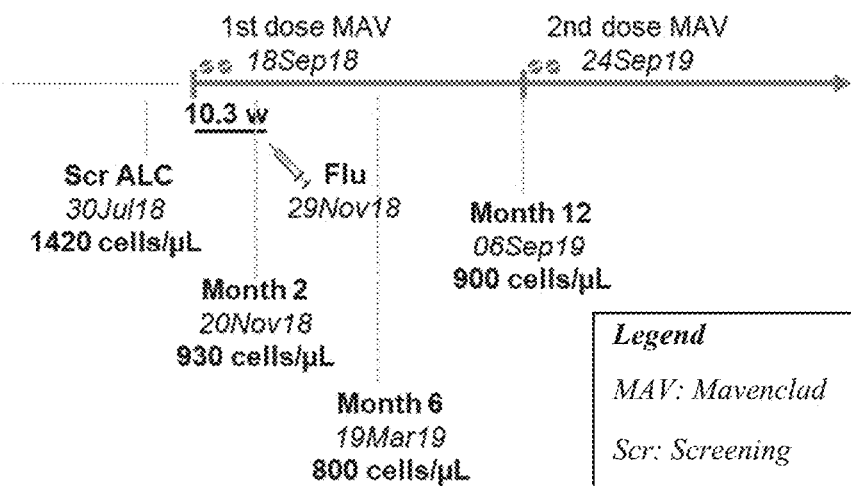
FIG. 7

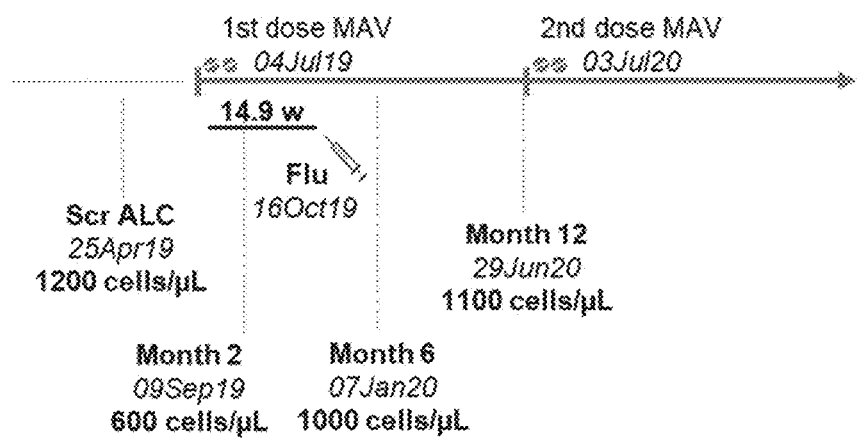
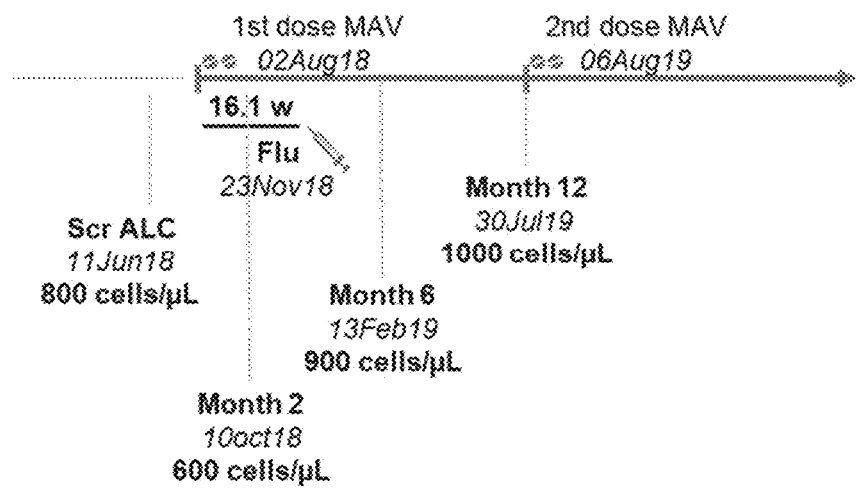
FIG. 8

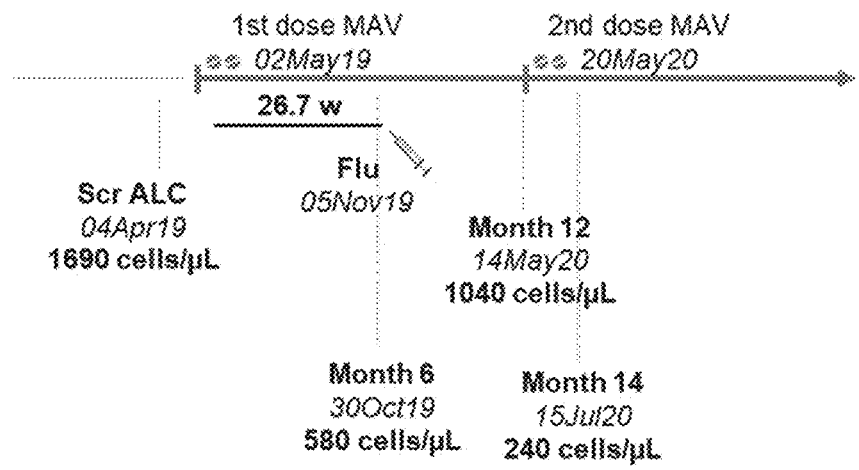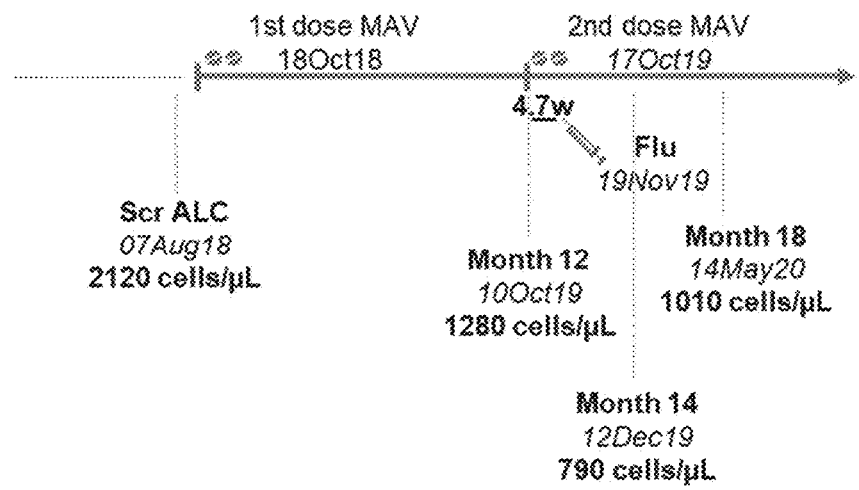
FIG. 9

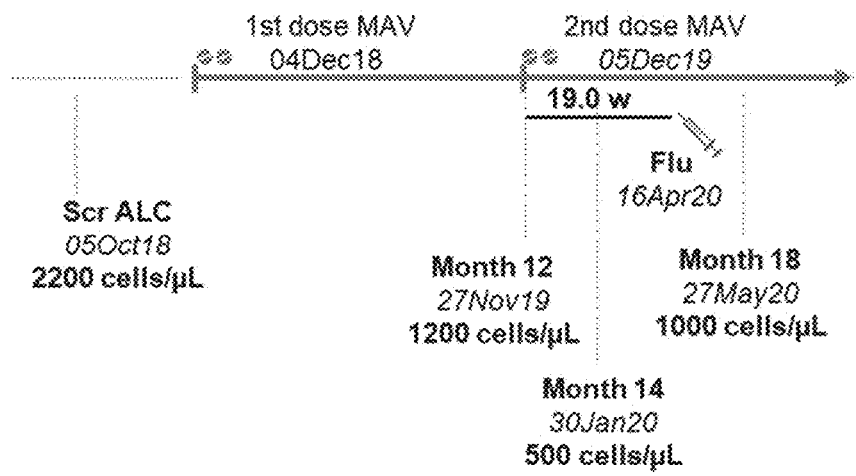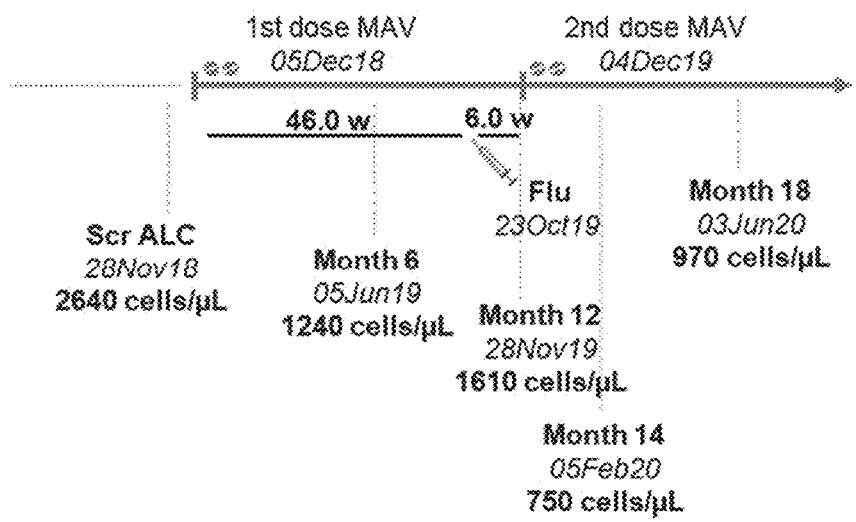
FIG. 10

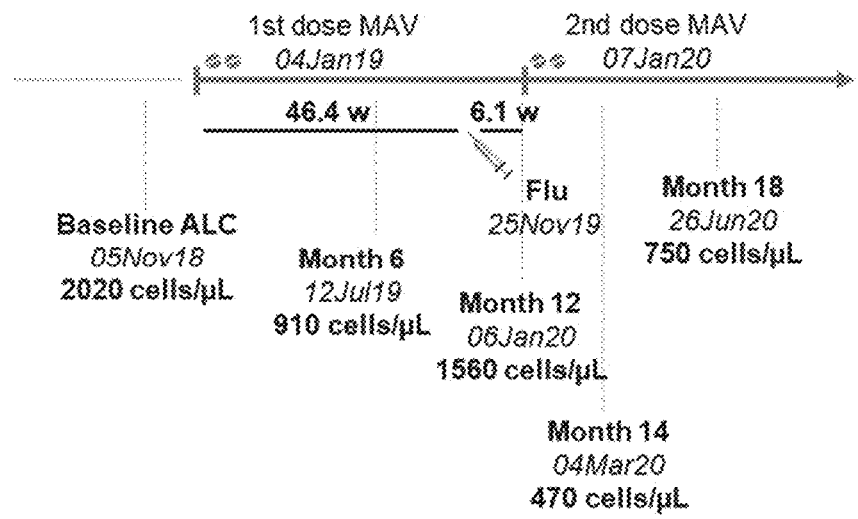
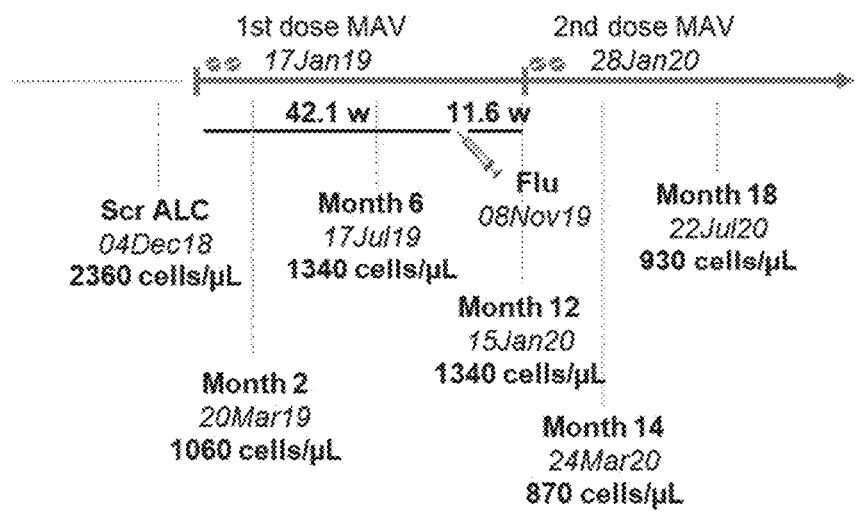
FIG. 11

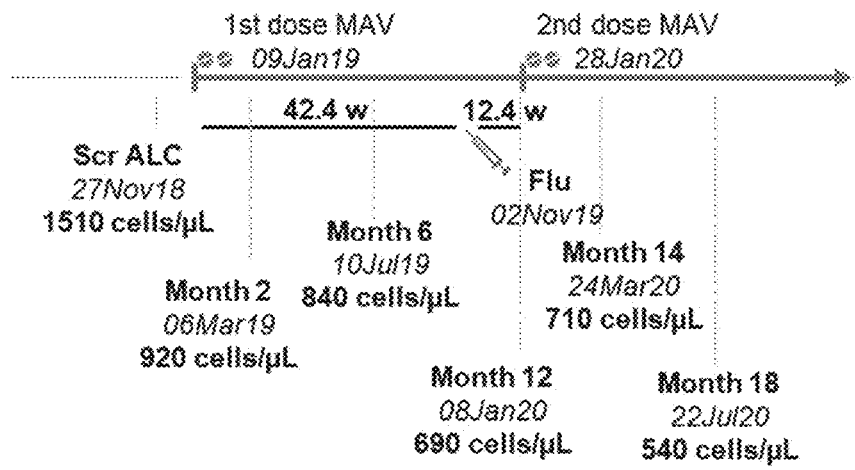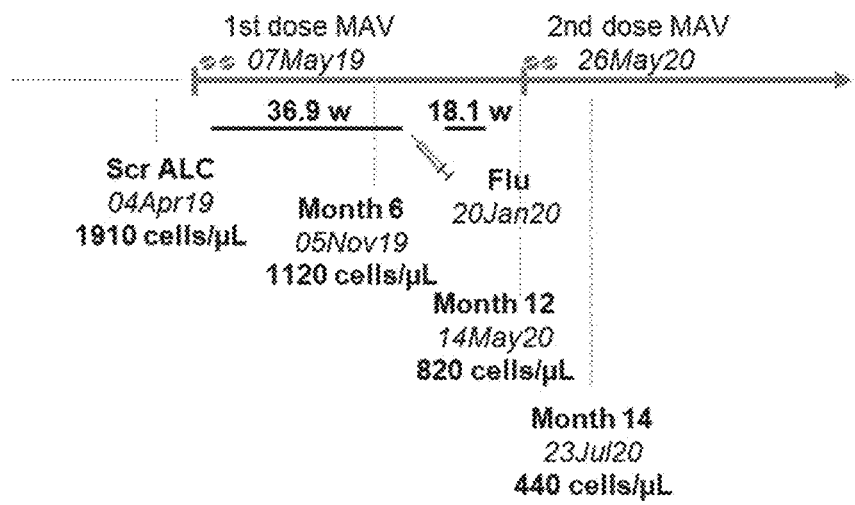
FIG. 12

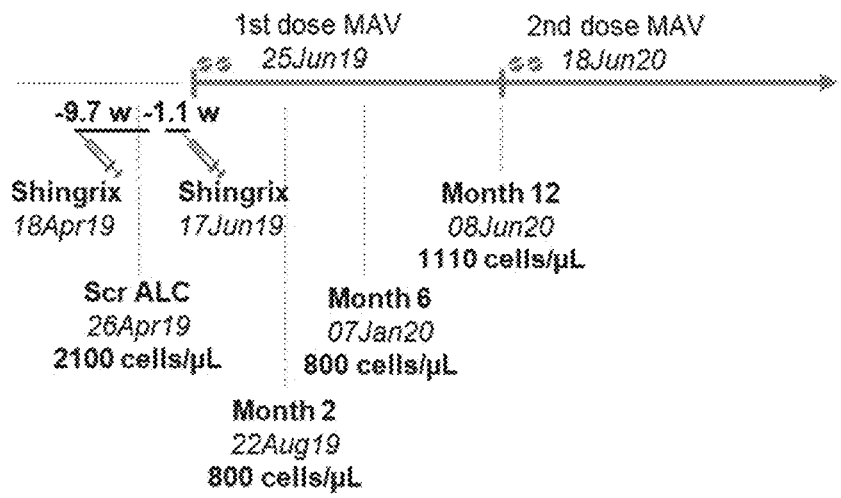
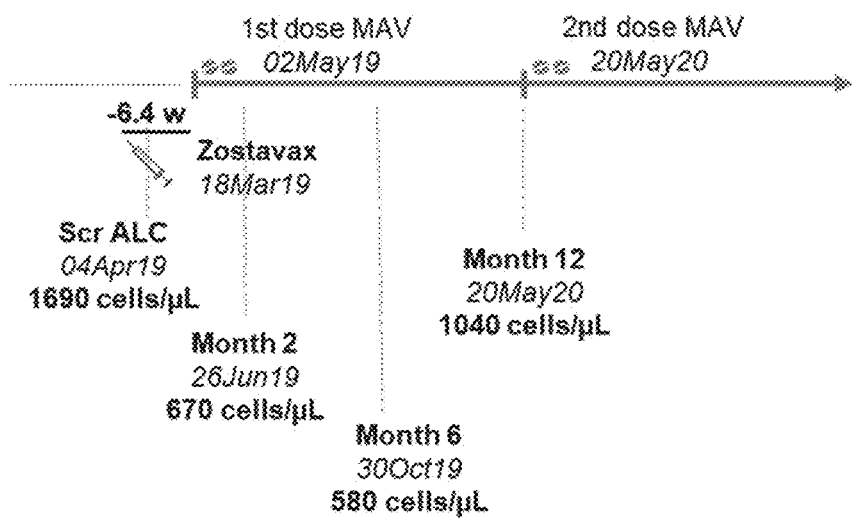
FIG. 13

2020-2021 Influenza Vaccine Composition

It is recommended that egg-based quadrivalent actions for use in the 2020-2021 northern hemisphere influenza season contain the following:

- an A/Guangdong-Maonan/SWL1536/2019 (H1N1)pdm09-like virus;
- an A/Hong Kong/2671/2019 (H3N2)-like virus;
- a B/Washington/02/2019 (B/Victoria lineage)-like virus; and
- a B/Phuket/3073/2013-like virus (B/Yamagata/16/88 lineage).

Cell- or recombinant-based quadrivalent vaccines for use in the 2020-2021:

- an A/Hawaii/70/2019 (H1N1)pdm09-like virus;
- an A/Hong Kong/45/2019 (H3N2)-like virus;
- a B/Washington/02/2019 (B/Victoria lineage)-like virus; and
- a B/Phuket/3073/2013-like virus (B/Yamagata/16/88 lineage).

2019-2020 Influenza Vaccine Composition

It is recommended that egg-based quadrivalent vaccines for use in the 2020-2021 northern hemisphere influenza season contain the following:

- an A/Brisbane/02/2018 (H1N1)pdm09-like virus;
- an A/Kansas/14/2017 (H3N2)-like virus;
- a B/Colorado/06/2017-like virus (B/Victoria/2/87 lineage); and
- a B/Phuket/3073/2013-like virus (B/Yamagata/16/88 lineage).

It is recommended that the influenza B virus component of the trivalent vaccines for use in the 2019-2020 northern hemisphere influenza season be a B/Colorado/06/2017-like virus of the B/Victoria/2/87 lineage.

FIG. 16A

2018-2019 Influenza Vaccine Composition

It is recommended by the WHO that quadrivalent vaccines for use in the 2018-2019 northern hemisphere influenza season contain the following:

A/Michigan/45/2015 (H1N1)pdm09-like virus;
A/Singapore/INFIMH-16-0019/2016 (H3N2)-like virus;
B/Colorado/06/2017-like virus (B/Victoria/2/87 lineage); and
B/Phuket/3073/2013-like virus (B/Yamagata lineage).

It is recommended that the influenza B virus component of the trivalent vaccines for use in the 2018-2019 northern hemisphere influenza season be a B/Colorado/06/2017-like virus of the B/Victoria/2/87 lineage.

2017-2018 Influenza Vaccine Composition

All 2017-18 influenza vaccines licensed in the United States will contain hemagglutinin (HA) derived from influenza viruses antigenically similar to those recommended by FDA.

2017-18 trivalent vaccines:

A/Michigan/45/2015 (H1N1)pdm09-like virus;
A/Hong Kong/4801/2014 (H3N2)-like virus;
A/Brisbane/60/2008-like virus (Victoria lineage)

2017-18 quadrivalent vaccines:

the same three HA antigens as trivalent vaccines, plus
B/Phuket/3073/2013-like virus (Yamagata lineage).

FIG. 16B

TREATMENT REGIMEN FOR THE TREATMENT OF AUTOIMMUNE DISORDERS

CROSS-REFERENCE TO RELATED APPLICATIONS

This application is a continuation of U.S. application Ser. No. 18/599,308, filed Mar. 8, 2024, which is a continuation of U.S. application Ser. No. 18/044,568, filed Mar. 8, 2023, which is the National Stage entry under § 371 of International Application No. PCT/EP2021/074928, filed on Sep. 10, 2021, and which claims the benefit of priority to U.S. Provisional Application No. 62/706,795, filed on Sep. 10, 2020, 62/706,819, filed on Sep. 11, 2020, 63/198,971, filed on Nov. 25, 2020, 63/199,265 filed on Dec. 16, 2020, 63/149,196, filed on Feb. 12, 2021, and 63/175,318, filed on Apr. 15, 2021. The content of each of these applications is hereby incorporated by reference in its entirety.

BACKGROUND OF THE INVENTION

Field of the Invention

The present invention relates to a novel treatment regimen for the treatment of autoimmune disorders. Said novel treatment regimen preferably provides for an efficacious treatment of autoimmune disorders with an advantageous safety profile and/or a high quality of life for the patient. Preferably, said novel treatment regimen provides for an advantageous benefit-risk ratio for patients endangered by the risk of infections. This is deemed of particular importance as basically all treatment options for treating autoimmune disorders that provide for efficacious treatment include active ingredients that have immunosuppressive properties, which are generally afflicted with safety concerns in context to infectious disorders.

Description of Related Art

In the treatment of autoimmune disorders, such as Multiple Sclerosis (MS), Rheumatoid Arthritis (RA), Systemic Lupus Erythematosus (SLE), Neuromyelitis Optica Spectrum Disorders (NMOSD) and Myasthenia Gravis (MG), a suppression of at least a part of the immune system of the diseased body can lead to improvements of the clinical picture of the respective disorders, as autoimmune disorders are to be regarded as the result of an over-activation the body's own immune system.

Accordingly, a variety of directly or indirectly immunosuppressant drugs are widely used in the treatment of autoimmune disorders, including, but not limited to corticosteroids, such as such as cortisol, glucocorticoids, such as prednisone, dexamethasone and hydrocortisone, cytostatics, such as nitrogen mustards (e.g. cyclophosphamide), nitrosoureas, platinum compounds, anti-metabolites, such as methotrexate, azathioprine, mercaptopurine, fluorouracil and cladribine, B- and/or T-cell receptor directed antibodies, such as obinutuzumab, rituximab, ocaratuzumab, ocrelizumab and muromonab, Drugs acting on immunophilins, such as ciclosporin, tacrolimus, sirolimus and everolimus, and other also immunosuppressive drugs, such as interferons, opioids, TNF binding proteins, such as infliximab, etanercept and adalimumab, and Mycophenolate.

In the field of Multiple Sclerosis (MS), Rheumatoid Arthritis (RA), Systemic Lupus Erythematosus (SLE), Neuromyelitis Optica Spectrum Disorders (NMOSD) and Myasthenia Gravis (MG), the immunosuppressive drugs most widely used include injectables like natalizumab (Tysabri®), alemtuzumab (Lemtrada®), ocrelizumab (Ocrevus®), rituximab (Rituxan®), and glatirameracetate (Copaxone®), and orals like dimethyl fumarate (Tecfidera®), fingolimod (Gilenya®) and cladribine tablets (Mavenclad®)

However, as autoimmune diseases are normally not curable, but rather are chronic lifelong disorders, sustained administration of immunosuppressive drugs over the years, if not decades, is clinical reality. As a consequence, their side effects can lead to severe outcomes in many of the accordingly treated subjects, sometimes even more severe than the underlying autoimmune disease itself. Under immunosuppressive treatment, every infection or even opportunistic infection, independently of whether by bacteria, viruses or virus and related pathogens, such as viroids, fungi, or protozoa, can cause severe clinical crises for a subject.

The active ingredient cladribine has been developed in the 1980s as an active principle (API) that is an antimetabolite for the treatment of certain blood cancers and subsequently approved for the treatment of hairy cell leukaemia (HCL). Its mode of action in the indication HCL is based on the finding that it is able to enrich in certain blood cells of the living body of the treated subject, including lymphocytes, and depleting them, e.g. by apoptosis. As a result of the treatment with cladribine, the amount of lymphocytes in the body of the treated subject decreases quite considerably, thereby affecting the immune system of the subject since the immune system largely depends on the lymphocytes that the living body normally provides. Thus, treatment of hairy cell leukaemia with cladribine is known to be associated with potential side effects, such as an increased risk for infections, an increased severity of infections, and an increased risk for malignancies in the long term.

Despite these problems, the reduction of the lymphocytes in the body achieved by administering an API to the body of a subject and the resulting suppression of the immune system of the treated body by it is not necessarily negative in the first place, as a reduced activity of the immune system is beneficial in the treatment of certain disorders or conditions, such as host-graft rejection, and autoimmune diseases or autoimmune disorders in general. In both the treatment or amelioration of host-graft rejection and autoimmune diseases, a variety of immunosuppressant drugs are first choice treatment options.

However, to date, there is a high medical need for treatment regimen for treating autoimmune disorders with immunosuppressive agents with a positive benefit-risk ratio with regard to adverse events triggered by infections, especially viral and/or bacterial infections.

SUMMARY OF THE INVENTION

Multiple types of bacteria, especially multiple types of pathogenic bacteria, that potentially can infect, more specifically pathologically infect, one or more host species, including warm-blooded animals, mammals and humans, are known. Generally, an infection by (pathologic) bacteria often leads to bacterial disease or infectious bacterial disease in said host, when an organism's body (i.e. the host's body) is invaded by one or more of said pathogenic bacteria, and the host body's cannot control or not sufficiently control the replication and spread of said pathogenic bacteria within the host's body, or parts or organs thereof, and thus cause a bacterial disease or disorder.

Other bacteria are characterized as opportunistic pathogens and cause disease mainly in people suffering from immunosuppression or cystic fibrosis. Examples of these opportunistic pathogens include *Pseudomonas aeruginosa* (causing diseases such as hospital-acquired infections, ventilator-associated pneumonia, a type of lung infection that occurs in people who are on mechanical ventilation breathing machines in hospitals, and various sepsis syndromes), *Burkholderia cenocepacia*, and *Mycobacterium avium* (found in fresh and salt water, in household dust and in soil, is causing a disease in humans called *Mycobacterium avium-intracellulare* infection or *Mycobacterium avium* complex infection, normally only in subjects who are immunocompromised or those with severe lung disease.

Preferably, bacterial infections, diseases or disorders include, but are preferably not limited to, Anthrax, Cholera, Diphtheria, *Haemophilus influenzae*, Meningococcal Meningitis, Pertussis, Plague, Pneumococcal Disease, *Streptococcus pneumoniae*, Tetanus, Tuberculosis, and Typhus.

Multiple types of viruses that potentially can infect, more specifically pathologically infect, one or more host species, including warm-blooded animals, mammals and humans, are known. Generally, a viral infection, often leading to a viral disease or infectious viral disease, in said host occurs when an organism's body (i.e. the host's body) is invaded by pathogenic viruses, and infectious virus particulates (such as virions) attach to and enter susceptible cells of said body of said host or subject.

Basic structural characteristics, such as genome type, virion shape and replication site, generally share the same features among virus species within the same family:

Double-stranded DNA families: three are non-enveloped (Adenoviridae, Papillomaviridae and Polyomaviridae) and two are enveloped (Herpesviridae and Poxviridae). All of the non-enveloped families have icosahedral capsids.

Partly double-stranded DNA viruses: Hepadnaviridae. These viruses are enveloped.

One family of single-stranded DNA viruses infects humans: Parvoviridae. These viruses are non-enveloped.

Positive single-stranded RNA families: three non-enveloped (Astroviridae, Caliciviridae and Picornaviridae) and four enveloped (Coronaviridae, Flaviviridae, Retroviridae and Togaviridae). All the non-enveloped families have icosahedral nucleocapsids.

Negative single-stranded RNA families: Arenaviridae, Bunyaviridae, Filoviridae, Orthomyxoviridae, Paramyxoviridae and Rhabdoviridae. All are enveloped with helical nucleocapsids.

Double-stranded RNA genome: Reoviridae.

The Hepatitis D virus has not yet been assigned to a family, but is clearly distinct from the other families infecting humans.

Viruses known to infect humans that have not been associated with disease: the family Anelloviridae and the genus Dependovirus. Both of these taxa are non-enveloped single-stranded DNA viruses.

Human-infecting virus families offer rules that may assist physicians and medical microbiologists/virologists.

As a general rule, DNA viruses replicate within the cell nucleus while RNA viruses replicate within the cytoplasm. Exceptions are known to this rule: poxviruses replicate within the cytoplasm and orthomyxoviruses and hepatitis D virus (RNA viruses) replicate within the nucleus.

Segmented genomes: Bunyaviridae, Orthomyxoviridae, Arenaviridae, and Reoviridae (acronym BOAR). All are RNA viruses.

Viruses transmitted almost exclusively by arthropods: Bunyavirus, Flavivirus, and Togavirus. Some Reoviruses are transmitted from arthropod vectors. All are RNA viruses.

One family of enveloped viruses causes gastroenteritis (Coronaviridae). All other viruses associated with gastroenteritis are non-enveloped.

The below given table [Table 1] summarises some of the most clinically important pathogenic viruses that are known to afflict a plurality of hosts, including humans, and the type, family, exemplary transmission routes and infections/diseases commonly attributed to the respective viruses. However, the clinical characteristics of viruses may differ substantially among species within the same family.

TABLE 1

| Type | Family | Transmission | Infections/Diseases |
|---|---|---|---|
| Adenovirus | Adenoviridae | droplet contact<br>fecal—oral<br>venereal<br>direct eye<br>contact | gastroenteritis<br>keratoconjunctivitis<br>pharyngitis<br>croup<br>pharyngoconjunctival fever<br>pneumonia<br>pneumonia<br>cystitis |
| Coxsackievirus | Picornaviridae | fecal—oral<br>respiratory<br>droplet contact | Hand, foot and mouth disease<br>pleurodynia<br>aseptic meningitis<br>pericarditis<br>myocarditis |
| Epstein-Barr virus | Herpesviridae | saliva | infectious mononucleosis<br>Burkitt's lymphoma<br>Hodgkin's lymphoma<br>nasopharyngeal carcinoma |
| Hepatitis A virus | Picornaviridae | fecal—oral | acute hepatitis |
| Hepatitis B virus | Hepadnaviridae | bodily fluids<br>Vertical and<br>sexual | acute hepatitis<br>chronic hepatitis<br>hepatic cirrhosis<br>hepatocellular carcinoma |
| Hepatitis C virus | Flaviviridae | blood<br>sexual contact | acute hepatitis<br>chronic hepatitis<br>hepatic cirrhosis<br>hepatocellular carcinoma |

TABLE 1-continued

| Type | Family | Transmission | Infections/Diseases |
|---|---|---|---|
| Herpes simplex virus, type 1 | Herpesviridae | direct contact saliva | herpes labialis, cold sores—can recur by latency gingivostomatitis in children tonsillitis & pharyngitis in adults keratoconjunctivitis |
| Herpes simplex virus, type 2 | Herpesviridae | sexual contact vertical transmission | Skin vesicles, mucosal ulcers, Oral and/or genital Can be latent Aseptic meningitis |
| Cytomegalovirus | Herpesviridae | vertical transmission bodily fluids | infectious mononucleosis Cytomegalic inclusion disease Premature birth liver, lung and spleen diseases in the newborn Small size at birth Small head size congenital seizures in the newborn |
| Human herpesvirus, type 8 | Herpesviridae | Saliva Sexual | Kaposi sarcoma multicentric Castleman disease primary effusion lymphoma |
| HIV | Retroviridae | sexual contact blood breast milk vertical transmission | AIDS |
| Influenza virus | Orthomyxoviridae | droplet contact | influenza (Reye syndrome) |
| Measles virus | Paramyxoviridae | droplet contact | measles postinfectious encephalomyelitis |
| Mumps virus | Paramyxoviridae | droplet contact | mumps |
| Human papillomavirus | Papillomaviridae | direct contact sexual contact vertical transmission | hyperplastic epithelial lesions (common, flat, plantar and anogenital warts, laryngeal papillomas, epidermodysplasia verruciformis) Malignancies for some species (cervical carcinoma, squamous cell carcinomas) |
| Parainfluenza virus | Paramyxoviridae | droplet contact | croup pneumonia bronchiolitis common cold |
| Poliovirus | Picornaviridae | fecal—oral | poliomyelitis |
| Rabies virus | Rhabdoviridae | animal bite droplet contact | rabies (fatal encephalitis) |
| Respiratory syncytial virus | Paramyxoviridae | droplet contact hand to mouth | bronchiolitis pneumonia influenza-like syndrome severe bronchiolitis with pneumonia[3] |
| Rubella virus | Togaviridae | Respiratory droplet contact | congenital rubella German measles |
| Varicella-zoster virus | Herpesviridae | droplet contact direct contact | chickenpox herpes zoster Congenital varicella syndrome |
| SARS-CoV-2 | Coronaviridae | droplet contact fecal—oral | COVID-19 |

Preferably, all of the above given viruses and/or viral disorders are to be regarded as clinically relevant viruses and/or viral disorders in the context of the uses according to the instant invention and/or methods of treatment according to the instant invention. More preferably, in MS, a number of vaccine-preventable infectious diseases are relevant as the risk of infection or poor outcomes is increased by the MS itself or its therapy. These primarily include hepatitis B virus (HBV) and varicella zoster virus (VZV). Other infection diseases might include Hepatitis B, Measles, Influenza, Poliovirus, Pneumococci, Diphtheria, Tetanus and *Bordetella pertussis*, SARS-COVID-2 and/or SARS-COVID-19. Vaccines against SARS Covid-2 and/or SARS-COVID-19 are now available, with further alternatives to become available soon.

Viral infections and/or the resulting diseases can typically be detected by clinical presentation, signs and/or symptoms, including, but not limited to severe muscle and joint pains preceding fever, or skin rash and swollen lymph glands. Standard laboratory investigation may help detecting viral infections. Laboratory investigation may also be useful in diagnosing bacterial infections associated with a viral infection. Viral infections are commonly of limited duration, and treatment according to the prior art typically consists of reducing the symptoms, and antipyretic and analgesic drugs are commonly prescribed.

However, the best protection of subjects against the potentially serious and harmful outcome of infections is the prevention of amelioration of the infection as such. The most advantageous way of preventing or ameliorating inventions is currently regarded the vaccination of subjects that are endangered by said infections.

However, precautionary measures against infections, like vaccinations, generally require a proper immune response of the respective body and are thus are generally recommended to be done well in advance of serious medical interventions, i.e. surgery, chemotherapy, radiotherapy or of the start of an immunosuppressive treatment, and/or well after the end of the respective serious medical intervention.

Accordingly, precautionary measures against infections, like vaccinations, which require a proper immune response of the respective body are generally recommended to be done well in advance of the start of the respective immunosuppressive treatment, and/or well after the end of the respective immunosuppressive treatment, if any.

In this context, a vaccination is preferably the administration of a vaccine to help the immune system develop protection from a disease, preferably an infectious disease. Vaccines typically contain the pathogen of the respective disease, preferably a microorganism or virus, in a weakened, live or killed/dead state, or proteins or toxins from the respective organism. In stimulating the body's adaptive immunity, they help prevent sickness from an infectious disease. Vaccination is the most effective method of preventing infectious diseases, thus preventing and infectious diseases in people with reduced immunity due to a immunosuppressive treatment are generally regarded as important and advantageous/desirous.

Infectious disorders for which vaccines are available or at least desirous, include, but are not limited to influenza and influenza-like diseases, such as Parainfluenza virus (causing croup, pneumonia, bronchiolitis and/or common cold), and Cornavirus-induced infections, such as the epidemics or pandemics caused by SARS-CoV, HCoV NL63, HCoV HKU1, MERS-CoV, and SARS-CoV-2/COVID-19, and/or its mutants or successors.

More specifically, coronaviruses preferably constitute the subfamily Orthocoronavirinae, in the family Coronaviridae, order Nidovirales, and realm Riboviria. They are regarded as enveloped viruses with a positive-sense single-stranded RNA genome and/or a nucleocapsid of helical symmetry. The latter is typically wrapped in a icosahedral protein shell. The genome size of coronaviruses is believed to range from approximately 26 to 32 kilobases, one of the largest among RNA viruses. Moreover, they typically have characteristic club-shaped spikes that project from their surface, which in electron micrographs create an image reminiscent of the solar corona, from which their name is believed to be derived.

Human coronaviruses were discovered in the 1960s, including viruses tagged B814, 229E, IBV (infectious bronchitis virus), and OC43. This new group of viruses came to be known as coronaviruses after their distinctive morphological appearance. Since then, a plurality of other human coronaviruses have been identified, including SARS-CoV in 2003, HCoV NL63 in 2004, HCoV HKU1 in 2005, MERS-CoV in 2012, and SARS-CoV-2 in 2019. However, there have also been a large number of animal coronaviruses identified since the 1960s.

Influenza, commonly known as "the flu", is an infectious disease caused by an influenza virus. Symptoms can be mild to severe. The most common symptoms include: high fever, runny nose, sore throat, muscle and joint pain, headache, coughing, and feeling tired. These symptoms typically begin two days after exposure to the virus and most last less than a week. The cough, however, may last for more than two weeks. In children, there may be diarrhea and vomiting, but these are not common in adults. Complications of influenza may include viral pneumonia, secondary bacterial pneumonia, sinus infections, and worsening of previous health problems such as asthma or heart failure.

Typically, three of the four types of influenza viruses affect humans: Type A, Type B, and Type C. Type D has not been known to infect humans to date, but is believed to have the potential to do so.

There are 4 types of influenza virus_A, B, C and D. Only influenza A and B cause seasonal epidemics of respiratory illness that occur every year. Influenza A viruses are further divided into different subgroups based on two proteins found on the surface of the virus—hemagglutinin (HA) and Neuaminidase (NA). There are 18 different subtypes of HA (H1-18) and 11 different subtypes of NA (N1-11).

Each year the annual flu vaccine protects against 3 or 4 strains of flue. H1N1, H1N2, and H3N2 are the only known Influenza A virus subtypes currently circulating among humans and are included in the trivalent vaccines, while an extra influenza B strain is included in the quadrivalent vaccine.

H1N1 flu is also known as swine flu. It's called swine flu because in the past, the people who caught it had direct contact with pigs. That changed several years ago, when a new virus emerged that spread among people who hadn't been near pigs. In 2009, H1N1 was spreading fast around the world, so the World Health Organization called it a pandemic.

The H3N2 virus continues to circulate worldwide as a seasonal influenza A virus. Seasonal H3N2 viruses, which are associated with severe illness in older people, undergo regular antigenic drift. In years in which H3N2 is the predominant strain, there are more hospitalizations, particular among high risk groups such as older adults and younger children.

All northern 2018-2019 hemisphere influenza vaccines contained an A/michigan/45/2015-like (H1N1) pdm09 virus and a B/Colorado/06/2017-like Victoria lineage virus. Quadrivalent vaccines contained n additional B/Phuket/3073/2013-like Yamagata lineage virus. Genetic characterization of viruses indicated that the majority of circulating A (H3N2) viruses in the US were antigenically distinct, or drifted from the 2018-19 Northern hemisphere vaccine strain, while the circulating A(H1N1)pdm9 viruses were well matched.

Influenza B virus is known only to infect humans and seals. This limited host range is apparently responsible for the lack of associated influenza pandemics in contrast with those caused by the morphologically similar influenza A virus as both mutate by both antigenic drift and reassortment. There are two known circulating lineages of Influenza B virus based on the antigenic properties of the surface glycoprotein hemagglutinin. The lineages are termed B/Yamagata/16/88-like and B/Victoria/2/87-like viruses. The quadrivalent influenza vaccine licensed by the CDC is currently designed to protect against both co-circulating lineages and has been shown to have greater effectiveness in prevention of influenza caused by Influenza B virus than the previous trivalent vaccine. Further diminishing the impact of this virus, "in humans, influenza B viruses evolve slower than A viruses and faster than C viruses".

Influenza virus B mutates at a rate 2 to 3 times slower than type A.

Injected trivalent inactivated influenza vaccines are most commonly used throughout the world.

Quadrivalent inactivated influenza vaccines, available from the 2014/2015 season, were used in the Magnify study In 2011, a live attenuated influenza vaccine (LAIV) for intranasal use was approved in the EU/EEA for children and adolescents (2-17 years of age). All live attenuated influenza vaccines currently available are quadrivalent combination vaccines containing two influenza A strains (H1N1 and H3N2 subtypes) and two influenza B strains (Victoria and Yamagata lineages) as per WHO recommendations.

Since seasonal influenza vaccines are usually recommended for several vulnerable populations who are poorer immune responders due to age or disease, several attempts to improve the vaccines have been explored over the last 10-15 years such as: increasing the antigen dose administered, intradermal administration to activate other arms of the immune system, and adding immunostimulating compounds such as adjuvants Products utilising these new techniques are now authorised and available in some EU/EEA countries. See table below. For human influenza vaccines, MF59 (squalene) and AS03 (squalene and α-tocopherol) have been approved as adjuvants by regulatory agencies in the EU, Canada and the United States. Data from several observational studies indicating improved performance and reductions in hospitalisations in older adults against influenza disease and hospitalisations have been included in the label for the adjuvanted trivalent influenza vaccine.

Most influenza vaccines, both inactivated and live attenuated, are based on production of influenza viruses/antigens in fertilised hens' eggs. These vaccines can therefore not be given to egg-allergic individuals developing severe symptoms upon exposure to egg proteins. Hence, a few manufacturers have developed cell-based influenza vaccines.

In the Mavenclad-related clinical experiments, the following influenza strains were used: H1N1 (BrisbaneA), H3N2 (Kansas A), H1N1 (MichiganA), H3N2 (SingaporeA), Victoria (Colorado/B), Yamagata (Phuket/B).

Influenza A virus subtype H1N2 (A/H1N2) is a subtype of the species Influenza A virus (sometimes called bird flu virus). It is currently endemic in both human and pig populations. H1N1, H1N2, and H3N2 are the only known Influenza A virus subtypes currently circulating among humans. The virus generally does not cause more severe illness than other influenza viruses, and no unusual increases in influenza activity have been associated with it.

The H3N2 virus continues to circulate worldwide as a seasonal influenza A virus. Seasonal H3N2 viruses, which are associated with severe illness in older people, undergo regular antigenic drift.

Typical influenza vaccine compositions generally used or to be used in 2018-2021 are listed in FIGS. 16A and 16B.

Injected trivalent inactivated influenza vaccines are most commonly used throughout the world. Influenza antigen preparation varies between manufacturers. The inactivated influenza vaccines available in the EU/EEA may contain either split virion influenza virus products or subunit influenza products. Adjuvanted inactivated subunit influenza vaccines for older people are available in some EU/EEA Member States.

Injected quadrivalent inactivated influenza vaccines, available from the 2014/2015 season in some EU/EEA countries, are expected to replace the trivalent vaccines over time. Although available in the private market in some European countries, vaccine authorisation, vaccine availability, observed vaccine effectiveness and the cost may influence the speed of this replacement.

In 2011, a live attenuated influenza vaccine (LAIV) for intranasal use was approved in the EU/EEA for children and adolescents (2-17 years of age). All live attenuated influenza vaccines currently available are quadrivalent combination vaccines containing two influenza A strains (H1N1 and H3N2 subtypes) and two influenza B strains (Victoria and Yamagata lineages) as per WHO recommendations.

The universal paediatric programmes organised in Finland and the United Kingdom offer quadrivalent LAIV to either young children 2-3 or 2-11 years of age, respectively.

Since seasonal influenza vaccines are usually recommended for several vulnerable populations who are poorer immune responders due to age or disease, several attempts to improve the vaccines have been explored over the last 10-15 years such as: increasing the antigen dose administered, intradermal administration to activate other arms of the immune system, and adding immunostimulating compounds such as adjuvants (See reference 1-4).

Products utilising these new techniques are now authorised and available in some EU/EEA countries. See table below. For human influenza vaccines, MF59 (squalene) and AS03 (squalene and α-tocopherol) have been approved as adjuvants by regulatory agencies in the EU, Canada and the United States. Data from several observational studies indicating improved performance and reductions in hospitalisations in older adults against influenza disease and hospitalisations have been included in the label for the adjuvanted trivalent influenza vaccine.

Most influenza vaccines, both inactivated and live attenuated, are based on production of influenza viruses/antigens in fertilised hens' eggs. These vaccines can therefore not be given to egg-allergic individuals developing severe symptoms upon exposure to egg proteins. Hence, a few manufacturers have developed cell-based influenza vaccines which can be given to severely egg-allergic individuals. Use of cell-based products may have an improved match to circulating influenza strains as they avoid egg-adaption issues.

TABLE 2

Overview of available seasonal influenza vaccines in the EU/EEA (2019/20 season)

| Name of product | Manufacturer | Vaccine type | Adjuvant | Administration route | Produced in | Age recommended |
|---|---|---|---|---|---|---|
| 3Fluart | Fluart Innovative Vaccines Kit | Inactivated | Aluminium phosphate gel | Intramuscular | Egg | From 3 years |
| Afluria | Pfizer/Seqirus | Inactivated | None | Intramuscular | Egg | From 5 years |
| Agrippal | Seqirus | Inactivated/ subunit | None | Intramuscular | Egg | From 6 months |
| Ruad | Seqirus | Inactivated/ subunit | Squalene (MF59) | Intramuscular | Egg | From 65 years |
| Fluarix | GlaxoSmithKline | Inactivated/ split | None | Intramuscular/ subcutaneous | Egg | From 6 months |

TABLE 2-continued

Overview of available seasonal influenza vaccines in the EU/EEA (2019/20 season)

| Name of product | Manufacturer | Vaccine type | Adjuvant | Administration route | Produced in | Age recommended |
|---|---|---|---|---|---|---|
| Fluarix Tetra | GlaxoSmithKline | Inactivated/split | None | Intramuscular | Egg | From 6 months |
| Flucelvax Tetra | Seqirus | Inactivated | None | Intramuscular | Cell | From 9 years |
| Fluenz Tetra | AstraZeneca | Live attenuated | None | Intranasal | Egg | From 24 months to 17 years |
| Imuvac | Abbot Biologicals/Mylan Products Ltd. (Marketing Authorisation Holder) | Inactivated | None | Intramuscular | Egg | From 6 months |
| Influvac Xanaflu | Mylan Products Ltd. | Inactivated | None | Intramuscular | Egg | From 6 months |
| Influvac Tetra | Mylan Products Ltd. | Inactivated | None | Intramuscular/subcutaneous | Egg | From 3 years |
| Trivalent Influenza Vaccine High Dose | Sanofi Pasteur | Split virion, inactivated | None | Intramuscular | Egg | From 65 years |
| Vaxigrip Istivac Mutagrip | Sanofi Pasteur | Inactivated | None | Intramuscular/subcutaneous | Egg | From 6 months |
| Vaxigrip Tetra | Sanofi Pasteur | Inactivated | None | Intramuscular/subcutaneous | Egg | 6 months |
| Xanaflu Tetra Fluvaccinol Subunit Tetra Batrevac Tetra Influenza vaccine Tetra MYL | Abbot Biologicals/Mylan Products Ltd. (Marketing Authorisation Holder) | Inactivated | None | Intramuscular/deeply subcutaneous | Egg | From 3 years |

TABLE 3 available seasonal influenza vaccines in the UK (2020/2021 season)
All influenza vaccines available in the UK for the 2020 to 2021 season

| Supplier | Name of product | Vaccine type | Age indications | Ovalbumin content micrograms/dose |
|---|---|---|---|---|
| AstraZeneca UK Ltd | Fluenz ® Tetra | Quadrivalent LAIV (live attenuated influenza vaccine) supplied as nasal spray suspension | From 24 months to less than 18 years of age | Less than 0.024 micrograms per 0.2 ml dose |
| GSK | Fluarix Tetra | QIVe (standard egg-grown quadrivalent influenza vaccine), split virion, inactivated | From 6 months | Equal to or less than 0.05 micrograms per 0.5 ml dose |
| MASTA | Quadrivalent Influenza vaccine * | QIVe (standard egg-grown quadrivalent influenza vaccine), split virion, inactivated | From 6 months | Equal to or less than 0.05 micrograms per 0.5 ml dose |
| Sanofi Pasteur Vaccines | Quadrivalent Influenza vaccine * | QIVe (standard egg-grown quadrivalent influenza vaccine), split virion, inactivated | From 6 months | Equal to or less than 0.05 micrograms per 0.5 ml dose |
| Mylan | Quadrivalent Influvac ® sub-unit Tetra * | QIVe (standard egg-grown quadrivalent influenza vaccine), surface antigen, inactivated | From 3 years | Equal to or less than 0.1 micrograms per 0.5 ml dose |
| Seqirus UK Ltd | Flucelvax ® Tetra * | QIVc (cell-grown quadrivalent influenza vaccine), surface antigen, inactivated | From 9 years | Egg-free |
| Seqirus UK Ltd | Adjuvanted Trivalent Influenza Vaccine | aTIV (egg-grown trivalent influenza vaccine), surface antigen, inactivated, adjuvanted with MF59C.1 | From 65 years | Equal to or less than 0.2 micrograms per 0.5 ml dose |

Infectious disorders for which vaccines are available or at least desirous, include, but are preferably not limited to hepatitis B virus (HBV) and varicella zoster virus (VZV). Other infection diseases might include Hepatitis B, Measles, Influenza vaccines, Poliovirus, Pneumococci, Diphteria, Tetanus and *Bordetella pertussis* and SARS-Covid 2. Vaccines against SARS Covid-2 are now available, with further alternatives to become available soon.

Other diseases, including smallpox, chickenpox, polio, tetanus, measles, mumps, rubella, whooping cough, and/or influenza-like disorders, might also be relevant.

Vaccination with vaccines is a way of artificially activating the immune system to protect against infectious disease. The activation occurs through priming the immune system with an immunogen. Stimulating immune responses with an infectious agent is known as immunization. Vaccination includes various ways of administering immunogens.

Various routes for administration of vaccines are known to the skilled artisan. Typically, vaccine administration may be oral, by injection (intramuscular, intradermal, subcutaneous), by puncture, transdermal or intranasal. Several recent clinical trials have aimed to deliver the vaccines via mucosal surfaces to be up-taken by the common mucosal immunity system, thus avoiding the need for injections.

Most vaccines are administered before a patient has contracted a disease to help increase future protection. However, some vaccines are administered after the patient already has contracted a disease. Vaccines given after exposure to smallpox are reported to offer some protection from disease or may reduce the severity of disease.

Most vaccines are given by injection as they are not absorbed reliably through the intestines. Live attenuated polio, rotavirus, some typhoid, and some cholera vaccines are given orally to produce immunity in the bowel. While vaccination provides a lasting effect, it usually takes several weeks to develop and requires an immune system that is able to mount suitable immune response.

Vaccine Types

There are several different types of vaccines. Each type is designed to teach your immune system how to fight off certain kinds of germs—and the serious diseases they cause. When scientists create vaccines, they consider: How your immune system responds to the germ, who needs to be vaccinated against the germ, the best technology or approach to create the vaccine. Based on a number of these factors, scientists decide which type of vaccine they will make. There are several main types of vaccines, e.g. Live-attenuated vaccines, Inactivated vaccines, Subunit, recombinant, polysaccharide, and conjugate vaccines, Toxoid vaccines. The most relevant types of vaccines are described in more detail below:

Live-attenuated vaccines: Live vaccines use a weakened (or attenuated) form of the germ that causes a disease. Because these vaccines are so similar to the natural infection that they help prevent, they create a strong and long-lasting immune response. Just 1 or 2 doses of most live vaccines can give you a lifetime of protection against a germ and the disease it causes. But live vaccines also have some limitations. For example: Because they contain a small amount of the weakened live virus, some people should talk to their health care provider before receiving them, such as people with weakened immune systems, long-term health problems, or people who've had an organ transplant. They need to be kept cool, so they don't travel well. That means they can't be used in countries with limited access to refrigerators. Live vaccines are used to protect against: Measles, mumps, rubella (MMR combined vaccine), Rotavirus, Smallpox, Chickenpox, Yellow fever, nasal Influenza vaccines;

Inactivated vaccines: Inactivated vaccines use the killed version of the germ that causes a disease. Inactivated vaccines usually don't provide immunity (protection) that's as strong as live vaccines. So you may need several doses over time in order to get ongoing immunity against diseases. Inactivated vaccines are used to protect against: Hepatitis A, Flu (shot only), Polio (shot only), Rabies Subunit, recombinant, polysaccharide, and conjugate vaccines: Theses vaccines use specific pieces of the germ—like its protein, sugar, or capsid (a casing around the germ). Because these vaccines use only specific pieces of the germ, they give a very strong immune response that's targeted to key parts of the germ. They can also be used on almost everyone who needs them, including people with weakened immune systems and long-term health problems. One limitation of these vaccines is that you may need booster shots to get ongoing protection against diseases. These vaccines are used to protect against: Hib (*Haemophilus influenzae* type b) disease, Hepatitis B, HPV (Human papillomavirus), Whooping cough (part of the DTaP combined vaccine, Pneumococcal disease, Meningococcal disease, Shingles, Toxoid vaccines: Toxoid vaccines use a toxin (harmful product) made by the germ that causes a disease. They create immunity to the parts of the germ that cause a disease instead of the germ itself. That means the immune response is targeted to the toxin instead of the whole germ. Like some other types of vaccines, you may need booster shots to get ongoing protection against diseases. Toxoid vaccines are used to protect against: Diphtheria, Tetanus DNA plasmid vaccines: comprise a small circular piece of DNA called a plasmid that carries genes encoding proteins from the pathogen of interest. The manufacturing process for DNA plasmid vaccines is well-established, allowing experimental vaccines to be quickly developed to address emerging or re-emerging infectious diseases. NIAID's Vaccine Research Center has developed candidate DNA vaccines to address several viral disease threats during outbreaks, including SARS coronavirus (SARS-CoV) in 2003, H5N1 avian influenza in 2005, H1N1 pandemic influenza in 2009, and Zika virus in 2016. The time from selection of the viral genes to be included in the vaccine to initiation of clinical studies in humans was shortened from 20 months with SARS-CoV to slightly longer than three months with Zika virus.

mRNA Vaccines: Vaccines based on messenger RNA (mRNA), an intermediary between DNA and protein, also are being developed. Recent technological advances have largely overcome issues with the instability of mRNA and the difficulty of delivering it into cells, and some mRNA vaccines have demonstrated encouraging early results. For example, NIAID-supported researchers developed an experimental mRNA vaccine that protected mice and monkeys against Zika virus infection after a single dose.

Recombinant Vector vaccines (platform based vaccines): Rather than delivering DNA or mRNA directly to cells, some vaccines use a harmless virus or bacterium as a vector, or carrier, to introduce genetic material into cells. Several such recombinant vector vaccines are approved to protect animals from infectious diseases, including rabies and distemper. Many of these veterinary vaccines are based on a technology developed by NIAID researchers in the 1980s that uses weakened versions of a poxvirus to deliver the pathogen's genetic material. Today, NIAID-supported scientists are developing and evaluating recombinant vectored vaccines to protect humans from viruses such as HIV, Zika virus and Ebola virus.

However, vaccinations can lead to severe clinical crisis in the vaccinated body, e.g. by vaccine failure. Typically, vaccine failure is implied when an organism contracts a disease in spite of being vaccinated against it. Primary vaccine failure occurs when an organism's immune system does not produce antibodies when first vaccinated. Vaccines can fail when several series are given and fail to produce an immune response. The term "vaccine failure" does not necessarily imply that the vaccine is defective. Most vaccine failures are simply from individual variations in immune response, but also occur in immunosuppressed bodies, e.g. under immunosuppressive treatment of autoimmune diseased patients.

Historically, the term "inoculation" was often used interchangeably with "vaccination". However, the terms are not synonymous. Vaccination is the more commonly used term, which originally consist of a relatively 'safe' injection of a sample taken from a (virus) diseased body, e.g. a cow suffering from cowpox. Inoculation, a practice probably almost as old as the disease itself, is the injection of the variola virus taken from a pustule or scab of a smallpox sufferer into the superficial layers of the skin, commonly on the upper arm of the subject. Often inoculation was done 'arm-to-arm' or, less effectively, 'scab-to-arm'. Inoculation oftentimes caused the patient to become infected with smallpox, and in some cases the infection turned into a severe case.

In one aspect of the instant invention, the term Vaccination is preferably meant to include also the meaning of the term "inoculation". However, due to the often questionable reliability and safety aspects of inoculation, the term "vaccination" is preferably meant not to include "inoculation".

Vaccines, i.e. the vaccination with the respective vaccines, have led to major decreases in the prevalence of a plurality infectious diseases in the higher developed countries. Previous studies regarding the effectiveness of vaccinations/vaccines on mortality or morbidity rates of those exposed to various diseases have shown almost 100% decreases in death rates, and about a 90% decrease in exposure rates.

However, with the growing anti-vaccine movement, even the highest development countries have seen a resurgence of certain vaccine-preventable diseases. For example, the measles virus has now lost its elimination status in the US as the number of measles cases continues to rise in recent years. As a result, even previously as "extinct" regarded infectious diseases can now again endanger subjects with bodies in immunosuppressed status.

As a result, precautionary measures against infections, preferably vaccinations, are highly desirous for subjects having autoimmune diseases which are either prone to be treated with immunosuppressive agents, or are already receiving treatment with immunosuppressive agents. However, as outlined above and/below, vaccinations require a proper immune response of the vaccinated body and thus are generally recommended to be done well in advance of the start of the respective immunosuppressive treatment, and/or well after the end of the respective immunosuppressive treatment. Normally, keeping a gap or an interval with a duration of at least six weeks to several months between a vaccination and the beginning and/or end of an immunosuppressive treatment are applied in order to have a safety margin.

Unfortunately, due to the severity and unpredictability of certain autoimmune disorders that can impose serious outbreaks, flares or relapses of disease activity basically on any subject at any given time, and the mostly chronic nature of said autoimmune disorders requiring for prolonged, if not continuous immunosuppressive treatment over years or even decades, keeping said gap or interval intended as safety margin presents a major task for both the subject in need of treatment and vaccination, and the treating physician.

BRIEF DESCRIPTION OF THE DRAWINGS

FIG. 1: Data sets of patients treated with MAVENCLAD® who acquired suspected or confirmed COVID-19 (as of Jun. 29, 2020).

FIG. 5: Illustration of SHINGRIX® vaccination schedule for patient under treatment with MAVENCLAD® according to the invention.

FIG. 7: Summary of blood ALC results for patients Spain 2 and Spain 3 of example 4.

FIG. 8: Summary of blood ALC results for patients Canada 1 and Spain 1 of example 4.

FIG. 9: Summary of blood ALC results for patients Finland 1 and France 1 of example 4.

FIG. 10: Summary of blood ALC results for patients Australia 1 and Finland 2 of example 4.

FIG. 11: Summary of blood ALC results for patients Germany 1 and UK 2 of example 4.

FIG. 12: Summary of blood ALC results for patients UK 1 and France 2 of example 4.

FIG. 13: Summary of blood ALC results for patients Canada VZV and Finland VZV of example 4.

FIG. 16A: Typical influenza vaccine compositions generally used or to be used in 2019-2021.

FIG. 16B: Typical influenza vaccine compositions generally used or to be used in 2018-2019.

DETAILED DESCRIPTION OF THE INVENTION

Figure 2:
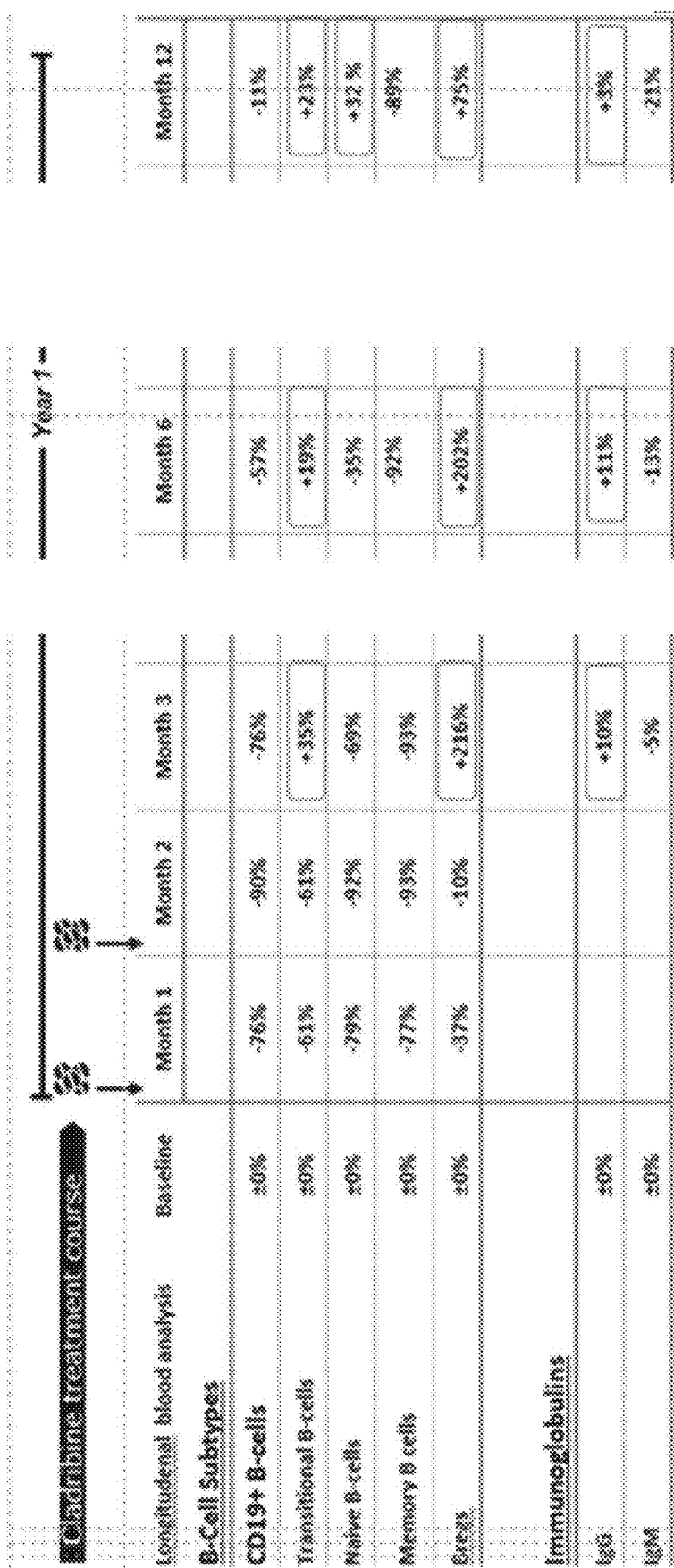
FIG. 2: Evolution of B-cell subtypes and immunoglobulins during the first year of Cladribine treatment course as followed in the MAGNIFY-MS Phase IV clinical trials.

Over the last two decades, treatment options for patients with autoimmune diseases, including but not limited to multiple sclerosis (MS), have grown constantly, as a number of highly effective active principles (APIs) have been found, developed and/or marketing approved. Examples of such APIs include, but are not limited to, injectables/monoclonal antibodies, such as natalizumab, ocrelizumab and alemtuzumab, and orals/small molecules, such as dimethyl fumarate, fingolimod, teriflunomide and cladribine tablets. It is believed that the mode of action of all of the above named APIs is based on their effect on lymphocytes and/or lymphocyte subpopulations, which effect includes, but is not limited to, reducing the number of circulating lymphocytes, e.g. by depletion and/or apoptosis of lymphocytes or subpopulations thereof, by inhibiting the migration of lymphocytes within the body, e.g. by immigration inhibition by sequestration of lymphocytes or subtypes thereof, or other functional modulations of lymphocytes or subtypes thereof.

However, as lymphocytes are a very substantial part of the immune system, the reductions of the numbers of circulating lymphocytes and/or their subtypes are believed to affect the body's ability to mount immune responses, e.g. against infections and/or vaccines against such infections. Thus, the tracking of adverse events for said APIs and other APIs with similar mode of action generally show an increase of infection-related adverse events, either caused by de novo infections, or by worsening ongoing infections or even reactivation of latent and/or chronic infections. One of the obvious choices for lowering the risk of acquiring infections, preventing the outbreak of existing latent infections, or preventing the worsening of existing ongoing infections includes vaccination strategies and strategies for vaccination like immunisations.

However, since both infections and vaccinations/immunisations against infections are believed to be especially problematic in immunocompromised patients, including MS patients due to the disease itself, and particularly in MS patients under immunosuppressive treatment, including, but not limited to immunosuppressive treatment with the above named APIs, the handling of infections and their prevention via vaccinations/immunisations is regarded to be associated with high risks for said immunocompromised patients. In particular, a number of theoretically vaccine-preventable infectious diseases are critical in this regard as the risk of the infection itself or poor outcomes for the infected patient is increased by MS itself and/or its therapy. Examples of such theoretically vaccine-preventable infectious diseases include, but are not limited to, hepatitis B virus (HBV), varicella zoster virus (VZV), measles, mumps and rubella (MMR), hepatitis A, hepatitis B, human papilloma virus (HPV), diphtheria, tetanus, acellular pertussis, meningococci, and/or influenza, However, also the reaction to vaccines has been shown to be compromised in MS patients receiving immunotherapies, especially lymphocyte depleting immunotherapies. For example, Peripherally B-cell depleted patients treated with ocrelizumab mounted only significantly attenuated humoral responses to clinically relevant vaccines. Especially the humoral immune response to vaccination in the patients receiving ocrelizumab was significantly reduced compared to placebo. Similarly, the response to the 23-valent pneumococcal polysaccharide vaccine was impaired substantially, with less patients mounting positive responses against ≥12 strains.

Vaccinations in MS patients on therapy with alemtuzumab achieved sufficient vaccination protection with recall antigens (tetanus, diphtheria, polio). However, in contrast thereto, following vaccination with the pneumococcal polysaccharide vaccine, the response showed suboptimal high individual variability.

Effectiveness of vaccination of MS patients on fingolimod is reduced compared with placebo-treated patients and may still be limited during and up to two months after discontinuation of fingolimod. While natalizumab treatment does not appear to affect responses to primary or secondary immunization in a clinically relevant extent, responses to a H1N1 influenza vaccine were similarly significantly reduced as found with glatiramer acetate.

Cladribine is a known immunosuppressive (ATC-Codes L01BB04 an L04AA40). In view of this, it previously has not been considered appropriate to administer vaccines during treatment with this agent. According to major regulatory authorities (e.g. FDA, EMA) administration of vaccines must be avoided during treatment with cladribine as a precaution against infectious complications and their sequelae in an immunosuppressed patient. Also, administration of such vaccines might result in unexpected adverse reactions. Given the immunosuppressive properties of cladribine patients treated with this product would not, in any case, be expected to mount an adequate or effective immune response.

Cladribine tablets (Mavenclad®) provide for a safe and efficacious treatment of Multiple Sclerosis (MS), and especially for the treatment of relapsing forms of multiple sclerosis (MS), including relapsing-remitting MS (RRMS) and active secondary progressive MS (SPMS), preferably in adults. Because of its safety profile, use of cladribine tablets (MAVENCLAD®) is generally recommended for patients who have had an inadequate response to, or are unable to tolerate, an alternate drug indicated for the treatment of MS. Furthermore, cladribine tablets (MAVENCLAD®) are preferably indicated for the treatment of adult patients with highly active relapsing multiple sclerosis (MS) as defined by clinical or imaging features. The recommended cumulative dose of cladribine tablets (MAVENCLAD®) is preferably 3.5 mg/kg body weight over 2 years, preferably administered as 1 treatment course of 1.75 mg/kg per year. Each treatment course preferably consists of 2 treatment weeks, one preferably at the beginning of the first month and one preferably at the beginning of the second month of the respective treatment year. Each treatment week preferably consists of 4 or 5 days on which a patient preferably receives 10 mg or 20 mg (one or two tablets), preferably as a single daily dose, preferably depending on body weight. Preferably, following completion of the 2 treatment courses, no further cladribine treatment is required in years 3 and/or 4 (see section 5.1). Re-initiation of therapy after year 4 has not been officially studied, but clearly remains an option according to specific circumstances. Due to the unique dosing regimen, the unique posology, the defined length of the treatment of basically two years, and the sustained efficacy well beyond the two years of the treatment scheme to up to 4 years, and probably beyond, present physicians with particular challenges in the context of the risk management of infections and/or opportunistic infections under treatment. More specifically, physicians tend to be hesitant to start treatment with oral cladribine in patients which appear to be endangered by such infections and/or opportunistic infections, especially in times where the outbreak of infections is high, such as in the influenza season and more particularly in times where new types of infections spread over the globe, such as the current COVID-19 pandemic.

However, even the most preferred protection strategy against infections in an actual or potential immunosuppressive treatment setting, vaccinations/immunisations, provide significant challenges for the treating physician due to complexity of the immune system, which makes vaccine-mediated protection a complex immunological challenge, especially in the context of potential immunosuppressive treatment and/or potentially immune compromised subjects suffering from an autoimmune disorder, such as MS.

The European Summary of Product Characteristics (EU SmPC) for MAVENCLAD® (cladribine tablets) states that treatment with MAVENCLAD should not be initiated within 4 to 6 weeks after vaccination with live or attenuated live vaccines because of a risk of active vaccine infection. Vaccination with live or attenuated live vaccines should be avoided during and after cladribine treatment as long as the patient's white blood cell counts are not within normal limits. In this regard, the MAVENCLAD® (cladribine tablets) Label Information (EU SmPC) states (excerpts):

MAVENCLAD is indicated for the treatment of adult patients with highly active relapsing multiple sclerosis (MS) as defined by clinical or imaging features.

Live or live attenuated vaccines
Treatment with MAVENCLAD should not be initiated within 4 to 6 weeks after vaccination with live or attenuated live vaccines because of a risk of active vaccine infection. Vaccination with live or attenuated live vaccines should be avoided during and after cladribine treatment as long as the patient's white blood cell counts are not within normal limits.

Further Vaccine Information states (as recommendations):
Cladribine tablets should not be initiated within 4-6 weeks after vaccination with attenuated or live vaccines.
Any use of live attenuated vaccines should be avoided during treatment with cladribine tablets. Users should wait for the lymphocytes/leukocytes to return to normal wherever possible.
If an inactivated component vaccination is essential for a patient, clinicians should wait for the lymphocyte levels to return to within the normal range.
For certain multi-dose vaccinations, clinicians may consider giving the first dose of the vaccine 4-6 weeks before treatment initiation with cladribine tablets. Subsequent vaccine doses should be given at a later date, after initiation with cladribine tablets, once lymphocyte counts have recovered.

Furthermore, according to Giovannoni (*Giovannoni G. Cladribine to treat relapsing forms of multiple sclerosis. Neurotherapeutics.* 2017; 14:874-87. (https://doi.org/10.1007/s13311-017-0573-4), in patients with RMS receiving continuous immunosuppressive therapy (maintenance therapy), the use of live or attenuated live vaccines is contraindicated. Cladribine tablets are administered during very short treatment courses and the use of live or attenuated live vaccines should be avoided during treatment, and afterwards for as long as patients' white blood cell counts are not within normal limits.

The American Academy of Neurology, in collaboration with the Immunization Panel of the MS Council for Clinical Practice Guidelines, published a summary of evidence and recommendations regarding immunizations and MS. The recommendations state:

"You should not receive live or live attenuated vaccines within the 4 to 6 weeks preceding your treatment with MAVENCLAD®. You should not receive these types of vaccines during your treatment with MAVENCLAD and until your healthcare provider tells you that your immune system is no longer weakened".

"Live and live-attenuated vaccines are generally not recommended for people with MS who take a disease modifying therapy (DMT)".

However, cladribine tablets-treated multiple sclerosis (MS) patients received vaccines (mostly against influenza virus) during the CLARITY study. No adverse events (AEs) associated with the administration of vaccines were reported in these subjects.

Furthermore, we newly found evidence in a small retrospective investigation of blood samples from patients enrolled in the MAGNIFY study, that post-vaccination antibody titers in patients treated with cladribine tablets at various timepoints before and during cladribine treatment for relapsing MS remained over the clinically accepted seroprotection limits, e.g., against seasonal influenza (hemagglutination inhibition [HAI]≥40) and varicella zoster virus (VZV; ≥100 IU/L)). Additionally, we newly found evidence in detailed blood sample analyses that this finding is the outcome of a general principle caused by the newly found temporal behaviour of certain lymphocyte subtypes and their impact on their immunological environment, thus it is deemed to be applicable to a broad variety of vaccines and/or vaccine types, if not all vaccines and/or vaccine types. In the EU and the plurality of more than 80 countries around the world, MAVENCLAD® (cladribine tablets) is indicated for the treatment of adult patients with relapsing multiple sclerosis (MS), preferably highly active relapsing multiple sclerosis (MS) as defined by clinical or imaging features. The recommended cumulative dose of MAVENCLAD® is 3.5 mg/kg body weight over 2 years, administered as 1 treatment course of 1.75 mg/kg per year. In the US, MAVENCLAD® (cladribine tablets) MAVENCLAD® (cladribine) tablets is indicated for the treatment of relapsing forms of multiple sclerosis (MS), to include relapsing-remitting disease and active secondary progressive disease, in adults. MAVENCLAD is administered in 2 treatment courses approximately 1 year apart, wherein the recommended cumulative dosage of MAVENCLAD is 3.5 mg/kg body weight, administered orally and divided into 2 yearly treatment courses (1.75 mg/kg per treatment course), preferably as follows:

Year 1 treatment course:
  First cycle (month 1): Start any time.
  Second cycle (month 2): Start 23-27 days after the last dose (approximately 1 month after beginning of first cycle).
Year 2 treatment course:
  First cycle (month 1): Start approximately 1 year after beginning the first course, at least 43 weeks after the last dose.
  Second cycle (month 2): Start 23-27 days after the last dose (approximately 1 month after beginning first cycle).

Each treatment cycle consists of 4 or 5 consecutive days; administer the cycle dosage as 1 or 2 tablets once daily over 4 or 5 consecutive days.

In this context of treatment of MS with cladribine, preferably oral cladribine and especially cladribine tablets, we surprisingly found that in the context of said treatment, preferably said treatment regimen as described above/below, with regard to cladribine, preferably oral cladribine and especially cladribine tablets, a variety of vaccinations can be safely and/or efficaciously performed at basically any time, preferably any time, during said treatment, including the Year 1 treatment course and/or the Year 2 treatment course as described above and/or below in more detail, despite the fact that the mode of action of cladribine, preferably oral cladribine, and especially cladribine tablets, is associated with extended periods of median to severe lymphocytopenia, as shown by low absolute lymphocyte counts (ALC), in both said Year 1 treatment course and said Year 2 treatment course. Moreover, it has been found that this is especially surprisingly true for the Year 2 treatment course, since at the beginning of said Year 2 treatment course, the ALC is not back to normal levels in most cases, if not all cases, and thus the grade of lymphocytopenia is even more prominent during prolonged periods said Year 2 treatment course, as shown by a further and prolonged drop in ALC. Surprisingly, both the results of the detailed analysis of the blood samples of non-vaccinated patients under said MS treatment as well as the detailed analysis of the blood samples of patients that are vaccinated shortly before said MS treatment and during said MS treatment, preferably including vaccinations during said Year 1 treatment course and/or said Year 2 treatment course, clearly show that, contrary what was previously believed, the immune response to vaccination under treatment with cladribine, preferably oral cladribine and especially cladribine tablets, is preferably not correlating or not significantly correlating with the ALC level, e.g. in the sense that low ALC values predict a low probability for safe and/or efficacious vaccination. In contrast thereto, vaccinating patients directly before starting said Year 1 treatment course and/or directly before starting said Year 2 treatment course, vaccinating patients during said Year 1 treatment course and/or vaccinating during said Year 2 treatment course, preferably including vaccinating during the First cycle (month 1) and/or Second cycle (month 2) of said Year 1 treatment course, and preferably including vaccinating during the First cycle (month 1) and/or the Second cycle (month 2) of said Year 2 treatment course, is preferably shown to be safe and/or efficacious by the data presented herein, especially for patients having Grade 0 to Grade 3 lymphocytopenia, more preferably Grade 1 to Grade 3 lymphocytopenia and especially Grade 1 to Grade 2 lymphocytopenia or Grade 2 to Grade 3 lymphocytopenia at the time the vaccination is to be performed. This is preferably to 4 vaccines selected from the group consisting of live vaccines, attenuated live vaccines, and non-live vaccines, preferably vaccines as described herein. Vaccinating "directly before starting" said Year 1 and/or Year 2 treatment course preferably means vaccinating the patient less than 4 weeks, more preferably less than 3 weeks, even more preferably less than 2 weeks and especially less than one week before starting said Year 1 and/or Year 2 treatment course, in particular vaccinating said patient in week 3, week 2 and/or week 1 before starting said Year 1 and/or Year 2 treatment course, preferably including vaccinating said patient on the last day before starting said Year 1 and/or Year 2 treatment course. Vaccinating patients during said Year 1 treatment course preferably means vaccinating said patient at all times between the first day of said First cycle (month 1) in said Year 1 treatment course on which day cladribine, preferably oral cladribine and especially cladribine tablets are administered to said patient, and the last day of said Year 1 treatment course. Typically, said last day of said Year 1 treatment course is also the day before the beginning of the First cycle (month 1) of said Year 2 treatment course. Vaccinating patients during said Year 2 treatment course preferably means vaccinating said patient at all times between the first day of said First cycle (month 1) in said Year 2 treatment course on which cladribine, preferably oral cladribine and especially cladribine tablets are administered to said patient, and the last day of said Year 2 treatment course. Typically, said last day of said Year 2 treatment course is preferably approximately one year apart, preferably 45 to 55 weeks apart, more preferably 47 to 53 weeks apart and especially 48 to 52 weeks apart, from the beginning of the First cycle (month 1) of said Year 2 treatment course. Vaccinating patients during said Year 1 and/or Year 2 treatment course is preferred in patients having Grade 0 to Grade 3 lymphocytopenia, more preferably Grade 1 to Grade 3 lymphocytopenia and especially Grade 1 to Grade 2 lymphocytopenia or Grade 2 to Grade 3 lymphocytopenia. Surprisingly, we found that, in contrast to what has been discussed previously, there is preferably no reduction, or at least no significant reduction, of the immune response to vaccination at the nadir of the absolute lymphocyte count (ALC), directly before the nadir of the ALC, and during the prolonged period during which the slow recovery of the ALC takes place. Typically, the ALC in patients during Year 1 course and/or Year 2 treatment course by a steep decline, or at least a relatively steep decline, of said ALC within weeks 7 to 9 from the beginning (i.e. day 1) of the respective First cycle (month 1) of said Year 1 treatment course and/or Year 2 treatment course, to then reach said ALC nadir during weeks 12-16 (e.g. in the CLARITY study), weeks 10 to 14 or weeks 8 to 14, such as during weeks 9 to 12 during weeks 8 to 10 or during weeks 9 to 11, calculated from the beginning (i.e. day 1) of the respective First cycle (month 1) of said Year 1 treatment course and/or Year 2 treatment course. Said ALC nadir is then typically followed by a very slow ALC recovery and thus a period of very low ALC levels from week 10-36, more preferably from week 9-24 or week 8-24, counted from the beginning (i.e. day 1) of the respective First cycle (month 1) of said Year 1 treatment course and/or Year 2 treatment course. Previously, the recommendation was not to vaccinate during said week 10-36 period or said week 9-24 period, because it was believed that a safe and/or efficacious vaccination during those periods is not possible. However, according to the invention, it is preferably recommended to actually vaccinate patients during said week 8-36 period or said week 9-24 period (preferably counted from the beginning (i.e. day 1) of the respective First cycle (month 1) of said Year 1 treatment course and/or Year 2 treatment course, respectively), because it was newly found that a safe and/or efficacious vaccination, preferably with vaccines as described herein, is possible. Surprisingly, we newly found that if there is a period of reduced immune competence or ability to raise a substantial immune response, which might be relevant for patients having a special risk profile to be considered under treatment with cladribine, oral cladribine are cladribine tablets, it is a time period of 4 to 9 weeks, preferably 5 to 9 weeks, more preferably 5 to 8 weeks, even more preferably 5 to 7 weeks, and especially 6 to 8 or 6 to 7 weeks, preferably counted from the beginning (i.e. day 1) of the respective First cycle (month 1) of said Year 1 treatment course and/or Year 2 treatment course, respectively.

Thus, there is a recommendation to preferably vaccinate at any time point with regard to an actual or planned treatment with cladribine, oral cladribine or cladribine tablets, preferably including one or more options selected from
  i) vaccinating patients directly before starting said Year 1 and/or Year 2 treatment course, preferably vaccinating patients directly before said Year 1 and/or Year 2 treatment course as described above and/or below, and especially vaccinating patients directly before starting said Year 1 treatment course, preferably as described above and/or below,
  ii) vaccinating patients during said Year 1 treatment course and/or vaccinating patients during said Year 2 treatment course, preferably including vaccinating during the First cycle (month 1) and/or Second cycle (month 2) of said Year 1 treatment course, and preferably including vaccinating during the First cycle (month 1) and/or the Second cycle (month 2) of said Year 2 treatment course, preferably as described above and/or below;
  iii) vaccinating patients at any time between
    a) the first day on which cladribine, oral cladribine or cladribine tablets are administered to a patient in the First cycle (month 1) of the Year 1 treatment course, and
    b) the end of a period of 5 to 11 months, preferably 4 to 10 months, more preferably 4 to 8 months or 3 to 4 months, from the last day on which cladribine, oral cladribine or cladribine tablets are administered to a patient in the Second cycle (month 2) of said Year 1 treatment or said Year 2 treatment course;
  iv) vaccinating patients at any time between
    a) the first day on which cladribine, oral cladribine or cladribine tablets are administered to a patient in the First cycle (month 1) of the Year 1 treatment course, and
    b) the end of a period of 5 to 11 months, preferably 4 to 10 months, more preferably 4 to 8 months or 3 to 4 months, from the last day on which cladribine, oral cladribine or cladribine tablets are administered to a patient in the Second cycle (month 2) of said Year 1 treatment course;
  v) vaccinating patients at any time between
    a) the first day on which cladribine, oral cladribine or cladribine tablets are administered to a patient in the First cycle (month 1) of the Year 2 treatment course, and
    b) the end of a period of 5 to 11 months, preferably 4 to 10 months, more preferably 4 to 8 months or 3 to 4 months, from the last day on which cladribine, oral cladribine or cladribine tablets are administered to a patient in the Second cycle (month 2) of said Year 2 treatment course;
  vi) vaccinating patients at any time between
    a) the end of a period of 2 to 3 months from the first day on which cladribine, oral cladribine or cladribine tablets are administered to a patient in the First cycle (month 1) of the Year 1 treatment course, and
    b) the end of a period of 4 to 8 months, preferably 5 to 7 months, more preferably 5 to 6 months, yet preferably 6 months, from the first day on which cladribine, oral cladribine or cladribine tablets are administered to a patient in the First cycle (month 1) of the Year 1 treatment course;
  vii) vaccinating patients at any time between
    a) the first day on which cladribine, oral cladribine or cladribine tablets are administered to a patient in the First cycle (month 1) of the Year 1 treatment course, and
    b) the end of a period of 2 to 5 months, preferably 2 to 3 months, from the first day on which cladribine, oral cladribine or cladribine tablets are administered to a patient in the First cycle (month 1) of the Year 1 treatment course;
  viii) vaccinating patients at any time between
    a) the end of a period of 2 to 3 months from the first day on which cladribine, oral cladribine or cladribine tablets are administered to a patient in the First cycle (month 1) of the Year 2 treatment course, and
    b) the end of a period of 4 to 8 months, preferably 5 to 7 months, more preferably 5 to 6 months, yet preferably 6 months, from the first day on which cladribine, oral cladribine or cladribine tablets are administered to a patient in the First cycle (month 1) of the Year 2 treatment course;
  ix) vaccinating patients at any time between
    a) the first day on which cladribine, oral cladribine or cladribine tablets are administered to a patient in the First cycle (month 1) of the Year 2 treatment course, and
    b) the end of a period of 2 to 5 months, preferably 2 to 3 months, from the first day on which cladribine, oral cladribine or cladribine tablets are administered to a patient in the First cycle (month 1) of the Year 2 treatment course.

Preferably, there is a recommendation to vaccinate at any time point with regard to an actual treatment with cladribine, oral cladribine or cladribine tablets, preferably as described above and/or below, and more preferably as described in one or more of the options selected from options ii), iii), iv) or v), except for a time period selected from
  α) the time of the Second cycle (month 2) of said Year 1 treatment,
  β) the time of the Second cycle (month 2) of said Year 2 treatment,
  γ) the time of the Second cycle (month 2) of said Year 1 treatment, and 1, 2 or 3 weeks thereafter, preferably 1 or 2 weeks thereafter, and/or
  δ) the time of the Second cycle (month 2) of said Year 2 treatment, and 1, 2 or 3 weeks thereafter, preferably 1 or 2 weeks thereafter.

Alternatively, there is a recommendation to vaccinate at any time point with regard to an actual treatment with cladribine, oral cladribine or cladribine tablets, preferably as described above and/or below, and more preferably as described in one or more of the options selected from options ii), iii), iv) or v),
  A) except for a time period of 4 to 9 weeks, preferably 5 to 9 weeks, more preferably 5 to 8 weeks, even more preferably 5 to 7 weeks, and especially 6 to 8 or 6 to 7 weeks, preferably counted from the beginning (i.e. day 1) of the respective First cycle (month 1) of said Year 1 treatment course, and/or
  B) except for a time period of 4 to 9 weeks, preferably 5 to 9 weeks, more preferably 5 to 8 weeks, even more preferably 5 to 7 weeks, and especially 6 to 8 or 6 to 7 weeks, preferably counted from the beginning (i.e. day 1) of the respective First cycle (month 1) of said Year 2 treatment course.

The above given recommendations are preferred for vaccinations/vaccinating patients using vaccines selected from the group consisting of live vaccines and/or non-live vaccines. More preferably, they are selected from the group consisting of live vaccines, attenuated-live vaccines and/or non-live vaccines.

The above given recommendations are more preferred for vaccinations/vaccinating patients using vaccines selected from the group consisting of attenuated live vaccines, inactivated vaccines, subunit vaccines, recombinant vaccines, polysaccharide vaccines, conjugate vaccines and toxoid vaccines, and/or combinations thereof.

Preferred in this regard are influenza vaccines and/or varicella zoster virus vaccines, preferably influenza vaccines and/or varicella zoster virus vaccines as described herein.

Also preferred in this regard are (anti-) Corona vaccines, (anti-)COVID-19 vaccines, (anti-)SARS-COVID-19 vaccines and/or (anti-)SARS-CoV-2 vaccines, more preferably (anti-)SARS-CoV-2 vaccines and/or (anti-)COVID-19 vaccines, and preferably vaccines against mutants thereof.

Preferred with regards to varicella zoster virus vaccines are live vaccines or live-attenuated vaccines, such as Zostavax® (zoster vaccine live), which can be used to prevent herpes zoster virus (shingles) in people age 50 and older. Also preferred in this regard non-live varicella zoster virus (VZV) vaccines, preferably including, but not limited to inactivated VZV vaccines and recombinant VZV vaccines, such as Shingrix® or Shingrix (Pro)®, Herpes zoster is caused by the same virus (varicella) that causes chickenpox in children. When this virus becomes active again in an adult, it can cause herpes zoster, or shingles. Zostavax® (zoster vaccine live) is a live vaccine that helps prevent shingles, as preferably inactivated or recombinant VZV vaccines, such as Shingrix® or Shingrix (Pro)® also do.

Herpes zoster (HZ) often occurs following reactivation of latent varicella-zoster virus (VZV) in sensory and autonomic neurons. Incidence of HZ varies from 6-8 cases/1000 person-years at age 50-59 years of age to >11 cases/1000 person-years at 70 years of age. The severity of HZ and its complications also increase with age, closely corresponding to the age-related decline in VZV-specific T-cell-mediated immunity (CMI) that is considered important in preventing the reactivation of latent VZV and preventing the propagation of the reactivated virus. HZ vaccines are believed to boost VZV-specific memory T cells, preventing their decline below the presently unknown threshold required for protection against HZ.

A live attenuated VZV vaccine (Zostavax, Merck Sharpe & Dohme Corp, hereafter referred to as Zoster Vaccine Live [ZVL]), is available to prevent HZ in individuals ≥50 years of age. However, ZVL has some limitations. Clinical trials indicate that vaccine efficacy against HZ is 70% in adults 50-59 years of age, and declines with age from 64% in persons 60-69 years to 18% in those ≥80 years. Moreover, efficacy of ZVL against HZ decreases over time, from 62% in the first year after vaccination to approximately 40% by the fifth year postvaccination.

A recombinant glycoprotein E (gE) subunit vaccine (HZ/su) was developed to overcome the unmet medical need for a better vaccine. HZ/su consists of the recombinant VZV gE and the AS01B Adjuvant System. gE was selected as the vaccine antigen because it is the most abundant glycoprotein expressed by VZV-infected cells and it induces both neutralizing antibody and CD4 T-cell responses. AS01B contains *Quillaja saponaria Molina*, fraction 21 (QS-21; licensed by GSK from Antigenics LLC, a wholly owned subsidiary of Agenus Inc., a Delaware, US corporation) and 3-O-desacyl-4'-monophosphoryl lipid A (MPL). AS01B stimulates a local and transient activation of the innate response leading to the recruitment and activation of antigen-presenting dendritic cells. QS-21 is an adjuvant that induces transient local cytokine responses and activation of dendritic cells and macrophages in muscle and draining lymph nodes in animal models. The toll-like receptor type 4 agonist MPL synergizes with QS-21 to enhance the immune response to the coadministered antigen through the production of interferon-gamma (IFN-γ).

Phase I and II trials demonstrated that a single HZ/su dose elicits substantial humoral and CMI responses, which further increase after a second dose.

The above given treatment regimen, vaccination regimen and recommendations are preferably safe and/or efficacious, preferably safe and/or efficacious as described herein, in preferably in patients, and especially in patients having Grade 0 to Grade 3 lymphocytopenia, more preferably Grade 1 to Grade 3 lymphocytopenia and especially Grade 1 to Grade 2 lymphocytopenia or Grade 2 to Grade 3 lymphocytopenia at the time the vaccination is performed or is to be performed, and even more preferably in patients aged >30 years, >40 years, >50 years, >60 years, or >70 years, preferably aged >50 years, >60 years or >70 years, and especially aged >50 years.

Further preferred methods of treatment, methods of vaccinating and/or methods of vaccinating under treatment are described in one or more of sections selected from section [1] to section [36], and preferably the subsections relating thereto and/or directly adjacent thereto.

Further background and insights in the mechanisms underlying the instant invention are preferably described below.

Vaccine Response and Effector Mechanisms

Vaccines are found to induce effector mechanisms (cells or molecules) capable of rapidly controlling replicating pathogens or inactivating their toxic components. Early protective efficacy is primarily conferred by the induction of immune effectors produced by B cells, antigen specific antibodies, capable of binding to a pathogen or toxin. Long term protection requires the persistence of vaccine antibodies above protective threshold and/or the maintenance of immune memory capable of rapid and effective reactivation. Antigen-specific antibodies have been formally demonstrated as conferring vaccine induced protection against many diseases. The predominant role of B cells in the efficacy of current vaccines should not overshadow the importance of T cell responses. Most antigens and vaccines trigger B (humoral immunity) and T cell responses (cellular immunity).

CD4+ T cells are required for most antibody responses and antibodies exert significant influences on T cell responses to intracellular pathogens. T cells are essential to the induction of high affinity antibodies and immune memory. Cytotoxic CD8+ T lymphocytes are additional effectors that would limit the spread of infectious agents by recognizing and killing infected cells or secreting specific anti-viral cytokines. CD4+ T helper cells (Th) provide support to the generation and maintenance of B cell and CD8 responses and contribute to protection by cytokine production (example: TH1 cells expressing IFN-gamma). Other additional Th subtype effector cells are follicular Th cells (Tfh) supporting potent B cell activation and differentiation in antibody secreting cells or TH17 cells.

TABLE 4

Effector Mechanisms Triggered by Vaccines

Antibodies prevent or reduce infections by clearing extracellular pathogens through:
Binding to the enzymatic active sites of toxins or preventing their diffusion
Neutralising viral replication (e.g., preventing viral binding and entry into cells)
Promoting opsonophagocytosis of extracellular bacteria (i.e., enhancing their
clearance by macrophages and neutrophils)
Activating the complement cascade
CD8$^+$ T cells do not prevent infection but reduce, control, and clear intracellular
pathogens by:
Directly killing infected cells (release of perforin, granzyme, etc.)
Indirectly killing infected cells through antimicrobial cytokine release
CD4$^+$ T cells do not prevent infection but participate in the reduction, control, and
clearance of extracellular and intracellular pathogens by their homing and cytokine-
production capacities. Their main subsets include:
Follicular T-helper (Tfh) cells producing mainly interleukin (IL)-21 and providing B
cell help
T-helper 1 (Th1) effector cells producing interferon (IFN)-gamma, tumour necrosis
factor (TNF)-alpha/TNF-beta, IL-2, and mainly involved in protection against
intracellular pathogens (viruses, *Mycobacterium tuberculosis*)
Th2 effector cells producing IL-4, IL-5, IL-13, and responding to extracellular
pathogens (bacteria and helminths)
Th9 effector cells producing IL-9 and also responding to extracellular pathogens
Th17 effector cells producing IL-17, IL-22, and IL-26 and contributing to mucosal
defense (*Streptococcus pneumoniae, Bordetella pertussis, Mycobacterium tuberculosis*)

The Nature of the Vaccine Exerts a Direct Influence on the Type of the Immune Effectors Elicited that Mediate Protective Activity A hall mark of T dependent responses (elicited by Toxoid, protein, inactivated or live attenuated viral vaccines) is to induce higher affinity antibodies and immune memory. In addition live attenuated vaccines/vectors usually generate CD8 cytotoxic T cells. Most current vaccines mediate their protective efficacy through the induction of vaccine antibodies, whereas vaccine induced CD4+ T cells contribute to macrophage activation and control of *Mycobacterium tuberculosis*. Current vaccines mostly mediate protection through the induction of highly specific IgG serum antibodies. Live vaccines induce serum IgA and secretory IgA levels which help to limit viral shedding at mucosal surfaces. There is conclusive evidence that that T cells are the main effectors for BCG in BCG immunized infants or in zoster immunized adults. There is indirect evidence that vaccine induced T cells contribute to the protection conferred by other vaccines.

TABLE 5

T-Cell Responses to Vaccines
Type

| CD4$^+$ T-helper cells | | |
|---|---|---|
| Th1 | IFN-gamma production | Extrafollicular B-cell help |
| Th1 | Cell contact, IFN-gamma | Activation of CD8$^+$ T cells |
| Th1/Th2 | Cell contact, CD40L | Dendritic cell activation |
| Th2 | IL-4, IL-5, IL-13 | Extrafollicular B-cell help |
| Th2 | Cell contact, IL-4 | Suppression of CD8$^+$ T cells |
| Th17 | IL-17, IL-21, IL-22 | Mucosal inflammation |
| CD4$^+$ follicular T-helper cells | | |
| Tfh1 | IFN-gamma | Germinal center B-cell help |
| Tfh2 | IL-4, IL-5, IL-13 | Germinal center B-cell help |
| CD4$^+$ regulatory T cells | Multiple mechanisms | Suppression of CD4$^+$/CD8$^+$ responses |
| CD8$^+$ T cells | IFN-gamma, TNF-alpha | Killing of infected cells |
| Effector memory T cells | Th1/Th2 cytokines, perforin, granzyme | Rapid secondary effector- responses in periphery |
| Memory T cells | | |
| Effector memory T cells | Th1/Th2 cytokines, perforin, granzyme | Rapid secondary effectors responses in periphery |
| Central memory T cells | IL-2, IL-10, CD40L | Delayed activation/ proliferation in lymph nodes |
| Tissue-resident memory T cells | Th1/Th2 cytokines, perforin, granzyme | Tissue localisation enabling immediate-early reactivation |

IFN; interferon;
IL; interleukin;
Th, T-helper;
TNF, tumor necrosis factor

Innate Immunity and Vaccination

When exposed to pathogens in the tissues or the sites of injections immature dentritic cells maturate and migrate to secondary lymphnodes where the induction of B and T cell responses are to occur. The central role of mature DCs (DC=dendritic cell) in the induction of a vaccine response is to provide sufficient danger signals through vaccine antigens or adjuvants to trigger an inflammatory action. DCs, monocytes and neutrophils express pattern recognition receptors (ex. Toll like receptors, TLRs) sensing the potential danger when they encounter a pathogen and get activated. They modulate the expression of cell surface proteins and produce proinflammatory cytokines and chemokines. The inflammatory milieux drives monocyte differentiation into macrophages and DC maturation. In absence of a danger signal DCs remain immature and on contact with naïve cells, CD4+ cells do not differentiate into effector cells. Life vaccines trigger most efficiently the innate immune system in time and space via TLRs. Non-live vaccines (ex. proteins, glycoconjugates, inactivated microorganisms) may still contain pathogen recognition receptors, however vaccine induced activation stays more limited at the site of injection. After activation, DCs change their homing receptors and migrate to draining lymphnodes, where B and T cell reactions occur.

Primary AB Responses

In response to a protein antigen B cells capable of binding to this antigen with their surface immunoglobulins undergo brisk activation. The initial antigen exposure elicits an extrafollicular response where B cells rapidly differentiate in plasma cells that produce low affinity antibodies (IgM+/− IgG isotypes) that results in a rapid appearance of low Ig titers in the serum within a few days after immunization. Antigen specific T helper cells that have been activated by antigen bearing DCs trigger antigen specific B cells to migrate toward follicular DCs, initiating the germinal center (GC) reaction. In GCs B cells receive additional signals from T follicular helper (Tfh) cells, undergo massive clonal proliferation and switch from IgM toward IgG, Ig A or IgE. As B cell proliferate in Germinal Centers IgG antibody titers increase up to peak values, usually reached at 4 weeks after immunization. The short lifespan of these plasma cells results in rapid decrease of antibody titers. A minimal interval of 3 weeks between 2 primary doses allows development of successive waves of Ag specific primary responses without interference.

Secondary AB Response

In the secondary immune response booster exposure to antigen reactivates immune memory and results in a rapid increase of IgG titers. Short lived plasma cells maintain peak levels for several weeks until long-lived plasma cells that have reached the survival niches in the bone marrow continue to produce antigen specific antibodies which then decline with slower kinetics. A minimal interval of 4 month between priming and boosting allow affinity maturation of memory B cells and thus higher secondary responses. This generic pattern may not apply to live vaccines triggering long term IgG antibodies for extended periods.

TABLE 6

Determinants of the Duration of Vaccine Antibody Responses in Healthy People

| Determinants | Mechanisms (Presumed) |
|---|---|
| VACCINE TYPE | |
| Live vs inactivated | Life vaccines generally induce more sustained Ab responses, presumably through Ag persistence within the host. |
| Polysaccharide antigens | Failure to generate Tfh cells and GCs limits the induction of memory responses and of high affinity long-lived plasma cells. |
| VACCINE SCHEDULE | |
| Interval between primary doses | A minimal interval of three weeks between primary doses allows development of successive waves of Ag-specific primary responses without interference. |
| Interval before boosting | A minimal interval of 4 months between priming and boosting allows affinity maturation of memory B cells and thus higher secondary responses. |
| Age at immunization | Early life immune immaturity and age-associated immunosenescence limit the induction/persistence of long-lived plasma cells. |
| Environmental factors | Mostly and identified |

Ab: antibody;
Ag: antigen;
GC: germinal center;
Tfh: follicular T-helper cells

Vaccine Induced B Cell Memory

Memory B cells are generated during primary responses to T-dependent vaccines. They persist in the absence of antigens—re-exposure to antigen drives their differentiation into antibody-producing plasma cells. This reactivation is rapid, does not need T cell help, such that booster responses are characterized by rapid increase to higher titers of antibodies that have a higher affinity for antigens than do antibodies generated during primary responses.

TABLE 7

Hallmarks of Memory B-Cell Responses

Memory B cells:

Are generated only during T -dependent responses inducing follicular T-helper cells and thus germinal center responses
Are resting cells that do not produce antibodies
Rapidly (days) differentiate into antibody-secreting plasma cells on reexposure to antigen primary plasma cells
Differentiate into plasma cells that produce high(er)-affinity antibodies than do primary plasma cells
Vaccine induced T cell memory

TABLE 8

Determinants of Memory T-Cell Responses

| Main Factors | Determinants |
|---|---|
| Frequency of memory T cells | Magnitude of T-cell expansion (initial antigen load, antigen persistence) Phenotype of memory T cells |
| Effector memory | Induction favored by prolonged antigen persistence Tissue-resident memory |
| Central memory Persistence of memory T cells | Induction favored by rapid antigen clearance Supported by interleukin (IL)-15, IL-7 |

TABLE 9

| | In Elderly People |
|---|---|
| Limited magnitude of Ab responses to PS | Low reservoir of IgM+ memory B cells; weaker differentiation into plasma cells |
| Limited magnitude of Ab responses to proteins | Limited GC responses: suboptimal CD4+ helper responses, suboptimal B-cell activation, limited FDC network development; changes in B-/T-cell repertoire |
| Limited quality (affinity, isotype) of antibodies | Limited GC responses; changes in B-/T-cell repertoire |
| Short persistence of Ab responses to proteins | Limited plasma cell survival |
| Limited induction of CD4+/CD8+ responses | Decline in naïve T-cell reservoir (accumulation of effector memory and CD8+ T cell clones) |
| Limited persistence of CD4+ responses | Limited induction of new effector memory T cells (IL-2, IL~7) |

Ab, antibody; FDC, follicular dendritic cell; GC: germinal center; IFN: interferon; Ig: immunoglobulin; IL: interleukin; PS: polysaccharide.

Additionally, there has been a recent shift in the peak age-specific prevalence of MS in Europe and Northern America from 40 years to around 60 years, and an aging MS population may be associated with a significant disability. Biological aging of the immune system, or immunosenescence, is influenced by both genetic and environmental factors and is associated with a reduced ability to fight infections and develop immunological memory. Lymphocyte levels are also typically lower in older patients with MS compared to younger patients, and use of disease-modifying drugs (DMDs) that further reduce lymphocyte function could potentially put older patients at greater risk of chronic infections and malignancies. A meta-analysis of clinical studies involving 13 categories of immunomodulatory drugs in more than 28,000 patients with MS suggested that efficacy of DMDs decreases with age. Opportunistic infections such as cryptococcal meningitis are common with some DMDs and this risk increase with patient age. The risk for varicella zoster virus (VZV) reactivation is higher among the elderly, and use of DMDs can further increase the risk of viral reactivation among older patients with MS. Low lymphocyte levels, especially in the central nervous system (CNS), are also associated with an increased risk for progressive multifocal leukoencephalopathy (PML) and aging appears to contribute to this risk. Given these observations, it is important to understand the immunological impact of DMDs on older versus younger patients with MS.

Cladribine, especially cladribine tablets, is found to cause a preferential reduction of circulating T and B lymphocytes that play a central role in the pathogenesis of MS. Consistent with its mechanism of action, lymphopenia (Grade≥1) has been reported in ~90% of patients treated with cladribine tablets 3.5 mg/kg over the two years of treatment. Analysis of pooled data from the Phase 3 CLARITY and CLARITY Extension trials and the PREMIERE registry showed that treatment with cladribine tablets 3.5 mg/kg resulted in transient decreases in ALC and a depletion of CD19+ B, CD4+ T and CD8+ T lymphocyte subsets. This was followed by recovery phase within weeks of nadir, wherein lymphocyte levels gradually reached normal or threshold levels. By selective and transient reduction in lymphocyte subsets, cladribine is believed to reset the immune system in some way that it facilitates longer treatment-free periods.

In the Experimental Section herein a post hoc analysis of Phase 3 clinical data is provided that further explores and characterizes the impact of age (≤50 years vs. >50 years) on the nature of lymphopenia experienced by patients treated with cladribine tablets 3.5 mg/kg in an integrated safety analysis.

As the immune system undergoes significant remodeling during aging due to immunosenescence, the impact and efficacy of DMDs on older patients with MS is not known. Results from this post hoc exploratory analysis demonstrates that the incidence of Grade ≥3 lymphopenia with cladribine tablets was not very different in both younger and older patients with MS. Although cladribine tablets did not have a significantly different impact on ALC and/or lymphocyte subsets in older and younger patients during two years of treatment, the ALC dropped in the weeks following dosing in both treatment years and gradually increased to normal levels, largely independent of patient age. The overall incidence of Grade ≥3 lymphopenia and time to recover to Grades ≤1/2 lymphopenia were also not significantly different across the two age groups.

Decreases in ALC and lymphocyte subsets have been observed in MS patients who were treated with DMDs such as interferons, dimethyl fumarate (DMF) and alemtuzumab. In an integrated analysis of 2470 patients with MS treated with DMF, Grade ≥3 lymphopenia lasting ≥6 months was observed in 2.2% of patients treated with DMF. Depletion of lymphocyte subsets have been observed following infusion of alemtuzumab, an anti-CD52 monoclonal antibody, where a near-complete depletion of ALC, CD19+ B, CD4+ T, and CD8+ T lymphocytes was observed. However, recovery to LLN range after alemtuzumab infusion can take 8 months (B lymphocytes) to nearly 3 years (T lymphocytes). Lymphopenia is an anticipated effect of cladribine tablets due to its mechanism of action. However, recovery of ALC and lymphocyte subsets (CD19+ B and CD4+ T) following depletion with cladribine tablets happens soon after nadir, and reached normal levels within 30-43 weeks of last dose in treatment year 2; CD8+ T lymphocytes did not fall below LLN. The results from this post hoc analysis showed similar trends in both ALC and levels of lymphocyte subsets regardless of age, and recovery to normal levels occurred by the end of the study year in both age groups.

The pathogenesis of MS is found to be driven by autoreactive immune cells, mainly T and B lymphocytes that infiltrate into the CNS. Therefore, the various DMDs that are utilized in MS therapies result in immunomodulation or lymphocyte depletion. A potential risk of DMDs in the elderly is the risk for opportunistic infections such as PML, which is caused by the JC virus (JCV). In a multinational cohort of patients with MS, the seroprevalence of JCV increased from 49.5% in patients <30 years to 66.5% in patients over 60 years. It has been reported that patients with MS who are over 50 years old are at greater risk for developing PML following treatment with DMDs such as fingolimod and dimethyl fumarate. Among older patients with MS, treatment with natalizumab is associated with an earlier onset of PML; the additive effects of immunosenescence and natalizumab-induced restriction of the T lymphocyte repertoire was attributed to this increased risk. In a prior post hoc analysis of patients treated with cladribine tablets 3.5 mg/kg in the monotherapy oral cohort (median age ~36 years), an increased frequency of infections was observed during periods of Grade ≥3 lymphopenia; the type of infectious events occurring in patients with Grade 3/4 lymphopenia did not differ from those occurring outside these periods. However, the incidence and type of infections were not analyzed by patient age. The current study explores the incidence and nature of TEAEs of viral and bacterial infections among patients treated with cladribine tablets 3.5 mg/kg who reported Grade ≥3 lymphopenia by patient age. The incidence of these TEAEs were generally similar between younger and older patients with Grade 3 lymphopenia. While most (>50%) of these TEAEs were mild-to-moderate in severity in both age groups, severe TEAEs were reported in the Age >50 group. A higher frequency of bronchitis, herpes zoster, respiratory tract infection, and pneumonia were reported among older patients with Grade ≥3 lymphopenia; this group also had a higher incidence of these TEAEs that occurred during the Year 1 Grade ≥3 lymphopenia episode. The higher incidence of herpes reactivation observed in the Age >50 group is consistent with previous studies, where viral reactivations were reported with increasing age of the patients. Together, results from this post hoc analyses show that treatment with cladribine tablets has an age-dependent impact on TEAEs, according to which TEAEs are slightly higher in older patients with MS and slightly lower in younger patients with MS, but nevertheless support its use also among patients with aging immune systems.

The current analysis had a few limitations. First, the analysis was limited by its post hoc nature. Second, there were fewer patients in the Age >50 group compared to the Age ≤50 group. Finally, circulating lymphocytes do only reflect a part of the total lymphocyte population and therefore, do reflect changes that occur within the CNS only in part. While it is reported that cladribine can cross the blood-brain-barrier and enter the CNS, the impact of cladribine tablets on CNS-resident lymphocytes is to date not completely clear.

This post hoc analysis of data from Phase 3 studies of cladribine tablets 3.5 mg/kg (CLARITY, CLARITY Extension and ORACLE-MS) as well as the PREMIERE registry, demonstrates that cladribine tablets had a relatively small, but different impact on ALC and lymphocyte subsets in older versus younger patients during 2 years of treatment. Further, the incidence of TEAEs of viral and bacterial infections among patients who reported Grade ≥3 lymphopenia with cladribine tablets was slightly higher in the older age group. However, these results still strongly support the use of cladribine tablets 3.5 mg/kg in both younger and older patients with MS.

The COVID-19 pandemic has caused unprecedented disruption to normal social and economic life worldwide. As of the end of June 2020, over 10 million cases have occurred worldwide with approximately 500,000 deaths (https://www.who.int/emergencies/diseases/novel-coronavirus-2019). The disease is caused by a novel zoonotic coronavirus, SARS-CoV-2, which infects cells via the angiotensin-converting enzyme receptor type 2 expressed on cells of the respiratory tract and also key tissues such as the brain.

Two observations of the proposed pathogenic mechanisms of COVID-19 may be relevant to the treatment of patients with multiple sclerosis (MS). The coronaviruses responsible for the previous SARS and MERS outbreaks were shown to suppress natural interferon (IFN) responses. Evidence from patients with the most severe forms of COVID-19 also show profound downregulation of IFN-stimulated gene expression. (Park and Iwasaki, 2020) In addition, lymphopenia is very commonly observed in patients with COVID-19. (Guan et al., 2020; Huang et al., 2020) Severe lymphopenia has been associated with poorer outcomes compared to patients with higher lymphocyte counts at admission. (Onder et al., 2020; Zhou et al., 2020)

These observations are relevant because recombinant IFN beta has been approved for the treatment of relapsing forms of MS for over 20 years, (Jakimovski et al., 2018) and many, more recently approved agents reduce either absolute lymphocyte count (ALC) or certain subsets of lymphocytes. (Reich et al., 2018) Recent data provide some reassurance regarding the severity of COVID-19 in patients with MS, whether treated with a disease-modifying drug or not (Louapre et al., 2020; Sormani, 2020). However, more data are needed.

Here we report on cases of COVID-19 occurring in MS patients treated with cladribine tablets (Mavenclad®) within the Merck KGaA Global Patient Safety Database. While such voluntary pharmacovigilance data might be incomplete, (Hughes et al., 2020) they can provide an additional Correspondence level of detail on individual drugs to the information emerging from the national and international registries for COVID-19 occurring in patients with MS. (Louapre et al., 2020; Sormani, 2020).

As of 29 June, approximately 19,000 patients with relapsing MS have been treated with cladribine tablets. On this date, there were 46 patients with confirmed or suspected COVID-19 within the safety database. Patient age was available for 35 patients, with a range of 22-67 years. There were 26 females, 12 males, and 8 patients for whom gender was not reported. Cases were defined as confirmed if a confirmatory diagnostic test was reported as positive. If no confirmatory test was performed or reported, then cases were described as suspected. Due to the well-documented issues with false negative rates with polymerase chain reaction (PCR) testing techniques for COVID-19, (Woloshin et al., 2020) suspected cases that conformed to the World Health Organization diagnostic criteria were included in our analysis even if a negative PCR test was reported. Cases were designated as serious if they fulfilled the criteria of hospitalized, considered to be life-threatening, or medically significant. In keeping with usual pharmacovigilance practices, outcome was classified as recovered, recovering, not recovered, fatal, or not reported.

Of the 46 total cases, 18 cases were confirmed. In 3 cases, confirmation included a report of a positive immunoglobulin G test at a time after COVID-19 symptom onset. Four of the confirmed cases were classified as serious (as hospitalization was required in 3 cases and the physician reported 1 case classified as "medically significant"). Among the suspected COVID-19 cases 2 were classified as serious (1 due to hospitalization and 1 which the physician classified as "medically significant").

The majority of patients with suspected or confirmed COVID-19 had mild to moderate respiratory symptoms. Two confirmed cases had not reported experiencing any COVID-19 symptoms. None of the cases (either suspected or confirmed) received mechanical ventilation and there were no deaths. There was no indication for relevant involvement of other organ systems, in particular no ischemic complications were reported.

Cladribine tablets are taken during short dosing periods at the beginning of Years 1 and 2 of treatment. Each dosing period consists of 2 treatment weeks (of up to 5 days) separated by 1 month. The ALC nadir occurs or, more precisely starts, in months 2-3 after the start of each treatment year, preferably stays low for 1-3 months, with counts increasing gradually thereafter for the rest of year. Accordingly, for many patients treated with cladribine, oral cladribine and especially cladribine tablets, the ALC nadir is found to occur rather in months 4-6 or months 5-6. This is preferably true for Year 1 and/or Year 2 of treatment. The median ALC in the first year remains above the lower limit of normal (LLN). In the second year median ALC remains above 800 cells/mL and recovers to above the LLN before the end of the treatment year. (Giovannoni et al., 2010) The time to onset of COVID-19 from last dose of cladribine tablets was available for 21/46 patients, with a median of 180 days (i.e. approximately 6 months after the last dose; range 3-559 days). Two patients experienced COVID-19 onset between the treatment weeks of Year 1 or Year 2, with the second treatment week delayed until symptoms resolved. Another patient who experienced COVID-19 onset shortly before commencing Year 2 also had treatment delayed until symptoms resolved.

In keeping with the use of immunosuppressive drugs in other conditions during the COVID-19 pandemic, (Russell et al., 2020) our data do not suggest that patients with MS treated with cladribine tablets and who acquire COVID-19 are at more risk of a severe outcome.

Advantageously, it was found that cladribine, preferably oral cladribine and especially cladribine tablets, appear to have a unique effect on the biology of the immune system, preferably including, but not limited to, the humeral, innate and/or adaptive immune system, which allows for a surprisingly advantageous risk/benefit profile in the management of infectious disorders, and particularly in the management of vaccinations as a measure for protection from infectious disorders.

Surprisingly, it was also found that cladribine, preferably oral cladribine and especially cladribine tablets, appear to have a further unique effect on the biology of the immune system, preferably including, but not limited to the adaptive (B and T cells) and/or innate immune system (NK cells, myeloid cells) driving humoral and cellular vaccination responses.

Even more surprisingly, it was found that cladribine, preferably oral cladribine and especially cladribine tablets, appear to have a unique effect on the biology of the adaptive immune system. The innate immune system is less affected. Cladribine affects the temporal pattern of CD19+ B cell subtypes and CD4+, CD8+ T cell subtypes in very specific ways. A unique cell subtype specific depletion and repopulation pattern allows for a surprisingly advantageous risk/benefit profile in the management of infectious disorders, and particularly in the management of vaccinations.

More specifically, we have advantageously found that according to the temporal pattern of lymphocyte cell numbers observed in blood samples gained from clinical trials (CLARITY, ORACLE, posthoc analysis) an improved time window comprising the time period starting at 2 to 4 months after the last dose of treatment cycle in year 1 (4-6 month after the first cladribine dose) and ending 4-6 weeks before the next treatment cycle (e.g. the treatment cycle in year 2) appears to be advantageously adequate for vaccination. Similarly for year 2, we found that the tentative immunization window preferably begins 2 to 4 months after the last dose (4-6 month after the first cladribine dose), but continues indefinitely or until 4-6 weeks before any subsequent or further disease-modifying treatment is initiated. However, the core of the instant invention provides for an even much more liberal and/or flexible approach with regard to the timelines and opportunities for infection prevention and especially infection prevention via vaccinations and/or immunisations.

Even more specifically, we have advantageously found that according to the temporal pattern of lymphocyte cell numbers observed in blood samples gained from Clinical trials (CLARITY and ORACLE analysis and the MAGNIFY Phase 4 study), an improved time window comprising the time period starting at 1-2 months after the last dose of the treatment cycle in year 1 (3-5 months or preferably 3-4 months after the first cladribine dose) and ending 4-6 weeks before the next treatment cycle appears to be advantageously adequate for vaccination. Similarly for year 2, we found that the tentative immunization window preferably begins 1 to 2 months after the last dose (3-5 months or preferably 3-4 months after the first cladribine dose) but continues indefinitely or until 4-6 weeks before any further disease-modifying treatment is initiated. However, the core of the instant invention provides for an even much more liberal and/or flexible approach with regard to the timelines and opportunities for infection prevention and especially infection prevention via vaccinations and/or immunisations.

Even more specifically, we have advantageously found that according to the temporal pattern of lymphocyte cell numbers observed in blood samples gained from Clinical trials (CLARITY and ORACLE analysis and the MAGNIFY Phase 4 study), an improved time window comprising the time period starting at 0-4 weeks, preferably 1-3 weeks and especially 1 week, 2 weeks or 3 weeks, after the last dose of the treatment cycle in year 1 (5-10 weeks, preferably 6-10 weeks and 6-8 weeks after the first cladribine dose) and preferably ending 0-4 weeks, preferably 1-3 weeks and especially 0 weeks, 1 week, 2 weeks or 3 weeks, before the next treatment cycle appears to be advantageously adequate for vaccination. Similarly for year 2, we found that the tentative immunization window preferably starting at 0-4 weeks, preferably 1-3 weeks and especially 1 week, 2 weeks or 3 weeks, after the last dose of the treatment cycle in year 1 (5-10 weeks, preferably 6-10 weeks and 6-8 weeks after the first cladribine dose) but preferably continues indefinitely or until 0-4 weeks, preferably 1-3 weeks and especially 0 weeks, 1 week, 2 weeks or 3 weeks, before any subsequent or further disease-modifying treatment is initiated. However, the core of the instant invention provides for an even much more liberal and/or flexible approach with regard to the timelines and opportunities for infection prevention and especially infection prevention via vaccinations and/or immunisations.

The pivotal the role of B cells in an early and lasting humoral vaccine response—e.g. in terms of eliciting an immune response against a new antigen and the immunoglobulin class switch from IgM to IgG and mucosal IgA— the kinetics of B cell subset counts after application of a cycle of cladribine tablets that we found is important for consideration. Our deep immune phenotyping performed on blood samples from the MAGNIFY-MS study has provided more information on and more insight into, e.g., the kinetics of B cell subpopulations, providing a broader rationale for recommendations on timing and use of vaccines.

In the blood samples of our Biomarker substudy of the ongoing MAGNIFY-MS Phase 4, B and T cell subtypes and Immunoglobulins have been analysed and will be analysed longitudinally over the remaining part of the 2 years study duration. The 1 year results have been fully analyzed and the temporal pattern of cell numbers that we found is shown in Table A and B. All B cell subtypes have an early nadir at 2 month after cladribine treatment start (particularly after the last cladribine dose in month 2), and with exception of the memory B cells, all other B cell subtypes start repopulating immediately after, showing increased numbers already at 3 month. Interestingly, transitional and Breg numbers regain positive increased values already at month 3 (+35%, +216%) and levels stay high at month 6 (+19%, +202%) up to 12 months (+23%, +75%). Naïve B cell numbers show continuous repopulation at month 3 (−69%) and 6 (−35%), until full recovery and even a slight increase in numbers are reached at month 12 (+32%). Memory B cell counts show a more sustained decrease in the blood compartment but the numbers in the lymphoid tissues might be less affected as shown in a cladribine marmoset study. Also immunoglobulin numbers are not decreased after cladribine treatment at various time points, suggesting that tissue short or long lived plasma cells are not a cladribine target. Total CD4+ and CD8+ T cells show a modest depletion and have reached nadir at month 6 (−60%, −50%), with minor effects at month 1 (30% and 20% respectively). Interestingly, central and effector memory T cells and/or TH1 and TH17 T cells also show a moderate decrease (−56% and −37% respectively) at month 3 and repopulate further from this timepoint.

Interestingly the innate immune system is less affected. Only NK cells show a moderate decrease in month 1-2 and then repopulate to normal numbers.

Figure 3:
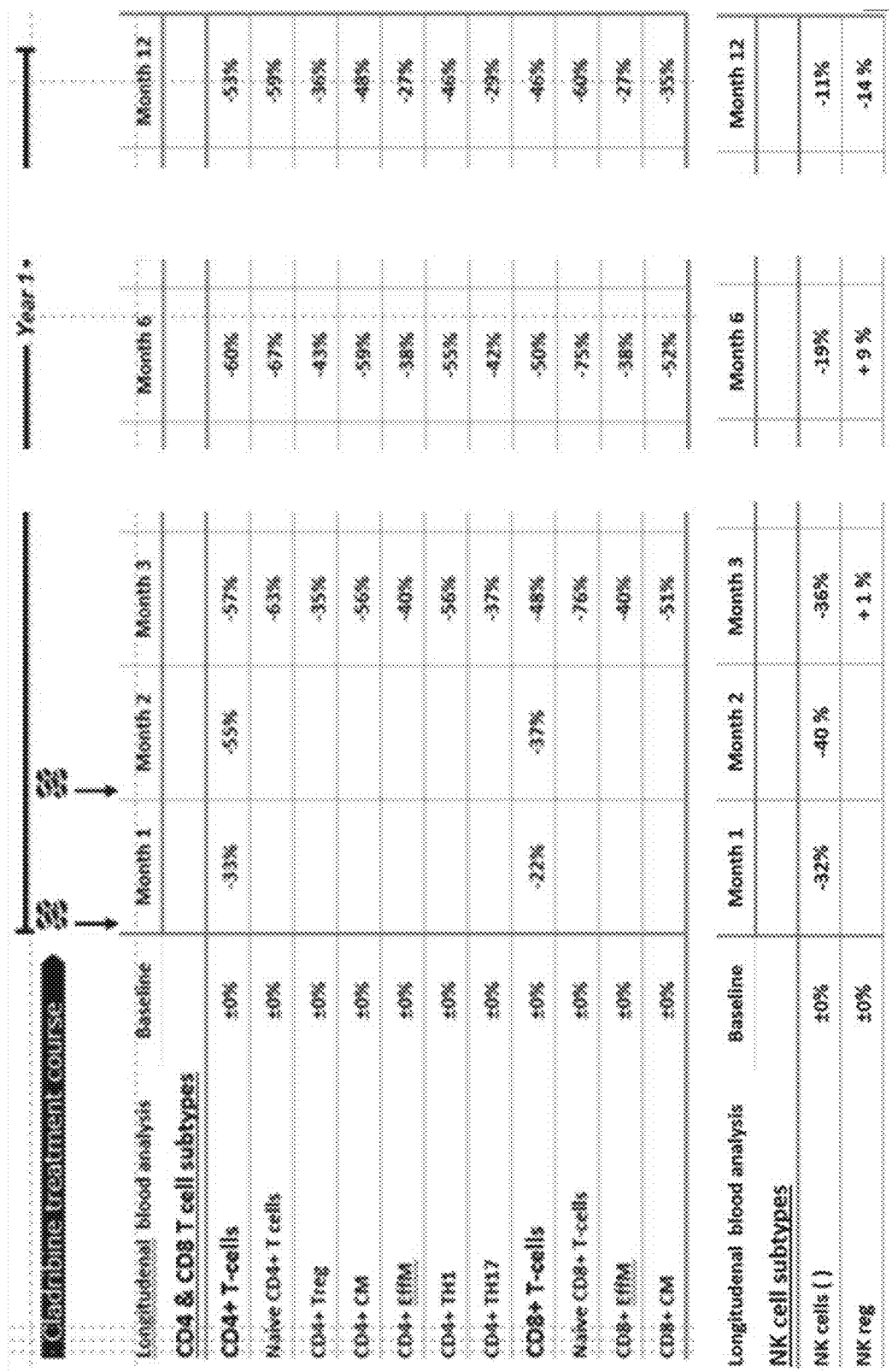
FIG. 3: Evolution of T-cell subtypes, immunoglobulins and NK-cell subtypes during the first year of Cladribine treatment course as followed in the MAGNIFY-MS Phase IV clinical trials.
Figure 4:
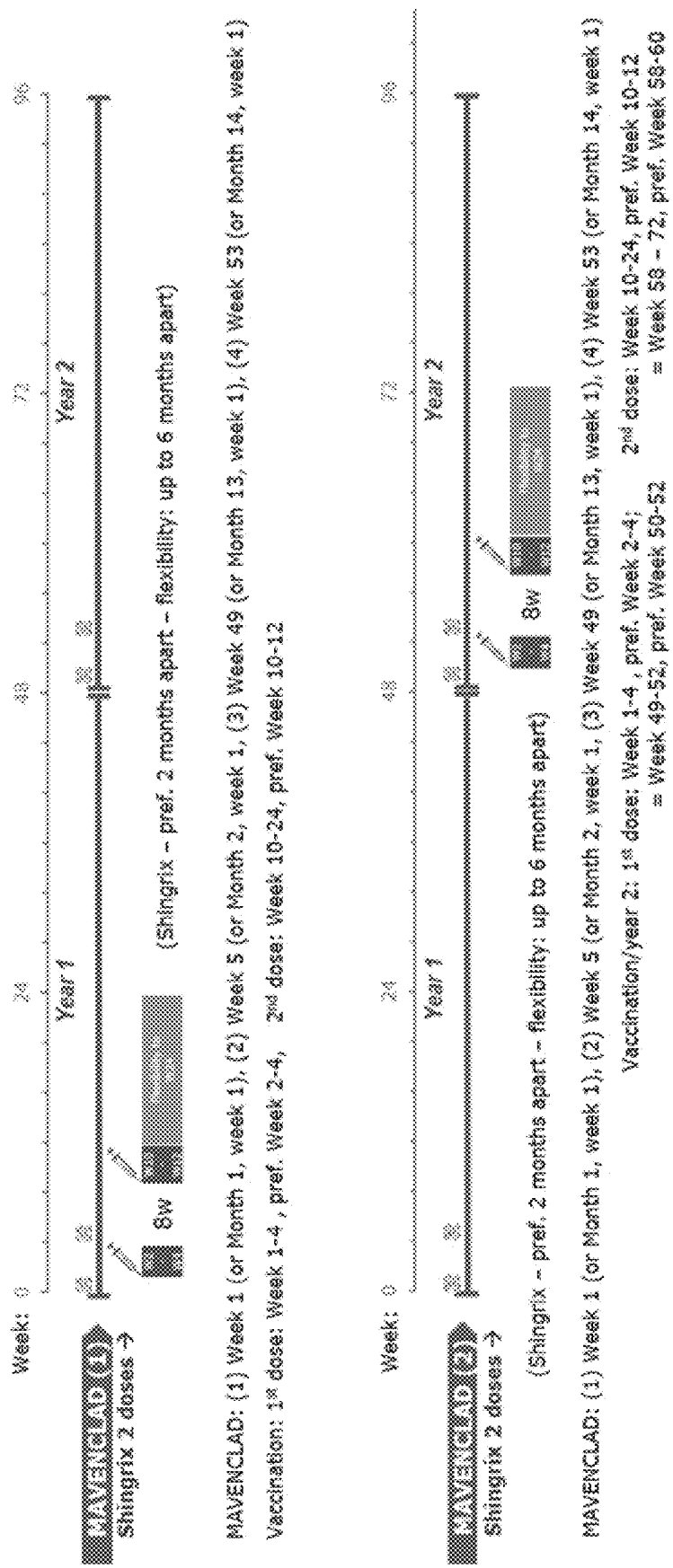
FIG. 4: Illustration of SHINGRIX® vaccination schedule for patient under treatment with MAVENCLAD® according to the invention.
Figure 6:
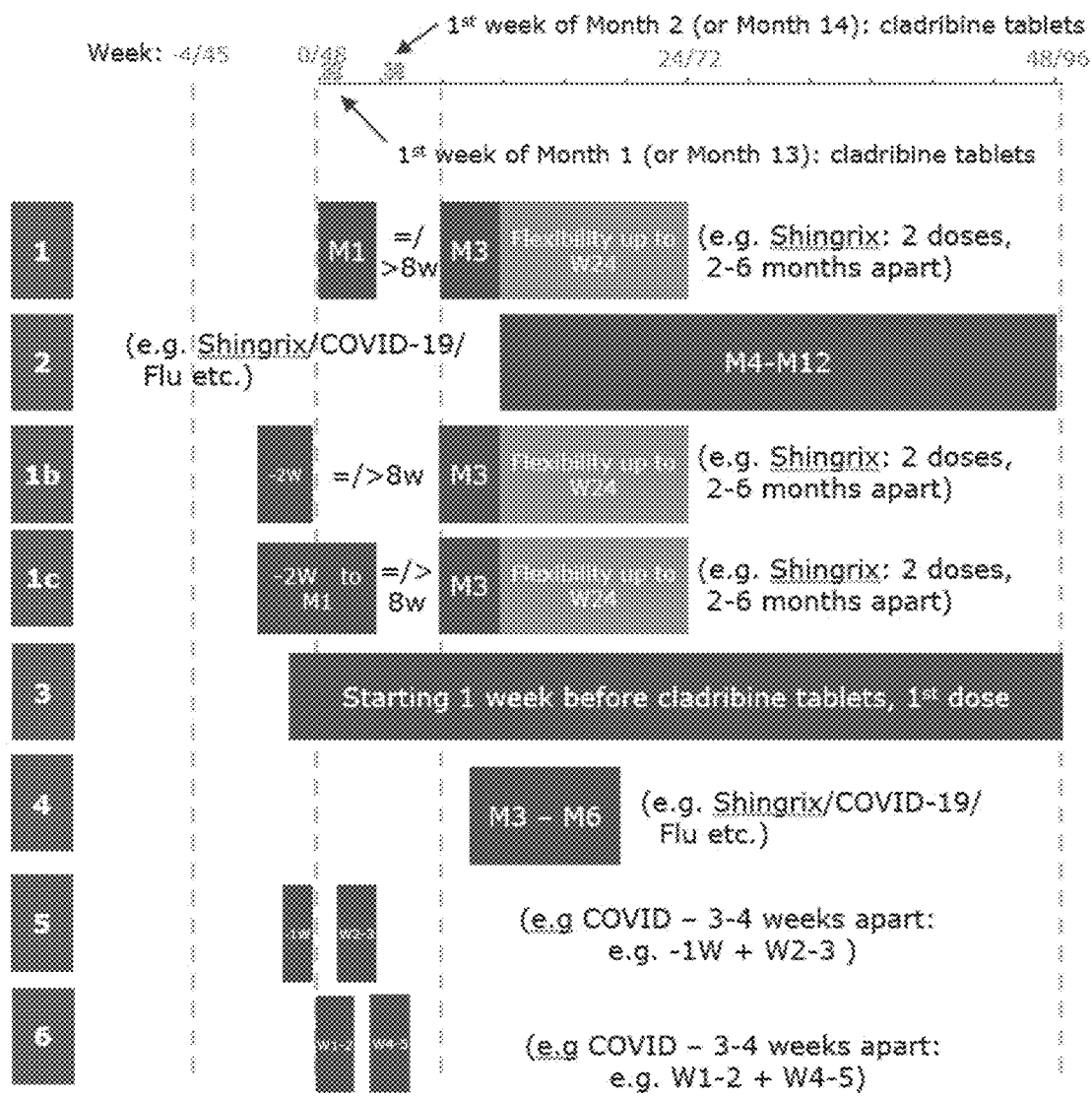
FIG. 6: Illustration of SHINGRIX® vaccination schedule for patient under treatment with MAVENCLAD® according to the invention.
Figure 14:
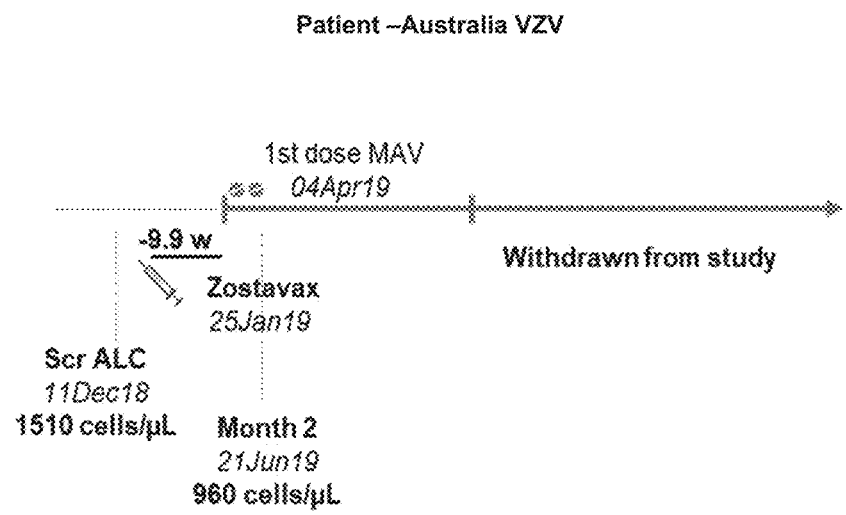
FIG. 14: Summary of blood ALC results for patient Australia VZV of example 4.

These data support the notion that sufficient B cells important to raise an early and sustained immune response against a new antigen, or a recall response, are available at timepoints even much earlier than expected from the total lymphocyte counts. The relevance, if any, of the interpatient variability of B cell recovery in the peripheral compartment (i.e. in blood) for the effectiveness of vaccinations in the individual patient remains to be determined, but is deemed of little relevance. It is well conceivable that B cell kinetics in central compartments are more homogeneous. The consequences of the variable recovery are deemed to be further mitigated by the findings that (i) innate immune cells, central to the induction of a vaccine response by providing sufficient danger signals, are less affected by cladribine (ii) Cladribine induces only a modest depletion of CD4+ and CD8+ T cells (iii) B cells are less relevant for the immediate immune response, and (iv) memory B cells come into play late in the immune response process. These data are detailed in FIGS. 2 and 3.

Advantageously, these findings allow for a much higher applicability of vaccinations in the context of cladribine treatment, and a much greater flexibility when to vaccinate in the context of treatment with cladribine.

In the clinical trial program of cladribine tablets, the incidence rate of total infections (cladribine 24.9 vs. placebo 27.1 events per 100 patient-years (PY)) and serious infections (0.8 vs. 0.9/100 PY) was not more frequent than under placebo.

Among the vaccine-preventable diseases, herpes zoster occurred more frequently on cladribine (0.83 vs. 0.2 episodes per 100 PY on placebo). The incidence rate was higher in cladribine-treated patients with grade 3-4 lymphopenia (4.5/100 PY) than with grade 0-2 lymphopenia (0.73/100 PY). Most herpes zoster episodes occurred 1-3 years after the start of therapy. Systemic, severe or disseminated herpes zoster episodes have not been reported to date.

Other vaccine-preventable diseases were limited to influenza, which did not show any different incidence versus placebo (2.75 vs. 2.69 cases per 100 PY with lymphopenia grade 0-2; and 3.35 vs. 2.69/100 PY with lymphopenia grade 3-4).

However, also with cladribine tablets, there is the health authority provided recommendation that all required vaccinations and/or immunisation should generally be applied well before starting treatment with cladribine tablets. Even though data from P-cell depleting antibody therapies cannot be directly extrapolated to oral cladribine, completion of vaccination schemes at least 4-6 weeks before starting cladribine therapy is generally recommended to date. In particular, due to the high risk of an active infection by the vaccine, vaccination or immunisation with live vaccines or live attenuated vaccines should be completed at least 4 to 6 weeks before starting treatment with cladribine tablets. Likewise, after cladribine treatment, vaccination should be avoided as long as the lymphocyte count is below the normal range, especially if life vaccines or live-attenuated vaccines are considered.

It has been surprisingly found that the depletion of lymphocytes induced by cladribine is particularly selective and affects the different subtypes of lymphocytes in a unique and very different manner than other immunosuppressive agents or APIs, especially with regard to the onset of the depleting action, the amount of lymphocytes depleted, the duration of the depletion of the respective lymphocyte subtypes, the rebound or increase of the respective lymphocyte subtypes over time, the timing of said increase or rebound, and the like. As a result, the potentially negative impact of cladribine treatment on the part of the immune system responsible for mounting an immune response to vaccinations, immunisations and/or infections is found to be surprisingly low.

In contrast to the general recommendations so far, it has been surprisingly found that subjects suffering from autoimmune disorders can be subjected to cladribine treatment, preferably cladribine tablet treatment, more preferably cladribine tablet treatment as health authority approved in more than 75 countries around the globe, at any time there is deemed a need to treat, and nevertheless can be safely vaccinated and/or immunised against infections, preferably viral and/or bacterial infections, at any time such vaccination and/or immunisation is deemed necessary or desirable, including, but not limited to, directly before beginning cladribine treatment, during cladribine treatment, preferably both during a limited amount of months during the treatment periods in which actually cladribine or cladribine tablets are administered to a subject, as well as during the several months of cladribine-free periods that typically follow the cladribine treatment periods and make up for the largest part of the about two years treatment phase, preferably comprising 2 treatment courses or treatment cycles, as it has been health authority approved for cladribine, preferably cladribine tablets.

Even more surprisingly, it has been found that the accordingly cladribine treated subjects, preferably cladribine tablets treated subjects, are nevertheless preferably able to mount an immune response to vaccination, immunisation and/or infection to an at least meaningful manner or degree, preferably an at least sufficient manner or degree, preferably at all times or at least almost all times during the health authority approved and recommended two-year treatment phase or cycle. In this context, an at least meaningful manner or degree preferably means that subjects vaccinated under cladribine treatment, preferably subjects vaccinated under cladribine treatment as described herein, have been shown to fulfil the seropositivity criterion hemagglutination inhibition [HAI] of equal to or higher than 40 ([HAI]≥40) and/or and at least twofold increase, preferably an at least fourfold increase, of the respective relevant antibody titers, such as varicella zoster virus titers (VZV; ≥100 IU/L)).

Thus, preferred aspects of the instant invention relate to:

[1] A method for treating an autoimmune disorder in a patient in need thereof, the method comprising:
   (a) optionally administering cladribine during one or more treatment courses orally to a patient at fixed dose per patient, per body weight and per treatment course, wherein said fixed dose is selected from the range of 1.0 mg/kg to 3.0 mg/kg,
   (b) identifying a patient at risk of acquiring an infection, (c) vaccinating the patient at risk of acquiring an infection with a vaccine against said infection, and d) optionally administering cladribine during one or more treatment courses orally to a patient at fixed dose per patient, per body weight and per treatment course, wherein said fixed dose is selected from the range of 1.0 mg/kg to 3.0 mg/kg, with the proviso that said method comprises one or more treatment courses in which cladribine is administered, and with the further proviso that said fixed dose per patient is about the same in all of the one or more treatment courses wherein cladribine is administered, thereby treating said patient against said autoimmune disorder and limiting the risk of said patient of acquiring said infection.

Thus, preferred is method for treating an autoimmune disorder in a patient in need thereof, the method comprising:

(a) preferably not administering cladribine, (b) identifying a patient at risk of acquiring an infection, (c) vaccinating the patient at risk of acquiring an infection with a vaccine against said infection, preferably vaccinating said patient within the timeframe less than four weeks, preferably less than three weeks and especially less than three weeks before the subsequent administration of cladribine, preferably according to step d) as given below:

d) administering cladribine during one or more treatment courses, preferably one or two treatment courses, and especially two treatment courses comprising orally administering cladribine, preferably cladribine tablets, to that patient at fixed dose per patient, per body weight and per treatment course, wherein said fixed dose is selected from the range of 1.0 mg/kg to 3.0 mg/kg, and preferably is about 1.75 mg/kg per treatment course, preferably with the proviso that said method comprises one or more treatment courses, preferably two treatment courses in which cladribine is administered, and with the further proviso that said fixed dose per patient is about the same in all of the one or more treatment courses wherein cladribine is administered, thereby treating said patient against said autoimmune disorder and limiting the risk of said patient of acquiring said infection.

Vaccinating a patient identified to be at risk of acquiring an infection before the beginning of the first treatment course comprising orally administering cladribine, preferably takes place less than four weeks, less than three weeks or less than two weeks before the beginning of the first treatment course. This is advantageous, if identification of said patient has taken place before the start of cladribine treatment according to the invention, especially if said identification has taken place shortly before the start of a (planned or required) first treatment course.

Alternatively preferred is a method for treating an autoimmune disorder in a patient in need thereof, the method comprising:

(a) administering cladribine during one treatment courses orally to a patient at fixed dose per patient, per body weight and per treatment course, wherein said fixed dose is selected from the range of 1.0 mg/kg to 3.0 mg/kg, (b) identifying a patient at risk of acquiring an infection, (c) vaccinating the patient at risk of acquiring an infection with a vaccine against said infection, wherein vaccination preferably takes place either during the first month of said treatment course, and/or within less than four weeks after the end of said treatment course, and d) administering cladribine during one or more treatment courses orally to a patient at fixed dose per patient, per body weight and per treatment course, wherein said fixed dose is selected from the range of 1.0 mg/kg to 3.0 mg/kg, with the proviso that said method comprises two or more treatment courses in which cladribine is administered, and preferably with the further proviso that said fixed dose per patient is about the same in all of the one or more treatment courses wherein cladribine is administered, thereby treating said patient against said autoimmune disorder and limiting the risk of said patient of acquiring said infection.

A method for treating an autoimmune disorder in a patient in need thereof, the method comprising:

(a) optionally administering cladribine during one or more treatment courses orally to a patient at fixed dose per patient, per body weight of said patient and per treatment course, wherein said fixed dose is selected from the range of 1.0 mg/kg to 3.0 mg/kg of said patient, (b) identifying a patient at risk of acquiring an infection, (c) vaccinating the patient at risk of acquiring an infection with a vaccine against said infection, and d) optionally administering cladribine during one or more treatment courses orally to said patient a said fixed dose per patient, per body weight of said patient and per treatment course, wherein said fixed dose is selected from the range of 1.0 mg/kg to 3.0 mg/kg of body weight, with the proviso that said method comprises one or more treatment courses in which cladribine is administered, more preferably at least two treatment courses, e.g. 2, 3, 4 or 5 treatment courses, and especially two treatment courses, and preferably with the further proviso that said fixed dose per patient is about the same in all of the one or more treatment courses wherein cladribine is administered, thereby treating said patient against said autoimmune disorder and limiting the risk of said patient of acquiring said infection. Preferably, there is a cladribine-free period of at least nine months, preferably 9-18 months and especially of about 10 months between the first treatment course and the second or subsequent treatment course. Preferably, said fixed dose in each of said treatment courses is about 1.75 mg/kg body weight. Preferably, each treatment course or treatment cycle consists of about two months, preferably referred to as "treatment months", in which cladribine, preferably oral cladribine and especially cladribine tablets are administered, preferably as described herein. Preferably, each of said months or treatment months comprises one treatment week, wherein said treatment week preferably starts at the beginning of the respective month or treatment month. Preferably, each treatment week consists of 4 or 5 days (treatment days) on which a patient preferably receives cladribine treatment, preferably independently selected per day from 10 mg per day or 20 mg per day. Preferably, the 10 mg per day or 20 mg per day are administered as oral dosage forms, preferably solid oral dosage forms and especially as tablets, containing 10 mg of cladribine each.

More preferably, there is a cladribine-free period of at least nine months, preferably 9-18 months and especially of about 10 months between the first treatment course and the second treatment course, and preferably also between each two of any subsequent treatment courses. Preferably, said fixed dose in each of said treatment courses is about 1.75 mg/kg body weight. Preferably, each treatment course consists of about two months.

[2] The method as described herein and especially as described above and/or below, wherein the duration of each treatment course within step (a) is independently selected from about 1 to about 3 months, and/or wherein the duration of each treatment course within step (d) is independently selected from about 1 to about 3 months.

Especially preferably, the duration of each treatment course it is about two months, preferably two months.

[3] The method as described herein and especially as described above and/or below,
  i) wherein the method comprises two or more treatment courses in which cladribine is administered, each course with a duration from about 1 to about 3 months,
  ii) wherein each of said two or more treatment courses are separated by a period in which no cladribine is administered to said patient, and
  iii) wherein each of the periods in which no cladribine is administered to said patient has a duration of at least 9 months.

[4] The method as described herein and especially as described above and/or below, wherein at least one of the periods in which no cladribine is administered to said patient has a duration of 9 to 18 months. Preferably, there is a cladribine-free period of at least nine months, preferably 9-18 months and especially of about 10 months between the first treatment course and the second or subsequent treatment course. More preferably, there is a cladribine-free period of at least nine months, preferably 9-18 months and especially of about 10 months between a (first) treatment course and a subsequent treatment course.

Preferably, the periods in which no cladribine is administered to said patient is also referred to as "cladribine-free period" or "cladribine-free periods". Preferably, each cladribine-free period after a treatment course and before the next treatment course has a duration of about 10 months, preferably 10 months. However, if the medical condition of the subject after a treatment course is followed by a cladribine-free period of 10 months or about 10 months does not allow for the next treatment course, the next treatment course can be delayed by prolonging that cladribine-free period, e.g. to up to 12 months, up to 14 months, up to 16 months or even up to 18 months.

[5] The method as described herein and especially as described above and/or below, comprising:
  (a) administering cladribine during 1 or 2 treatment courses orally to a patient at fixed dose per patient, per body weight and per treatment course, wherein said fixed dose is selected from the range of 1.0 mg/kg to 3.0 mg/kg,
  (b) identifying a patient at risk of acquiring an infection,
  (c) vaccinating the patient at risk of acquiring an infection with a vaccine against said infection, and
  d) administering cladribine during 0 or 1 treatment courses orally to a patient at fixed dose per patient, per body weight and per treatment course, wherein said fixed dose is selected from the range of 1.0 mg/kg to 3.0 mg/kg. According to this method, vaccinating said patient preferably takes place within a timeframe set by the last oral administration of cladribine of the last treatment course, and ends with the beginning of the second treatment month within the subsequent treatment course. Alternatively preferably, vaccinating said patient preferably either takes place within a timeframe of less than four weeks, less than three weeks and especially less than two weeks after the end of the last treatment course, or within a timeframe of less than four weeks, less than three weeks and especially less than two weeks before the beginning of the first treatment month or second treatment month of the subsequent treatment course.

Preferably, each treatment course is separated from a next treatment course by a cladribine-free period as described herein, preferably a cladribine free period of at least 9 months, more preferably a cladribine free period of 9 to 18 months, more preferably a cladribine free period of 9 to 16 months, and especially preferably a cladribine free period of 9 to 14 months. More preferably, each treatment course is separated from the next treatment course by a cladribine free period of 10 to 18 months, more preferably 10 to 16 months, even more preferably 10 to 14 months and especially 10 to 12 months.

[6] The method as described herein and especially as described above and/or below, comprising:
  (a) administering cladribine during 0 or 1 treatment courses orally to a patient at fixed dose per patient, per body weight and per treatment course, wherein said fixed dose is selected from the range of 1.0 mg/kg to 3.0 mg/kg,
  (b) identifying a patient at risk of acquiring an infection,
  (c) vaccinating the patient at risk of acquiring an infection with a vaccine against said infection, and
  d) administering cladribine during 1 or 2 treatment courses orally to a patient at fixed dose per patient, per body weight and per treatment course, wherein said fixed dose is selected from the range of 1.0 mg/kg to 3.0 mg/kg.

If there is no treatment course prior to step (b) and/or (c), vaccinating said patient before the beginning of the first treatment course comprising orally administering cladribine preferably takes place less than four weeks, less than three weeks, less than two weeks or less than one week before the beginning of the first treatment course, preferably a treatment course comprising the administration of cladribine as described herein. This is advantageous, if identification of said patient has taken place before the start of a cladribine treatment according to the invention or a treatment method as described herein. If there is no treatment course prior to step (b) and/or (c) vaccinating said patient before the beginning of the first treatment course comprising orally administering cladribine, preferably takes place less than four weeks, less than three weeks or less than two weeks before the beginning of the first treatment course. This is advantageous, if identification of said patient has taken place before the start of our cladribine treatment according to the invention.

If cladribine is administered once during step (a), vaccinating said patient preferably takes place within a timeframe set by the last oral administration of cladribine of the last treatment course, and ends with the beginning of the second treatment month within the subsequent treatment course. Alternatively preferably, vaccinating said patient preferably either takes place within a timeframe of less than four weeks, less than three weeks and especially less than two weeks after the end of the last treatment course, or within a timeframe of less than four weeks, less than three weeks and especially less than two weeks before the beginning of the first treatment month or second treatment month of the subsequent treatment course.

[7] The method as described herein and especially as described above and/or below, wherein the treatment courses in which cladribine is administered to said patient are separated from each other by at least 9 months in which no cladribine is administered to said patient. Preferably, said treatment courses are separated from each other by 9 to 18 months, preferably 9 to 16 months, more preferably 9 to 14 months, and especially 9 to 12 months, in which no cladribine is administered to said patient. More preferably, said treatment courses are separated from each other by 10 to 18 months, preferably 10 to 16 months, more preferably 10 to 14 months, and especially 10 to 12 months, in which no cladribine is administered to said patient.

[8] The method as described herein and especially as described above and/or below, wherein
i) identifying a patient at risk of acquiring an infection according to step (b), and/or
ii) vaccinating said patient according to step (c) take place any time
a) within a timeframe of about 4 weeks prior to a treatment course wherein cladribine is orally administered to said patient, and/or
any time
b) within a timeframe of about 4 weeks after a treatment course wherein cladribine is orally administered so said patient.

[9] The method as described herein and especially as described above and/or below, wherein said method comprises at least 2 treatment courses wherein cladribine is orally administered to said patient, and wherein vaccinating said patient according to step (c) takes place any time within about 4 weeks prior to the first treatment course wherein Cladribine is orally administered to said patient, or within about 4 weeks after the last treatment course wherein cladribine is orally administered to said patient.

[10] The method as described herein and especially as described above and/or below, wherein said method comprises at least 2 treatment courses wherein cladribine is orally administered to said patient, and wherein vaccinating said patient according to step (c) takes place any time within a timeframe starting about 2 weeks before the beginning of the first treatment course in which cladribine is orally administered to said patient, and ending within about 2 weeks after the end of the last treatment course wherein Cladribine is orally administered to said patient.

[11] The method as described herein and especially as described above and/or below, wherein
i) identifying a patient at risk of acquiring an infection according to step (b), and/or
ii) vaccinating said patient according to step (c) take place at any time
a) within a timeframe of about 1 or 2 weeks prior to a treatment course wherein cladribine is orally administered to said patient, and/or any time
b) within a timeframe of about 4 or about 5 weeks starting from the beginning of the respective treatment course wherein cladribine is orally administered so said patient.

[12] The method as described herein and especially as described above and/or below, wherein vaccinating said patient according to step (c) takes place any time within a timeframe
i) starting with the beginning of the first treatment course wherein cladribine is orally administered to said patient, and
ii) ending with the end of the last treatment course wherein Cladribine is orally administered to said patient.

The method as described herein and especially as described above and/or below, wherein vaccinating said patient, preferably vaccinating said patient according to step (c), takes place during the first treatment month of a treatment course as described herein, during the second month of said treatment course as described herein, and/or during the cladribine free period following said treatment course as described herein.

The method as described herein and especially as described above and/or below, wherein vaccinating said patient, preferably vaccinating said patient according to step (c), takes place during the first treatment month of a treatment course as described herein, during the second month of said treatment course as described herein, and/or during the cladribine free period following said treatment course as described herein. If vaccinating said patient takes place during the cladribine free period following said treatment course as described herein, it preferably takes place within the first 9 months of said cladribine free period, preferably the first 6 months of said cladribine free period, more preferably the first 4 months of said cladribine free period and especially the first 3 months of said cladribine free period.

The method as described herein and especially as described above and/or below, wherein vaccinating said patient, preferably vaccinating said patient according to step (c), takes place during the first treatment month of a treatment course as described herein, during the second month of said treatment course as described herein, and/or during the cladribine free period following said treatment course as described herein. If vaccinating said patient takes place during the cladribine free period following said treatment course as described herein, it preferably takes place within the last 6 months of said cladribine free period, preferably the first 4 months of said cladribine free period, more preferably the first 2 months of said cladribine free period and especially in the last month of said cladribine free period.

[13] The method as described herein and especially as described above and/or below, wherein said method comprises two treatment courses wherein cladribine is orally administered to said patient, and wherein vaccinating said patient according to step (c) takes place any time within a timeframe starting about 2 weeks before the beginning of the first treatment course in which cladribine is orally administered to said patient, and ending within about 2 weeks after the end of the second treatment course wherein Cladribine is orally administered to said patient.

[14] The method as described herein and especially as described above and/or below, wherein vaccinating said patient according to step (c) takes place at any time as specified in one or more of the sections above and/or below, except for the about 4 weeks before and/or about 4 weeks after the lowest B-cell count determined in the blood of the respective subject during a timeframe set by the beginning of two adjacent treatment courses wherein cladribine is orally administered to said patient.

The method as described herein and especially as described above and/or below, wherein vaccinating said patient, preferably vaccinating said patient according to step (c), takes place at any time as specified in one or more of the sections above and/or below, except for the about 2 weeks before and/or about 2 weeks after the lowest B-cell count determined in the blood of the respective subject during a timeframe set by the beginning of two adjacent treatment courses wherein cladribine is orally administered to said patient.

[15] The method as described herein and especially as described above and/or below, wherein vaccinating said patient, preferably vaccinating said patient according to step (c), takes place at any time as specified in one or more of the sections above and/or below, except for the time period of 5 to 13 weeks or 6 to 14 weeks after the beginning of the respective treatment course wherein cladribine is orally administered to said patient.

[16] The method as described herein and especially as described above and/or below, wherein said vaccination, preferably said vaccination as described in step (c), comprises administering to said patient a vaccine in 1 to 6 separate doses, preferably administered on different days, preferably if more than 1 dose of the vaccine is to be administered.

[17] The method as described herein and especially as described above and/or below, wherein said vaccination, preferably said vaccination as described in step (c), comprises administering to said patient a vaccine in 2 to 6 separate doses, wherein said 2 to 6 separate doses are administered to the patient on different days within a timeframe of about 1 to 12 weeks, preferably 1 to 8 weeks, yet preferably 1 to 6 weeks and especially 2 to 4 weeks.

[17b] The method as described herein and especially as described above and/or below, wherein said vaccination, preferably said vaccination as described in step (c), comprises administering to said patient a vaccine in 2 to 6 separate doses, preferably 2 to 5 separate doses, more preferably 2 to 4 separate doses and especially 2 or 3 separate doses, wherein each said separate doses are preferably administered to the patient on different days within a timeframe of about 1 to 12 weeks, preferably 1 to 8 weeks, yet preferably 1 to 6 weeks and especially 2 to 4 weeks.

[18] A method of treating an autoimmune disorder and reducing the risk of an infection in a subject in need thereof, said method comprising
  a) orally administering cladribine to said subject within a treatment course of about 2 months, in which treatment course a fixed dose of cladribine per patient, selected from 1.0 mg/kg to 3.0 mg/kg, is orally administered to said patient, wherein said treatment course is followed by a cladribine free period of at least 9 months in which no cladribine is administered to said patient, and
  b) vaccinating or immunising said subject against said infection within a timeframe
  i) beginning less than 4 weeks, preferably less than 3 weeks and especially less than 2 weeks, before said treatment course of about 2 months wherein cladribine is orally administered to said patient, and ending with the beginning of the second treatment month in the respective treatment course wherein cladribine is orally administered to said patient, and/or
  ii) beginning with the end of the second treatment month in the said treatment course wherein cladribine is orally administered to the patient, and ending with the end of the cladribine free period of at least 9 month that is directly following that treatment course.

[19] A method of treating an autoimmune disorder and reducing the risk of an infection in a subject in need thereof, said method comprising,
  a) at least 2 treatment courses of about 2 months duration each, wherein cladribine is orally administered to said subject at a fixed dose per patient and per treatment course, wherein said fixed dose is selected from the range of 1.0 mg/kg and 3.0 mg/kg, preferably 1.5 mg/kg and 2.0 mg/kg, and wherein each treatment course is to be followed by a cladribine free period of at least 9 months, in which no cladribine is administered to said subject, and
  b) at least one vaccination period of up to 4 weeks, preferably up to 2 weeks, wherein said subject is vaccinated or immunised one or more times against said infection, wherein said vaccination period starts
  i) less than 4 weeks, preferably less than 3 weeks and especially less than 2 weeks, before the beginning of a said treatment course,
  ii) within the first or second week of a said treatment course, and/or
  iii) with a timeframe set by the end of a said treatment course wherein cladribine is orally administered to said subject, and ending with the end of a subsequent cladribine free period of at least 9 months, in which no cladribine is administered to said subject, which cladribine free period preferably directly follows a said treatment course.

A method of treating an autoimmune disorder and reducing the risk of an infection in a subject in need thereof, preferably as described above and/or below, said method comprising,
  a) at least 2 treatment periods of about 2 months duration each, wherein cladribine is orally administered to said subject at a fixed dose per patient and per treatment period, wherein said fixed dose is selected from the range of 1.0 mg/kg to 3.0 mg/kg, preferably 1.5 mg/kg to 2.0 mg/kg, and wherein each treatment period is to be followed by a cladribine free period of at least 9 months, in which no cladribine is administered to said subject, and
  b) at least one vaccination period, preferably one or two vaccination periods, of up to 4 weeks, preferably up to 2 weeks, wherein said subject is vaccinated or immunised one or more times against said infection, wherein said vaccination period starts
  i) less than 4 weeks, preferably less than 3 weeks and especially less than 2 weeks, before the beginning of a said treatment period,
  ii) within the first, second, third or fourth week, preferably within weeks 1 to 4, 1 to 3, 2 to 4 or 3 to 4, or of a said treatment period, and/or
  iii) with a timeframe set by the end of a said treatment period wherein cladribine is orally administered to said subject, and ending with the end of a subsequent cladribine free period of at least 9 months, in which no cladribine is administered to said subject, which cladribine free period preferably directly follows a said treatment period.

[20] A method of treating an autoimmune disorder and reducing the risk of an infection in a subject in need thereof, preferably as described above and/or below, said method comprising,
  a) 2 treatment courses of about 2 months duration each, wherein cladribine is orally administered to said subject at a fixed dose per patient and per treatment course, wherein said fixed dose is selected from the range of 1.5 mg/kg and 2.0 mg/kg, and wherein each treatment course is to be followed by a cladribine free period of at least 9 months, preferably at least 10 months, in which no cladribine is administered to said subject, and
  b) one or two vaccination periods of up to 4 weeks, preferably up to 2 weeks, wherein said subject is vaccinated or immunised one or more times against said infection, wherein each of said vaccination periods starts
  i) less than 4 weeks, preferably less than 3 weeks and especially less than 2 weeks, before the beginning of a said treatment course,
  ii) within the first or second week of a said treatment course, and/or
  iii) at any time within a timeframe set by the end of a said treatment course wherein cladribine is orally administered to said subject, and by end of the subsequent cladribine free period of at least 9 or preferably 10 months, in which no cladribine is administered to said subject, preferably a said cladribine free period which directly follows a said treatment course.

[21] A method of treating an autoimmune disorder and reducing the risk of an infection in a subject in need thereof, preferably as described above and/or below, said method comprising,
  a) 2 treatment courses of about 2 months duration each, wherein cladribine is orally administered to said subject at a fixed dose per patient and per treatment course, wherein said fixed dose is selected from the range of 1.5 mg/kg and 2.0 mg/kg, and wherein each treatment course is to be followed by a cladribine free period of at least 9 months, preferably at least 10 months, in which no cladribine is administered to said subject, and
  b) one or two vaccination periods of up to 4 weeks, preferably up to 2 weeks, wherein said subject is vaccinated or immunised one or more times against said infection, wherein each said vaccination periods, independently from each other,
  i) starts less than 4 weeks, preferably less than 3 weeks and especially less than 2 weeks, before the beginning of a said treatment course, and ends 6 weeks, preferably 4 weeks and especially 2 weeks, after the beginning of said treatment course, or
  ii) starts with the end of said treatment course, starts 1 week after the end of said treatment course, or starts two weeks after the end of said treatment course.

[21b] Preferably, said fixed dose per patient and per treatment course is the same or about the same in at least 2 treatment courses, preferably at least 2 adjacent treatment courses. Preferably, said fixed dose is fixed per patient, per body weight of said patient, and per treatment course.

[22] The method according to one or more of the preceding claims, preferably as described above and/or below, wherein said subject
  i) is vaccinated one or more times, preferably once or twice, within a timeframe starting two weeks before the beginning said treatment course, and ending four weeks after the beginning of said treatment course, and/or
  ii) is vaccinated one or more times, preferably once or twice, within a timeframe starting with the end of said treatment course and ending two weeks, three weeks or four weeks after the end of said treatment course.

[23b] The method according to one or more of the sections above and/or below, wherein each treatment course consists of 2 treatment months. Preferably, each of said treatment months comprises one treatment week, wherein said treatment week preferably starts at the beginning of the respective treatment month.

[23] The method according to one or more of the sections above and/or below, wherein each treatment course consists of 2 treatment months, wherein each treatment month comprises one treatment week, wherein said treatment week preferably starts at the beginning of the respective treatment month.

[24] The method as described herein and especially as described above and/or below, wherein each treatment week consists of 4 or 5 days (treatment days) on which a patient preferably receives cladribine treatment, preferably independently selected per day from 10 mg per day or 20 mg per day.

[25] The method as described herein and especially as described above and/or below, wherein
  i) the vaccination period comprises two weeks to four weeks,
  ii) the one or more vaccinations are preferably administered to said subject during the first week and/or the last week of said vaccination period, and/or
  iii) at least one vaccination is administered to said subject on one of days one, two, three, five, six or seven of said first week, and/or on one of days one, two, three, five, six or seven of said last week.

[26] The method as described herein and especially as described above and/or below, wherein said subject to be vaccinated or immunised is having lymphopenia Grade ≥1, lymphopenia Grade ≥2, or lymphopenia (Grade ≥3), at the beginning or during said vaccination period.

[26b] The method as described herein and especially as described above and/or below, wherein said subject is vaccinated with one or more vaccines, preferably vaccines as described herein and especially as described above and/or below, which are selected from the group consisting of live vaccines and/or non-live vaccines. More preferably, they are selected from the group consisting of live vaccines, live-attenuated vaccines and/or non-live vaccines.

[26c] The method as described herein and especially as described above and/or below, wherein said subject is vaccinated with one or more vaccines, selected from the group consisting of live-attenuated vaccines, inactivated vaccines, subunit vaccines, recombinant vaccines, polysaccharide vaccines, conjugate vaccines and toxoid vaccines, and/or combinations thereof.

[27] The method as described herein and especially as described above and/or below, wherein said subject is vaccinated with one or more vaccines, selected from the group consisting of inactivated vaccines, subunit vaccines, recombinant vaccines, polysaccharide vaccines, conjugate vaccines and toxoid vaccines, and/or combinations thereof.

[27b] The method as described herein and especially as described above and/or below, wherein said subject is vaccinated with one or more vaccines, preferably vaccines as described herein and especially as described above and/or below, which are not live vaccines and/or live-attenuated vaccines, and/or combinations thereof.

[28] The method as described herein and especially as described above and/or below, wherein said infection is a viral infection, preferably selected from the group consisting of hepatitis, preferably hepatitis A and/or hepatitis B, more preferably hepatitis B, varicella zoster (shingles), or if unexposed: varicella, measles, influenza, poliovirus, pneumococcal pneumonia, diphtheria, tetanus, pertussis, human papilloma virus (HPV) and other papillomavirus-related diseases, covid-19, as now vaccines have become available, and any other viral disease according to recommended immunization schedules based on age, travel or geographical exposure-related risks, or other factors.

[29] The method as described herein and especially as described above and/or below, wherein said infection is a bacterial infection, preferably selected from the group consisting of Anthrax, Cholera, Diphtheria, *Haemophilus influenzae*, Meningococcal Meningitis, Pertussis, Plague, Pneumococcal Disease, *Streptococcus pneumoniae*, Tetanus, Tuberculosis, and Typhus.

[30] The method as described herein and especially as described above and/or below, wherein said vaccination is performed with a vaccine selected from the group consisting of Anthrax Prophylaxis vaccine, Cholera Prophylaxis vaccine, Diphtheria Prophylaxis vaccine, *Haemophilus influenzae* Prophylaxis vaccine, Meningococcal Meningitis Prophylaxis vaccine, Pertussis Prophylaxis vaccine, Plague Prophylaxis vaccine, Pneumococcal Disease Prophylaxis vaccine, *Streptococcus pneumoniae* Prophylaxis vaccine, Tetanus Prophylaxis vaccine, Tuberculosis Prophylaxis vaccine, Typhoid Prophylaxis vaccine.

[31] The method as described herein and especially as described above and/or below, wherein the autoimmune disorder is selected from the group consisting of Multiple Sclerosis (MS), Rheumatoid Arthritis (RA), Systemic Lupus Erythematosus (SLE), Neuromyelitis Optica Spectrum Disorders (NMOSD) and Myasthenia Gravis (MG), preferably Multiple Sclerosis (MS), Neuromyelitis Optica Spectrum Disorders (NMOSD) and Myasthenia Gravis (MG).

[32] The method as described herein and especially as described above and/or below, wherein the autoimmune disorder is Multiple Sclerosis (MS).

[33] The method as described herein and especially as described above and/or below, wherein the autoimmune disorder is Multiple Sclerosis (MS), including one or more indications selected from the group consisting of relapsing forms of Multiple Sclerosis (RMS), relapsing-remitting multiple sclerosis (RRMS), secondary progressive Multiple Sclerosis (SPMS) and primary progressive multiple Sclerosis (PPMS).

[34] The method as described herein and especially as described above and/or below, the method comprising:
administering cladribine during one or more treatment courses orally to a patient at fixed dose per patient, per body weight and per treatment course, wherein said fixed dose is selected from the range of about 1.0 mg/kg to about 3.0 mg/kg, and wherein the cladribine is administered to said patient in a manner that the effective or bioavailable amount of cladribine in said patient is a fixed dose per patient, per body weight and per treatment course selected from the range of about 0.5 mg/kg to about 1.6 mg/kg, preferably 0.8+/−0.2 mg/kg.

[35] The method as described herein and especially as described above and/or below, wherein said effective or bioavailable amount of cladribine in said patient at a fixed dose per patient, per body weight and per treatment course in the range of about 0.3 mg/kg to about 2.0 mg/kg is achieved by administering an oral dosage form providing a bioavailability of cladribine in said patient selected from the range consisting of about 30% to about 100%, preferably about 40% to 50%.

Said fixed dose per patient, per body weight and per treatment course is preferably the same or about the same in at least two of said treatment courses. Said fixed dose per patient, per body weight and per treatment course is more preferably the same or about the same in all of said treatment courses. Even more preferably, said fixed dose per patient, per body weight and per treatment course is preferably the same in all of said treatment courses of the respective patient, or about the same in all of said treatment courses of the respective patient. Especially preferably, said fixed dose per patient, per body weight and per treatment course is preferably the same in all of said treatment courses of all patients, or about the same in all of said treatment courses of all patients. Preferably, "about the same" in this regard means an interchangeability per patient and/or per treatment course of plus/minus 15% of said fixed dose, preferably plus/minus 10% of said fixed dose and especially plus/minus 5% of said fixed dose.

[36] The method according to one or more of the preceding claims, wherein the autoimmune disorder to be treated is Multiple Sclerosis (MS), preferably relapsing forms of MS (RMS), more preferably relapsing-remitting MS (RRMS), secondary progressive MS (SPMS) are primary progressive MS (PPMS), and that subject to be treated is having high disease activity (HDA), preferably high disease activity as defined according to HDA 1, HDA 2, HDA 3, or HDA 4.

The method as described herein and especially as described above and/or below, wherein the subject to be treated is aged >30 years, >40 years, >50 years, >60 years, or >70 years, preferably aged >50 years, >60 years or >70 years, and especially >50 years.

The method as described herein and especially as described above and/or below, wherein said vaccinating of said patient takes place at any time except for the time period of 5 to 10 weeks, 6 to 11 weeks, 5 to 13 weeks or 6 to 14 weeks after the beginning of the respective treatment period or treatment course wherein cladribine is orally administered to said patient.

The method as described herein and especially as described above and/or below, wherein said vaccinating of said patient takes place at any time except for the time period of 5 to 9 weeks, 6 to 10 weeks, 5 to 12 weeks or 6 to 13 weeks after the beginning of the respective treatment period or treatment course wherein cladribine is orally administered to said patient.

Advantageously, in the context of the instant invention, vaccination of subjects during and after cladribine treatment, preferably cladribine tablet treatment, is preferably recommended even if the patient's white blood cell counts are not within normal limits, but preferably closer to normal level than Grade 4 lymphopenia, more preferably closer to normal than Grade 3 lymphopenia, and especially equal to Grade 2 lymphopenia, and that vaccination can be preferably be administered less than 6 weeks prior to the start of cladribine therapy, and especially less than four weeks to start of cladribine therapy. Types of vaccines that are deemed suitable in this regard are preferably selected from the group consisting of live-attenuated vaccines, inactivated vaccines, subunit vaccines, recombinant vaccines, polysaccharide vaccines, conjugate vaccines and toxoid vaccines, and/or combinations thereof.

Thus, subject of the instant invention is preferably a method of treating autoimmune disorders and especially Multiple Sclerosis by administering cladribine, preferably cladribine tablets, preferably as defined herein, comprising vaccination of subjects during and after said cladribine treatment, preferably cladribine tablet treatment, in patients where white blood cell counts are not within normal limits, but preferably closer to normal level than Grade 4 lymphopenia, more preferably closer to normal than Grade 3 lymphopenia, and especially equal to Grade 2 lymphopenia, wherein said vaccination is preferably also administered less than 6 weeks prior to the start of cladribine therapy, and especially less than four weeks to start of cladribine therapy. Types of vaccines that are deemed suitable in this regard are preferably selected from the group consisting of live-attenuated vaccines, inactivated vaccines, subunit vaccines, recombinant vaccines, polysaccharide vaccines, conjugate vaccines and toxoid vaccines, and/or combinations thereof.

Thus, subject of the instant invention is especially preferably a method of treating autoimmune disorders and especially Multiple Sclerosis, by administering cladribine, preferably oral cladribine and especially cladribine tablets, preferably as defined herein, comprising vaccination of subjects during and after said cladribine treatment, preferably oral cladribine treatment and especially cladribine tablet treatment, in patients having Grade 1-2 lymphopenia, Grade 1-3 lymphopenia or Grade 1-4 lymphopenia, more preferably in patients having Grade 2-3 lymphopenia or Grade 2-4 lymphopenia. Preferably, said vaccination is also administered less than 6 weeks, preferably less than 4 weeks, more preferably less than 2 weeks and especially less than one week prior to the start of cladribine therapy, preferably applicable to the start of the first treatment course, the second treatment course and/or each subsequent treatment course. Types of vaccines that are deemed suitable in this regard are preferably selected from the group consisting of live-attenuated vaccines, inactivated vaccines, subunit vaccines, recombinant vaccines, polysaccharide vaccines, conjugate vaccines and toxoid vaccines, and/or combinations thereof. According the USPI for cladribine tablets (MAVENCLAD®), the recommended cumulative dosage of cladribine is about 3.5 mg per kg body weight, administered orally and divided into 2 yearly treatment courses (about 1.75 mg per kg per treatment course) (see Table 1). Each treatment course is divided into 2 treatment cycles:

Administration of First Treatment Course
 First Course/First Cycle: start any time.
 First Course/Second Cycle: administer 23 to 27 days after the last dose of First Course/First Cycle.
Administration of Second Treatment Course
 Second Course/First Cycle: administer at least 43 weeks after the last dose of First Course/Second Cycle.
 Second Course/Second Cycle: administer 23 to 27 days after the last dose of Second Course/First Cycle.

TABLE 10

Dose of Mavenclad per cycle by Patient weight in each treatment course

| Weight Range | Dose in mg (Number of 10 mg Tablets) per Cycle | |
| --- | --- | --- |
| kg | First Cycle | Second Cycle |
| 40* to less than 50 | 40 mg (4 tablets) | 40 mg (4 tablets) |
| 50 to less than 60 | 50 mg (5 tablets) | 50 mg (5 tablets) |
| 60 to less than 70 | 60 mg (6 tablets) | 60 mg (6 tablets) |
| 70 to less than 80 | 70 mg (7 tablets) | 70 mg (7 tablets) |
| 80 to less than 90 | 80 mg (8 tablets) | 70 mg (7 tablets) |
| 90 to less than 100 | 90 mg (9 tablets) | 80 mg (8 tablets) |
| 100 to less than 110 | 100 mg (10 tablets) | 90 mg (9 tablets) |
| 110 and above | 100 mg (10 tablets) | 100 mg (10 tablets) |

*The use of MAVENCLAD in patients weighing less than 40 kg has not been investigated.

Preferably, the cycle dosage is administered as 1 or 2 tablets once daily over 4 or 5 consecutive days.

Accordingly, preferred in the context of the instant invention is a method of treating an autoimmune disorder and to reducing the risk of an infection in a subject in need thereof, said method comprising
 a) orally administering cladribine in an accumulated dosage of about 3.5 mg per kg bodyweight, divided into 2 about yearly treatment courses, wherein in each about yearly treatment course, about 1.75 mg per kg per treatment course are administered, and wherein each treatment course is divided into two treatment cycles, each cycle preferably consisting of four or five consecutive days, wherein cladribine is orally administered,
 wherein said
 i) first course/first cycle: oral cladribine administration can be started at any time,
 ii) first course/second cycle: oral cladribine administration is started 23 to 27 days after the last dose administered in the first course/first cycle
 iii) second course/first cycle: oral cladribine administration is started at least 43 weeks after the last dose of first course/second cycle, and
 iv) second course/second cycle: oral cladribine administration is started 23 to 27 days after the last dose administered in the second course/first cycle, and
 b) wherein said subject is vaccinated within a first timeframe
 starting four weeks before the first course/first cycle, and
 ending with the beginning of the second course/second cycle, and/or said subject is vaccinated within a second timeframe,
 starting with the end of the second course/second cycle, and
 ending with the end of the second year (preferably 96-104 weeks after the start of the first course/first cycle.

Further preferred a method of treating an autoimmune disorder and to reducing the risk of an infection in a subject in need thereof, said method comprising
 a) orally administering cladribine in an accumulated dosage of about 3.5 mg per kg bodyweight, divided into 2 about yearly treatment courses, wherein in each about yearly treatment course, about 1.75 mg per kg per treatment course are administered, and wherein each treatment course is divided into two treatment cycles, each cycle preferably consisting of four or five consecutive days, wherein cladribine is orally administered,
 wherein said
 i) first course/first cycle: oral cladribine administration can be started at any time,
 ii) first course/second cycle: oral cladribine administration is started 23 to 27 days after the last dose administered in the first course/first cycle
 iii) second course/first cycle: oral cladribine administration is started at least 43 weeks after the last dose of first course/second cycle, and
 iv) second course/second cycle: oral cladribine administration is started 23 to 27 days after the last dose administered in the second course/first cycle, and
 b) wherein said subject is vaccinated
 1) within a first timeframe
 starting less than four weeks before the first course/first cycle, and
 ending with the beginning of the first course/second cycle,
 2) within a second timeframe,
 starting 2 to 3 weeks and ending 4 to 6 weeks after the end of the first course/second cycle,
 3) within a third timeframe,
 starting less than four weeks before the second course/first cycle, and
 ending with the beginning of the second course/second cycle, and/or 4) a fourth timeframe starting 2 to 3 weeks and ending 4 to 6 weeks after the end of the second course/second cycle. The method as described herein and especially as described above and/or below, wherein said vaccinating of said patient takes place at any time except for the time period of 5 to 10 weeks, 6 to 11 weeks, 5 to 13 weeks or 6 to 14 weeks after the beginning of the respective treatment period or treatment course wherein cladribine is orally administered to said patient.

The method as described herein and especially as described above and/or below, wherein said vaccination comprises administering to said patient a vaccine in 1 to 6 separate doses administered on different days.

The method as described herein and especially as described above and/or below, wherein said vaccination comprises administering to said patient a vaccine in 2 to 6 separate doses, wherein said 2 to 6 separate doses are administered to the patient on different days within a timeframe of about 1 to 12 weeks, preferably 1 to 8 weeks, yet preferably 1 to 6 weeks and especially 2 to 4 weeks.

The method as described herein and especially as described above and/or below, wherein said subject to be vaccinated or immunised is having lymphopenia Grade ≥1, lymphopenia Grade ≥2, or lymphopenia (Grade ≥3), at the beginning or during said vaccination period.

The method as described herein and especially as described above and/or below, wherein said subject is vaccinated with one or more vaccines, selected from the group consisting of live-attenuated vaccines, inactivated vaccines, subunit vaccines, recombinant vaccines, polysaccharide vaccines, conjugate vaccines and toxoid vaccines, and/or combinations thereof.

The method as described herein and especially as described above and/or below, wherein said subject is vaccinated with one or more vaccines, selected from the group consisting of inactivated vaccines, subunit vaccines, recombinant vaccines, polysaccharide vaccines, conjugate vaccines and toxoid vaccines, and/or combinations thereof.

The method as described herein and especially as described above and/or below, wherein said subject is vaccinated with one or more vaccines, preferably vaccines as described herein and especially as described above and/or below, which are not live vaccines and/or live-attenuated vaccines, and/or combinations thereof.

The method as described herein and especially as described above and/or below, wherein said infection is a viral infection, preferably selected from the group consisting of hepatitis, preferably hepatitis A and/or hepatitis B, more preferably hepatitis B, varicella zoster (shingles), or if unexposed: varicella, measles, influenza, poliovirus, pneumococcal pneumonia, diphteria, tetanus, pertussis, human papilloma virus (HPV) and other papillomavirus-related diseases, covid-19, since vaccines have now become available, and any other viral disease according to recommended immunization schedules based on age, travel or geographical exposure-related risks, or other factors.

The method as described herein and especially as described above and/or below, wherein said infection is a bacterial infection, preferably selected from the group consisting of Anthrax, Cholera, Diphtheria, *Haemophilus influenzae*, Meningococcal Meningitis, Pertussis, Plague, Pneumococcal Disease, *Streptococcus pneumoniae*, Tetanus, Tuberculosis, and Typhus.

The method as described herein and especially as described above and/or below, wherein said vaccination is performed with a vaccine selected from the group consisting of Anthrax Prophylaxis vaccine, Cholera Prophylaxis vaccine, Diphtheria Prophylaxis vaccine, *Haemophilus influenzae* Prophylaxis vaccine, Meningococcal Meningitis Prophylaxis vaccine, Pertussis Prophylaxis vaccine, Plague Prophylaxis vaccine, Pneumococcal Disease Prophylaxis vaccine, *Streptococcus pneumoniae* Prophylaxis vaccine, Tetanus Prophylaxis vaccine, Tuberculosis Prophylaxis vaccine, Typhoid Prophylaxis vaccine.

The method as described herein and especially as described above and/or below, wherein the autoimmune disorder is selected from the group consisting of Multiple Sclerosis (MS), Rheumatoid Arthritis (RA), Systemic Lupus Erythematosus (SLE), Neuromyelitis Optica Spectrum Disorders (NMOSD) and Myasthenia Gravis (MG), preferably Multiple Sclerosis (MS), Neuromyelitis Optica Spectrum Disorders (NMOSD) and Myasthenia Gravis (MG).

The method as described herein and especially as described above and/or below, wherein the autoimmune disorder is Multiple Sclerosis (MS).

The method as described herein and especially as described above and/or below, wherein the autoimmune disorder is Multiple Sclerosis (MS), including one or more indications selected from the group consisting of relapsing forms of Multiple Sclerosis (RMS), relapsing-remitting multiple sclerosis (RRMS), secondary progressive Multiple Sclerosis (SPMS) and primary progressive multiple Sclerosis (PPMS).

The method as described herein and especially as described above and/or below, wherein the subject to be treated is aged >30 years, >40 years, >50 years, >60 years, or >70 years, preferably aged >50 years, >60 years or >70 years, and especially >50 years.

The method as described herein and especially as described above and/or below, wherein said vaccinating of said patient takes place at any time except for the time period of 5 to 10 weeks, 6 to 11 weeks, 5 to 13 weeks or 6 to 14 weeks after the beginning of the respective treatment period or treatment course wherein cladribine is orally administered to said patient.

For use according to the instant invention the following vaccine types and/or vaccine platforms are generally preferred and selected from the group consisting of: live attenuated virus, recombinant viral-vectored vaccines, preferably those that are bioengineered to express target pathogen antigens in vivo, inactivated or killed virus, protein subunit vaccines, virus-like particles (VLPs), and nucleic acid-based (DNA or mRNA) vaccines.

The method as described herein and especially as described above and/or below, wherein said vaccination is against shingles, varicella zoster, influenza, SARS-CoV-2/COVID-19, or combinations and/or mutants thereof.

In view of the EMA SmPC of oral cladribine and especially cladribine tablets (MAVENCLAD®), especially preferred is a method for treating an autoimmune disorder in a patient in need thereof, the method comprising: (a) orally administering to said patient a cumulative dose of 3.5 mg, preferably +/−0.5 mg, of cladribine per kilogram of body weight of said patient during a treatment period of about 2 years, i.e. 2 treatment years, wherein said cladribine is orally administered to said patient as 1 treatment course of 1.75 mg, preferably +/−0.25 mg, per body weight of said patient and per treatment year, wherein each treatment course comprises two treatment weeks, one at the beginning of the first month and one at the beginning of the second month of the respective treatment year, and wherein each treatment week comprises 4 or 5 days on which said patient orally receives about 10 mg or about 20 mg of cladribine as a daily dose;

(b1) vaccinating said patient at least once during said first treatment year, and/or during the 2 weeks before the start of said first treatment year, and/or (b2) vaccinating said patient at least once during said second treatment year, and/or during the 2 weeks before the start of the second treatment year, with one or more vaccines, selected from group consisting of anti-viral vaccines and antibacterial vaccines. Preferably, said auto-immune disorder is selected from the group consisting of Multiple Sclerosis (MS), Rheumatoid Arthritis (RA), Systemic Lupus Erythematosus (SLE), Neuromyelitis Optica Spectrum Disorders (NMOSD) and Myasthenia Gravis (MG), preferably Multiple Sclerosis (MS), Neuromyelitis Optica Spectrum Disorders (NMOSD) and Myasthenia Gravis (MG), and especially selected from the group consisting of Multiple Sclerosis (MS), relapsing forms of MS (RMS), relapsing-remitting Multiple Sclerosis (RRMS), and secondary progressive Multiple Sclerosis (SPMS), preferably in high disease activity (HDA) patients, even more preferably HDA patients as defined herein.

[45] Thus, especially preferred is a method for treating an autoimmune disorder in a patient in need thereof, preferably as described above and/or below, the method comprising:

(i1) administering orally to said patient a cumulative dosage of 3.5 mg, preferably +/−0.5 mg, of cladribine per kilogram of body weight (mg/kg) of said patient, wherein (i2) said cumulative dosage is divided into 2 yearly treatment courses of 1.75 mg, preferably +/−0.25 mg, of cladribine per kilogram of bodyweight of said patient and per treatment course, wherein (i3) each treatment course is divided into 2 treatment cycles, wherein (i4) each treatment cycle dosage is about 10 mg or about 20 mg per day, orally administered daily for 4 or 5 consecutive days depending on said bodyweight, and preferably said treatment cycle dosage is administered within the first week of the respective treatment cycle, wherein (ii1) the first treatment course/first treatment cycle can be started any time, and (ii2) the first treatment course/second treatment cycle, or first treatment course/second treatment cycle dose, is then administered about 23 to 27 days after the last dose of said first treatment course/first treatment cycle, preferably as described in section (i4), (iii1) administering orally to said patient the second treatment course/first treatment cycle, or second treatment course/first treatment cycle dose, at least 43 weeks after the last dose of the first treatment course/ second treatment cycle, preferably as described in section (i4), and (iii2) administering orally to said patient the second treatment course/second treatment cycle about 23 to 27 days after the last dose of the second treatment course/ first treatment cycle, preferably as described in section (i4), and iv) vaccinating said patient, preferably (iv1) at least once between the start of the first treatment course/first treatment cycle and the end of the first treatment course, or during the two weeks before the start of said first treatment course/first treatment cycle, and/or iv2) at least once between the start of the second treatment course/first treatment cycle and the end of the second treatment course, or during the two weeks before the start of said second treatment course/first treatment cycle, with one or more vaccines, selected from group consisting of anti-viral vaccines and antibacterial vaccines.

[46] The method as described herein and especially as described above, wherein vaccinating said patient takes place (iv1) at least once between the start of the first treatment year/first treatment course and the end of the first treatment year, or during the week before the start of said first treatment year/treatment course, and/or iv2) at least once between the start of the second treatment course/first treatment cycle and the end of the second treatment course, or during the week before the start of said second treatment course/first treatment course.

[47] The method as described herein and especially as described above, wherein vaccinating said patient takes place (iv1) at least once between the start of the first treatment year/first treatment course and the end month 10 or month 11 of said first treatment year, and/or during one of the two weeks, preferably during the last week, before the start of said first treatment year/first treatment course;

and/or iv2) at least once between the start of the second treatment year/first treatment course and the end of said second treatment year, preferably at least once between the start of the second treatment year/first treatment course and the end of month 7, month 8, month 9 or month 10 of said second treatment year, and/or during one of the two weeks, preferably during the last week, before the start of second treatment year/first treatment course.

[48] The method as described herein and especially as described above, wherein vaccinating said patient takes place (iv1) at least once, preferably once or twice, in one or more months of said first treatment year, wherein the one or more months are selected from month 1 of said first treatment year and months 3-12, preferably months 3-11 and especially months 4-10, of said first treatment year, and/or during one of the two weeks, preferably during the last week, before the start of said first treatment year/first treatment course;

and/or iv2) at least once, preferably once or twice, in one or more months of said first treatment year, wherein the months are selected from month 1 of said first treatment year and months 3-12, preferably months 3-11, more preferably 4-10 and especially months 4-18, of said second treatment year, and/or during one of the two weeks, preferably during the last week, before the start of second treatment year/first treatment course.

[49] The method as described herein and especially as described above, wherein vaccinating said patient takes place (iv1) at least once, preferably once or twice, in one or more months of said first treatment year, wherein the one or more months are selected from month 1 of said first treatment year, month 3 of said first treatment year and months 4-12, preferably months 5-11 and especially months 6-10, of said first treatment year, and/or during one of the two weeks, preferably during the last week, before the start of said first treatment year/first treatment cycle;

and/or iv2) at least once, preferably once or twice, in one or more months of said first treatment year, wherein the months are selected from month 1 of said first treatment year, month 3 of said first treatment year and months 4-12, preferably months 5-11 and especially months 6-10, of said second treatment year, and/or during one of the two weeks, preferably during the last week, before the start of second treatment year/first treatment course.

[50] The method as described herein and especially as described above, wherein vaccinating said patient takes place at least once between weeks 6 and 52 of the first treatment year, preferably between weeks 8 and 52 of the first treatment year, more preferably between weeks 9 and 52 of the first treatment year, even more preferably between weeks 10 and 48 of the first treatment year, and especially between weeks 12 and 42 of the first treatment year.

[51] The method as described herein and especially as described above, and especially as described in Section [48], wherein vaccinating said patient takes place at least once between weeks 6 and 52 of the second treatment year, preferably between weeks 8 and 52 of the second treatment year, more preferably between weeks 9 and 52 of the second treatment year, even more preferably between weeks 10 and 48 of the second treatment year, and especially between weeks 12 and 42 of the second treatment year, and/or during one of the two weeks, preferably during the last week, before the start of second treatment year/first treatment course.

The method as described herein and especially as described above, wherein said vaccinating said patient at least once takes place during weeks 1 to 5, preferably during weeks 1 to 4, more preferably during weeks 2 to 4, and especially during weeks 1 to 2, weeks 2 to 3 or weeks 3 to 4, of said first treatment year and/or of said second treatment year.

The method as described herein and especially as described above, wherein said vaccinating said patient at least once preferably takes place during weeks 6 to 18, preferably weeks 6 to 16, more preferably 7 to 15 and especially weeks 8 to 12, especially weeks 7 to 9, weeks 9 to 12 or weeks 13 to 15, of said first treatment year and/or of said second treatment year.

Preferred is the method as described herein and especially as described above, wherein said vaccinating said patient at least once takes place within the one or two weeks following the last oral dose of cladribine in said first treatment course in said first treatment year and/or said second treatment year, i.e. week 2 or week 3, or preferably week 3 or 4, of said treatment year.

Preferred is the method as described herein and especially as described above, wherein said vaccinating said patient at least once takes place within the one or two weeks following the last oral dose of cladribine in said second treatment course in said first treatment year and/or said second treatment year, i.e. week 3 or week 4 of said treatment year.

Even more preferred is the method as described herein and especially as described above, wherein said vaccinating said patient at least once takes place within the one or two weeks following the last oral dose of cladribine in said first treatment course in said first treatment year, i.e. week 2 or week 3 of said first treatment year. During said weeks, said patient preferably receives one or more shots of said vaccine, preferably one shot of said vaccine.

Even more preferred is the method as described herein and especially as described above, wherein said vaccinating said patient at least once takes place within the one or two weeks following the last oral dose of cladribine in said second treatment course in said first treatment year, i.e. week 3 or week 4 of said first treatment year. During said weeks, said patient preferably receives one or more shots of said vaccine, preferably one shot of said vaccine. Preferably, the same holds true for the second treatment year.

The method as described herein and especially as described above, wherein said patient is to receive more than one shot of said vaccine, e.g. two or three shots of said vaccine, then the first short of said vaccine is preferably administered in the weeks as outlined herein and especially as outlined directly above. If said patient is to receive two or more shots of said vaccine, preferably two shots of said vaccine, the second of said two or more shots is preferably administered during weeks 6 to 16, more preferably weeks 7 to 14, even more preferably weeks 8 to 12 and especially weeks 9 to 11, of said (first or second, preferably first) treatment year. Especially preferably, the second one of said two or more vaccine shots is preferably administered 7 to 15 weeks, more preferably 7 to 12 weeks, and especially 7 weeks, 8 weeks or 9 weeks, after the day of the Administration of said first shot of said vaccination, which first short is preferably administrated as described above, and especially preferably administrated in one of weeks 1 to 4, counted from the first day in which cladribine is orally administered in the respective treatment year. Alternatively, the second one of said two or more vaccine shots is preferably administered 5 to 12 weeks, more preferably 6 to 10 weeks, and especially 6 weeks, 7 weeks or 8 weeks, after the day of the Administration of said first shot of said vaccination, which first short is preferably administrated as described above, and especially preferably administered in one of weeks 2 to 5, and especially in one of weeks 2, 3 or 4, counted from the first day in which cladribine is orally administered in the respective treatment year. This is preferred for vaccines that are to be administered at least twice, more preferably for vaccines that are to be administered 2 times, preferably as 2 separate shots, which are preferably administered separated by a time period of at least 2 weeks and to up to 8 months, preferably at least 3 weeks and up to 6 months, and especially at least 4 weeks and up to around 6 months. Preferably, said 2 separate shots are preferably separated either by 3 to 9 weeks, preferably about 4 to 8 weeks, such as about 4 weeks or about 8 weeks, or by 4 to 7 months, preferably 5 to 6 months, such as about 6 months.

The method as described herein and especially as described above, wherein i) said patient is to receive more than one dose or shot of said vaccine, preferably two or three doses or shots of said vaccine, ii) a first dose or shot, or the first dose or shot, of said vaccine is preferably administered according to one or more of the claims, and iii) a second dose or shot, or the second dose or shot, of said more than one doses or shots is administered at least 1 to 8 weeks after said first dose or shot, preferably about 1 week, about 2 weeks, about 4 weeks or about 4 to 6 months after said first dose or shot.

The method as described herein and especially as described above, wherein the second one of said two or more vaccine doses or shots is administered 7 to 15 weeks, preferably 7 to 12 weeks, and especially 7 weeks, 8 weeks or 9 weeks, after the day of the administration of said first dose or shot of said vaccination, which first dose or shot is preferably administrated as described herein and especially as described above, and especially preferably administered in one of weeks 1 to 4, in one of weeks 1 to 2, in one of weeks 2 to 3, in one of weeks 2 to 4 or in one of weeks 3 to 4, counted from the first day in which cladribine is orally administered in the respective treatment course.

Such vaccines that normally are to be administered 2 times (i.e. as two separate shots) include, but are not limited to, anti-varicella zoster virus vaccines, or short varicella zoster vaccines, and (anti-)herpes zoster virus vaccines. Preferably, the terms "(anti-)herpes zoster virus" or "(anti-)herpes zoster" and "(anti-)varicella zoster virus" or "(anti-)varicella zoster" are to be regarded as synonyms, respectively. Preferred (anti-)varicella zoster virus vaccines include, but are not limited to live (anti-)varicella zoster virus vaccines, attenuated live (anti-)varicella zoster virus vaccines, inactive (anti-)varicella zoster virus vaccines. Preferred examples include, but are not limited to, Zostavax® (zoster vaccine live) and inactivated or recombinant VZV vaccines, such as Shingrix® or Shingrix (Pro)®. Inactivated or recombinant VZV vaccines, such as Shingrix® or Shingrix (Pro)®, are especially preferred in this regard. However, it is quite common to repeat vaccination, i.e. to give a second (or subsequent) short of the same vaccine in order to optimise the immunisation achieved or achievable by said vaccine. This is true for both vaccines intended for the single use, such as (anti-)influenza flu vaccines, and vaccines intended for repeated use, such as once repeated use of said vaccine, or use as 2 separate shots of said vaccine, as it is typical for (anti-)varicella zoster virus vaccines. Preferably, live (anti-)varicella zoster virus vaccines and/or attenuated live (anti-)varicella zoster virus vaccines are only administered once, preferably as one shot. This is typically true for Zostavax® (zoster vaccine live). However, also in that case, it is possible to repeat vaccination, i.e. to give a second (or even a further subsequent) shot of the same vaccine in order to optimise the immunisation achieved or achievable by said vaccine.

In the above described methods, all the recommendations and timelines for vaccinating patients and/or using said vaccines given with regard to the first treatment year preferably hold true also for the second treatment year, and, if applicable, for any subsequent treatment year.

Diseases, preferably viral diseases, which can be regarded as disorders, especially viral disorders, for which subjects, preferably patients, and more preferably patients in need thereof can be vaccinated against in the context of the instant invention, and for which preferably vaccines exist, preferably include one or more of the below given disorders, but are preferably not limited to the below given disorders, preferably the below given viral disorders:

Cholera, Dengue, Diphtheria, Hepatitis A, Hepatitis B, Hepatitis E, *Haemophilus influenzae* type b (Hib), Human papillomavirus (HPV), Influenza, Japanese encephalitis, Malaria, Measles, Meningococcal meningitis, Mumps, Pertussis, Pneumococcal disease, Poliomyelitis, Rabies, Rotavirus, Rubella, Tetanus, Tick-borne encephalitis, Tuberculosis, Typhoid, Varicella and/or Yellow Fever.

Vaccines against COVID-19 and/or mutants thereof are highly desirable for use according to the instant invention. Several vaccines directed against the COVID-19 virus (SARS-COV-2) are now available and several more are under development close to Health Authority approval. Actual and/or candidate approaches include subunit vaccines containing viral proteins, particularly the surface-membrane spike protein that mediates receptor attachment; nucleic acid-based vaccines that enable host cells to produce the viral antigen i.e. the spike protein or its immunogenic portions; and whole-microbe approach such as live-attenuated vaccine, inactivated vaccine or viral vector vaccine.

Preferred vaccines, preferably antiviral vaccines, for use according to the invention include one or more of the below given vaccines, but are preferably not limited to below given vaccines:

influenza virus vaccine, inactivated, e.g. Afluria or Afluria (Pro),
influenza virus vaccine, inactivated, e.g. Fluarix Quadrivalent or Fluarix Quadrivalent (Pro),
influenza virus vaccine, inactivated, e.g. Flublok Quadrivalent or Flublok Quadrivalent (Pro),
influenza virus vaccine, inactivated, e.g. Fluvirin or Fluvirin (Pro),
hepatitis b adult vaccine, e.g. Engerix-B,
influenza virus vaccine, inactivated, e.g. Flublok or Flublok (Pro),
zoster vaccine live, e.g. Zostavax or Zostavax (Pro),
human papillomavirus vaccine, e.g. Gardasil 9 or Gardasil 9 (Pro),
influenza virus vaccine, inactivated, e.g. Flucelvax Quadrivalent or Flucelvax Quadrivalent (Pro),
zoster vaccine, inactivated, e.g. Shingrix or Shingrix (Pro),
influenza virus vaccine, live, trivalent, e.g. FluMist or FluMist (Pro),
influenza virus vaccine, inactivated, e.g. Fluzone,
influenza virus vaccine, inactivated, e.g. Fluzone High-Dose or Fluzone High-Dose (Pro),
influenza virus vaccine, inactivated, e.g. Fluad or Fluad (Pro),
influenza virus vaccine, live, trivalent, e.g. FluMist Quadrivalent,
yellow fever vaccine, e.g. Stamaril or Stamaril (Pro),
smallpox vaccine, e.g. ACAM2000 or ACAM2000 (Pro),
influenza virus vaccine, inactivated, e.g. Afluria Quadrivalent or Afluria Quadrivalent (Pro),
influenza virus vaccine, inactivated, e.g. Agriflu,
measles virus vaccine, e.g. Attenuvax,
human papillomavirus vaccine, e.g. Cervarix or Cervarix (Pro),
smallpox vaccine, e.g. Dryvax,
hepatitis b pediatric vaccine, e.g. Engerix-B Pediatric,
influenza virus vaccine, inactivated, e.g. Fluarix or Fluarix (Pro),
influenza virus vaccine, inactivated, e.g. Flucelvax,
influenza virus vaccine, inactivated, e.g. FluLaval or FluLaval (Pro),
influenza virus vaccine, inactivated, e.g. FluLaval Preservative-Free Quadrivalent,
influenza virus vaccine, inactivated, e.g. FluLaval Quadrivalent or FluLaval Quadrivalent (Pro),
influenza virus vaccine, inactivated, e.g. Fluzone High-Dose Quadrivalent,
influenza virus vaccine, inactivated, e.g. Fluzone Intradermal Quadrivalent,
influenza virus vaccine, inactivated, e.g. Fluzone Quadrivalent or Fluzone Quadrivalent (Pro),
hepatitis a adult vaccine, e.g. Havrix or Havrix (Pro),
hepatitis a pediatric vaccine, e.g. Havrix Pediatric,
rabies vaccine, human diploid cell, e.g. Imovax Rabies or Imovax Rabies (Pro),
poliovirus vaccine, inactivated, e.g. Ipol or Ipol (Pro), japanese enceph vacc sa14-14-2, inactivated, e.g. Ixiaro or Ixiaro (Pro),
rubella virus vaccine, e.g. Meruvax II,
mumps virus vaccine, e.g. Mumpsvax,
rabies vaccine, purified chick embryo cell, e.g. RabAvert or RabAvert (Pro),
hepatitis b adult vaccine, e.g. Recombivax HB Adult,
hepatitis b adult vaccine, e.g. Recombivax HB Dialysis Formulation,
hepatitis b pediatric vaccine, e.g. Recombivax HB Pediatric/Adolescent,
rotavirus vaccine, e.g. Rotarix or Rotarix (Pro),
rotavirus vaccine, e.g. RotaTeq or RotaTeq (Pro),
hepatitis a adult vaccine, e.g. Vaqta or Vagta (Pro),
hepatitis a pediatric vaccine, e.g. Vaqta Pediatric,
varicella virus vaccine, e.g. Varivax or Varivax (Pro), and/or
yellow fever vaccine, e.g. YF-Vax or YF-Vax (Pro).

Diseases, preferably bacterial diseases, which can be regarded as disorders, especially viral disorders, for which subjects, preferably patients, and more preferably patients in need thereof can be vaccinated against in the context of the instant invention, and for which preferably vaccines exist, preferably include one or more of the below given disorders, but are preferably not limited not limited to the below given disorders, preferably the below given bacterial disorders:

Anthrax (Prophylaxis), Cholera (Prophylaxis), Diphtheria (Prophylaxis), *Haemophilus influenzae* (Prophylaxis), Meningitis, Meningococcal, Meningococcal Meningitis (Prophylaxis), Pertussis (Prophylaxis), Plague (Prophylaxis), Pneumococcal Disease (Prophylaxis), *Streptococcus*, pneumoniae (Prophylaxis), Tetanus (Prophylaxis), Tuberculosis, (Prophylaxis) and/or
Typhoid (Prophylaxis).

Preferred vaccines, preferably antibacterial vaccines, for use according to the invention include one or more of the below given vaccines, but are preferably not limited to below given vaccines:
  pneumococcal 23-polyvalent vaccine, e.g. Pneumovax 23 or Pneumovax 23 (Pro),
  pneumococcal 13-valent vaccine, e.g. Prevnar 13 or Prevnar 13 (Pro),
  meningococcal conjugate vaccine, e.g. Menactra or Menactra (Pro),
  haemophilus b conjugate (prp-t) vaccine, e.g. ActHIB or ActHIB (Pro),
  meningococcal group B vaccine, e.g. Bexsero or Bexsero (Pro),
  anthrax vaccine adsorbed, e.g. Biothrax or Biothrax (Pro),
  haemophilus b conjugate (prp-t) vaccine, e.g. Hiberix or Hiberix (Pro),
  haemophilus b conjugate (prp-omp) vaccine, e.g. Liquid PedvaxHIB or Liquid PedvaxHIB (Pro),
  haemophilus b conjugate (prp-t) vaccine/meningococcal conjugate vaccine, e.g. MenHibrix,
  meningococcal polysaccharide vaccine, e.g. Menomune A/C/Y/W-135,
  meningococcal conjugate vaccine, e.g. Menveo or Menveo (Pro),
  pneumococcal 7-valent vaccine, e.g. Prevnar or Prevnar (Pro),
  tetanus toxoid, e.g. Te Anatoxal Berna,
  tetanus toxoid, e.g. Tetanus Toxoid Adsorbed,
  meningococcal group B vaccine, e.g. Trumenba or Trumenba (Pro)
  typhoid vaccine, inactivated, e.g. Typhim Vi or Typhim Vi (Pro)
  cholera vaccine, live, e.g. Vaxchora or Vaxchora (Pro), and/or
  typhoid vaccine, live, e.g. Vivotif Berna.

Especially preferred for use as a vaccine in the context of the present invention is an inactivated and/or recombinant herpes zoster vaccine or varicella zoster vaccine, preferably one that has European Medicines Agency (EMA) product number EMEA/H/C/004336, in which the active substance comprises recombinant varicella zoster virus glycoprotein E, having the International non-proprietary name (INN) or common name "Herpes zoster vaccine" or "Herpes zoster vaccine (recombinant, adjuvanted)", for which the therapeutic areas (MeSH) comprise Herpes Zoster, and/or for which the Anatomical therapeutic chemical (ATC) code is J07BK03. This vaccine is known under the tradename SHINGRIX®. Preferably, said inactivated and/or recombinant herpes zoster vaccine or varicella zoster vaccine is available as a powder and a suspension, preferably to be mixed together, e.g. by a doctor or a nurse, before being administered to a said patient, preferably by injection, e.g. by injection into the upper arm muscle of a said patient. The vaccination in this regard preferably comprises 2 separate vaccinations, 2 separate injections or 2 separate shots, preferably given about 3 weeks to about 8 months apart, preferably about 4 weeks to about 6 months apart. Typically, in this regard, the two separate vaccinations, two separate shots or two separate injections, are administered to a said patient or subject
  (i) about 3 to 5 weeks or about one month apart
  (ii) about 8 to 10 weeks or about 2 months apart,
  (iii) about 24 to 28 weeks or about 6 months apart, or
  iv) about 4 to 28 weeks apart, about 6 to 26 weeks apart, or about 8 weeks to 25 weeks apart, or basically up to 6 months apart.

Accordingly, if desired or necessary in this regard, the second vaccination, dose, injection or shot can be given later than 3 to 10 weeks apart, but preferably within 6 months after the first vaccination, dose injection or shot. People whose immune system does not work properly, who are under immunosuppressive therapy, and/or are treated or are to be treated according to the methods of treatment of the instant invention, and thus would benefit from a shorter vaccination schedule can have the second dose one to two months after the first dose, preferably within the vaccination periods as outlined herein. This is especially preferred with regard to inactivated or recombinant zoster vaccines, herpes zoster vaccines, varicella zoster vaccines and/or VZV vaccines, especially such vaccines that are generally administered 2 times to said subject or said patient in order to achieve optimum protection or immunity for said subject or patient. Administration is typically done by 2 separate vaccinations, 2 separate injections or 2 separate shots, preferably as it is known in the art, and especially as described herein. A preferred example of such a vaccine is the Zoster Vaccine Recombinant, Adjuvanted, e.g. the one commercially available under the tradename SHINGRIX®. Such vaccines are preferably indicated for prevention of herpes zoster (shingles), more preferably for prevention of herpes zoster (shingles) in adults aged 50 years and older. Such vaccines are also preferred for use as a vaccine according to the invention. The two doses of said vaccines are preferably administered via injection, preferably intramuscularly, and preferably according to the following schedules:

A first dose at any time within the vaccination periods described herein, preferably within the early vaccination periods described herein, followed by a second dose administered a) at any time between 1 and 6 months later than the first dose, or b) at any time between 2 and 6 months later than the first dose, preferably within the later vaccination periods described herein.

The vaccine Zoster Vaccine Recombinant, Adjuvanted, e.g. SHINGRIX®, was shown to boost VZV-specific immune responses, preferably if used in accordance with the methods of the instant invention, which boost is believed to be the mechanism by which it protects said subjects or patients against said varicella zoster and/or herpes zoster disease.

Also especially preferred for use as a vaccine in the context of the present invention is Zoster Vaccine Live, which is preferably a live attenuated virus vaccine, e.g. ZOSTAVAX® (Zoster Vaccine Live), and is preferably indicated for prevention of herpes zoster (shingles), more preferably indicated for prevention of herpes zoster (shingles) in individuals 50 years of age and older. Zoster Vaccine Live, e.g. ZOSTAVAX®, is preferably a lyophilized preparation of a live, attenuated varicella-zoster virus (VZV) strain, e.g. the Oka/Merck strain of live, attenuated varicella-zoster virus (VZV). ZOSTAVAX®, when reconstituted as directed, is a sterile suspension for subcutaneous administration. Typically, such Zoster Vaccine Live is for single administration, thus it is typically administered only once (i.e as a single dose) to a subject or patient in accordance with the instant invention. However, once repeated administration can be recommended or prescribed by the treating physician. In any case, it is typically administered subcutaneously, preferably in the deltoid region of the upper arm of said subject or patient. Herpes zoster (HZ), commonly known as shingles or zoster, is preferably a manifestation of the reactivation of varicella zoster virus (VZV), which, as a primary infection, produces chickenpox (varicella). Following initial infection, the virus remains latent in the dorsal root or cranial sensory ganglia until it reactivates, producing zoster. Zoster is characterized by a unilateral, painful, vesicular cutaneous eruption with a dermatomal distribution. The risk of developing zoster and/or Shingles appears to be related to a decline in VZV-specific immunity. (anti-)Herpes Zoster Virus Vaccine (or (anti-)Herpes Zoster Vaccine), (anti-)Varicella Zoster Virus Vaccine (or (anti-)Varicella Zoster Vaccine), preferably Zoster Vaccine Live and especially ZOSTAVAX® was shown to boost VZV-specific immunity, which is thought to be the mechanism by which it protects against zoster and its complications. Normally, it is not recommended to administer Zoster Vaccine Live, e.g. ZOSTAVAX®, to individuals who are immunodeficient or immunosuppressed due to disease or therapy, as serious or fatal disseminated vaccine strain varicella-zoster virus disease may occur. Causes of immunodeficiency or immunosuppression may include, but are not limited to, primary or acquired immunodeficiency states, AIDS or other clinical manifestations of infection with human immunodeficiency viruses, leukemia, lymphoma or other malignant neoplasms affecting the bone marrow or lymphatic system, and immunosuppressive therapy. However, in the context of the instant invention, this isf believed to be different, as the results underlying the instant invention clearly show that, due to the surprisingly advantageous interaction of cladribine, preferably oral cladribine and especially cladribine tablets (e.g. MAVENCLAD®), with the immune system of subjects or patients treated with cladribine, preferably oral cladribine and especially cladribine tablets (e.g. MAVENCLAD®), preferably treated as described herein and/or as described in the approved labels, preferably approved EMA and/or FDA labels, is less suppressed than anticipated and/or described in the prior art. Thus, the results underlying the instant invention clearly evidence that several vaccines and/or types of vaccines, if not all vaccines and/or types of vaccines, can be administered safely and/or efficaciously to subjects or patients in the context of treatment of autoimmune disorders with cladribine, preferably oral cladribine and especially cladribine tablets (e.g. MAVENCLAD®), as described in detail herein.

Suitable (anti-)influenza (virus) vaccines, include, but are not limited to: Mutagrip may contain traces of egg, such as ovalbumin, and of neomycin, formaldehyde and octoxynol-9, used during the manufacturing process (as per Spanish label). This vaccine is used in subject—70056800227010005 & 70056800227010013 from Spain. Quadrivalent Inactivated Influenza Vaccine VAXIGRIPTETRA™

VAXIGRIPTETRA™ (IIV4; Sanofi Pasteur) is a quadrivalent split-virion influenza vaccine approved in Europe in 2016 for individuals ≥3 years of age. IIV4 builds on the well-established record of the trivalent split-virion influenza vaccine (VAXIGRIP®). Areas covered: This literature review summarizes the rationale for developing quadrivalent influenza vaccines and discusses the phase III clinical trial results supporting the immunogenicity, safety, and tolerability of IIV4. Expert commentary: IIV4 is immunogenic and well tolerated. Adding a second B strain to the trivalent split-virion influenza vaccine provides a superior immune response for the additional strain but does not reduce the immune response for the three other strains or negatively affect the safety profile. By offering broader protection against co-circulating influenza B lineages, IIV4 has the potential to further reduce influenza-related morbidity and mortality beyond that achieved with trivalent vaccines.

Vagigrip tetra contain a buffer solution of sodium chloride, potassium chloride, disodium phosphate dihydrate, potassium dihydrogen phosphate, and water for injections. Some components such as eggs (ovalbumin, chicken proteins), neomycin, formaldehyde or octoxinol-9 may be present in very small amounts. This vaccine is used in subject—70056800221620002, 70056800221620004, 70056800221620006 (all from Finland).

Alfuria quad—A single 0.5 mL dose of AFLURIA QUADRIVALENT contains sodium chloride (4.1 mg), monobasic sodium phosphate (80 mcg), dibasic sodium phosphate (300 mcg), monobasic potassium phosphate (20 mcg), potassium chloride (20 mcg), and calcium chloride (0.5 mcg). From the manufacturing process, each 0.5 mL dose may also contain residual amounts of sodium taurodeoxycholate (≤10 ppm), ovalbumin (<1 mcg), sucrose (<10 mcg), neomycin sulfate (≤81.8 nanograms [ng]), polymyxin B (≤14 ng), beta-propiolactone (≤1.5 ng) and hydrocortisone (≤0.56 ng). This vaccine is used in subject—70056800221220003 (from Australia)

Trivalent inactivated influenza virus vaccines and Quadrivalent inactivated influenza vaccines vaccines are preferred (anti-)influenza (virus) vaccines for use according to the instant invention.

Especially preferred for use as a vaccine in the context of the present invention is Quadrivalent Influenza Vaccine (split virion, inactivated), which is indicated for the prevention of influenza disease caused by the two influenza A virus subtypes and the two influenza B virus types contained in the vaccine. Quadrivalent Influenza Vaccine (split virion, inactivated) is a vaccine administered to protect subjects or patients against influenza (flu). Quadrivalent Influenza Vaccine (split virion, inactivated), or similar types of vaccines, is indicated for the prevention of influenza disease caused by the two influenza A virus subtypes and the two influenza B virus types contained in the vaccine. Typically, such influenza vaccines are only administered once a year, preferably prior to or during flu-season. Preferably, influenza vaccines are administered once per year or in connection with the flu-season, but preferably in accordance with the vaccination periods of the instant invention. However, such flu vaccines can also be administered more than once per year or per flu-season, preferably 2 or 3 times, more preferably 2 times, e.g. in order to boost or optimise the immunisation achieved or achievable by said vaccine. If such a vaccine is to be administered 2 times, a first dose is preferably administered at any time within the vaccination periods described herein, preferably within the early vaccination periods described herein, followed by a second dose administered either within 1-3 weeks after said first administration, preferably within 1-3 weeks of the same early vaccination period, or within 4 weeks to 3 months later than the first dose, preferably within a later or subsequent vaccination period as described herein.

Especially preferred for use as a vaccine in the context of the present invention are (anti-) Corona vaccines, (anti-) COVID-19 vaccines, (anti-)SARS-COVID-19 vaccines and/or (anti-)SARS-CoV-2 vaccines, including, but not limited to
mRNA-technology based vaccines, such as:
mRNA-1273 (Moderna/NIAID vaccine),
BNT162b2 (Pfizer/BioNTech vaccine);
Vector-based vaccines, preferably Adenovirus/Vector-based vaccines, such as:
Ad26.COV2.S (Johnson & Johnson/Janssen Pharmaceuticals vaccine),
AZD1222 (ChAdOx1-S) (AstraZeneca/University of Oxford vaccine),
Gam-COVID-Vac/Sputnik V (Gamaleya Institute),
Ad5-nCoV (CanSino Biologics);
Virus-Like Particles (VLPs) based vaccines, such as:
CVnCoV (CureVac),
CoVLP (Medicago);
DNA-based vaccines, such as:
INO-4800 (Inovio Pharmaceuticals/International Vaccine Institute);
Protein-based vaccines, such as:
ZF2001 (Anhui Zhifei Longcom Biopharmaceutical), preferably plus adjuvants,
NVX-CoV2373 (Novavax), preferably plus adjuvants;
Inactivated Virus-based or Dead Virus-based vaccines, such as:
Covaxin/BBV152 (Bharat Biotech/Indian Council of Medical Research (ICMR)/National Institute for Virology (NIV),
CoronaVac (Sinovac),
Sinopharm/Wuhan Institute of Biological Products,
BBIBP-CorV (Sinopharm/Beijing Institute of Biological Products);
and the like.

The same preferably applies to further (anti-)Corona vaccines, (anti-)COVID-19 vaccines, (anti-)SARS-COVID-19 vaccines and/or (anti-)SARS-CoV-2 vaccines.

mRNA-technology based vaccines, such as mRNA-1273 (Moderna/NIAID vaccine) and BNT162b2 (Pfizer/BioNTech vaccine), and/or protein-based vaccines, such as ZF2001 (Anhui Zhifei Longcom Biopharmaceutical), preferably plus adjuvants, and NVX-CoV2373 (Novavax), preferably plus adjuvants, are especially preferred.

Varicella zoster virus infections, including, but not limited to herpes zoster infections and/or shingles, are an identified risk for patients suffering from autoimmune diseases, including, but not limited to Multiple Sclerosis (MS), relapsing forms of MS (RRMS) and/or secondary progressive MS (SPMS), and that are treated or are to be treated with cladribine, preferably oral cladribine and especially cladribine tablets. Accordingly, vaccination of patients who are antibody-negative for varicella zoster virus is recommended at least 4 to 6 weeks prior to initiation of treatment with cladribine, preferably oral cladribine and especially cladribine tablets for life-attenuated or life vaccine as well as during Mavenclad treatment for non-live vaccines.

However, there is a high need for more flexibility and/or options to vaccinate patients in the context of treatment with cladribine, preferably oral cladribine and especially cladribine tablets, especially in the context of the posology of cladribine tablets (Mavenclad®) as approved according to the EMA SmPC and/or the FDA USPI. Surprisingly and advantageously it was newly found by studying the impact of treatment of patients with cladribine tablets according to the SmPC and/or the USPI that the impact of said treatment with cladribine tablets on the immune system of said patients different than originally anticipated, i.e. less severe and strongly depending on the time point within said treatment. Even more surprisingly and advantageously it was newly found that vaccinations can be handled much more liberally in the context of treatment with cladribine tablets.

Thus, it is the subject of the instant invention to provide improved options to vaccinate patients in the context of treatment with cladribine tablets, preferably taking into consideration the current vaccination or immunisation guidelines.

A preferred subject thus is to provide improved options to vaccinate patients with an (anti-) varicella zoster virus vaccine or (anti-) herpes zoster virus vaccine (collectively "VZV-vaccine") in the context of treatment with cladribine tablets, preferably taking into consideration the current vaccination or immunisation guidelines and the posology of cladribine tablets as described in the USPI and/or SmPC for cladribine tablets (Mavenclad®)

A preferred VZV-vaccine in that regard comprises recombinant varicella zoster virus glycoprotein E, preferably vaccine having the International non-proprietary name (INN) or common name "Herpes zoster vaccine" or "Herpes zoster vaccine (recombinant, adjuvanted)", e.g. SHINGRIX®

Thus, a preferred subject of the instant invention is a method of vaccinating a patient in the context of cladribine tablets treatment, wherein the vaccine is administered at least once to said patient at any time during cladribine tablets treatment according to the USPI and/or SmPC for cladribine tablets (Mavenclad®), preferably as further defined and/or described herein. Even more preferred is a method of vaccinating a patient with said Herpes zoster vaccine (recombinant, adjuvanted) wherein said vaccine is administered 2 times to said patient, and wherein the first administration of said vaccine to said patient takes place at any time during cladribine tablets treatment according to the USPI and/or SmPC for cladribine tablets (Mavenclad®), preferably as further defined and/or described herein, and the second administration of said vaccine takes place after about one month, about 2 month, or within 2 to 6 months, after that first administration of said vaccine.

Even more preferred is a method of vaccinating a patient with said Herpes zoster vaccine (recombinant, adjuvanted) wherein said vaccine is administered 2 times to said patient, and wherein the first administration of said vaccine to said patient takes place within weeks 1 to week 4 and preferably weeks 2 to 4 after the start of cladribine tablets treatment according to the USPI and/or SmPC for cladribine tablets (Mavenclad®), preferably as further defined and/or described herein, and the second administration of said vaccine takes place
- a) in weeks 8 to 14 and preferably weeks 10 to 12 after the start of cladribine tablets treatment according to the USPI and/or SmPC for cladribine tablets (Mavenclad®), preferably as further defined and/or described herein, or
- b) can be delayed up to month 6 after the first administration of said vaccine to said patient.

It was newly found that, in the context of treatment of patients with cladribine, preferably oral cladribine and especially cladribine tablets (MAVENCLAD®), it is advantageously possible to safely and/or efficaciously to vaccinate patients,
- preferably patients that are antibody-negative to varicella zoster virus, more preferably patients that are antibody-negative to varicella zoster virus prior to or during treatment with cladribine, oral cladribine or cladribine tablets (MAVENCLAD®),
- with a varicella zoster vaccine, preferably a non-live varicella zoster vaccine, at any time point during said treatment with cladribine, oral cladribine or cladribine tablets (MAVENCLAD®), preferably at any time point during the 2 years that said treatment with cladribine, oral cladribine or cladribine tablets (MAVENCLAD®) normally takes. Preferably, said treatment of patients with cladribine, preferably oral cladribine and especially cladribine tablets (MAVENCLAD®), is performed as described herein and especially as described in the European Health Authority (EMA) approved SmPC and/or the US Food and Drug Administration (FDA) approved USPI for cladribine tablets (MAVENCLAD®), the disclosure of which is incorporated by reference into the instant patent application, preferably according to the status of the SmPC and/or USPI as of November 2020). Suitable varicella zoster vaccines are known in the art. Preferred varicella zoster vaccines are described herein. Especially preferred in this regard is a vaccine comprising recombinant varicella zoster virus glycoprotein E, preferably a vaccine having the International non-proprietary name (INN) or common name "Herpes zoster vaccine" or "Herpes zoster vaccine (recombinant, adjuvanted)", e.g. SHINGRIX®. Preferably, the treatment of patients with cladribine is a treatment of an autoimmune disorder as described herein, and especially is a treatment of multiple sclerosis (MS), preferably relapsing forms of MS (RMS), more preferably relapsing-remitting MS (RRMS) and/or secondary progressive MS (SPMS).

Additionally, it was newly found that, in the context of treatment of patients with cladribine, preferably oral cladribine and especially cladribine tablets (MAVENCLAD®), it is advantageously possible to safely and/or efficaciously to vaccinate patients,
- preferably patients that are antibody-negative to varicella zoster virus, more preferably patients that are antibody-negative to varicella zoster virus prior to or at the beginning of treatment with cladribine, oral cladribine or cladribine tablets (MAVENCLAD®),
- with a varicella zoster vaccine, preferably a non-live varicella zoster vaccine,
- during said treatment with cladribine, oral cladribine or cladribine tablets (MAVENCLAD®) at the preferred time periods given below, i.e.:
- a) in weeks 2 to 4 (e.g. a first dose of the vaccine or the only dose of the vaccine) and/or in weeks 10 to 12 (e.g. a second dose of the vaccine or the only dose, alternatively) after (or: counted from) the first dose of cladribine, oral cladribine or cladribine tablets (MAVENCLAD®), with the possibility to delay the administration of the second dose of the vaccine up to month 6 after first dose of the vaccine. Preferably, this is applicable with regard to the first treatment year and/or the second treatment year of the 2 years that said treatment with cladribine, oral cladribine or cladribine tablets (MAVENCLAD®) normally takes. Preferably, said treatment of patients with cladribine, preferably oral cladribine and especially cladribine tablets (MAVENCLAD®), is performed as described herein and especially as described in the European Health Authority (EMA) approved SmPC and/or the US Food and Drug Administration (FDA) approved USPI for cladribine tablets (MAVENCLAD®), the disclosure of which is incorporated by reference into the instant patent application, preferably according to the status of the SmPC and/or USPI as of November 2020). Suitable varicella zoster vaccines are known in the art. Preferred varicella zoster vaccines are described herein. Especially preferred in this regard is a vaccine comprising recombinant varicella zoster virus glycoprotein E, preferably a vaccine having the International non-proprietary name (INN) or common name "Herpes zoster vaccine" or "Herpes zoster vaccine (recombinant, adjuvanted)", e.g. SHINGRIX®. Preferably, the treatment of patients with cladribine is a treatment of an autoimmune disorder as described herein, and especially is a treatment of multiple sclerosis (MS), preferably relapsing forms of MS (RMS), more preferably relapsing-remitting MS (RRMS) and/or secondary progressive MS (SPMS).

Preferably, in the context of treatment of patients with cladribine, preferably oral cladribine and especially cladribine tablets (MAVENCLAD®), it is advantageously possible to safely and/or efficaciously to vaccinate patients,
- preferably patients that are antibody-negative to varicella zoster virus, more preferably patients that are antibody-negative to varicella zoster virus prior to or at the beginning of treatment with cladribine, oral cladribine or cladribine tablets (MAVENCLAD®),
- with a varicella zoster vaccine, preferably a non-live varicella zoster vaccine,
- during said treatment with cladribine, oral cladribine or cladribine tablets (MAVENCLAD®) at the preferred time periods given below, i.e.:
- a) in weeks 2 to 4 (first dose of the vaccine) and in weeks 10 to 12 (second dose of the vaccine) after (or: counted from) the first dose of cladribine, oral cladribine or cladribine tablets (MAVENCLAD®), with the possibility to delay the administration of said second dose of the vaccine up to month 6 after first dose of the vaccine. Preferably, this is applicable with regard to the first treatment year and/or the second treatment year of the 2 years that said treatment with cladribine, oral cladribine or cladribine tablets (MAVENCLAD®) normally takes. Preferably, said treatment of patients with cladribine, preferably oral cladribine and especially cladribine tablets (MAVENCLAD®), is performed as described herein and especially as described in the European Health Authority (EMA) approved SmPC and/or the US Food and Drug Administration (FDA) approved USPI for cladribine tablets (MAVENCLAD®), the disclosure of which is incorporated by reference into the instant patent application, preferably according to the status of the SmPC and/or USPI as of November 2020). Suitable varicella zoster vaccines are known in the art. Preferred varicella zoster vaccines are described herein. Especially preferred in this regard is a vaccine comprising recombinant varicella zoster virus glycoprotein E, preferably a vaccine having the International non-proprietary name (INN) or common name "Herpes zoster vaccine" or "Herpes zoster vaccine (recombinant, adjuvanted)", e.g. SHINGRIX®. Preferably, the treatment of patients with cladribine is a treatment of an autoimmune disorder as described herein, and especially is a treatment of multiple sclerosis (MS), preferably relapsing forms of MS (RMS), more preferably relapsing-remitting MS (RRMS) and/or secondary progressive MS (SPMS).

Alternatively, in the context of treatment of patients with cladribine, preferably oral cladribine and especially cladribine tablets (MAVENCLAD®), it is advantageously possible to safely and/or efficaciously to vaccinate patients, preferably patients that are antibody-negative to varicella zoster virus, more preferably patients that are antibody-negative to varicella zoster virus prior to or during treatment with cladribine, oral cladribine or cladribine tablets (MAVENCLAD®), with a varicella zoster vaccine, preferably a non-live varicella zoster vaccine, at any time point during said treatment with cladribine, oral cladribine or cladribine tablets (MAVENCLAD®), preferably at any time point during the 2 years that said treatment with cladribine, oral cladribine or cladribine tablets (MAVENCLAD®) normally takes, except for the first 3 months after administering the first dose of cladribine, oral cladribine or cladribine tablets ((MAVENCLAD®), preferably a) except for the first 3 months after administering the first dose of cladribine, oral cladribine or cladribine tablets, in the first treatment year of the 2 years that said treatment with cladribine, oral cladribine or cladribine tablets (MAVENCLAD®) takes, and/or b) except for the first 3 months after administering the first dose of cladribine, oral cladribine or cladribine tablets, in the second treatment year of the 2 years that said treatment with cladribine, oral cladribine or cladribine tablets (MAVENCLAD®) normally takes. Preferably, said treatment of patients with cladribine, preferably oral cladribine and especially cladribine tablets (MAVENCLAD®), is performed as described herein and especially as described in the European Health Authority (EMA) approved SmPC and/or the US Food and Drug Administration (FDA) approved USPI for cladribine tablets (MAVENCLAD®), the disclosure of which is incorporated by reference into the instant patent application, preferably according to the status of the SmPC and/or USPI as of November 2020). Suitable varicella zoster vaccines are known in the art. Preferred varicella zoster vaccines are described herein. Especially preferred in this regard is a vaccine comprising recombinant varicella zoster virus glycoprotein E, preferably a vaccine having the International non-proprietary name (INN) or common name "Herpes zoster vaccine" or "Herpes zoster vaccine (recombinant, adjuvanted)", e.g. SHINGRIX®. Preferably, the treatment of patients with cladribine is a treatment of an autoimmune disorder as described herein, and especially is a treatment of multiple sclerosis (MS), preferably relapsing forms of MS (RMS), more preferably relapsing-remitting MS (RRMS) and/or secondary progressive MS (SPMS).

Thus, methods of treatment according to the above findings are preferred subjects of the instant invention.

Thus, preferred are:

A method of treatment, preferably as described above and/or below, comprising a) treating a patient with cladribine tablets, preferably as described herein, and especially as described in the USPI or EU SmPC of Mavenclad®, and b) vaccinating said patient once or twice with a varicella zoster vaccine, preferably as described herein with regard to vaccination with varicella zoster vaccines, at any time point during said treatment with cladribine tablets, preferably at any time point during treatment year 1 and/or treatment year 2 of the 2 years that said treatment with cladribine tablets normally takes.

A method of treatment, preferably as described above and/or below, comprising a) treating a patient with cladribine tablets, preferably as described herein, and especially as described in the USPI or EU SmPC of Mavenclad®, and b) vaccinating said patient once or twice with a varicella zoster vaccine, preferably as described herein with regard to vaccination with varicella zoster vaccines, at any time point during one year calculated from the first administration of cladribine tablets to said patient, preferably at any time point during treatment year 1 of the 2 years that said treatment with cladribine tablets normally takes.

A method of treatment, preferably as described above and/or below, comprising a) treating a patient with cladribine tablets, preferably as described herein, and especially as described in the USPI or EU SmPC of Mavenclad®, and b) vaccinating said patient once or twice with a varicella zoster vaccine, preferably as described herein with regard to vaccination with varicella zoster vaccines, at any time point during one year calculated from the first administration of cladribine tablets to said patient, which one year is preferably treatment year 1 of the 2 years that said treatment with cladribine tablets normally takes.

A method of treatment, preferably as described above and/or below, comprising a) treating a patient with cladribine tablets, preferably as described herein, and especially as described in the USPI or EU SmPC of Mavenclad®, and b) vaccinating said patient twice with a varicella zoster vaccine, wherein said patient is vaccinated with said varicella zoster vaccine once (first dose) in weeks 2 to 4 and (second dose) in weeks 10 to 12 after the administration of the first dose said cladribine tablets, with the possibility to delay administration of said second dose of said vaccination up to month 6 after said first dose of said vaccination.

A method of treatment, preferably as described above and/or below, comprising a) treating a patient with cladribine tablets, preferably as described herein, and especially as described in the USPI or EU SmPC of Mavenclad®, and b) vaccinating said patient twice with a non-live varicella zoster vaccine, wherein said patient, preferably a patient that is antibody-negative to varicella zoster virus, is vaccinated with said non-live varicella zoster vaccine once (first dose) in weeks 2 to 4 and in (second dose) weeks 10 to 12 after the first administration of said cladribine tablets, with the possibility to delay administration of said second dose of said vaccination up to month 6 after said first dose of said vaccination.

A method of treatment, preferably as described above and/or below, comprising a) treating a patient with cladribine tablets, preferably as described herein, and especially as described in the USPI or EU SmPC of Mavenclad®, and b) vaccinating said patient twice with a non-live varicella zoster vaccine, wherein said patient, preferably a patient that is antibody-negative to varicella zoster virus prior the first vaccination and/or prior to the first administration of cladribine tablets, is vaccinated with said non-live varicella zoster vaccine once (first dose) in weeks 2 to 4 and once (second dose) in weeks 10 to 12 after the first administration of said cladribine tablets (or calculated from the first administration of said cladribine tablets) with the possibility to delay administration of said second dose of said vaccination up to month 6 after said first dose of said vaccination.

A method of treatment, preferably as described above and/or below, comprising a) treating a patient with cladribine tablets, preferably as described herein, and especially as described in the USPI or EU SmPC of Mavenclad®, and b) vaccinating said patient once or twice with a varicella zoster vaccine, preferably as described herein with regard to vaccination with varicella zoster vaccines, at any time point during said treatment with cladribine tablets, preferably at any time point during treatment year 1 and/or treatment year 2 of the 2 years that said treatment with cladribine tablets normally takes, except for the first 3 months after administering the first dose of cladribine tablets to said patient, preferably the first 3 months after administering the first dose of cladribine tablets to said patient in the respective treatment year (treatment year 1 and/or treatment year 2) of the 2 years that said treatment with cladribine tablets normally takes.

A method of treatment, preferably as described above and/or below, comprising a) treating a patient with cladribine tablets, preferably as described herein, and especially as described in the USPI or EU SmPC of Mavenclad®, and b) vaccinating said patient once or twice with a varicella zoster vaccine, preferably as described herein with regard to vaccination with varicella zoster vaccines, at any time point during one year calculated from the first administration of cladribine tablets to said patient, preferably at any time point during treatment year 2 of the 2 years that said treatment with cladribine tablets normally takes, except for the first 3 months after administering the first dose of cladribine tablets to said patient, preferably the first 3 months after administering the first dose of cladribine tablets to said patient in the first treatment year (treatment year 1), preferably first treatment year (treatment year 1) of the 2 years that said treatment with cladribine tablets normally takes.

A method of treatment, preferably as described above and/or below, comprising a) treating a patient with cladribine tablets, preferably as described herein, and especially as described in the USPI or EU SmPC of Mavenclad®, and b) vaccinating said patient once or twice with a varicella zoster vaccine, preferably as described herein with regard to vaccination with varicella zoster vaccines, at any time point during one year calculated from the first administration of cladribine tablets to said patient, which one year is preferably treatment year 1 of the 2 years that said treatment with cladribine tablets normally takes, except for the first 3 months after administering the first dose of cladribine tablets to said patient, preferably the first 3 months after administering the first dose of cladribine tablets to said patient in the second treatment year (treatment year 2), preferably second treatment year (treatment year 2) of the 2 years that said treatment with cladribine tablets normally takes.

Said first administration of cladribine tablets preferably refers to the first administration of cladribine tablets in the first treatment year (treatment year 1, or first treatment course) and/or the second treatment year (treatment year 2, or second treatment course) of the 2 years that said treatment with cladribine tablets, preferably said treatment with cladribine tablets as described herein, normally takes.

Preferably, said treating a patients with cladribine tablets is a treatment of an autoimmune disorder as described herein, and especially is a treatment of multiple sclerosis (MS), preferably relapsing forms of MS (RMS), more preferably relapsing-remitting MS (RRMS) and/or secondary progressive MS (SPMS).

A method for the treatment of patients with cladribine, preferably oral cladribine and especially cladribine tablets (MAVENCLAD®), preferably as described herein, said method further comprising vaccinating said patients, preferably patients that are antibody-negative to varicella zoster virus, more preferably patients that are antibody-negative to varicella zoster virus prior to or during treatment with cladribine, oral cladribine or cladribine tablets (MAVENCLAD®), with a varicella zoster vaccine, preferably a non-live varicella zoster vaccine, at any time point during said treatment with cladribine, oral cladribine or cladribine tablets (MAVENCLAD®), preferably at any time point during the 2 years that said treatment with cladribine, oral cladribine or cladribine tablets (MAVENCLAD®) normally takes. Preferably, said treatment of patients with cladribine, preferably oral cladribine and especially cladribine tablets (MAVENCLAD®), is performed as described herein and especially as described in the European Health Authority (EMA) approved SmPC and/or the US Food and Drug Administration (FDA) approved USPI for cladribine tablets (MAVENCLAD®), the disclosure of which is incorporated by reference into the instant patent application, preferably according to the status of the SmPC and/or USPI as of November 2020). Suitable varicella zoster vaccines are known in the art. Preferred varicella zoster vaccines are described herein. Especially preferred in this regard is a vaccine comprising recombinant varicella zoster virus glycoprotein E, preferably a vaccine having the International non-proprietary name (INN) or common name "Herpes zoster vaccine" or "Herpes zoster vaccine (recombinant, adjuvanted)", e.g. SHINGRIX®.

A method for the treatment of patients with cladribine, preferably oral cladribine and especially cladribine tablets (MAVENCLAD®), preferably as described herein, said method further comprising vaccinating said patients, preferably patients that are antibody-negative to varicella zoster virus, more preferably patients that are antibody-negative to varicella zoster virus prior to or at the beginning of treatment with cladribine, oral cladribine or cladribine tablets (MAVENCLAD®), with a varicella zoster vaccine, preferably a non-live varicella zoster vaccine, during said treatment with cladribine, oral cladribine or cladribine tablets (MAVENCLAD®) at the time periods given below, i.e.:

a) vaccinating said patient in weeks 2 to 4 (preferably with a first dose of the vaccine or the only dose of the vaccine) and/or in weeks 10 to 12 (preferably with a second dose of the vaccine or the only dose, alternatively) after (or: counted from) the first dose of cladribine, oral cladribine or cladribine tablets (MAVENCLAD®), with the possibility to delay the administration of the second dose of the vaccine up to month 6 after first dose of the vaccine. Preferably, this is applicable with regard to the first treatment year and/or the second treatment year of the 2 years that said treatment with cladribine, oral cladribine or cladribine tablets (MAVENCLAD®) normally takes. Preferably, said treatment of patients with cladribine, preferably oral cladribine and especially cladribine tablets (MAVENCLAD®), is performed as described herein and especially as described in the European Health Authority (EMA) approved SmPC and/or the US Food and Drug Administration (FDA) approved USPI for cladribine tablets (MAVENCLAD®), the disclosure of which is incorporated by reference into the instant patent application, preferably according to the status of the SmPC and/or USPI as of November 2020). Suitable varicella zoster vaccines are known in the art. Preferred varicella zoster vaccines are described herein. Especially preferred in this regard is a vaccine comprising recombinant varicella zoster virus glycoprotein E, preferably a vaccine having the International non-proprietary name (INN) or common name "Herpes zoster vaccine" or "Herpes zoster vaccine (recombinant, adjuvanted)", e.g. SHINGRIX®

A method for the treatment of patients with cladribine, preferably oral cladribine and especially cladribine tablets (MAVENCLAD®), preferably as described herein, said method further comprising vaccinating said patients, preferably patients that are antibody-negative to varicella zoster virus, more preferably patients that are antibody-negative to varicella zoster virus prior to or at the beginning of treatment with cladribine, oral cladribine or cladribine tablets (MAVENCLAD®), with a varicella zoster vaccine, preferably a non-live varicella zoster vaccine, during said treatment with cladribine, oral cladribine or cladribine tablets (MAVENCLAD®) at the time periods given below, a) vaccinating said patients in weeks 2 to 4 (first dose of the vaccine) and in weeks 10 to 12 (second dose of the vaccine) after (or: counted from) the first dose of cladribine, oral cladribine or cladribine tablets (MAVENCLAD®), with the possibility to delay the administration of said second dose of the vaccine up to month 6 after first dose of the vaccine. Preferably, this is applicable with regard to the first treatment year and/or the second treatment year of the 2 years that said treatment with cladribine, oral cladribine or cladribine tablets (MAVENCLAD®) normally takes. Preferably, said treatment of patients with cladribine, preferably oral cladribine and especially cladribine tablets (MAVENCLAD®), is performed as described herein and especially as described in the European Health Authority (EMA) approved SmPC and/or the US Food and Drug Administration (FDA) approved USPI for cladribine tablets (MAVENCLAD®), the disclosure of which is incorporated by reference into the instant patent application, preferably according to the status of the SmPC and/or USPI as of November 2020). Suitable varicella zoster vaccines are known in the art. Preferred varicella zoster vaccines are described herein. Especially preferred in this regard is a vaccine comprising recombinant varicella zoster virus glycoprotein E, preferably a vaccine having the International non-proprietary name (INN) or common name "Herpes zoster vaccine" or "Herpes zoster vaccine (recombinant, adjuvanted)", e.g. SHINGRIX®.

A method for the treatment of patients with cladribine, preferably oral cladribine and especially cladribine tablets (MAVENCLAD®), preferably as described herein, said method further comprising vaccinating said patients, preferably patients that are antibody-negative to varicella zoster virus, more preferably patients that are antibody-negative to varicella zoster virus prior to or during treatment with cladribine, oral cladribine or cladribine tablets (MAVENCLAD®), with a varicella zoster vaccine, preferably a non-live varicella zoster vaccine, at any time point during said treatment with cladribine, oral cladribine or cladribine tablets (MAVENCLAD®), preferably at any time point during the 2 years that said treatment with cladribine, oral cladribine or cladribine tablets (MAVENCLAD®) normally takes, except for the first 3 months after administering the first dose of cladribine, oral cladribine or cladribine tablets ((MAVENCLAD®), preferably a) except for the first 3 months after administering the first dose of cladribine, oral cladribine or cladribine tablets, in the first treatment year of the 2 years that said treatment with cladribine, oral cladribine or cladribine tablets (MAVENCLAD®) takes, and/or b) except for the first 3 months after administering the first dose of cladribine, oral cladribine or cladribine tablets, in the second treatment year of the 2 years that said treatment with cladribine, oral cladribine or cladribine tablets (MAVENCLAD®) normally takes. Preferably, said treatment of patients with cladribine, preferably oral cladribine and especially cladribine tablets (MAVENCLAD®), is performed as described herein and especially as described in the European Health Authority (EMA) approved SmPC and/or the US Food and Drug Administration (FDA) approved USPI for cladribine tablets (MAVENCLAD®), the disclosure of which is incorporated by reference into the instant patent application, preferably according to the status of the SmPC and/or USPI as of November 2020). Suitable varicella zoster vaccines are known in the art. Preferred varicella zoster vaccines are described herein. Especially preferred in this regard is a vaccine comprising recombinant varicella zoster virus glycoprotein E, preferably a vaccine having the International non-proprietary name (INN) or common name "Herpes zoster vaccine" or "Herpes zoster vaccine (recombinant, adjuvanted)", e.g. SHINGRIX®

SUMMARY

An especially preferred subject of the instant invention is a method for the treatment of patients with cladribine tablets (MAVENCLAD®), further comprising
vaccinating patients, preferably patients that are antibody-negative to varicella zoster virus prior to said treatment and/or said vaccinating, with a varicella zoster vaccine, preferably a varicella zoster vaccine as described herein,
a) wherein said vaccinating takes place directly prior to said treatment of patients with said cladribine tablets, preferably one or two weeks directly prior to the start of said treatment of patients with said cladribine tablets,
and/or
b) wherein said vaccinating takes place at any time during said treatment of patients with said cladribine tablets, preferably at any time during said treatment of patients with said cladribine as described herein.

Preferably, said treatment of patients with said cladribine tablets is a treatment of an autoimmune disorder as described herein, and especially is a treatment of multiple sclerosis (MS), preferably relapsing forms of MS (RMS), more preferably relapsing-remitting MS (RRMS) and/or secondary progressive MS (SPMS). Preferred in this regard is vaccine comprising live attenuated varicella zoster virus, e.g. ZOSTAVAX® (Zoster Vaccine Live). This vaccine is more preferred for use prior to treatment with said cladribine tablets. Especially preferred in this regard, preferably both prior and during treatment with said cladribine tablets, is a vaccine comprising recombinant varicella zoster virus glycoprotein E, preferably a vaccine having the International non-proprietary name (INN) or common name "Herpes zoster vaccine" or "Herpes zoster vaccine (recombinant, adjuvanted)", e.g. SHINGRIX®.

An especially preferred subject of the instant invention is a method for the treatment of patients with cladribine tablets (MAVENCLAD®), further comprising
vaccinating patients, preferably patients that are antibody-negative to varicella zoster virus prior to said treatment and/or said vaccinating, with a varicella zoster vaccine, preferably a varicella zoster vaccine as described herein,
a) wherein said vaccinating takes place directly prior to said treatment of patients with said cladribine tablets, preferably one or two weeks directly prior to the start of said treatment of patients with said cladribine tablets,
and/or
b) wherein said vaccinating takes place in weeks 2 to 4 (preferably with the first dose of said vaccine) and weeks 10 to 12 (preferably with the second dose of said vaccine) after the first dose of said cladribine tablets, with the possibility to delay administration of said $2^{nd}$ dose of saddlebags in up to 6 months after that first dose of said vaccine.

An especially preferred subject of the instant invention is a method for the treatment of patients with cladribine tablets (MAVENCLAD®), further comprising
vaccinating patients, preferably patients that are antibody-negative to varicella zoster virus prior to said treatment and/or said vaccinating, with a varicella zoster vaccine, preferably a varicella zoster vaccine as described herein,
a) wherein said vaccinating takes place directly prior to said treatment of patients with said cladribine tablets, preferably one or two weeks directly prior to the start of said treatment of patients with said cladribine tablets, or
b) wherein said vaccinating takes place in weeks 2 to 4 (preferably with the first dose of said vaccine) and weeks 10 to 12 (preferably with the second dose of said vaccine) after the first dose of said cladribine tablets, with the possibility to delay administration of said $2^{nd}$ dose of saddlebags in up to 6 months after that first dose of said vaccine;
or
c) wherein said vaccinating takes place in weeks 12 to 14 (preferably with the first dose of said vaccine) and weeks 20 to 22 (preferably with the second dose of said vaccine) after the first dose of said cladribine tablets, with the possibility to delay administration of said $2^{nd}$ dose of saddlebags in up to 6 months after that first dose of said vaccine;

Preferably, said treatment of patients with said cladribine tablets is a treatment of an autoimmune disorder as described herein, and especially is a treatment of multiple sclerosis (MS), preferably relapsing forms of MS (RMS), more preferably relapsing-remitting MS (RRMS) and/or secondary progressive MS (SPMS). Preferred in this regard is vaccine comprising live attenuated varicella zoster virus, e.g. ZOSTAVAX® (Zoster Vaccine Live). This vaccine is more preferred for use prior to treatment with said cladribine tablets.

Especially preferred in this regard, preferably both prior and during treatment with said cladribine tablets, is a vaccine comprising recombinant varicella zoster virus glycoprotein E, preferably a vaccine having the International non-proprietary name (INN) or common name "Herpes zoster vaccine" or "Herpes zoster vaccine (recombinant, adjuvanted)", e.g. SHINGRIX®.

An especially preferred subject of the instant invention is a method for the treatment of patients with cladribine tablets (MAVENCLAD®), further comprising
vaccinating patients, preferably patients that are antibody-negative to varicella zoster virus prior to said treatment and/or said vaccinating, with a varicella zoster vaccine, preferably a varicella zoster vaccine as described herein,
a) wherein said vaccinating takes place directly prior to said treatment of patients with said cladribine tablets, preferably one or two weeks directly prior to the start of said treatment of patients with said cladribine tablets,
and/or
b) wherein said vaccinating takes place at any time during said treatment of patients with said cladribine tablets, preferably at any time during said treatment of patients with said cladribine as described herein, except for the first 3 months after administering the first dose of said cladribine tablets, preferably except for the first 3 months after administering the first dose of said cladribine tablets.

Preferably, said treatment of patients with said cladribine tablets is a treatment of an autoimmune disorder as described herein, and especially is a treatment of multiple sclerosis (MS), preferably relapsing forms of MS (RMS), more preferably relapsing-remitting MS (RRMS) and/or secondary progressive MS (SPMS). Preferred in this regard is vaccine comprising live attenuated varicella zoster virus, e.g. ZOSTAVAX® (Zoster Vaccine Live). This vaccine is more preferred for use prior to treatment with said cladribine tablets. Especially preferred in this regard, preferably both prior and during treatment with said cladribine tablets, is a vaccine comprising recombinant varicella zoster virus glycoprotein E, preferably a vaccine having the International non-proprietary name (INN) or common name "Herpes zoster vaccine" or "Herpes zoster vaccine (recombinant, adjuvanted)", e.g. SHINGRIX®.

Thus, preferred is

[85] A method for the treatment of multiple sclerosis (MS) in a patient in need thereof, preferably as described above and/or below, said method comprising
    a) treating said patient with cladribine tablets (MAVENCLAD®), preferably as described in preferably as described above and/or below, and especially as described in the USPI or EU SmPC of MAVENCLAD®, and
    b) vaccinating said patient with a non-live varicella zoster vaccine (SHINGRIX®), wherein said patient is vaccinated with said vaccine once (first dose) in weeks 2 to 4 and then (second dose) in weeks 10 to 12, which weeks are counted from the day on which said patient received the first dose of said cladribine tablets, preferably counted from the day on which said patient received the first dose of said cladribine tablets in the respective treatment period of about 1 year, the respective treatment year or (yearly) treatment course, with the possibility to delay the Administration of said second dose of said vaccine up to 6 months after the administration of said first dose of said vaccine.

[85b] Also preferred is a method for the treatment of multiple sclerosis (MS) in a patient in need thereof, preferably as described above and/or below, said method comprising
    a) treating said patient with cladribine tablets (MAVENCLAD®), preferably as described in preferably as described above and/or below, and especially as described in the USPI or EU SmPC of MAVENCLAD®, and
    b) vaccinating said patient with a non-live varicella zoster vaccine (SHINGRIX®), wherein said patient is vaccinated with said vaccine once (first dose) in weeks 12 to 14 and then (second dose) in weeks 20 to 22, which weeks are counted from the day on which said patient received the first dose of said cladribine tablets, preferably counted from the day on which said patient received the first dose of said cladribine tablets in the respective treatment period of about 1 year, the respective treatment year or (yearly) treatment course, with the possibility to delay the Administration of said second dose of said vaccine up to 6 months after the administration of said first dose of said vaccine.

[86] A method for the treatment of multiple sclerosis (MS) in a patient in need thereof, preferably as described above and/or below, said method comprising
    a) treating said patient with cladribine tablets (MAVENCLAD®), preferably as described above and/or below, and especially as described in the USPI or EU SmPC of MAVENCLAD®, and
    b) vaccinating said patient with a non-live varicella zoster vaccine (SHINGRIX®), wherein said patient is vaccinated with said vaccine once (first dose) in weeks 2 to 4 and then (second dose) in weeks 10 to 12, which weeks are counted from the day on which said patient received the first dose of said cladribine tablets, preferably counted from the day on which said patient received the first dose of said cladribine tablets in the respective treatment period of about 1 year, the respective treatment year or (yearly) treatment course, with the possibility to delay the Administration of said second dose of said vaccine up to 6 months after the administration of said first dose of said vaccine.

[86b] A method for the treatment of multiple sclerosis (MS) in a patient in need thereof, preferably as described above and/or below, said method comprising
    a) treating said patient with cladribine tablets (MAVENCLAD®), preferably as described above and/or below, and especially as described in the USPI or EU SmPC of MAVENCLAD®, and
    b) vaccinating said patient with a non-live varicella zoster vaccine (SHINGRIX®), wherein said patient is vaccinated with said vaccine once (first dose) in weeks 12 to 14 and then (second dose) in weeks 20 to 22, which weeks are counted from the day on which said patient received the first dose of said cladribine tablets, preferably counted from the day on which said patient received the first dose of said cladribine tablets in the respective treatment period of about 1 year, the respective treatment year or (yearly) treatment course, with the possibility to delay the Administration of said second dose of said vaccine up to 6 months after the administration of said first dose of said vaccine.

[87] A method for the treatment of multiple sclerosis (MS) in a patient in need thereof, preferably as described above and/or below, said method comprising
    a) treating said patient with cladribine tablets (MAVENCLAD®), preferably as described above and/or below, and especially as described in the USPI or EU SmPC of MAVENCLAD®, and
    b) vaccinating said patient with a non-live varicella zoster vaccine (SHINGRIX®), wherein said patient is vaccinated with said vaccine once (first dose) in month 1 and then (second dose) in months 3 to 8 and preferably months 3 to 6, counted from the day on which said patient received the first dose of said cladribine tablets, preferably counted from the day on which said patient received the first dose of said cladribine tablets in the respective treatment period of about 1 year, the respective treatment year or (yearly) treatment course, and wherein said first dose of said vaccine and said second dose of said vaccine are preferably administered 1 to 7 months apart from each other, more preferably 2 to 6 months apart from each other and especially 2 to 3 months or 3 to 6 months apart from each other.

[88] A method for the treatment of multiple sclerosis (MS) in a patient in need thereof, preferably as described above and/or below, said method comprising
    a) treating said patient with cladribine tablets (MAVENCLAD®), preferably as described above and/or below, and especially as described in the USPI or EU SmPC of MAVENCLAD®, and
    b) vaccinating said patient with a non-live varicella zoster vaccine (SHINGRIX®), wherein said patient is vaccinated with said vaccine twice, preferably by administering a first dose and a second dose 2 to 6 months apart from each other and preferably about two months or about three months apart from each other, wherein said first dose of said vaccine administered in months 4 to 10 and especially in months 5 to 8, counted from the day on which said patient received the first dose of said cladribine tablets, preferably counted from the day on which said patient received the first dose of said cladribine tablets in the respective treatment period of about 1 year, the respective treatment year or (yearly) treatment course.

[89] A method for the treatment of multiple sclerosis (MS) in a patient in need thereof, preferably as described above and/or below, and especially as described in Section [85], wherein said patient is antibody-negative to varicella zoster virus, preferably antibody-negative to varicella zoster virus prior to said vaccination with said non-live varicella zoster vaccine and/or prior to receiving the first dose of said cladribine tablets.

[90] A method for the treatment of multiple sclerosis (MS) in a patient in need thereof, preferably as described above and/or below, said method comprising
- a) treating said patient with cladribine tablets (MAVENCLAD®), preferably as preferably as described above and/or below, and especially as described in the USPI or EU SmPC of MAVENCLAD®, and
- b) vaccinating said patient at least once with a vaccine, wherein said at least one vaccination takes place during months 3 to 8 and especially during months 3 to 6, counted from the day on which said patient received the first dose of said cladribine tablets, preferably counted from the day on which said patient received the first dose of said cladribine tablets in the respective treatment period of about 1 year, the respective treatment year or (yearly) treatment course.

[91] A method for the treatment of multiple sclerosis (MS) in a patient in need thereof, preferably as described above and/or below, said method comprising
- a) treating said patient with cladribine tablets (MAVENCLAD®), preferably as described above and/or below, and especially as described in the USPI or EU SmPC of MAVENCLAD®, and
- b) vaccinating said patient at least once with a vaccine, preferably at least twice with a vaccine and especially twice with a vaccine,
- b1) wherein a first vaccination takes place either 1 or 2 weeks prior or 1 or 2 weeks after to the day on which said patient receives the first dose of said cladribine tablets, and optionally wherein at least one subsequent vaccination takes place 2 to 4 weeks or 3 to 10 weeks after that first vaccination took place.

[92] A method for the treatment of multiple sclerosis (MS) in a patient in need thereof, preferably as described above and/or below, said method comprising
- a) treating said patient with cladribine tablets (MAVENCLAD®), preferably as described above and/or below, and especially as described in the USPI or EU SmPC of MAVENCLAD®, and
- b) vaccinating said patient at least once with a vaccine, preferably at least twice with a vaccine and especially twice with a vaccine,
- b1) wherein a first vaccination takes place either 1 or 2 weeks prior to the day on which said patient receives the first dose of said cladribine tablets, or 1 to 4 weeks, preferably 2 to 4 weeks and especially 1 or 2 weeks, 2 or 3 weeks or 3 or 4 weeks, after the day on which said patient receives the first dose of said cladribine tablets, and optionally
wherein at least one subsequent vaccination takes place 2 to 8 months or 2 to 6 months after that first vaccination took place.

[93] A method for the treatment of multiple sclerosis (MS) in a patient in need thereof, preferably as described above and/or below, said method comprising
- a) treating said patient with cladribine tablets (MAVENCLAD®), preferably as described above and/or below, and especially as described in the USPI or EU SmPC of MAVENCLAD®, and
- b) vaccinating said patient at least once with a vaccine, preferably at least twice with a vaccine and especially twice with a vaccine,
- b1) wherein a first vaccination takes place either 1 or 2 weeks prior to the day on which said patient receives the first dose of said cladribine tablets, or 1 to 4 weeks, preferably 2 to 4 weeks and especially 1 or 2 weeks, 2 or 3 weeks or 3 or 4 weeks, after to the day on which said patient receives the first dose of said cladribine tablets, and optionally
wherein at least one subsequent vaccination takes place within month 2 to 12, preferably month 2 to 10 and especially month 3 to 9, counted from the day on which said patient received the first dose of said cladribine tablets, preferably counted from the day on which said patient received the first dose of said cladribine tablets in the respective treatment period of about 1 year, the respective treatment year or (yearly) treatment course.

[94] A method for the treatment of multiple sclerosis (MS) in a patient in need thereof, preferably as described above and/or below, and especially according one or more of Sections [90] to [93], wherein said vaccine is selected from the group consisting of
- a) selected from the group consisting of: (anti-)varicella zoster virus vaccines, (anti-)herpes zoster virus vaccines, attenuated live (anti-)varicella zoster virus vaccines, attenuated live (anti-)herpes zoster virus vaccines, inactive (anti-)varicella zoster virus vaccines, inactivated and/or recombinant (anti-)varicella zoster virus vaccines, and inactivated and/or recombinant (anti-)herpes zoster virus vaccines;
- b) selected from the group consisting of: mRNA-based (anti-)SARS-CoV-2/COVID-19 virus vaccines, Vector-based (anti-)SARS-CoV-2/COVID-19 virus vaccines, Adenovirus/Vector-based (anti-)SARS-CoV-2/COVID-19 virus vaccines, Virus-Like Particles (VLPs) based (anti-)SARS-CoV-2/COVID-19 virus vaccines, DNA-based (anti-)SARS-CoV-2/COVID-19 virus vaccines, Protein-based (anti-)SARS-CoV-2/COVID-19 virus vaccines, Inactivated Virus-based (anti-)SARS-CoV-2/COVID-19 virus vaccines, and Dead Virus-based (anti-)SARS-CoV-2/COVID-19 virus vaccines, and/or
- c) consisting of (anti-)influenza virus vaccine, selected from the group consisting of monovalent (anti-)influenza virus vaccines, divalent (anti-)influenza virus vaccines, trivalent (anti-)influenza virus vaccines, quadrivalent (anti-)influenza virus vaccines and polyvalent (anti-)influenza virus vaccines.

[95] A method for the treatment of multiple sclerosis (MS) in a patient in need thereof, preferably as described above and/or below, said method comprising a) treating said patient with cladribine tablets (MAVEN-CLAD®), preferably as described above and/or below, and especially as described in the USPI or EU SmPC of MAVENCLAD®, and
b) vaccinating said patient at least once with a vaccine, preferably at least twice with a vaccine and especially twice with a vaccine, wherein said vaccine is a (anti-)SARS-CoV-2/COVID-19 virus vaccines, preferably a (anti-)SARS-CoV-2/COVID-19 virus vaccine as described above and/below and especially as described in Section [94],
b1) wherein a first vaccination takes place either 1 or 2 weeks prior to the day on which said patient receives the first dose of said cladribine tablets, or 1 to 4 weeks, preferably 2 to 4 weeks and especially 1 or 2 weeks, 2 or 3 weeks, or 3 or 4 weeks, after to the day on which said patient receives the first dose of said cladribine tablets, and optionally a second vaccination takes place 2 to 6 weeks, preferably 3 to 5 weeks and especially 3 to 4 weeks after said first vaccination, optionally followed by one or more subsequent vaccinations after at least 3 weeks, at least 6 weeks or at least 12 weeks;
b2) wherein a first vaccination takes place 1 or 2 weeks, 2 or 3 weeks or 3 or 4 weeks after the day on which said patient receives the first dose of said cladribine tablets, preferably the day on which said patient receives the first dose of said cladribine tablets in the respective treatment period of about 1 year, the respective treatment year or (yearly) treatment course, and optionally a second vaccination takes place 2 to 6 weeks, preferably 3 to 5 weeks and especially 3 to 4 weeks after said first vaccination, optionally followed by one or more subsequent vaccinations after at least 3 weeks, at least 6 weeks or at least 12 weeks;
and/or
b3) wherein a first vaccination takes place 3 to 11 months, preferably 4 to 10 months and especially 3 to 6 or 4 to 8 months, after to the day on which said patient receives the first dose of said cladribine tablets, preferably the day on which said patient receives the first dose of said cladribine tablets in the respective treatment period of about 1 year, the respective treatment year or (yearly) treatment course,
and optionally a second vaccination takes place 2 to 6 weeks, preferably 3 to 5 weeks and especially 3 to 4 weeks after said first vaccination, optionally followed by one or more subsequent vaccinations after at least 3 weeks, at least 6 weeks or at least 12 weeks.

[96] A method for the treatment of multiple sclerosis (MS) in a patient in need thereof, preferably as described above and/or below, said method comprising
a) treating said patient with cladribine tablets (MAVEN-CLAD®), preferably as described above and/or below, and especially as described in the USPI or EU SmPC of MAVENCLAD®, and
b) vaccinating said patient at least once with a vaccine, preferably once or twice, with a vaccine, wherein said vaccine is a (anti-)influenza virus vaccine, preferably a (anti-)influenza virus vaccine as described above and/or below and especially as described in Section [94],
b1) wherein a first vaccination takes place either 1 or 2 weeks prior to the day on which said patient receives the first dose of said cladribine tablets, or 1 to 4 weeks, preferably 2 to 4 weeks and especially 1 or 2 weeks, 2 or 3 weeks or 3 or 4 weeks, after to the day on which said patient receives the first dose of said cladribine tablets, and optionally a second vaccination takes place 1 to 6 weeks, preferably 2 to 5 weeks and especially 1-2 or 3-4 weeks after said first vaccination, optionally followed by one or more subsequent vaccinations after at least 3 weeks, at least 6 weeks or at least 12 weeks;
b2) wherein a first vaccination takes place either 1 to 5 weeks, preferably 1 to 4 weeks and especially 2-3 or 3-4 weeks after to the day on which said patient receives the first dose of said cladribine tablets, and optionally a second vaccination takes place 1 to 6 weeks, preferably 2 to 5 weeks and especially 1-2 or 3-4 weeks after said first vaccination, optionally followed by one or more subsequent vaccinations after at least 3 weeks, at least 6 weeks or at least 12 weeks;
and/or
b3) wherein a first vaccination takes place 3 to 11 months, preferably 4 to 10 months and especially 3 to 6 or 4 to 8 months, after to the day on which said patient receives the first dose of said cladribine tablets, and optionally a second vaccination takes place 2 to 6 weeks, preferably 3 to 5 weeks and especially 3 to 4 after said first vaccination, optionally followed by one or more subsequent vaccinations after at least 3 weeks, at least 6 weeks or at least 12 weeks.

Preferably, said day on which said patient receives the first dose of said cladribine tablets means the day on which said patient receives the first dose of said cladribine tablets in the respective treatment period of about 1 year, the respective treatment year or (yearly) treatment course.

[97] A method for the treatment of multiple sclerosis (MS) in a patient in need thereof, preferably as described above and/or below, and especially according to one or more of Sections [84] to [96], wherein said day on which said patient receives the first dose of said cladribine tablets is
a) the first day of the first treatment year (treatment year 1, or the first treatment course) with respect to cladribine treatment, preferably cladribine treatment as described above and/or below, and especially as described in the USPI or EU SmPC of MAVEN-CLAD®, and/or
b) the first day of the second treatment year (treatment year 2, or the second treatment course) with respect to cladribine treatment, preferably cladribine treatment as described in one or more of the preceding claims.

[98] A method for the treatment of multiple sclerosis (MS) in a patient in need thereof, preferably as described above and/or below, and especially according to one or more of Sections [85] to [97], wherein in the above described methods, all the recommendations and timelines for vaccinating patients and/or using said vaccines given with regard to the first treatment course, the first treatment year and/or treatment year 1, preferably hold true also for the second treatment course, the second treatment year and/or treatment year 2, respectively, and, if applicable, for any subsequent treatment course, or treatment year.

[99] A method for the treatment of multiple sclerosis (MS) in a patient in need thereof, preferably as described above and/or below, and especially according to one or more of Sections [85] to [98], wherein each of said 2 yearly treatment courses, preferably said first treatment course and/or said second treatment course, has a duration, preferably independently selected for each treatment course, of about 1 year, preferably of about 12 months, more preferably of 46 to 54 weeks, more preferably of 48-53 weeks and especially of about 48 or about 52 weeks.

[100] A method for the treatment of multiple sclerosis (MS) in a patient in need thereof, preferably as described above and/or below, and especially according to one or more of Sections [85] to [99], wherein
  i) the autoimmune disorder is selected from the group consisting of Multiple Sclerosis (MS), Rheumatoid Arthritis (RA), Systemic Lupus Erythematosus (SLE), Neuromyelitis Optica Spectrum Disorders (NMOSD) and Myasthenia Gravis (MG), preferably Multiple Sclerosis (MS), Neuromyelitis Optica Spectrum Disorders (NMOSD) and Myasthenia Gravis (MG), and preferably is Multiple Sclerosis (MS), more preferably Multiple Sclerosis selected from the group consisting of relapsing forms of Multiple Sclerosis (RMS), relapsing-remitting multiple sclerosis (RRMS), secondary progressive Multiple Sclerosis (SPMS) and primary progressive multiple Sclerosis (PPMS),
  ii) the subjects or patients are having high disease activity (HDA) and/or
  iii) wherein subjects or patients are aged over 30 years, over 40 years, over 50 year, over 60 years, or over 70 years, preferably are aged 30 years to 40 years.

The term "high disease activity", or abbreviated "HDA", preferably as used herein, is known and understood in the art. However, the term "High Disease Activity" or abbreviated "HDA" as used in the context of the instant invention preferably defines subjects, preferably human subjects, more preferably patients, that suffer an autoimmune disorder as defined herein, and preferably that suffer from Multiple Sclerosis (MS) as defined herein and especially from relapsing forms of MS (RMS) are relapsing-remitting MS (RRMS) and which are suffering from a higher than average disease load or burden. Suitable definitions of how "HDA" can be characterised were developed, preferably developed for being used in the label descriptions for cladribine, more preferably cladribine tablets and especially for Mavenclad® for highly active disease forms of the above given, in a similar manner as this was done for other therapeutic agents for use in the field of autoimmune disorders, such as for fingolimod and natalizumab, preferably taking them as a sort of as reference.

However, for specific reasons, it was not possible to reliably apply one exact definition with regard HDA (High Disease Activity).

For this reason, we consulted with National Health Agencies, reviewed documentation (European Public Assessment Reports [EPARs]) of other recently approved DMDs in MS, and sought the advice of MS clinical experts, and this resulted in the development of 3 additional HDA definitions:
HDA1:
  (a) Subjects with at least 1 relapse in the previous year while on DMD therapy and at least 1 T1 Gd+ lesion or 9 T2 lesions, OR
  (b) Subjects with 2 or more relapses in the previous year (no prior use of DMD at any time in subject history or duration of previous DMD therapy less than 1 year) and at least 1 T1 Gd+ lesion.
HDA2:
  Subjects with 2 or more relapses in previous year (regardless of previous treatment status).
HDA3:
  Subjects with 2 or more relapses in previous year (regardless of previous treatment status), AND at least: 1 T1 Gd+ lesion OR 9 T2 lesions.
HDA4:
  (a) Subjects with at least 1 relapse in the previous year while on DMD therapy and at least 1 T1 Gd+ lesion or 9 T2 lesions, OR
  (b) Subjects with 2 or more relapses in the previous year (regardless of previous t status).

In summary, the efficacy of cladribine 3.5 mg/kg in subjects with HDA2, HDA4 and HDA4 was largely supportive of the efficacy seen in the overall population (note that HDA1 was not.

Still HDA1 was less effective in selecting high disease active patients.

Please note that HDA4 is indicated in the EMA label.

Those findings are further enhanced by the fact that approximately 19,000 patients with relapsing MS have been treated with cladribine tablets. Of these, there were 46 patients with confirmed or suspected COVID-19 within the safety database. Patient age was available for 35 patients, with a range of 22-67 years. There were 26 females, 12 males, and 8 patients for whom gender was not reported. Cases were defined as confirmed if a confirmatory diagnostic test was reported as positive. If no confirmatory test was performed or reported, then cases were described as suspected. Due to the well-documented issues with false negative rates with polymerase chain reaction (PCR) testing techniques for COVID-19, (Woloshin et al., 2020) suspected cases that conformed to the World Health Organization diagnostic criteria were included in our analysis even if a negative PCR test was reported. Cases were designated as serious if they fulfilled the criteria of hospitalized, considered to be life-threatening, or medically significant. In keeping with usual pharmacovigilance practices, outcome was classified as recovered, recovering, not recovered, fatal, or not reported.

Of the 46 total cases, 18 cases were confirmed. In 3 cases, confirmation included a report of a positive immunoglobulin G test at a time after COVID-19 symptom onset. Four of the confirmed cases were classified as serious (as hospitalization was required in 3 cases and the physician reported 1 case classified as "medically significant"). Among the suspected COVID-19 cases 2 were classified as serious (1 due to hospitalization and 1 which the physician classified as "medically significant").

The majority of patients with suspected or confirmed COVID-19 had mild to moderate respiratory symptoms. Two confirmed cases had not reported experiencing any COVID-19 symptoms. None of the cases (either suspected or confirmed) received mechanical ventilation and there were no deaths. There was no indication for relevant involvement of other organ systems, in particular no ischemic complications were reported.

Considering that patients were able to have positive confirmation of COVID-19 via Ig G testing suggests that the patients were able to mount sufficient Ig G responses during the immune reduction phase of treatment with cladribine tablets (MAVENCLAD®).

Definitions

According to the invention, the step of "identifying a patient at risk of acquiring an infection" is a routine step for the ones skilled in the art, which preferably includes, but is not limited to, a skilled physician, preferably in general medicine, in the field of immunology and/or the field of autoimmune disorders. Especially preferably, said "identification of a patient at risk of acquiring an infection" lies within the discretion of the treating physician, who may employ standard laboratory procedures, including e.g. determining antibody and/or Ig titers.

The term "mg/kg" as used herein preferably means "milligram per kilogram bodyweight".

More preferably, the term "mg/kg" as used herein and more preferably as used in connection with the fixed dose, in which cladribine is administered orally to a patient, that term "mg/kg" preferably means "milligram" of cladribine (orally) administered "per kilogram of body weight" of said patient.

The "total dose" or "cumulative dose" preferably refers to the total dose of Cladribine administered during the treatment, i.e. the dose reached at the end of the treatment that is calculated by adding the daily doses. For example, the total dose of Cladribine corresponding to a treatment of 0.7 mg/kg Cladribine per day during 5 days is 3.5 mg/kg or the total dose of Cladribine corresponding to a treatment of 0.35 mg/kg Cladribine per day during 5 days is 1.7 mg/kg.

"The total effective dose" or "cumulative effective dose" preferably refers to the bioavailable dose of Cladribine after a given administration period, i.e. the bioavailable dose reached at the end of the treatment that is calculated by adding the daily doses reduced by the bioavailability coefficient. For example, the total effective dose of Cladribine corresponding to a treatment of 0.7 mg/kg Cladribine per day during 5 days wherein the bioavailability of Cladribine is of about 40% is 1.4 mg/kg or the total effective dose of Cladribine corresponding to a treatment of 0.35 mg/kg Cladribine per day during 5 days wherein the bioavailability of Cladribine is of about 40% is 0.7 mg/kg.

Typically, the bioavailability of Cladribine or of a Cladribine formulation used in the context of this invention is from about 20% to about 90%, preferably from about 25% to about 80%, more preferably from about 30% to about 70%, even more preferably from about 35% to about 60% and especially from about 40% to about 50%, such as about 35%, about 40%, about 45%, about 50% or about 55%. Especially preferably the bioavailability from cladribine tablets is 45%+/−25%, more preferably 45%+/−20%, even more preferably 45%+/−15%, even more preferably 45%+/−10%, and especially 45%+/−5%, preferably based on the total content of the active ingredient cladribine (2-CdA) in the cladribine containing formulation, preferably cladribine containing oral formulation, to be preferably used in the methods and/or treatment schemes according to the invention.

The term "bioavailability" as used herein with regard to pharmaceutical dosage forms, including, but not limited to tablets, is known and understood in the art. Also, methods and/or procedures for the reliable determination of said bioavailability are known, understood and described in the art. Those known methods and/or procedures are typically in line with the requirements of Good Manufacturing Practice (GMP) and/or the requirements of Good Clinical Practice (GCP) to an extent as required by Health Authorities such as the FDA and/or EMA, as well as others.

However, bioavailability can be preferably assessed using the following methodology:

Bioavailability, conventionally defined as the fraction of the dose reaching the systemic circulation, has been assessed after oral administration of a single 10 mg tablet of Mavenclad and of 3 mg of cladribine (Leustatin 1 mg/mL) administered as a 1-hour IV infusion, in a randomized, two-period, two-sequence cross over study in patients with multiple sclerosis, where cladribine plasma concentration were measured using a validated LC/MS/MS method. Bioavailability has been estimated by means of nonlinear mixed effect modeling (software NONMEM version VI [higher versions would apply too]), by incorporating it in the form of a logit transform (to constrain it to be within the 0-1 range) as a parameter in the integrated pharmacokinetic model, developed in merging several studies using Mavenclad in various conditions (e.g. fed/fasted) and of varying duration (see RM Savic 2017 (DOI 10.1007/s40262-017-0516-6)). This modeling took into account several covariates, such as food intake in relation to drug administration. In addition to the parameter estimate, its precision and inter-subject variance were also included in the pharmaco-statistical model and calculated. Following sequential model development, refinement and validation, cladribine bioavailability following Mavenclad 10 mg tablets administration has been estimated at 45.6%, preferably at about 45.6%, more preferably with a precision of 7.03% and/or variance (on a logit scale) of 22.3%.

However, also other methods and methodologies can be successfully applied, e.g. as described in "Population Pharmacokinetics of Cladribine in Patients with Multiple Sclerosis", Radojka M. Savic, Ana M. Novakovic, Marianne Ekblom, Alain Munafo & Mats O. Karlsson; Clinical Pharmacokinetics volume 56, pages 1245-1253(2017), and/or "The Clinical Pharmacology of Cladribine Tablets for the Treatment of Relapsing Multiple Sclerosis", Robert Hermann, Mats O. Karlsson, Ana M. Novakovic, Nadia Terranova, Markus Fluck & Alain Munafo; Clinical Pharmacokinetics volume 58, pages 283-297(2019), which are hereby incorporated by reference in their entirety.

More specifically, e.g. for use according to the approved label for cladribine tablets (MAVENCLAD®), and taking into account a bioavailability for cladribine tablets of a about 45%, the recommended cumulative effective dose to be preferably reached in the body of the patient by the administration of cladribine tablets (MAVENCLAD®) is preferably about 1.58 mg/kg body weight (as achieved by administering cladribine tablets (MAVENCLAD®) in an amount of about 3.5 mg/kg body weight, based on a bioavailability of the administered tablets of about 45% as outlined before) over 2 years, preferably administered as 1 treatment course of 0.79 mg/kg body weight ((as achieved by administering cladribine tablets (MAVENCLAD®) in an amount of about 1.75 mg/kg body weight, based on a bioavailability of the administered tablets of about 45% as outlined before) per year. According to the approved label, each treatment course preferably consists of 2 treatment weeks, one preferably at the beginning of the first month and one preferably at the beginning of the second month of the respective treatment year. Each treatment week preferably consists of 4 or 5 days on which a patient preferably receives 10 mg or 20 mg (one or two tablets), preferably as a single daily dose, preferably depending on body weight.

The term "United States Prescribing Information", abbreviated as "USPI", is known and understood in the art. Preferably, the USPI sets out the health authority agreed usage, preferably the US Federal Drug Agency agreed usage, preferably more specifically, the US Federal Drug Agency marketing approved usage of a drug. It provides information on usage for healthcare professionals, and is an intrinsic part of the application for Marketing Authorisation (MA) of a new drug or medicine within the United States. Preferably, the equivalent of the USPI in the European Union is the Summary of Product Characteristics (SmPC).

Reference to the USPI in the context of the instant invention preferably refers to the USPI of oral cladribine or cladribine tablets, marketed under the tradename MAVENCLAD®, Mavenclad®, or just Mavenclad. Preferably, reference to the USPI in the context of the instant invention with regard to cladribine tablets means reference to the USPI of cladribine tablets/MAVENCLAD® as valid as of 2020. Preferably, the reference to the USPI of cladribine tablets/

MAVENCLAD® includes all contents of that USPI except for the content with regard to and immunisations and/or vaccinations against infections, preferably immunisations vaccinations and/or infections as described herein in the context of the instant invention. Preferably, the instant invention provides methods of treatment that are preferably advantageously improved over the content of the USPI with regard to said immunisations and/or vaccinations against infections. Especially preferably, a reference to the USPI includes the treatment scheme or schedule and/or the posology given in said USPI.

The term "European Summary of Product Characteristics", abbreviated as "EU SmPC" or "SmPC", is known and understood in the art. Preferably it refers to a document describing the properties and the officially approved conditions of use of a medicine. Summaries of product characteristics form the basis of information for healthcare professionals on how to use the medicine safely and effectively. More specifically, the SmPC preferably sets out the health authority agreed usage, preferably the European Health Authority (or Authorities) agreed usage, preferably more specifically, the European Medicines Agency (EMA) marketing approved usage of a drug. It provides information on usage for healthcare professionals, and is an intrinsic part of the application for Marketing Authorisation (MA) of a new drug or medicine within the European Union. Preferably, the equivalent of the SmPC in the United States of America is the "United States Prescribing Information" or abbreviated, "USPI".

Reference to the EU SmPC, or preferably SmPC, in the context of the instant invention preferably refers to the EU SmPC, or preferably SmPC, of oral cladribine or cladribine tablets, marketed under the tradename MAVENCLAD®, Mavenclad®, or just Mavenclad. Preferably, reference to the EU SmPC, or preferably SmPC, in the context of the instant invention with regard to cladribine tablets means reference to the EU SmPC, or preferably SmPC, of cladribine tablets/MAVENCLAD® as valid as of 2020. Preferably, the reference to the EU SmPC, or preferably SmPC, of cladribine tablets/MAVENCLAD® includes all contents of that EU SmPC, or preferably SmPC, except for the content with regard to and immunisations and/or vaccinations against infections, preferably immunisations vaccinations and/or infections as described herein in the context of the instant invention. Preferably, the instant invention provides methods of treatment that are preferably advantageously improved over the content of the EU SmPC, or preferably SmPC, with regard to said immunisations and/or vaccinations against infections. Especially preferably, a reference to the EU SmPC, or preferably SmPC, includes the treatment scheme or schedule and/or the posology given in said EU SmPC, or preferably SmPC.

If not explicitly specified otherwise, the terms "vaccinating" and "immunising" are preferably used interchangeably within the context of the instant invention.

If not explicitly specified otherwise, the terms, "vaccination" and"immunisation" are preferably used interchangeably within the context of the instant invention.

"A week" preferably refers to a period of time of or about 5, about 6 or about 7 days.

"A month" preferably refers to a period of time of or about 28, about 29, about 30 or about 31 days.

The term "treatment" is known and understood in the art. In specific contents, the term can preferably also mean or include the sequential succession of an "induction treatment" and at least a "maintenance treatment". In this specific context, a treatment may comprise an "induction treatment" and about one or about two or about three maintenance treatments.

Typically, a treatment according to the invention is of about 2 years (about 24 months) or about 3 years (about 36 months) or about 4 years (about 48 months), preferably about two years.

Preferably, a treatment according to the invention is of about two years (about 24 months) or about three years (about 36 months) or about for years (about 48 months), preferably about two years (about 24 months). If the treatment according to the invention is of about two years (about 24 months), it preferably contains two treatment periods or to treatment courses. If the treatment according to the invention is of about three years (about 36 months) or about four years (about 48 months), it preferably contains three treatment periods/treatment courses or four treatment period/treatment courses.

Preferably, the treatment periods or treatment courses according to the invention comprise one month, two months or three months, wherein cladribine or preferably cladribine tablets are administered to a subject, preferably a subject in need thereof. Preferably, the treatment periods or treatment causes according to the invention comprise two months, wherein cladribine preferably cladribine tablets are administered to said subject. Especially preferably, each treatment course consists of two treatment weeks, one preferably at the beginning of the first month of said treatment course, and one week preferably at the beginning of the second month of said treatment course. Preferably, the same holds true for treatment periods, as those terms are preferably interchangeable in the context of the instant invention.

Preferably, each said treatment week comprises four or five days on which a subject receives cladribine, preferably cladribine tablets, preferably at a daily dose of 10 or 20 mg, depending on the body weight of the patient, in order to achieve the dosing of cladribine in mg/kg of body weight as described herein.

A "cladribine-free period" is preferably a period wherein no cladribine is administered to the subject or patient. During a cladribine-free period, the patient can be free of any administration or be dosed with a placebo-pill or another drug except. A Cladribine-free period preferably lasts at least 9 months or at least 10 months, and preferably up to about 10 months, up to 12 months, up to 14 months, up to 16 months, or up to about 18 months. For example, a Cladribine-free period lasts from about 9 to about 12 months, from about 10 months to about 14 months, from about 10 months to about 14 months or from about 10 months to about 18 months, such as about nine months, about 10 months, about 11 months, about 12 months, about 12 months, about 14 months, about 16 months or about 18 months, but typically of about 10 months, about 14 months or about 18 months. Especially preferably, a cladribine-free period lasts for about 10 months. This is especially preferred if a further treatment period is to follow. If no treatment period is to follow said cladribine cladribine-free period, it preferably can be principally of any length or duration.

Within the context of this invention, the beneficial effect, including but not limited to an attenuation, reduction, decrease or diminishing of the pathological development after onset of the disease, may be seen after one or more "treatments", after one or more "treatment periods" or "treatment courses", after one or more "treatment years" or during one or more cladribine-free periods.

"Daily dose" preferably refers to the total dose of Cladribine orally administered to the patient each day of administration. The daily dose can be reached through a single or several administrations per day, such as for example once a day, twice a day or three times a day.

Preferably, the dosage administered, as single or multiple doses, to an individual will vary depending upon a variety of factors, including pharmacokinetic properties, patient conditions and characteristics (sex, age, body weight, health, size), extent of symptoms, concurrent treatments, frequency of treatment and the effect desired.

Patients suffering from MS can be defined for example as having clinically definite or laboratory-definite MS according to Schumacher or Poser criteria (Schumacher et al., 1965, Ann. NY Acad. Sci. 1965; 122:552-568; Poser et al., 1983, Ann. Neurol. 13(3): 227-31).

"Relapses" preferably involve neurologic problems that occur over a short period, typically days but sometimes as short as hours or even minutes. These attacks most often involve motor, sensory, visual or coordination problems early in the disease. Later, bladder, bowel, sexual and cognitive problems may be shown. Sometimes the attack onset occurs over several weeks. Typical MS relapse involves a period of worsening, with development of neurological deficits, then a plateau, in which the patient is not getting any better but also not getting any worse followed by a recovery period. Recovery usually begins within a few weeks.

"Efficacy" of a treatment according to the invention can be preferably measured based on changes in the course of disease in response to a use according to the invention. For example, treatment of MS efficacy can be measured by the frequency of relapses in RRMS and the presence or absence of new lesions in the CNS as detected using methods such as MRI technique (Miller et al., 1996, Neurology, 47(Suppl 4): 5217; Evans et al., 1997, Ann. Neurology, 41:125-132).

Preferably, the observation of the reduction and/or suppression of MRI T1 gadolinium-enhanced lesions (thought to represent areas of active inflammation) gives a primary efficacy variable.

Secondary efficacy variables preferably include MRI T1 enhanced brain lesion volume, MRI T1 enhanced lesion number, MRI T2 lesion volume (thought to represent total disease burden, i.e. demyelination, gliosis, inflammation and axon loss), MRI T1 enhanced hypointense lesion volume (thought to represent primarily demyelination and axon loss), time-to-progression of MS, frequency and severity of exacerbations and time-to-exacerbation, Expanded Disability Status Scale score and Scripps Neurologic Rating Scale (SNRS) score (Sipe et al., 1984, Neurology, 34, 1368-1372). Methods of early and accurate diagnosis of multiple sclerosis and of following the disease progression are described in Mattson, 2002, Expert Rev. Neurotherapeutics, 319-328.

Degree of disability of MS patients can be for example measured by Kurtzke Expanded Disability Status Scale (EDSS) score (Kurtzke, 1983, Neurology, 33, 1444-1452). Typically a decrease in EDSS score corresponds to an improvement in the disease and conversely, an increase in EDSS score corresponds to a worsening of the disease.

Cladribine (2-CdA)

2-CdA and its pharmacologically acceptable salts may be used in the practice of this invention.

Cladribine can be formulated in any pharmaceutical preparation suitable for oral administration. Representative oral formulations of 2-CdA are described in (WO 96/19230; WO 96/19229; U.S. Pat. Nos. 6,194,395; 5,506,214; WO 2004/087100; WO 2004/087101), the contents of which are incorporated herein by reference. Examples of ingredients for oral formulations are given below.

Processes for preparing 2-CdA are well known in the art. For example, the preparation of 2-CdA is described in (EP 173,059; WO 04/028462; WO 04/028462; U.S. Pat. No. 5,208,327; WO 00/64918) and Robins et al., J. Am. Chem. Soc., 1984, 106: 6379. Alternatively, pharmaceutical preparations of 2-CdA may be purchased from Bedford Laboratories, Bedford, Ohio.

Oral administration of Cladribine may be in capsule, tablet, oral suspension, or syrup form. The tablet or capsules may contain from about 3 to 500 mg of Cladribine. Preferably they may contain about 3 to about 10 mg of Cladribine, more preferably about 3, about 5 or about 10 mg of Cladribine. The capsules may be gelatin capsules and may contain, in addition to Cladribine in the quantity indicated above, a small quantity, for example less than 5% by weight, magnesium stearate or other excipient. Tablets may contain the foregoing amount of the compound and a binder, which may be a gelatin solution, a starch paste in water, polyvinyl polyvinyl alcohol in water, etc. with a typical sugar coating.

Preferably, the term "Cladribine" as used in the context of the instant invention, if not explicitly defined to be otherwise, preferably means "oral cladribine", i.e. the active ingredient cladribine to be orally administered according to the invention. Preferably, the cladribine to be orally administered according to the invention is administered in the form of an oral dosage form, such as a capsule, e.g. a capsule filled with cladribine solution, a capsule filled with cladribine powder, a cladribine containing tablet and especially a cladribine-cyclodextrin complex containing tablet, as it is marketed under the name of Mavenclad®.

Compositions

Compositions may further comprise one or more pharmaceutically acceptable additional ingredient(s) such as alum, stabilizers, antimicrobial agents, buffers, coloring agents, flavoring agents, adjuvants, and the like.

Compositions may be in the form of tablets or lozenges formulated in a conventional manner. For example, tablets and capsules for oral administration may contain conventional excipients including, but not limited to, binding agents, fillers, lubricants, disintegrants and wetting agents. Binding agents include, but are not limited to, syrup, accacia, gelatin, sorbitol, tragacanth, mucilage of starch and polyvinylpyrrolidone. Fillers include, but are not limited to, lactose, sugar, microcrystalline cellulose, maizestarch, calcium phosphate, and sorbitol. Lubricants include, but are not limited to, magnesium stearate, stearic acid, talc, polyethylene glycol, and silica. Disintegrants include, but are not limited to, potato starch and sodium starch glycollate. Wetting agents include, but are not limited to, sodium lauryl sulfate). Tablets may be coated according to methods well known in the art.

Compositions may also be liquid formulations including, but not limited to, aqueous or oily suspensions, solutions, emulsions, syrups, and elixirs. The compositions may also be formulated as a dry product for constitution with water or other suitable vehicle before use. Such liquid preparations may contain additives including, but not limited to, suspending agents, emulsifying agents, nonaqueous vehicles and preservatives. Suspending agent include, but are not limited to, sorbitol syrup, methyl cellulose, glucose/sugar syrup, gelatin, hydroxyethylcellulose, carboxymethyl cellulose, aluminum stearate gel, and hydrogenated edible fats. Emulsifying agents include, but are not limited to, lecithin, sorbitan monooleate, and acacia. Nonaqueous vehicles include, but are not limited to, edible oils, almond oil, fractionated coconut oil, oily esters, propylene glycol, and ethyl alcohol. Preservatives include, but are not limited to, methyl or propyl p-hydroxybenzoate and sorbic acid.

Especially preferably, said cladribine or oral cladribine for use according to the instant invention is to be orally administered as a tablet comprising 10 mg of Cladribine in the form of a mixture of Cladribine, 2-hydroxypropyl-β-cyclodextrin and Cladribine-2-hydroxypropyl-β-cyclodextrin-complexes, wherein the weight ratio of Cladribine to 2-hydroxypropyl-β-cyclodextrin is between about 1:10 to about 1:16, preferably between 1:13 to 1:15

A preferred oral dosage form in the form of the tablet is described directly below:

A preferred composition of cladribine for oral use according to the invention is a tablet containing 10 mg of cladribine (2-CdA), containing hydroxypropyl-beta-cyclodextrin, preferably as a cladribine-cyclodextrin complex, and excipients in the below given amounts in table 11:

TABLE 11

| Name of ingredients | Formula mg/tablet |
|---|---|
| Cladribine-2-hydroxypropyl-β-cyclodextrin-complex* | 153.75 equivalent to 10 mg 2-CdA |
| Sorbitol powder | 44.25 |
| Magnesium Stearate (vegetable grade) | 2.0 |
| Total | 200.0 |

*Cladribine is complexed and lyophilised with 2-hydroxypropyl-beta-cyclodextrin in a separate process as described in WO 2004/087101, the disclosure of which is Incorporated by reference into this application in its entirety.

However, also similar compositions, preferably containing that cladribine-cyclodextrin complex, and preferably having the same or a very similar bioavailability, can preferably be used according to the invention.

If not explicitly defined otherwise, the naming of an active ingredient, active principle (API), medicament or international nonproprietary name (INN) thereof preferably includes all prodrugs, salts and solvates thereof, especially those that are functionally equivalent and/or are deemed a suitable substitute from a clinical point of view.

If not explicitly defined otherwise, the terms humans, human beings, human patients or patients are preferably used herein as interchangeable or as synonyms.

If not explicitly defined otherwise, the terms human (being), human patient or (just) patient are preferably used herein as interchangeable or as synonyms.

Especially preferred according to the invention are subjects as described herein, wherein the characteristics of two or more preferred, more preferred and/or especially preferred embodiments, aspects and/or subjects are combined into one embodiment, aspect and/or subject. Preferably, according to this invention, preferred subjects or embodiments can be combined with other preferred subjects or embodiments; more preferred subjects or embodiments can be combined with other less preferred or even more preferred subjects or embodiments; especially preferred subjects or embodiments can be combined with other just preferred or just even more preferred subjects or embodiments, and the like.

Preferably in alignment with the wording in the Health Authority approved label/marketing authorisations, the term "treatment period" as used herein for the timeframe during which cladribine, preferably cladribine tablets, more preferably (Mavenclad®) is administered to subjects, preferably human subjects, more preferably patients and especially patients in need thereof, can be interchangeably also termed "treatment course" and/or "treatment cycle". Accordingly, the terms "treatment period", "treatment course" and/or "treatment cycle" can preferably used interchangeably within the context of the instant invention. The same holds preferably true for the terms "treatment periods", "treatment courses" and/or "treatment cycles". Preferably, if not explicitly defined otherwise, the terms "treatment period", "treatment course" and/or "treatment cycle" can also be used, in accordance with the instant invention, in abbreviated form as "period", "course" and/or "cycle", respectively. However, in line with the USPI, the term "First cycle" preferably means "month 1" in the "Year 1 treatment course" and/or "Year 2 treatment course"; likewise, the term "Second cycle" preferably means "month 2" in the "Year one treatment course" and/or "Year 2 treatment course".

However, in the treatment methods described herein wherein the administration of the cladribine, preferably the administration of the oral cladribine and especially the administration of the cladribine tablets (e.g. Mavenclad) takes place according to or substantially in line with the posology as described in the EU SmPC/the proved European label, the two or more about a year long periods (also referred to as about 12 months, 46-54 weeks, 48-52 weeks, 48 weeks or 52 weeks, or the like) at the beginning of which said cladribine, oral cladribine or cladribine tablets are administered, are preferably referred to as "treatment year" or "treatment years", e.g. a "first treatment year", a "second treatment year" or a "subsequent treatment year". Likewise, in this context, each of the months, preferably each of the 2 months, at the beginning of a "treatment year", in which months the cladribine, oral cladribine are cladribine tablets are administered to a patient are preferably referred to as "treatment course" or "treatment courses", e.g. a "first treatment course", a "second treatment course" or a "subsequent treatment course".

In contrast thereto, in the treatment methods described herein wherein the administration of the cladribine, preferably the administration of the oral cladribine and especially the administration of the cladribine tablets (e.g. Mavenclad) takes place according to or substantially in line with the posology as described in the US PI/the approved US label, the two or more about a year long periods (also referred to as about 12 months, 46-54 weeks, 48-52 weeks, 48 weeks or 52 weeks, or the like) at the beginning of which said cladribine, oral cladribine or cladribine tablets are administered, are preferably referred to as "treatment course" or "treatment courses", e.g. a "first treatment course", a "second treatment course" or a "subsequent treatment course". Likewise, in this context, each of the about a month long periods, preferably each of the 2 about a month long periods, at the beginning of a "treatment course", in which about a month long periods the cladribine, oral cladribine are cladribine tablets are administered to a patient are preferably referred to as "treatment cycles" or "treatment cycles", e.g. a "first treatment cycle", a "second treatment cycle" or a "subsequent treatment cycle".

If not explicitly defined otherwise, the terms "attenuated live vaccine(s)", "live attenuated vaccine(s)" and/or "live-attenuated vaccine(s)" are preferably used herein as interchangeable or as synonyms.

The term "about" as used herein with respect to numbers, figures, ranges and/or amounts is preferably meant to mean "circa" and/or "approximately". The meaning of those terms is well known in the art and preferably includes a variance, deviation and/or variability of the respective number, figure, range and/or amount of plus/minus 15% and especially of plus/minus 10%.

In any case, the term "about" as used herein with respect to numbers, figures, ranges and/or amounts is preferably meant to mean "circa" and/or "approximately". The meaning of those terms is well known in the art and preferably includes a variance, deviation and/or variability of the respective number, figure, range and/or amount of at least plus/minus 5%.

Preferably, any ranges mentioned herein below include all values and subvalues between the lowest and highest limit of this range.

Preferably, in the context of the present invention, the terms "(anti-)herpes zoster virus" or "(anti-)herpes zoster" and "(anti-)varicella zoster virus" or "(anti-)varicella zoster" are to be regarded as synonyms, respectively.

The terms "disorder(s)" and "disease(s)" as used herein are well-known and understood in the art. In the context of the present invention they are preferably used as synonyms and thus are preferably interchangeable, if the context they are used herein does not strongly implicate otherwise.

In the medical context, including, but not limited to treatment regimens, dosing schedules and clinical trial designs, for convenience and/or ease of use by patients, medical staff and/or physicians, as well as reliability and/or reproducibility of results etc., the terms "week"/"a week", "month"/"a month" and/or "year"/"a year" can used with slight deviations from the definitions of the Gregorian calendar. For example, in said medical context, a month is often referred to as 28 days, and a year is often referred to 48 weeks.

Thus, in the context of the instant invention, the term "week" or "a week" preferably refers to a period of time of about 5, about 6 or about 7 days, more preferably about 7 days.

In the medical context, the term "month" or "a month" preferably refers to a period of time of about 28, about 29, about 30 or about 31 days, more preferably about 28, about 30 or about 31 days.

In the medical context, the term "year" or "a year" preferably refers to a period of time of about 12 months or to a period of time of about 48, about 50, or about 52 weeks, more preferably 12 months, or about 48 or about 52 weeks.

The surprisingly advantageous dosing regimen according to the instant invention for treating autoimmune diseases with cladribine, especially cladribine tablets, thereby mitigating the risk of serious infections for patients having autoimmune diseases by the improved vaccinating options according to the invention is further confirmed by the positive outcome of most of the high number of infection cases, especially COVID 19 cases, that occurred under cladribine and especially cladribine tablets (Mavenclad®) treatment reported in Example 3 of the Experimental Section, which cases do not show any signal that the patient's immune system is compromised by the cladribine/cladribine tablets treatment in a way that would lead to worse or more severe outcomes as a result of said infections.

The invention is explained in greater detail below by means of examples. The invention preferably can be carried out throughout the range claimed and is not restricted to the examples given here.

Moreover, the following examples are given in order to assist the skilled artisan to better understand the present invention by way of exemplification. The examples are not intended to limit the scope of protection conferred by the claims. The features, properties and advantages exemplified for the processes, compounds, compositions and/or uses defined in the examples may be assigned to other processes, compounds, compositions and/or uses not specifically described and/or defined in the examples, but falling under the scope of what is defined in the claims.

Thus, the following examples describe the invention in more detail but do not limit the invention and its scope as claimed.

EXPERIMENTAL SECTION

Example 1

Lymphocyte counts from 12 subjects treated with cladribine tablets (Mavenclad®) according to the approved label over two years (cladribine tablets (Mavenclad®) dosed as 3.5 mg/kg body weight over 2 years, administered as 1 treatment course of 1.75 mg/kg per year, each treatment course consisting of 2 treatment weeks, one at the beginning of the first month and one at the beginning of the second month of the respective treatment year, each treatment week consisting of 4 or 5 days on which a patient received 10 mg or 20 mg (one or two tablets) as a single daily dose depending on body weight) and preferably vaccinated with a vaccine, selected from flu vaccine or shingles vaccine.

Blood samples from subjects were taken on Baseline (i.e. directly before onset of cladribine tablets (Mavenclad®) treatment, and at different time points, i.e. at Month 1, Month 2, Month 3, Month 6 and Month 12.

Analyses of the blood samples showed the following results:

All samples of baseline were defined to be the starting point, i.e. 0% difference at baseline. Since we were interested in potential vaccine responses, preferably B and T cell dependent vaccine responses, under treatment with cladribine tablets (Mavenclad®) we primarily considered the impact of treatment with cladribine tablets (Mavenclad®) and/or vaccination on B cell, AB and T cell effector cells. Additionally, deviations from baseline (0%) for IgG and IgM levels were also obtained at certain time points.

The following results were obtained:

TABLE 12

Lymphocyte Subsets (B-Cells) and immunoglobulins (IgG & IgM)

| Longitudinal blood analysis | Baseline | Month 1 | Month 2 | Month 3 | Month 6 | Month 12 |
|---|---|---|---|---|---|---|
| B-cell subsets | | | | | | |
| CD 19+ B-cells | ±0% | −76% | −90% | −76% | −57% | −11% |
| Transitional B-cells | ±0% | −61% | −61% | +35% | +19% | +23% |
| Naïve B-cells | ±0% | −79% | −92% | −69% | −35% | +32% |
| Memory B-cells | ±0% | −77% | −93% | −93% | −92% | −89% |
| Bregs | ±0% | −37% | −10% | +216% | +202% | +75% |
| Immunoglobulins | | | | | | |
| IgG | ±0% | | | +10% | +11% | +3% |
| IgM | ±0% | | | −5% | −13% | +21% |

TABLE 13

T-Cells (CD4 & CD8)

| Longitudinal blood analysis | Baseline | Month 1 | Month 2 | Month 3 | Month 6 | Month 12 |
|---|---|---|---|---|---|---|
| CD4 & CD8 T cell subtypes | | | | | | |
| CD4+ T-cells | ±0% | −76% | −90% | −76% | −57% | −11% |
| Naïve CD4+ T cells | ±0% | | | −63% | −67% | −59% |
| CD4+ Treg | ±0% | | | −35% | −43% | −36% |
| CD4+ CM | ±0% | | | −56% | −59% | −48% |
| CD4+ EffM | ±0% | | | −40% | −38% | −27% |
| CD4+ TH1 | ±0% | | | −56% | −55% | −46% |
| CD4+TH17 | ±0% | | | −37% | −42% | −29% |
| CD8+ T-cells | ±0% | −22% | −37% | −48% | −50% | −46% |
| Naïve CD8 T-cells | ±0% | | | −76% | −75% | −60% |
| CD8+ EfM | ±0% | | | −40% | −38% | −27% |
| CD8+ CM | ±0% | | | −51% | −52% | −35% |

TABLE 12 show the B cell subsets.

CD19+ total B cell numbers decrease in a steep slope in treatment month 1 and reach nadir during or towards the end of treatment month 2, see the decline of CD19+ B-cells to −76% and −90%, respectively. However, in months 3, 6 and 12 (which are part of the first cladribine-free period) the CD19+ B-cells increase to minus −76%, −57% and −11%, respectively. However, the behaviour of certain B cell subtypes is strongly different in comparison thereto. For example, Transitional B cells do not decline beyond −61% in treatment month 1 and treatment month 2, and are above baseline from month 3 on. More specifically, in the 10 month of the cladribine-free period following the first treatment period, Transitional B cell levels are +35% in month three (i.e. the first month of the cladribine free period), +19% in month 6 (i.e. the fourth month of the cladribine free period) and +23% in month 12 (i.e. the last month of the 10 month cladribine free period, and thus also the last month before begin of the cladribine tablet (Mavenclad®) treatment period of treatment year 2). More dramatic and even more faster is the impact of the first cladribine treatment period on naïve B-cells, with a decline to −79% and −92% in treatment month one and treatment month two, respectively, followed by a rapid increase during the 10 month cladribine-free period, i.e. to −69% (month 3/1st month of the cladribine-free period), −35% (month 6/month four of the cladribine-free period) and +35% (month 12/last month of the 10-month cladribine-free period). Although memory B cell, which develop into AB producing plasma cells, reach a nadir in counts at treatment month 2 (−93%) and show a sustained decrease in the blood compartment up to 12 month (−89%), it is important to note that the measured IgG immunoglobulin levels at all timepoint (1, 2, 3, 6 and 12 month) are comparable to baseline. IgM levels are only slightly decreased at month 12 but are still in the normal range, suggesting that humoral responses, and even recall responses, can be elicited after cladribine treatment.

Since B cells and antibodies play a pivotal role in early and lasting humoral vaccine response our findings support the evidence that due to the fast recovery profile of naïve and transitional B cells after Cladribine treatment a vaccination responses (extrafollicular and germinal center responses) can be elicited at most timepoints with most likely decreased antibody titers expected at month 2. The same holds true for the second treatment year, since total lymphocyte longitudinal profiles after cladribine treatment show a very similar pattern for the 2 years, i.e. treatment year 1 and treatment year 2, preferably treatment your one and treatment year to as given in the approved label for cladribine tablets (Mavenclad®).

Central to the induction of a vaccine response are innate immune cells (less or not affected by cladribine), providing danger signals to activate the immune system and drive together with T cell helper cells (which are only moderately affected by Cladribine at all timepoints) a successful Germinal Center (GC) reaction. Surprisingly, also the T cell subpopulation are preferably affected in a very unusual manner by the treatment periods with cladribine. Even though also partly depleted by the treatment with cladribine tablets (Mavenclad®), they show a very different time-dependent behavior compared to B cells, with only a slight decline over the first five months from the start of cladribine treatment, slight nadir around month six after start from the treatment and a slow increase towards the end of the cladribine free period in month 12. However, since the population of T cells preferably does not decline beyond −50% to −60%, preferably both in treatment year 1 and treatment year 2, there is sufficient T cell activity in order to enable activated antigen specific T helper cells to trigger specific B cells to migrate toward towards follicular Dendritic Cells (DCs), thereby preferably initiating the germinal center (GC) reaction. In the germinal centers, B cells preferably receive additional signaling from T follicular helper cells (Tfh), undergo massive clonal proliferation and switch antibody production from IgM phenotype towards IgG, IgA or IgE phenotype. As B cell proliferate in germinal centres, IgG antibody titres increase up to peak values, which are usually reached at around four weeks after vaccination/immunisation.

As a result, the selective impact of cladribine tablets (Mavenclad®) on the time-dependent levels of the specific subtypes of the B- and T-cell populations, a vaccination or immunisation appears to be possible at basically all times, directly before the start of cladribine tablets (Mavenclad®) treatment or directly after the end of the two-year treatment schedule with cladribine tablets (Mavenclad®), or preferably also within the first 12 months/1st treatment year, preferably both from a patient safety point of view, maybe with a slightly decreased efficacy or quality of the immune response when vaccinating during the second treatment month, and maybe or a couple of days before or after that month, preferably a couple of days after the second treatment month. However, even if there might be a slightly reduced immune response to vaccination under treatment with cladribine tablets (Mavenclad®) this could be readily addressed by determining the antibody titers of interest and/or by re-vaccinating and/or administration of a second dose within a suitable timeframe after the first vaccination, e.g. within 1 to 6, preferably within 3 to 6 weeks or 1 to 4 weeks, and especially 2 or 3 weeks after first vaccination. Generally, a minimal interval 2 or 3 weeks between 2 primary doses is regarded sufficient to allow development of successive waves of Ag or Ab specific primary responses without interference. Optionally, also a booster can be administered after one or more vaccinations and/or one or more re-vaccinations.

Example 2

This is a post hoc analysis aimed to further explore and characterize the impact of age ($\leq 50$ years vs. $>50$ years) on the nature of lymphopenia experienced by patients treated with cladribine tablets 3.5 mg/kg in an integrated safety analysis.

Methods

Trial Design

CLARITY and ORACLE-MS were Phase 3, double-blind, randomized, placebo-controlled, 96-week studies of cladribine tablets in patients with RRMS and a first clinical demyelination event (FCDE), respectively. Details on these studies have been published previously; briefly, both CLARITY and ORACLE-MS studies evaluated the efficacy and safety of cladribine tablets 3.5 mg/kg (cumulative dosage over 2 years) versus placebo. For this dose regimen, cladribine 10 mg tablets were administered over two weeks at 0.875 mg/kg/week over 4-5 consecutive days starting on Day 1 of Weeks 1 and 5 of Year 1; this was followed by two treatment weeks in Year 2 (at Weeks 48 and 52 from the start of study, or preferably weeks 49 and 53, respectively, from the start of the study, as in these studies, one year was preferably defined to consist of 48 weeks and one/each month was defined was defined to consist of four weeks or 28 days). The CLARITY Extension was a 120-week study which investigated long-term safety and efficacy of cladribine tablets 3.5 mg/kg versus placebo in eligible patients who completed CLARITY and were then re-randomized to placebo or additional cladribine tablets 3.5 mg/kg treatment. The PREMIERE registry was a long-term observational safety study of patients who participated in the Phase 3 studies of cladribine tablet.

Post Hoc Analysis

This post hoc analysis was conducted to examine the effect of age ($\leq 50$ and $>50$ years) at baseline and after treatment with placebo or cladribine tablets (3.5 mg/kg; cumulative dose over 2 years) on absolute lymphocyte count (ALC) and on levels of specific B and T lymphocyte subsets. The analysis period was between Weeks 0-288 of treatment with cladribine tablets 3.5 mg/kg and the analysis population was the cladribine tablets 3.5 mg/kg monotherapy oral cohort (safety populations of the Phase 3 CLARITY, CLARITY Extension, and ORACLE-MS studies of MS, and long-term follow-up in the PREMIERE registry). Assessments included incidence and severity of Grade $\geq 3$ lymphopenia; severity of Grade $\geq 3$ lymphopenia was defined based on the NCI CTCAE v3.0 toxicity grading system as ALC levels <500 cells/μL. The time to recover from Grade 3 lymphopenia to Grade $\leq 2$ (ALC $\geq 500$ cells/μL) and to Grade $\leq 1$ (ALC $\geq 800$ cells/μL) were also assessed. Additionally, the effects of cladribine tablets 3.5 mg/kg on levels of lymphocyte subsets, primarily the CD19+ B, CD4+ T and CD8+ T lymphocytes, were measured. All assessments were performed for each baseline age group ($\leq 50$ years and $>50$ years).

Among patients who had an episode of Grade $\geq 3$ lymphopenia in both age groups, the incidence of treatment-emergent adverse events (TEAEs) of viral and bacterial infections was determined. TEAEs were evaluated separately in Year 1 (Week 0-48) or Year 2 (Week 48-96) of cladribine tablets treatment, as well as by period before, during, and after Grade $\geq 3$ lymphopenia. The definitions used for before, during, and after lymphopenia were: before (before the start date of the first lymphopenia Grade $\geq 3$), during (on or after the start date of the first lymphopenia up and including to the last date of the last lymphopenia), and after (after the end date of the last lymphopenia). The incidence of TEAEs were summarized by Preferred Term (PT) and were coded according to the MedDRA dictionary Version 20.0. All analyses were performed using Statistical Analysis Software (SAS®), Version 9.4 or higher.

Results

Patients

A total of 1564 patients were included in this post hoc analysis. Of these, 1379 were ≤50 years (placebo: N=566; cladribine tablets 3.5 mg/kg: N=813) and 185 were >50 years (placebo: N=75; cladribine tablets 3.5 mg/kg: N=110) of age. Baseline data between the age groups were generally well balanced, although the age >50 group had a higher proportion of women (73.6-76% vs. 65.3-64.8%), longer disease duration (mean ~14.4 vs. 7.9 years), larger proportion of patients with one relapse at baseline (52.7-69.3% vs. 37.5-44.9%), and a higher Expanded Disability Status Scale (EDSS) at baseline (mean ~3.5 vs. 2.4), compared to the age ≤50 group (FIG. 1).

Changes in ALC During Two Years of Active Treatment with Cladribine Tablets 3.5 mg/kg Following treatment with cladribine tablets, the Year 1 nadir for ALC occurred at Week 9 (which was 4 weeks after completing Year 1 dosing) and the true nadir occurred at Week 55 from the start of study (3 weeks after completing dosing in Year 2) for both age groups (FIG. 1). The median (range) ALC at Week 9 for the Age ≤50 and >50 groups was 1.05 (0.2-6.7)×$10^9$ cells/L and 0.9 (0.3-2.5)×$10^9$ cells/L, corresponding to decreases of 43.5% and 52.4% from baseline, respectively. In the Age ≥50 group, ALC recovered to normal range (>1.02×$10^9$ cells/L) by end of the study year (Week 48; Table 14). The median [range] for the Age ≤50 and >50 groups for Year 2 were 0.83 [0.2-2.8]×$10^9$ cells/L and 0.79 [0.1-1.7]×$10^9$ cells/L, corresponding to decreases of 55.4% and 58.2% from baseline, respectively. This was followed by a gradual ALC recovery to within normal range at the end of the second study year (Week 96).

Effects of Cladribine Tablets 3.5 mg/kg on Lymphocyte Subsets

In both treatment years, following treatment with cladribine tablets, a decrease in the levels of each of the lymphocyte subsets (CD19+ B, CD4+ T and CD8+ T) was observed in both age groups; lymphocyte levels recovered to normal range by the end of the corresponding treatment year.

CD19+ B lymphocytes: For both age groups, following treatment with cladribine tablets, the true nadir for CD19+ B lymphocyte levels occurred at Week 9 (4 weeks from second dose in Year 1) and was below the lower limit of normal (LLN). The median (range) for Age ≤50 and >50 groups were 20 [4-239] and 13.0 [2-121] cells/μL, corresponding to decreases of 90.2% and 93.8% from baseline, respectively. CD19+ B cells recovered to normal range by Week 36

CD4+ T lymphocytes: The true nadir for CD4+ T lymphocytes occurred following Year 2 dosing at Week 60 (8 weeks from second dose in Year 2) and Week 72 (20 weeks from second dose in Year 2) for Age ≤50 and >50 groups, respectively, and were below LLN for both age groups. The median (range) for Age ≤50 and >50 groups were 281 [29-980] and 250 [68-944] cells/μL, corresponding to decreases of 66.4% and 73.7% from baseline, respectively. Median levels recovered to normal range by Week 96 (end of study Year 2).

CD8+ T lymphocytes: The true nadir for the Age ≤50 group occurred following Year 2 dosing, at Week 72 (20 weeks after second dose in Year 2); the median [range] was 232.5 [43-1212] cells/μL, corresponding to a decrease of 41.8% from baseline and remained in the normal range until Week 96 (end of study Year 2). For the Age >50 group, following treatment with cladribine tablets, the true nadir for CD8+ T lymphocyte levels were below LLN and occurred at Week 9 (median [range]: 191 [86-731] cells/μL, corresponding to a decrease of 43.4% from baseline), recovering to normal range by Week 13.

Severity of Lymphopenia

Treatment with cladribine tablets 3.5 mg/kg was associated with Grade ≥3 lymphopenia in both treatment years at similar rates in the Age ≤50 and >50 groups. In treatment Year 1, Grade ≥3 lymphopenia was reported in 8.3% and 10.0% of patients in the Age ≤50 and >50 groups, respectively; in Year 2, this increased to 18.7% and 20.0%. No Grade 4 lymphopenia episodes were reported among patients treated with cladribine tablets 3.5 mg/kg n Year 1; in Year 2, it was reported in 2 (0.3%) patients aged ≤50 years and 1 (1.0%) patient aged >50 years.

Time to Recover from Grade ≥3 Lymphopenia

Between Weeks 0-96, the incidence of Grade ≥3 lymphopenia among patients treated with cladribine tablets 3.5 mg/kg was similar in both age groups (Age ≤50: 205/813 [25.2%]; Age >50: 30/110 [27.2%]). The mean (SD) number of episodes of recovery from Grade ≥3 lymphopenia to Grade ≤2 per patient were also similar between the two age groups (Age ≤50: 1.6 [1.1]; Age >50: 1.9 [1.0]). Median (range) time to recovery from the first Grade ≥3 lymphopenia to Grade ≤2 was 1.18 (range: 0.2-22.3) months and 1.54 (range: 0.2-29.9) months in the Age ≤50 and >50 groups, respectively. Similarly, the mean (SD) number of episodes of recovery from Grade ≥3 lymphopenia to Grade ≤1 per patient were 1.2 (0.5) and 1.3 (0.5), in the Age ≤50 and >50 groups, respectively. Median (range) time to recovery from the first Grade ≥3 lymphopenia to Grade ≤1 was 5.49 (range: 0.2-88.4) months and 6.06 (range: 0.2-46.5) months in the Age ≤50 and >50 groups, respectively.

Bacterial and Viral Infections by Age, Treatment, and Lymphopenia Status

The incidence of TEAEs of viral and bacterial infections were analyzed among patients treated with cladribine tablets 3.5 mg/kg who reported Grade ≥3 lymphopenia (Age ≤50: N=205; Age >50: N=309. The overall incidence of TEAEs of viral and bacterial infections among these patients in treatment Years 1 and 2 (Weeks 0-96) were generally similar between the two age groups: Age ≤50: 105/205 (51.2%) vs. Age >50: 17/30 (56.7%). Across both age groups, the most commonly reported TEAEs in ≥5% of patients with Grade ≥3 lymphopenia were viral upper respiratory tract infections, upper respiratory tract infections, and influenza. Higher incidence (Age >50 vs. ≤50) of bronchitis (10% vs. 5.9%), herpes zoster (13.3% vs. 3.4%), respiratory tract infection (6.7% 1.5%) and pneumonia (6.7% vs. 1.0%) were noted among patients with Grade ≥3 lymphopenia in the Age >50 group. In the Age ≤50 group, TEAEs were reported by 103 (50.2%) of patients who received cladribine tablets 3.5 mg/kg, all of which were mild to moderate in severity. In the Age>50 group, 16 (53.3%) patients who received cladribine tablets 3.5 mg/kg reported TEAEs which were mild to moderate in intensity, and 1 (3.3%) patient reported TEAEs of pneumonia and bronchitis, both of which severe in intensity.

In both age groups, the TEAEs were similarly distributed with respect to the lymphopenia episode. However, more TEAEs of viral and bacterial infections were reported during the Year 1 Grade ≥3 lymphopenia episode in the Age >50 group (Age ≤50: 21.5%; Age >50: 30%). During the lymphopenia period, upper respiratory tract infections, mostly mild to moderate in severity, were commonly reported in both age groups.

Discussion

As the immune system undergoes significant remodeling during aging due to immunosenescence, the impact and efficacy of DMDs on older patients with MS is not known. Results from this post hoc exploratory analysis demonstrates that the incidence of Grade ≥3 lymphopenia with cladribine tablets was not very different in both younger and older patients with MS. Furthermore, cladribine tablets did not have a significantly different impact on ALC and/or lymphocyte subsets in older and younger patients during two years of treatment. ALC dropped in the weeks following dosing in both treatment years and gradually increased to normal levels, largely independent of patient age. The overall incidence of Grade ≥3 lymphopenia and time to recover to Grades ≤1/2 lymphopenia were also not significantly different across the two age groups.

Decreases in ALC and lymphocyte subsets have been observed in MS patients who were treated with DMDs such as interferons, dimethyl fumarate (DMF) and alemtuzumab. In an integrated analysis of 2470 patients with MS treated with DMF, Grade ≥3 lymphopenia lasting ≥6 months was observed in 2.2% of patients treated with DMF. Depletion of lymphocyte subsets have been observed following infusion of alemtuzumab, an anti-CD52 monoclonal antibody, where a near-complete depletion of ALC, CD19+ B, CD4+ T, and CD8+ T lymphocytes was observed. However, recovery to LLN range after alemtuzumab infusion can take 8 months (B lymphocytes) to nearly 3 years (T lymphocytes). Lymphopenia is an anticipated effect of cladribine tablets due to its mechanism of action. However, recovery of ALC and lymphocyte subsets (CD19+ B and CD4+ T) following depletion with cladribine tablets happens soon after nadir, and reached normal levels within 30-43 weeks of last dose in treatment year 2; CD8+ T lymphocytes did not fall below LLN. The results from this post hoc analysis showed similar trends in both ALC and levels of lymphocyte subsets regardless of age, and recovery to normal levels occurred by the end of the study year in both age groups.

The pathogenesis of MS is found to be driven by autoreactive immune cells, mainly T and B lymphocytes that infiltrate into the CNS. Therefore, the various DMDs that are utilized in MS therapies result in immunomodulation or lymphocyte depletion. A potential risk of DMDs in the elderly is the risk for opportunistic infections such as PML, which is caused by the JC virus (JCV). In a multinational cohort of patients with MS, the seroprevalence of JCV increased from 49.5% in patients <30 years to 66.5% in patients over 60 years. It has been reported that patients with MS who are over 50 years old are at greater risk for developing PML following treatment with DMDs such as fingolimod and dimethyl fumarate. Among older patients with MS, treatment with natalizumab is associated with an earlier onset of PML; the additive effects of immunosenescence and natalizumab-induced restriction of the T lymphocyte repertoire was attributed to this increased risk. In a prior post hoc analysis of patients treated with cladribine tablets 3.5 mg/kg in the monotherapy oral cohort (median age ~36 years), an increased frequency of infections was observed during periods of Grade ≥3 lymphopenia; the type of infectious events occurring in patients with Grade 3/4 lymphopenia did not differ from those occurring outside these periods. However, the incidence and type of infections were not analyzed by patient age. The current study explores the incidence and nature of TEAEs of viral and bacterial infections among patients treated with cladribine tablets 3.5 mg/kg who reported Grade ≥3 lymphopenia by patient age. The incidence of these TEAEs were generally similar between younger and older patients with Grade ≥3 lymphopenia. While most (>50%) of these TEAEs were mild-to-moderate in severity in both age groups, severe TEAEs were reported in the Age >50 group. A higher frequency of bronchitis, herpes zoster, respiratory tract infection, and pneumonia were reported among older patients with Grade ≥3 lymphopenia; this group also had a higher incidence of these TEAEs that occurred during the Year 1 Grade ≥3 lymphopenia episode. The higher incidence of herpes reactivation observed in the Age >50 group is consistent with previous studies, where viral reactivations were reported with increasing age of the patients. Together, results from this post hoc analyses show that treatment with cladribine tablets has an age-dependent impact on TEAEs, according to which TEAEs are slightly higher in older patients with MS and slightly lower in younger patients with MS, but nevertheless support its use also among patients with aging immune systems.

The current analysis had a few limitations. First, the analysis was limited by its post hoc nature. Second, there were fewer patients in the Age >50 group compared to the Age ≤50 group. Finally, circulating lymphocytes do only reflect a part of the total lymphocyte population and therefore, do reflect changes that occur within the CNS only in part. While it is reported that cladribine can cross the blood-brain-barrier and enter the CNS, the impact of cladribine tablets on CNS-resident lymphocytes is to date not completely clear.

Conclusion

This post hoc analysis of data from Phase 3 studies of cladribine tablets 3.5 mg/kg (CLARITY, CLARITY Extension and ORACLE-MS) as well as the PREMIERE registry, demonstrates that cladribine tablets had a relatively small, but different impact on ALC and lymphocyte subsets in older versus younger patients during 2 years of treatment. Further, the incidence of TEAEs of viral and bacterial infections among patients who reported Grade ≥3 lymphopenia with cladribine tablets was slightly higher in the older age group. However, these results still strongly support the use of cladribine tablets 3.5 mg/kg in both younger and older patients with MS.

Example 3

COVID-19 Case Reports

We report on 46 confirmed or suspected cases of COVID-19 in patients undergoing treatment with cladribine tablets (MAVENCLAD®). The 46 patients in the case report summary "*Updated Post-Approval Safety of Cladribine Tablets in the Treatment of Multiple Sclerosis, with Particular Reference to Respiratory Viral Infections*" (Case Report Summary 1) by Giovannoni et al. also includes the 3 patients from the MAGNIFY-MS and CLARIFY-MS with confirmed COVID-19, as also reported in the case report summary "*Clinical Outcomes in Patients with COVID-19 Infection During Phase IV Studies of Cladribine Tablets for Treatment of Multiple Sclerosis*" (Case Report Summary 2) by Karan, Roy and Alexandri.

Reported Data:

Case Report Summary 1

Details include a summary of confirmed (N=18) and suspected (N=28) cases, reporting:

Severity (defined as medically significant [confirmed cases n=1; suspected cases n=1] or requiring hospitalisation [confirmed cases n=3; suspected cases n=1])

Outcome:
Recovered (confirmed cases n=8; suspected cases n=6),
Recovering (confirmed cases n=2; suspected cases n=5)
Not resolved (confirmed cases n=1)
Not reported (confirmed cases n=7; suspected cases n=17)
Median time to onset of COVID-19 from last dose of cladribine tablets (MAVENCLAD®) (180 days, range 3-559 days) is reported, based on the availability of these data for 21 (7 confirmed; 14 suspected) of the 46 patients.

For more detailed data, as far as available, please refer to FIG. 1 and Table 14 relating to the part of patients with the most complete data.

Age at COVID-19 onset is held on file for 35/46 patients reported in the poster (median 41 years; min: 22 years, max: 67 years). Date of first treatment with cladribine tablets (MAVENCLAD®) is held for 31/46 of patients and the date of starting the most recent course of treatment is held for 23/46 patients. The database also holds the most recent lymphocyte count for 9/46 patients (median 0.7 G/L; min: 0.24, max: 1.2), with the date of most recent lymphocyte count for 4/9 patients. Time in exact number of days from most recent course of treatment with cladribine tablets (MAVENCLAD®) to the onset of COVID-19 is known for 20/46 patients, with the date of recovery known for 3 patients.

Although we report on whether cases are confirmed or suspected, we do not provide details of the COVID-19 confirmation (i.e. PCR or antibody test). We do have data on the number of patients who had a positive antibody test, which would require some level of Ig G response (Table 14).

This includes a patient from the Netherlands who had a positive PCR test, followed by a subsequent negative PCR test but a positive Ig G test (FIG. 1 and Table 14). This patient also has data for time between most recent course of cladribine tablets (MAVENCLAD®) and onset of COVID-19 (104 days), as well as a lymphocyte count, measured between most recent course of cladribine tablets (MAVENCLAD®) and onset of COVID-19 (0.87 G/L).

Considering that patients were able to have positive confirmation of COVID-19 via Ig G testing, these data suggests that the patients were able to mount sufficient Ig G responses during the immune reduction phase of treatment with cladribine tablets (MAVENCLAD®).

Case Report Summary 2

Details include each of the 3 patients' gender, age, relevant medical history, most recent disability score (EDSS) and lymphocyte count prior to starting treatment with cladribine tablets (MAVENCLAD®). Time between last dose of cladribine tablets (MAVENCLAD®) and onset of COVID-19 is provided for each of the 3 patients in months. From the graphical representation, it is clear that ⅔ of the patients developed COVID-19 after receiving the second year's treatment course with cladribine tablets (MAVENCLAD®), with Patient 3 developing COVID-19 prior to starting the second year of treatment with cladribine tablets (MAVENCLAD®). Disease course is reported for each of the 3 patients with respect to severity of symptoms, confirmatory status of COVID-19, hospitalisation requirement and recovery status.

Further to the overall outcome for each of the 3 patients from the phase IV studies CLARIFY-MS and MAGNIFY-MS, data on file includes some detail regarding extent and nature of symptoms COVID-19 and concomitant diseases and medications (Table 15).

TABLE 14

Patients with antibody-confirmed COVID-19 (as of 29 Jun. 2020)

| Country | Sex | Age (years) | Serious | Therapy start date | Start of most recent course | COVID-19 onset | Time from most recent course to COVID-19 onset (days) | Last status |
| --- | --- | --- | --- | --- | --- | --- | --- | --- |
| Netherlands[a] | M | 49 | N | 18 Nov. 2019 | 18 Nov. 2019 | 1 Mar. 2020 | 104 | Recovered |
| Spain | M | NR | N | NR | NR | NR | NR | Recovered |
| Spain | F | 41 | N | 27 Mar. 2019 | 27 Mar. 2019 | 18 Mar. 2020 | 357 | Recovered |
| Spain | F | 26 | N | 21 Jan. 2020 | 21 Jan. 2020 | 10 Mar. 2020 | 49 | Recovered |

[a]Patient included in FIG. 1.
F, female;
M, male;
N, no;
NR, not reported

TABLE 15

Demographics, medical history and COVID-19 course in patients treated with cladribine tablets (MAVENCLAD ®) in CLARIFY-MS or MAGNIFY-MS who acquired COVID-19

| | Patient 1 - CLARIFY-MS | Patient 2 - CLARIFY-MS | Patient 3 - MAGNIFY-MS |
|---|---|---|---|
| Demographics | | | |
| Gender | Female | Female | Male |
| Age (years) | 57 | 32 | 31 |
| MS disease | | | |
| Disease duration (years) | 21 | 2 | 7 |
| Most recent EDSS score | 4.5 | 2.0 | 1.0 |
| Previous treatment | Avonex Rebif 22 (switching to MAVENCLAD) | None | Rebif 44 (switching to MAVENCLAD) |
| Medical History | | | |
| Concomitant diseases, treatments and pre-disposing factors | Carotid Dissection; HTN; Cardiac Arrhythmia (Nebivovol; Flecaine; Kardegic) Asthma - Symbicort; Budesonide; Terbutaline; Singulaire | Left leg DVT during pregnancy Depo-Provera inj every 3 months (since January 2018) | Insignificant |
| MAVENCLAD treatment monitoring | | | |
| Lymphocyte counts (dates and reference to treatment courses) | BL (October 2018) 1.48 G/L Y1 treat. (October-November 2018) M2 (December 2018) 0.68 G/L M6 (April 2019) 0.56 G/L M12 (October 2019) 0.64 G/L Y2 treat. (November-December 2019) M14 (January 2020)- 0.49 G/L | BL (January 2019) 2.80 G/L Y1 treat. (January-February 2019) M2 (March 2019) 1.60 G/L M6 (July 2019) 1.30 G/L M12 (January 2020) 1.30 G/L Y2 treat. (January-February 2020) Uns v. (17 Mar. 2020) 0.20 G/L | BL (May 2019) 2.39 G/L Y1 treat. (May-June 2019) M2 (July 2019) 0.95 G/L M6 (November 2019) 1.33 G/L M12 (not done) Y2 treat. (not started) |
| Adverse events | Asthmatic bronchitis October 2018; December 2018; October 2019 Angina pectoris October 2019 | Tachycardia January 2019; Left Sided Swollen glands January 2020 Poss. reaction of EBV - January 2020 | None |
| COVID-19 | | | |
| Severity (hospitalization/ treatment/ ventilation) | SAE, Severe, Hospitalization (05 Apr.-20 Apr. 2020), no need for mechanical ventilation | SAE, Severe, Hospitalization (17 Mar., self-discharge same day), fever, breathless, anorexia, vomit, fatigue. AB iv/oral. Self-isolation 14 days. | Mild, not serious (no hospitalization), fever, muscle pain, Paracetamol 500 mg. |
| Post COVID-19 outcome | Discharged with residual Cough and Fatigue | Recovering with chest tightness, fatigue, neuropathic pain. | Patient feeling fine, no symptoms, home isolation (waiting for negative RT-PCR) |

AB, antibiotics;
BL, baseline;
DVT, deep vein thrombosis;
EBV, Epstein-Barr virus;
EDSS, Expanded Disability Status Scale;
HTN, hypertension;
inj, injection;
iv, intravenous;
M2/6/12/14, Month 2/6/12/14;
SAE, serious adverse event Uns v, unscheduled visit;
Y 1/2 treat., initiation of Year 1/2 treatment with MAVENCLAD In addition to the baseline lymphocyte levels, Patients 1 and 2 have values for lymphocyte counts conducted, as per study schedule at Months 2, 6 and 12 following Year 1 treatment with cladribine tablets (MAVENCLAD®). Patient 1 has Month 14 (post Year 2 treatment with cladribine tablets (MAVENCLAD®)) lymphocyte levels. Patient 2 has an unscheduled lymphocyte count conducted in March 2020, one month after last dose of Year 2 treatment with cladribine tablets (MAVENCLAD®). Both Patients 1 and 2 have reports of possibly relevant adverse events (Patient 1: asthmatic bronchitis in October 2018, December 2018 and October 2019; angina pectoris in October 2019. Patient 2: tachycardia in January 2019; left-sided swollen glands and possible reactivation of Epstein-Barr virus in January 2020). Patient 3 has not yet started Year 2 treatment with cladribine tablets (MAVENCLAD®), so has lymphocyte counts, as per study schedule, at Months 2 and 6 following Year 1 treatment with cladribine tablets (MAVENCLAD®). Aside from COVID-19, no other adverse events or relevant concomitant diseases and medications are reported for Patient 3.

Example 4

Vaccination Studies:

Post-Vaccination Antibody Titers in 15 Patients Treated with Cladribine Tablets (MAVENCLAD®) at Various Timepoints Before, During and after Cladribine Treatment in Year 1 and 2 for Relapsing MS (MAGNIFY Study) Remained at Levels to Offer Protective Immunity Against the Seasonal Influenza and Varicella Zoster Virus Vaccine MAVENCLAD® (cladribine tablets) is indicated for the treatment of adult patients with highly active relapsing multiple sclerosis (MS) as defined by clinical or imaging features. The recommended cumulative dose of MAVENCLAD® (cladribine tablets) is 3.5 mg/kg body weight over 2 years, administered as 1 treatment course of 1.75 mg/kg per year.

The European Summary of Product Characteristics (EU SmPC) for MAVENCLAD® (cladribine tablets) states that treatment with MAVENCLAD® should not be initiated within 4 to 6 weeks after vaccination with live or attenuated live vaccines because of a risk of active vaccine infection. Vaccination with live or attenuated live vaccines should be avoided during and after cladribine treatment as long as the patient's white blood cell counts are not within normal limits.

There is a lack of data available to determine if CT impacts the antibody response to vaccination in patients with relapsing MS. A Merck internal data search retrieved the following information.

During the CLARITY clinical trial with cladribine tablets, a few MS patients received vaccines while treated with cladribine tablets 3.5 mg/kg during the placebo-controlled period (data shown in Table 1). The most frequent vaccines received by these patients were influenza virus vaccines and tetanus vaccines. Information on the timing of the vaccinations in relation to cladribine administration was not available. There were no reports of AEs associated with the administration of vaccines in patients treated with cladribine tablets.

TABLE 15

Vaccines received in cladribine treatment groups during the CLARITY study - Intention-to-treat (ITT) population.

| | Cladribine tablets 3.5 mg/kg (n = 433) n (%) |
|---|---|
| Vaccines | 20 (4.6) |

*includes influenza vaccines, tetanus vaccine, Imudon (mixture of bacterial lysates), tick-borne encephalitis (TBE) vaccine, TBE virus antigen, hepatitis B vaccine, hepatitis vaccines, diphtheria vaccine, pertussis vaccine, tetanus vaccine, poliomyelitis vaccine, encephalitis vaccines, rubella virus In a small retrospective investigation of blood samples from patients enrolled in the MAGNIFY study, post-vaccination antibody titers in patients treated at various timepoints (before, during or after) with cladribine tablets for relapsing MS remained over the seroprotection limits against seasonal influenza (hemagglutination inhibition [HAI]≥40) and varicella zoster virus (VZV; ≥100 IU/L)). To investigate the antibody response to seasonal influenza and varicella zoster virus (VZV) vaccination in patients treated with cladribine tablets (CT; 3.5 mg/kg over 2 years) for relapsing multiple sclerosis (RMS). Absolute lymphocyte counts (ALC), B cells subsets counts and immunoglobulins (IgG and IgM) levels were measured longitudinally in the study and timepoints with relevance to the vaccination response are presented in Figures.

Blood samples collected during the MAGNIFY-MS study (NCT03364036) from 15 patients with relapsing MS treated with CT who received seasonal influenza (n=12) or VZV vaccinations (n=1 Shingrix, n=2 Zostavax) as a standard of care were retrospectively analysed. Two control blood samples (baseline sample before starting CT, closest sample available just before vaccination) and two post-vaccination blood samples (closest sample available after vaccination) were examined. Quantitative antibody titers against the seasonal influenza and VZV vaccine were measured by hemagglutination inhibition (HAI) assay and Enzyme-Linked Immunosorbent Assay (ELISA) respectively. A longitudinal evaluation of ALC (Absolute lymphocyte counts) and peripheral blood immune cells at various timepoints before and after in the vaccination was analysed in the vaccinated patients. Absolute cell counts and % change from baseline were assessed and immunoglobulins G and M (IgG and IgM) were reported.

Figure 15A:
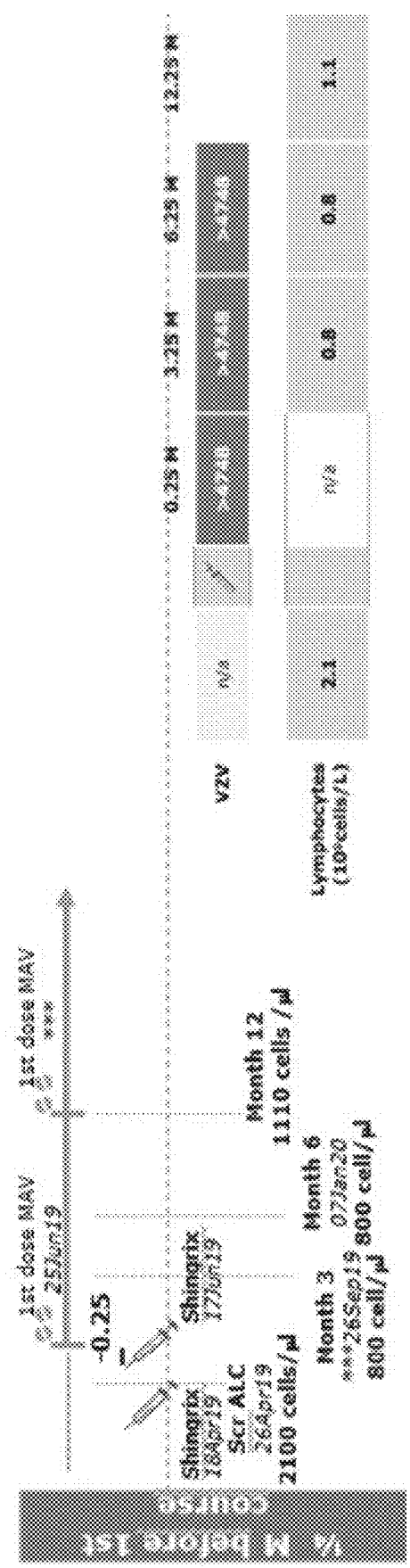
FIG. 15A: Summary of Antibody titers and ALC results of 8 Influenza/1 SHINGRIX® treated patients discussed in example 4.
Figure 15B:
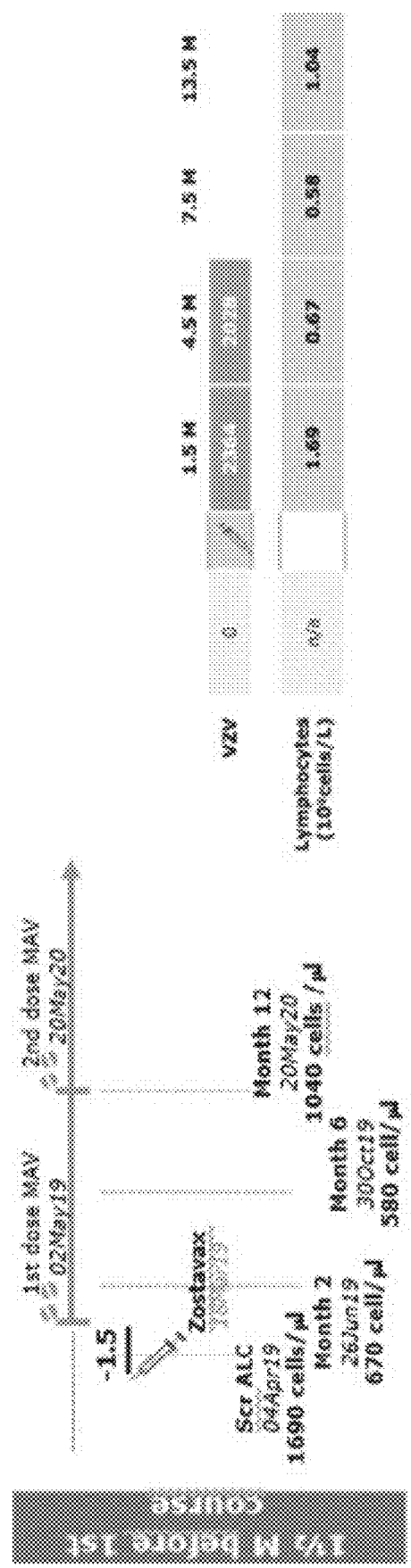
FIG. 15B: Summary of Antibody titers and ALC results of 8 Influenza/1 SHINGRIX® treated patients discussed in example 4.
Figure 15C:
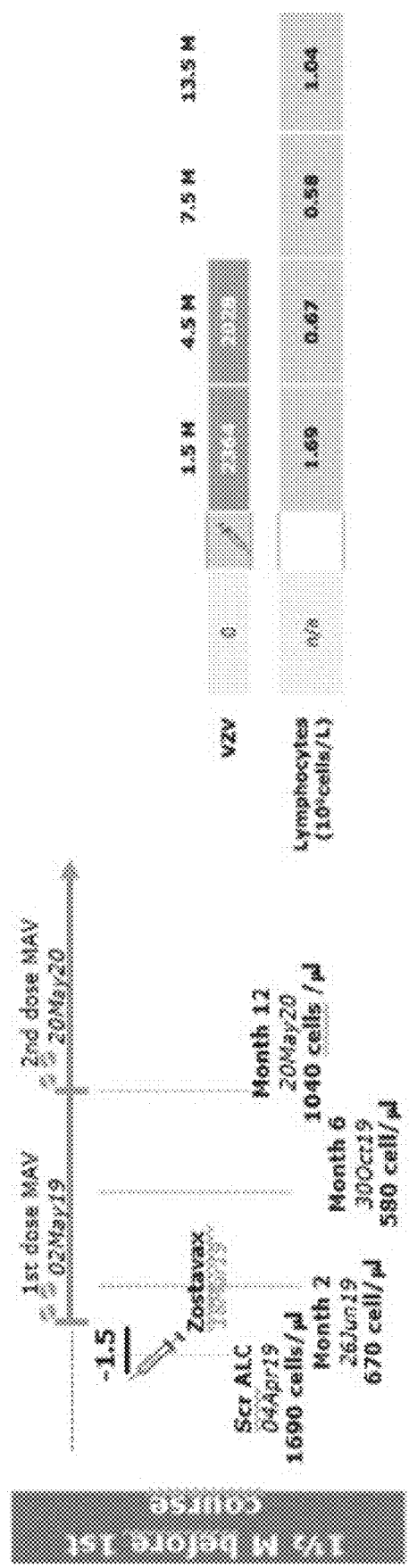
FIG. 15C: Summary of Antibody titers and ALC results of 8 Influenza/1 SHINGRIX® treated patients discussed in example 4.

VZV vaccines: In the post-vaccination samples from the patient receiving the VZV vaccine (Table 2: Shingrix: 70056800222530003 or Zostavax: 70056800221620004, 70056800221260001) the antibody titer was above the level of protective titer (≥100 IU/L) at all time points examined and maintained throughout MAVENCLAD® treatment. VZV titers were maintained in Shingrix case up to 6 months despite reduction of lymphocytes after MAVENCLAD® first treatment course to 800 cells/ml. For the Zostavax treatments, seropositivness was maintained for 4.5 or 5.25 month despite cladribine induced Grade 2 and Grade 1 lymphopenia and low mature B cells counts (FIGS. 15A-15C).

Influenza: In the post-vaccination blood samples from patients vaccinated against influenza A and B during year 1 or 2 of cladribine tablets, the antibody titers were above the limit for seroprotection (HAI≥40) for all strains present in the vaccine. All vaccinated MAGNIFY patients were able to mount an immune response regardless of the time of vaccination (in year 1 and 2 of cladribine treatment), the lymphocyte counts or B cell subtype (example: CD19+ and CD20+ mature B cells) counts (FIGS. 15A-15C). Postvaccination data of all patients vaccinated with different Influenza strains show 92-100% seroprotection. Influenza A strains (H1N1/H3N2) and the Influenza B strain (Victoria) show a 11%, 13% and 8% in 4-fold increase in postvaccination antibody titers. A 2-fold change AB titer was seen in all strains at a rate of 17-67%.

TABLE 16

| Influenza strains | Patients vaccinated | Pre-vacc seroprotection | Post-vacc seroprotection | 2-fold change | 4-fold change |
| --- | --- | --- | --- | --- | --- |
| H1N1 (BrisbaneA) | 9 | 100% | 100% | 22% | 11% |
| H3N2 (Kansas A) | 8 | 100% | 100% | 38% | 13% |
| H1N1 (MichiganA) | 3 | 100% | 100% | 33% | 0% |
| H3N2 (SingaporeA) | 3 | 33% | 100% | 67% | 0% |
| Victoria (Colorado/B) | 12 | 83% | 92% | 17% | 8% |
| Yamagata (Phuket/B) | 12 | 75% | 92% | 17% | 0% |

Summary of Antibody Titers and ALC Results of 8 Influenza/1 Shingrix Treated Patients (FIGS. 15A-15C)

All patients vaccinated against influenza A and B during year 1 or 2 of CT treatment retained seroprotection titers of ≥40 in post-vaccination samples across all strains present in the vaccine administered, despite the differences in vaccination timepoints and absolute lymphocyte counts. The proportion of previously seropositive patients (HAI≥40) with a ≥4-fold and ≥2-fold increase against at least 1 strain in post-vaccination titers were 37.5% (3/8) and 87.5% (7/8), respectively. The antibody effect was compared to the total lymphocyte counts in samples taken at available adjacent timepoints to the vaccination for the 8 patients analysed. ALC counts at time of vaccination were from covering a wide severity range from Grade 3, 2, 1 to normal levels. For the Shingrix treated patient, post-vaccination antibody titers were 40-fold increased (titers >4748 IU/L) at all time points baseline or month 3 and 6 after MAVENCLAD® treatment.

In conclusion, in this small retrospective investigation, post-vaccination antibody titers in patients treated with CT for relapsing MS remained at levels to offer protective immunity against the seasonal influenza and Shingrix vaccines despite the fact that vaccination was done at various timepoints before or after cladribine treatment.

A Detailed Description of Some of the Vaccination Cases: Immunophenotyping Results We also looked in more detail at the single vaccinated patients (FIGS. 15A-15C) to better understand the underlying immunological changes associated with Cladribine treatment and a potential vaccination response. We were mostly interested in blood ALC, CD20+ mature B cell and memory B cell counts to define potential nadir values with respect to time of vaccination and Short lived plasmablasts and CD38 m$^{bright}$ plasmacell numbers, in order to see if we can detect a vaccination response.

Most interestingly we saw in 3 patients (FIGS. 15A-15C: Patient 70056800222530003, 70056800221620004, 70056800227010005) transient increases in Short lived plasma cells and CD38$^{bright}$ Plasmacells, indicative of a vaccination response. As reviewed by Finke et al 2012, the appearance of PB in the blood is transient after vaccination—the magnitude of the PB response at day 7 is predictive for antibody titers at day 28.

Activated B cells proliferate and differentiate into antibody-producing cells, short lived and long-lived plasma cells (SLPCs and LLPCs), and memory B cells ($B_{mem}$) after immunization. SLPCs are found in extrafollicular sites, such as the red pulp of the spleen and medullary chords of the lymph nodes, while LLPC are located in other organs such as the bone marrow (BM) and gut-associated lymphoid tissues (GALT) where they produce antibodies for long periods of time.

What is the phenotype and the origin plasmablasts in the context of viral infections or vaccination and can plasma cells be predictors of long-lived immunity? Several studies have analysed the kinetics and phenotypic changes of B cell subtypes in the blood of vaccinated or infected individuals (reviewed in Finke 2012). Differentiation into plasmablasts (PB) is most commonly monitored with surface markers CD19, CD20, CD27, CD38, and CD138 and intracellular marker Ki-67. The term acute plasmablasts were used in various papers to associate the CD19lowCD20-CD27highCD38highCD138+/− cells appearing after infection & vaccination with the acute phase of the immune response and to differentiate them from steady-state plasmablasts. The timing of acute PB appearance in the blood is strikingly consistent after immunization or infection: Flow cytometry analysis or ELISPOT performed ex vivo with human PBMCs sampled daily after vaccination with attenuated yellow fever strain YF-17D, inactivated influenza vaccine, tetanus vaccine, and after infection with Respiratory Syncytial Virus or dengue virus showed that plasmablast numbers peak consistently at day 6 or 7. The response thus seems to be independent of the adjuvant used and independent of the route of immunization. The appearance of PB in the blood is transient after vaccination (Odendahl et al., 2005; Lee et al., 2011) whereas the duration of the response depends on the persistence of the virus after natural infection.

A recent study with HIV-infected persons on anti-retroviral treatment who were vaccinated with H1N1 vaccine and could be grouped into a responder and a non-responder group showed that the PB response at day 7 was predictive for the establishment of memory and for specific antibody titers at day 28. The study further showed that induction of PB and memory populations correlated with the capacity of B cells to upregulate IL-21 receptor, which differed in the responder- and non-responder group (Pallikkuth et al., 2011). Given these lines of evidence that the early PB response may be predictive for later immunity, it is crucial to understand the origin(s) of plasmablasts in the context if a given antigen and adjuvant in order to specifically generate B cell subsets which can be triggered during repeated infection. Early in vitro experiments with human naïve and memory B cells from tonsils demonstrated that memory B cells differentiate faster and more efficiently into plasmablasts than naïve B cells after unspecific activation with CD40L and in the presence of IL-2 and IL-10 (Arpin et al., 1997). More recent studies using Ig sequencing of single plasma blasts and memory B cells to analyze their relation in the context of tetanus vaccination indicated that a given memory B cell precursor can give rise to plasma blasts and memory cells at the same time (Frolich et al., 2010).

All these data indicate that PBs circulating in the blood at day 6-7 after infection or immunization (acute PBs) are memory B cell-derived. The similar timing of the appearance of acute PBs after primary and booster immunization at least in the context of viral infections suggests that memory B cells can be the source of such PBs in both scenarios.

We have used the following Plasma cell markers to study two plasmacell populations in our MAGNIFY Substudy also covering the Vaccinated patients:

Short-lived plasma cells: CD45bright, SSClow, CD3−, CD14−, CD56−, CD19dim, CD20−/dim, CD27bright
CD38$^{bright}$ plasma cells: CD45bright, SSClow, CD3−, CD14−, CD56−, CD19dim, CD20−, CD38brigh Influenza Treated MAGNIFY Patients (FIGS. 15A-15C):

Patient 70056800227010005: This patient was vaccinated three and a half Month (3.5M) after the 1rst MAVENCLAD® course. A ≥4 fold rise in titers seen against 2 Influenca strains, in the other 2 strains, titers were maintained at the protective level (i.e. not <40). Both ALC and number of CD20+ mature B cells (FIG. 3) were around nadir levels at vaccination time. The ALC at vaccination timepoint was at Grade 2 (600 cells/ml) as measured at the end of the 3 month timepoint. At Month 6 (M6) absolute lymphocyte levels increase to 900 cells/mL. Despite the fact that CD20+ B cells reached a −72% reduction at Month 3 (M3) (65 cells/mL), 2 weeks before vaccination, increase and maintained titers were seen over additional 4.5 month after vaccination. CD20+ B cells increase cells at month 6 (135 cells/ml) and reach normal levels at Month 12 (M12) (230 cells/ml).

In line with Finke (2012) describing PBs/PCs increase after viral infection or vaccination. CD38$^{bright}$ Plasma cells increase 3.3-fold (from 822 cells/ml at Month 2 (M2) to 2716 cells/ml at end of Month 3 (M3)), 2 weeks after vaccination and counts decrease afterwards. Short lived PCs (CD27$^{bright}$) increase 3.3-fold (from 831 cells/ml at Month 2 (M2) to 2762 cells/ml at the end of month 3 (M3) after cladribine treatment, 2 weeks after vaccination). IgG immunoglobulin levels were not affected at any timepoint after Mavenclad treatment.

Patient 70056800222520001: This patient vaccinated with Influenza vaccine at Month 4 (M4) confirms the previous findings with patient70056800227010005. A ≥2-fold rise in titers seen against 2 Influenza strains, in the other 2 strains, titers were maintained at the protective level (ie not <40). ALC counts were around nadir levels at vaccination time and should be therefore lower than 600 cells/mL measured at month 2. Despite these low levels at time of vaccination, the antibody response was protective. Since we are missing month 3 and 4 count data for CD20+ mature B cells, we can only state that the nadir of CD20+ B cells has been described around 2-3 month in the MAGNIFY study. IgG levels were not affected, despite—80% memory B cell decrease still seen at month 6 after MAVENCLAD® treatment.

Patient: 70056800222010002: This patient was vaccinated 33 days after starting the second year MAVENCLAD® treatment course. A ≥4-fold rise in titers was seen against one Influenza strain. For the other 3 strains, titers were maintained at the protective level (i.e. not <40). Absolute Lymphocyte levels at month 14, 1 month after vaccination were 700 cells/ml.

In Summary:
All MAGNIFY patients were able to mount a response regardless of the time of vaccination in Year 1 treatment course (Y1)/Year 2 treatment course (Y2), or lymphocyte counts In the post-vaccination samples from the patient receiving the varicella zoster virus (VZV) vaccine, the antibody titer was above the level of protective titer (≥100 IU/L) at all time points examined.

In the post-vaccination blood samples from patients vaccinated against influenza A and B during year 1 or 2 of cladribine tablets, the antibody titers were above the limit for seroprotection (HAI≥40) for all strains present in the vaccine.

Details with regard to every patient of said vaccination studies are given in the tables below:

Patient Spain 2-70056800227010013
Vaccinated 49 days after first dose of Mavenclad course 1 against Influenza strains H1N1 (MichiganA), H3N2 (SingaporeA), Victoria (Colorado/B) and Yamagata (Phuket/B)

| Trial month | Scr | 0[1] | 1 | 2 | 3 | 6 | 12 | 14 | 15 | 18 | End |
|---|---|---|---|---|---|---|---|---|---|---|---|
| Weeks before/after vaccination | −17.1 | −7.1 | −2.0 | 3.0 | 5.9 | 18.6 | 44.7 | 54.0 | 59.0 | 70.7 | |
| Weeks before/after first dose of previous Mavenclad course | −10.1 | −0.1 | 5.0 | 10.0 | 12.9 | 25.6 | 51.7 | 8.4 | 13.4 | 25.1 | |
| H1N1 (BrisbaneA) | | | | | | | | | | | |
| H3N2 (Kansas A) | | | | | | | | | | | |
| H1N1 (MichiganA)* | | 160 | | | 320 | 320 | | | | | |
| H3N2 (SingaporeA)* | | 20 | | | 20 | 40 | | | | | |
| Victoria (Colorado/B)* | | 20 | | | 20 | 20 | | | | | |
| Yamagata (Phuket/B)* | | 20 | | | 20 | 20 | | | | | |
| IgG [mg/dL] | | 1270 | | | | 1110 | 1170 | 1140 | | 1050 | 1080 |
| IgM [mg/dL] | | 311 | | | | 224 | 230 | 227 | | 155 | 193 |
| ALC[2] [cells/μL] | 1200 | | | 600 | | 700 | 900 | | | | |
| CD19+ B-cells [cells/μL] | | | 32 | 37 | 77 | 180 | 375 | 27 | | 98 | 166 |

-continued

Patient Spain 2-70056800227010013
Vaccinated 49 days after first dose of Mavenclad course 1 against Influenza strains H1N1
(MichiganA), H3N2 (SingaporeA), Victoria (Colorado/B) and Yamagata (Phuket/B)

| Trial month | Scr | 0[1] | 1 | 2 | 3 | 6 | 12 | 14 | 15 | 18 | End |
|---|---|---|---|---|---|---|---|---|---|---|---|
| CD20+ B-cells [cells/μL] | | | 31 | 36 | 76 | 178 | 372 | 27 | 97 | 165 | |
| Memory B-cells [cells/μL] | | | 2.7 | 1.6 | 1.5 | 2.8 | 2.7 | 0.2 | 0.6 | 1.0 | |
| CD69+ activated B-cells [cells/μL] | | | 0.9 | 1.0 | 2.0 | 7.2 | 6.5 | 0.4 | 2.2 | 2.7 | |
| CD38+ Plasma cells [cells/μL] | | | 0.6 | 0.3 | 0.3 | 0.9 | 0.5 | 0.1 | 0.5 | 0.3 | |
| Short-lived PCs [cells/μL] | | | 0.6 | 0.3 | 0.1 | 0.8 | 0.4 | <LLOQ | 0.2 | 0.2 | |
| CD16+ CD56+ NK-cells [cells/μL] | | | 124 | 209 | 116 | 201 | 258 | 169 | 156 | 203 | |
| CD3+ T-cells [cells/μL] | | | 490 | 594 | 420 | 393 | 486 | 290 | 276 | 290 | |

Scr: Screening; End: end of trial; MAV: Mavenclad; IgG: Immunoglobulin G; IgM: Immunoglobulin M; ALC: approximate lymphocyte count; LLOQ: lower limit of quantitation
[1]Month 0 blood was collected up to 6 days before first Mavenclad dose
[2]Date of ALC measurements may vary from other measurements by up to 7 days
*vaccinated Influenza strains Patient Spain 2-70056800227010013-Extended Panel[#)]
Vaccinated 49 days after first dose of Mavenclad course 1 against Influenza strains H1N1
(MichiganA), H3N2 (SingaporeA), Victoria (Colorado/B) and Yamagata (Phuket/B)

| Trial month | Scr | 0[1] | 1 | 2 | 3 | 6 | 12 | 14 | 15 | 18 | End |
|---|---|---|---|---|---|---|---|---|---|---|---|
| Weeks before/after vaccination | −17.1 | −7.1 | −2.0 | 3.0 | 5.9 | 18.6 | 44.7 | 54.0 | 59.0 | 70.7 | |
| Weeks before/after first dose of previous Mavenclad course | −10.1 | −0.1 | 5.0 | 10.0 | 12.9 | 25.6 | 51.7 | 8.4 | 13.4 | 25.1 | |
| H1N1 (BrisbaneA) | | | | | | | | | | | |
| H3N2 (Kansas A) | | | | | | | | | | | |
| H1N1(MichiganA)* | | 160 | | 320 | 320 | | | | | | |
| H3N2(SingaporeA)* | | 20 | | 20 | 40 | | | | | | |
| Victoria (Colorado/B)* | | 20 | | 20 | 20 | | | | | | |
| Yamagata (Phuket/B)* | | 20 | | 20 | 20 | | | | | | |
| IgG [mg/dL] | | 1,270 | | | 1,110 | 1,170 | 1,140 | | 1,050 | 1,080 | |
| IgM [mg/dL] | | 311 | | | 224 | 230 | 227 | | 155 | 193 | |
| ALC[2] [cells/μL] | 1,200 | | | 600 | | 700 | 900 | | | | |
| CD19+ B-cells | | | 32 | 37 | 77 | 180 | 375 | 27 | 98 | 166 | |
| CD20+ B-cells | | | 30.6 | 35.5 | 75.6 | 177.9 | 371.9 | 26.7 | 97.1 | 164.6 | |
| Naïve B-cells | | | 26.5 | 32.7 | 72.9 | 173.0 | 364.5 | 25.8 | 94.9 | 160.0 | |
| Regulatory B-cells | | | 8.4 | 18.5 | 61.1 | 54.6 | 23.9 | 15.8 | 48.3 | 35.4 | |
| Transitional B-cells | | | 6.5 | 12.8 | 39.9 | 25.8 | 22.1 | 10.0 | 28.9 | 42.6 | |
| Memory B-cells | | | 2.7 | 1.6 | 1.5 | 2.8 | 2.7 | 0.2 | 0.6 | 1.0 | |
| CD69+ actv. B-cells | | | 0.9 | 1.0 | 2.0 | 7.2 | 6.5 | 0.4 | 2.2 | 2.7 | |
| CD38+ Plasma cells | | | 0.6 | 0.3 | 0.3 | 0.9 | 0.5 | 0.1 | 0.5 | 0.3 | |
| Short-lived PCs | | | 0.6 | 0.3 | 0.1 | 0.8 | 0.4 | <LLOQ | 0.2 | 0.2 | |
| CD3+ TC | | | 490 | 594 | 420 | 393 | 486 | 290 | 276 | 290 | |
| CD4+ TC | | | 287 | 217 | 171 | 158 | 267 | 113 | 107 | 128 | |
| CD8+ TC | | | 180 | 358 | 240 | 212 | 218 | 169 | 163 | 154 | |
| CD4+ cent. mem. TC | | | | | 47.8 | 36.4 | 96.9 | | 22.8 | 23.8 | |
| CD4+ eff. mem. TC | | | | | 109.1 | 104.6 | 130.0 | | 80.8 | 91.2 | |
| CD4+ naïve TC | | | | | 13.3 | 15.8 | 39.0 | | 2.7 | 12.2 | |
| CD4+ Th1 TC | | | | | 86.3 | 79.1 | 140.7 | | 60.5 | 56.2 | |
| CD4+ Treg | | | | | 25.4 | 18.6 | 24.1 | | 14.5 | 15.3 | |
| CD8+ naïve TC | | | | | 10.7 | 10.2 | 29.2 | | 4.5 | 11.1 | |
| CD8+ cent. mem. TC | | | | | 9.5 | 6.2 | 15.5 | | 5.1 | 6.5 | |
| CD8+ eff. mem. TC | | | | | 62.8 | 83.9 | 63.2 | | 50.9 | 36.9 | |
| CD8+ term. diff. effector TC | | | | | 157.0 | 111.8 | 110.2 | | 102.5 | 99.5 | |
| CD4+ Th 17 TC | | | | | 4.0 | 2.0 | 3.9 | | 2.3 | 2.9 | |
| CD4+ Th2 TC | | | | | 70.0 | 56.2 | 78.9 | | 33.4 | 64.9 | |
| CD16+ CD56+ NKC | | | 124 | 209 | 116 | 201 | 258 | 169 | 156 | 203 | |

Patient Spain 3-70056800227050006
Vaccinated 72 days after first dose of Mavenclad course 1 against Influenza strains H1N1
(MichiganA), H3N2 (SingaporeA), Victoria (Colorado/B) and Yamagata (Phuket/B)

| Trial month | Scr | 0[1] | 1 | 2 | 3 | 6 | 12 | 14 | 15 | 18 | End |
|---|---|---|---|---|---|---|---|---|---|---|---|
| Weeks before/after vaccination | -17.4 | -10.3 | -6.4 | -1.3 | 2.9 | 15.7 | 40.1 | 51.9 | 55.0 | 69.0 | 94.7 |
| Weeks before/after first dose of previous Mavenclad course | -7.1 | 0.0 | 3.9 | 9.0 | 13.1 | 26.0 | 50.4 | 9.1 | 12.3 | 26.3 | 52.0 |
| H1N1 (BrisbaneA) | | | | | | | | | | | |
| H3N2 (Kansas A) | | | | | | | | | | | |
| H1N1 (MichiganA)* | | 240 | | 80 | >1280 | >1280 | | | | | |
| H3N2 (SingaporeA)* | | 40 | | 20 | 80 | 40 | | | | | |
| Victoria (Colorado/B)* | | 20 | | 20 | 40 | 60 | | | | | |
| Yamagata (Phuket/B)* | | 20 | | 30 | 40 | 40 | | | | | |
| IgG [mg/dL] | | 1100 | | | 1080 | | 1080 | 1050 | 1240 | 1080 | 1050 |
| IgM [mg/dL] | | 152 | | | 134 | | 114 | 110 | 110 | 95 | 92 |
| ALC[2] [cells/μL] | 1420 | | | 930 | | 800 | 900 | | | | |
| CD19+ B-cells [cells/μL] | | 377 | 135 | 41 | 40 | 64 | 134 | 25 | 28 | 59 | 79 |
| CD20+ B-cells [cells/μL] | | 371 | 130 | 39 | 38 | 60 | 132 | 23 | 27 | 57 | 75 |
| Memory B-cells [cells/μL] | | 116.5 | 40.7 | 12.0 | 8.4 | 8.6 | 19.5 | 6.8 | 5.1 | 8.7 | 12.4 |
| CD69+ activated B-cells [cells/μL] | | 5.3 | 2.5 | 1.0 | 1.0 | 0.8 | 2.8 | 0.6 | 0.6 | 0.9 | 1.4 |
| CD38+ Plasma cells [cells/μL] | | 3.2 | 2.9 | 1.1 | 0.7 | 3.0 | 0.7 | 1.1 | 0.4 | 0.7 | 2.3 |
| Short-lived PCs [cells/μL] | | 3.0 | 3.0 | 1.0 | 0.6 | 1.8 | 0.9 | 1.0 | 0.3 | 0.4 | 2.0 |
| CD16+ CD56+ NK-cells [cells/μL] | | 234 | 146 | 100 | 75 | 136 | 130 | 162 | 96 | 159 | 171 |
| CD3+ T-cells [cells/μL] | | 1563 | 1.093 | 761 | 422 | 510 | 621 | 609 | 557 | 564 | 565 |

Scr: Screening; End: end of trial; MAV: Mavenclad; IgG: Immunoglobulin G; IgM: Immunoglobulin M; ALC: approximate lymphocyte count; LLOQ: lower limit of quantitation
[1]Month 0 blood was collected up to 6 days before first Mavenclad dose
[2]Date of ALC measurements may vary from other measurements by up to 7 days
*vaccinated Influenza strains Patient Spain 3-70056800227050006-Extended Panel[#)]
Vaccinated 72 days after first dose of Mavenclad course 1 against Influenza strains H1N1
(MichiganA), H3N2 (SingaporeA), Victoria (Colorado/B) and Yamagata (Phuket/B)

| Trial month | Scr | 0[1] | 1 | 2 | 3 | 6 | 12 | 14 | 15 | 18 | End |
|---|---|---|---|---|---|---|---|---|---|---|---|
| Weeks before/after vaccination | -17.4 | -10.3 | -6.4 | -1.3 | 2.9 | 15.7 | 40.1 | 51.9 | 55.0 | 69.0 | 94.7 |
| Weeks before/after first dose of previous Mavenclad course | -7.1 | 0.0 | 3.9 | 9.0 | 13.1 | 26.0 | 50.4 | 9.1 | 12.3 | 26.3 | 52.0 |
| H1N1 (BrisbaneA) | | | | | | | | | | | |
| H3N2 (Kansas A) | | | | | | | | | | | |
| H1N1(MichiganA)* | | 240 | | 80 | >1280 | >1280 | | | | | |
| H3N2(SingaporeA)* | | 40 | | 20 | 80 | 40 | | | | | |
| Victoria (Colorado/B)* | | 20 | | 20 | 40 | 60 | | | | | |
| Yamagata (Phuket/B)* | | 20 | | 30 | 40 | 40 | | | | | |
| IgG [mg/dL] | | 1,100 | | | 1,080 | | 1,080 | 1,050 | 1,240 | 1,080 | 1,050 |
| IgM [mg/dL] | | 152 | | | 134 | | 114 | 110 | 110 | 95 | 92 |
| ALC[2] [cells/μL] | 1,420 | | | 930 | | 800 | 900 | | | | |
| CD19+ B-cells | | 377 | 135 | 41 | 40 | 64 | 134 | 25 | 28 | 59 | 79 |
| CD20+ B-cells | | 371.0 | 129.9 | 39.2 | 38.4 | 60.2 | 132.2 | 23.4 | 27.5 | 56.9 | 74.7 |
| Naïve B-cells | | 243.6 | 82.3 | 23.6 | 26.9 | 49.2 | 108.5 | 14.9 | 20.4 | 45.7 | 59.2 |
| Regulatory B-cells | | 26.2 | 7.2 | 13.3 | 18.1 | 19.9 | 9.2 | 5.4 | 5.0 | 3.9 | 3.7 |
| Transitional B-cells | | 41.0 | 13.8 | 12.1 | 13.8 | 9.3 | 28.0 | 5.7 | 8.3 | 8.0 | 8.2 |
| Memory B-cells | | 116.5 | 40.7 | 12.0 | 8.4 | 8.6 | 19.5 | 6.8 | 5.1 | 8.7 | 12.4 |
| CD69+ actv. B-cells | | 5.3 | 2.5 | 1.0 | 1.0 | 0.8 | 2.8 | 0.6 | 0.6 | 0.9 | 1.4 |
| CD38+ Plasma cells | | 3.2 | 2.9 | 1.1 | 0.7 | 3.0 | 0.7 | 1.1 | 0.4 | 0.7 | 2.3 |
| Short-lived PCs | | 3.0 | 3.0 | 1.0 | 0.6 | 1.8 | 0.9 | 1.0 | 0.3 | 0.4 | 2.0 |
| CD3+ TC | | 1,563 | 1,093 | 761 | 422 | 510 | 621 | 609 | 557 | 564 | 565 |
| CD4+ TC | | 992 | 682 | 498 | 268 | 323 | 411 | 376 | 338 | 353 | 362 |
| CD8+ TC | | 477 | 319 | 220 | 123 | 159 | 173 | 182 | 193 | 176 | 173 |

Patient Spain 3-70056800227050006-Extended Panel[#)]
Vaccinated 72 days after first dose of Mavenclad course 1 against Influenza strains H1N1
(MichiganA), H3N2 (SingaporeA), Victoria (Colorado/B) and Yamagata (Phuket/B)

| Trial month | Scr | 0[1] | 1 | 2 | 3 | 6 | 12 | 14 | 15 | 18 | End |
|---|---|---|---|---|---|---|---|---|---|---|---|
| CD4+ cent. mem. TC | | 391.0 | | | 117.9 | 124.1 | 142.3 | | 97.6 | 146.5 | 102.3 |
| CD4+ eff. mem. TC | | 232.0 | | | 66.1 | 93.5 | 147.6 | | 124.2 | 108.9 | 155.2 |
| CD4+ naïve TC | | 365.6 | | | 83.0 | 104.0 | 119.4 | | 112.9 | 95.3 | 97.9 |
| CD4+ Th1 TC | | 378.5 | | | 99.6 | 121.9 | 153.5 | | 130.7 | 155.8 | 156.7 |
| CD4+ Treg | | 75.4 | | | 18.3 | 28.4 | 37.6 | | 36.7 | 38.7 | 33.8 |
| CD8+ naïve TC | | 170.0 | | | 31.2 | 41.4 | 46.2 | | 42.2 | 39.9 | 31.2 |
| CD8+ cent. mem. TC | | 31.4 | | | 11.1 | 11.2 | 11.1 | | 8.8 | 16.8 | 6.1 |
| CD8+ eff. mem. TC | | 195.7 | | | 62.9 | 78.6 | 89.3 | | 99.1 | 83.8 | 88.4 |
| CD8+ term. diff. effector TC | | 80.0 | | | 17.8 | 27.9 | 26.4 | | 43.0 | 35.5 | 47.4 |
| CD4+ Th 17 TC | | 25.6 | | | 7.2 | 12.2 | 11.3 | | 12.0 | 18.7 | 23.6 |
| CD4+ Th2 TC | | 446.2 | | | 124.5 | 146.3 | 169.6 | | 148.2 | 135.2 | 118.2 |
| CD16+ CD56+ NKC | | 234 | 146 | 100 | 75 | 136 | 130 | 162 | 96 | 159 | 171 |

Patient Canada 1-70056800222520001
Vaccinated 104 days after first dose of Mavenclad course 1 against Influenza strains H1N1
(BrisbaneA), H3N2 (KansasA), Victoria (Colorado/B) and Yamagata (Phuket/B)

| Trial month | Scr | 0[1] | 1 | 2 | 3 | 6 | 12 | 14 | 15 | 18 | End |
|---|---|---|---|---|---|---|---|---|---|---|---|
| Weeks before/after vaccination | | −24.9 | −17.3 | | −5.3 | −2.0 | 11.9 | | | 36.7 | |
| Weeks before/after first dose of previous Mavenclad course | | −10.0 | −2.4 | | 9.6 | 12.9 | 26.7 | | | 51.6 | |
| H1N1 (BrisbaneA)* | | 80 | | | 80 | 80 | 80 | | | | |
| H3N2 (Kansas A)* | | 40 | | | 40 | 80 | 40 | | | | |
| H1N1 (MichiganA) | | 160 | | | 320 | 320 | 160 | | | | |
| H3N2 (SingaporeA) | | 320 | | | 320 | 160 | 160 | | | | |
| Victoria (Colorado/B)* | | 40 | | | 40 | 40 | 40 | | | | |
| Yamagata (Phuket/B)* | | 40 | | | 20 | 40 | 20 | | | | |
| IgG [mg/dL] | | 894 | | | 971 | 954 | 1010 | | | | |
| IgM [mg/dL] | | 54 | | | 52 | 51 | 46 | | | | |
| ALC[2] [cells/μL] | 1200 | | | 600 | | 1000 | 1100 | | | | |
| CD19+ B-cells [cells/μL] | | 138 | | | 44 | 136 | 231 | | | | |
| CD20+ B-cells [cells/μL] | | 135 | | | | 134 | 228 | | | | |
| Memory B-cells [cells/μL] | | 29.9 | | | | 6.4 | 10.7 | | | | |
| CD69+ activated B-cells [cells/μL] | | 1.5 | | | | 0.9 | 3.8 | | | | |
| CD38+ Plasma cells [cells/μL] | | 1.0 | | | | 0.7 | 1.0 | | | | |
| Short-lived PCs [cells/μL] | | 1.3 | | | | 0.8 | 1.2 | | | | |
| CD16+ CD56+ NK-cells [cells/μL] | | 183 | | | 143 | 176 | 197 | | | | |
| CD3+ T-cells [cells/μL] | | 597 | | | 512 | 603 | 707 | | | | |

Scr: Screening; End: end of trial; MAV: Mavenclad; IgG: Immunoglobulin G; IgM: Immunoglobulin M; ALC: approximate lymphocyte count; LLOQ: lower limit of quantitation
[1]Month 0 blood was collected up to 6 days before first Mavenclad dose
[2]Date of ALC measurements may vary from other measurements by up to 7 days
*vaccinated Influenza strains Patient Canada 1-70056800222520001-Extended Panel#)
Vaccinated 104 days after first dose of Mavenclad course 1 against Influenza strains H1N1
(BrisbaneA), H3N2 (KansasA), Victoria (Colorado/B) and Yamagata (Phuket/B)

| Trial month | Scr | 0[1] | 1 | 2 | 3 | 6 | 12 | 14 | 15 | 18 | End |
|---|---|---|---|---|---|---|---|---|---|---|---|
| Weeks before/after vaccination | −24.9 | −17.3 | | −5.3 | −2.0 | 11.9 | 36.7 | | | | |
| Weeks before/after first dose of previous Mavenclad course | −10.0 | −2.4 | | 9.6 | 12.9 | 26.7 | 51.6 | | | | |
| H1N1 (BrisbaneA)* | | 80 | | | 80 | 80 | 80 | | | | |
| H3N2 (Kansas A)* | | 40 | | | 40 | 80 | 40 | | | | |
| H1N1(MichiganA) | | 160 | | | 320 | 320 | 160 | | | | |
| H3N2(SingaporeA) | | 320 | | | 320 | 160 | 160 | | | | |
| Victoria (Colorado/B)* | | 40 | | | 40 | 40 | 40 | | | | |
| Yamagata (Phuket/B)* | | 40 | | | 20 | 40 | 20 | | | | |
| IgG [mg/dL] | | 894 | | | 971 | 954 | 1,010 | | | | |
| IgM [mg/dL] | | 54 | | | 52 | 51 | 46 | | | | |
| ALC[2] [cells/μL] | 1,200 | | | 600 | | 1,000 | 1,100 | | | | |
| CD19+ B-cells | | 138 | | | 44 | 136 | 231 | | | | |
| CD20+ B-cells | | 134.6 | | | | 133.8 | 228.1 | | | | |
| Naïve B-cells | | 98.4 | | | | 124.4 | 215.0 | | | | |
| Regulatory B-cells | | 4.3 | | | | 17.0 | 7.2 | | | | |
| Transitional B-cells | | 4.6 | | | | 14.2 | 11.3 | | | | |
| Memory B-cells | | 29.9 | | | | 6.4 | 10.7 | | | | |
| CD69+ actv. B-cells | | 1.5 | | | | 0.9 | 3.8 | | | | |
| CD38+ Plasma cells | | 1.0 | | | | 0.7 | 1.0 | | | | |
| Short-lived PCs | | 1.3 | | | | 0.8 | 1.2 | | | | |
| CD3+ TC | | 597 | | | 512 | 603 | 707 | | | | |
| CD4+ TC | | 460 | | | 282 | 360 | 422 | | | | |
| CD8+ TC | | 148 | | | 218 | 226 | 274 | | | | |
| CD4+ cent. mem. TC | | 187.0 | | | 64.2 | 118.4 | 142.2 | | | | |
| CD4+ eff. mem. TC | | 75.6 | | | 163.6 | 190.1 | 170.2 | | | | |
| CD4+ naïve TC | | 169.3 | | | 21.4 | 32.7 | 65.6 | | | | |
| CD4+ Th1 TC | | 118.9 | | | 95.2 | 192.0 | 158.5 | | | | |
| CD4+ Treg | | 28.8 | | | 19.9 | 28.4 | 28.7 | | | | |
| CD8+ naïve TC | | 36.9 | | | 11.1 | 15.7 | 30.4 | | | | |
| CD8+ cent. mem. TC | | 9.4 | | | 5.7 | 11.5 | 12.4 | | | | |
| CD8+ eff. mem. TC | | 41.0 | | | 51.3 | 80.1 | 60.6 | | | | |
| CD8+ term. diff. effector TC | | 60.7 | | | 150.0 | 118.7 | 170.6 | | | | |
| CD4+ Th 17 TC | | 4.7 | | | 5.0 | 6.6 | 9.3 | | | | |
| CD4+ Th2 TC | | 296.5 | | | 170.8 | 133.9 | 211.8 | | | | |
| CD16+ CD56+ NKC | | 183 | | | 143 | 176 | 197 | | | | |

Patient Spain 1-70056800227010005
Vaccinated 113 days after first dose of Mavenclad course 1 against Influenza strains H1N1
(MichiganA), H3N2 (SingaporeA), Victoria (Colorado/B) and Yamagata (Phuket/B)

| Trial month | Scr | 0[1] | 1 | 2 | 3 | 6 | 12 | 14 | 15 | 18 | End |
|---|---|---|---|---|---|---|---|---|---|---|---|
| Weeks before/after vaccination | −23.6 | −16.3 | −11.3 | −6.3 | −1.3 | 11.7 | 35.6 | 45.7 | 50.7 | 64.7 | 88.4 |
| Weeks before/after first dose of previous Mavenclad course | −7.4 | −0.1 | 4.9 | 9.9 | 14.9 | 27.9 | 51.7 | 9.1 | 14.1 | 28.1 | 51.9 |
| H1N1 (BrisbaneA) | | | | | | | | | | | |
| H3N2 (Kansas A) | | 80 | | | | | | | | | |
| H1N1 (MichiganA)* | | 160 | | | 320 | >1280 | 640 | | | | |
| H3N2 (SingaporeA)* | | 80 | | | 60 | 40 | 80 | | | | |
| Victoria (Colorado/B)* | | 40 | | | 40 | 160 | 80 | | | | |
| Yamagata (Phuket/B)* | | 40 | | | 40 | 40 | 30 | | | | |
| IgG [mg/dL] | | 853 | | | 994 | 1050 | 1090 | | 1030 | 1090 | 1070 |
| IgM [mg/dL] | | 117 | | | 121 | 107 | 98 | | 105 | 90 | 84 |
| ALC[2] [cells/μL] | 800 | | | 600 | | 900 | 1000 | | | | |
| CD19+ B-cells [cells/μL] | | | 19 | 18 | 69 | 140 | 237 | 17 | 63 | | 308 |
| CD20+ B-cells [cells/μL] | | | 17 | 15 | 65 | 135 | 230 | 16 | 61 | | 304 |
| Memory B-cells [cells/μL] | | | 3.0 | 1.9 | 3.0 | 4.3 | 11.5 | 1.5 | 2.3 | | 5.6 |

-continued

Patient Spain 1-70056800227010005
Vaccinated 113 days after first dose of Mavenclad course 1 against Influenza strains H1N1
(MichiganA), H3N2 (SingaporeA), Victoria (Colorado/B) and Yamagata (Phuket/B)

| Trial month | Scr | 0¹ | 1 | 2 | 3 | 6 | 12 | 14 | 15 | 18 | End |
|---|---|---|---|---|---|---|---|---|---|---|---|
| CD69+ activated B-cells [cells/μL] | | | 0.5 | 0.7 | 0.9 | 2.0 | 4.7 | 0.3 | 0.9 | | 1.8 |
| CD38+ Plasma cells [cells/μL] | | | 0.8 | 1.7 | 2.8 | 3.7 | 2.1 | 0.9 | 1.3 | | 2.8 |
| Short-lived PCs [cells/μL] | | | 0.8 | 1.0 | 2.7 | 1.8 | 2.2 | 0.6 | 0.8 | | 1.5 |
| CD16+ CD56+ NK-cells [cells/μL] | | | 68 | 85 | 150 | 182 | 151 | 65 | 149 | | 151 |
| CD3+ T-cells [cells/μL] | | | 579 | 552 | 700 | 676 | 833 | 455 | 631 | | 823 |

Scr: Screening; End: end of trial; MAV: Mavenclad; IgG: Immunoglobulin G; IgM: Immunoglobulin M; ALC: approximate lymphocyte count; LLOQ: lower limit of quantitation
¹Month 0 blood was collected up to 6 days before first Mavenclad dose
²Date of ALC measurements may vary from other measurements by up to 7 days
*vaccinated Influenza strains Patient Spain 1-70056800227010005-Extended Panel#)
Vaccinated 113 days after first dose of Mavenclad course 1 against Influenza strains H1N1
(MichiganA), H3N2 (SingaporeA), Victoria (Colorado/B) and Yamagata (Phuket/B)

| Trial month | Scr | 0¹ | 1 | 2 | 3 | 6 | 12 | 14 | 15 | 18 | End |
|---|---|---|---|---|---|---|---|---|---|---|---|
| Weeks before/after vaccination | −23.6 | −16.3 | −11.3 | −6.3 | −1.3 | 11.7 | 35.6 | 45.7 | 50.7 | 64.7 | 88.4 |
| Weeks before/after first dose of previous Mavenclad course | −7.4 | −0.1 | 4.9 | 9.9 | 14.9 | 27.9 | 51.7 | 9.1 | 14.1 | 28.1 | 51.9 |
| H1N1 (BrisbaneA) | | | | | | | | | | | |
| H3N2 (Kansas A) | | 80 | | | | | | | | | |
| H1N1(MichiganA)* | | 160 | | | 320 | >1280 | 640 | | | | |
| H3N2(SingaporeA)* | | 80 | | | 60 | 40 | 80 | | | | |
| Victoria (Colorado/B)* | | 40 | | | 40 | 160 | 80 | | | | |
| Yamagata (Phuket/B)* | | 40 | | | 40 | 40 | 30 | | | | |
| IgG [mg/dL] | | 853 | | | 994 | 1,050 | 1,090 | | 1,030 | 1,090 | 1,070 |
| IgM [mg/dL] | | 117 | | | 121 | 107 | 98 | | 105 | 90 | 84 |
| ALC² [cells/μL] | 800 | | | 600 | | 900 | 1,000 | | | | |
| CD19+ B-cells | | | 19 | 18 | 69 | 140 | 237 | 17 | 63 | | 308 |
| CD20+ B-cells | | | 16.8 | 14.8 | 64.8 | 135.1 | 230.1 | 15.6 | 60.9 | | 303.5 |
| Naïve B-cells | | | 12.9 | 12.6 | 58.4 | 127.2 | 214.0 | 13.3 | 56.2 | | 294.8 |
| Regulatory B-cells | | | 3.3 | 10.5 | 51.5 | 13.3 | 4.3 | 4.6 | 21.4 | | 17.8 |
| Transitional B-cells | | | 3.0 | 9.5 | 19.2 | 17.4 | 23.4 | 6.6 | 15.0 | | 28.8 |
| Memory B-cells | | | 3.0 | 1.9 | 3.0 | 4.3 | 11.5 | 1.5 | 2.3 | | 5.6 |
| CD69+ actv. B-cells | | | 0.5 | 0.7 | 0.9 | 2.0 | 4.7 | 0.3 | 0.9 | | 1.8 |
| CD38+ Plasma cells | | | 0.8 | 1.7 | 2.8 | 3.7 | 2.1 | 0.9 | 1.3 | | 2.8 |
| Short-lived PCs | | | 0.8 | 1.0 | 2.7 | 1.8 | 2.2 | 0.6 | 0.8 | | 1.5 |
| CD3+ TC | | | 579 | 552 | 700 | 676 | 833 | 455 | 631 | | 823 |
| CD4+ TC | | | 447 | 396 | 450 | 466 | 577 | 254 | 298 | | 533 |
| CD8+ TC | | | 118 | 142 | 226 | 193 | 221 | 159 | 260 | | 246 |
| CD4+ cent. mem. TC | | | | | 129.6 | 111.9 | 182.3 | | 71.9 | | 151.8 |
| CD4+ eff. mem. TC | | | | | 97.2 | 111.3 | 89.2 | | 142.4 | | 160.1 |
| CD4+ naïve TC | | | | | 222.0 | 240.4 | 303.8 | | 80.2 | | 218.3 |
| CD4+ Th1 TC | | | | | 112.7 | 102.9 | 174.0 | | 102.7 | | 146.6 |
| CD4+ Treg | | | | | 56.4 | 50.8 | 58.4 | | 44.5 | | 56.4 |
| CD8+ naïve TC | | | | | 30.6 | 29.4 | 70.7 | | 20.4 | | 66.0 |
| CD8+ cent. mem. TC | | | | | 4.5 | 0.5 | 12.0 | | 12.0 | | 13.5 |
| CD8+ eff. mem. TC | | | | | 87.6 | 63.2 | 64.4 | | 142.4 | | 81.3 |
| CD8+ term. diff. effector TC | | | | | 103.3 | 99.8 | 73.8 | | 85.3 | | 85.2 |
| CD4+ Th 17 TC | | | | | 4.9 | 5.3 | 6.4 | | 4.4 | | 5.8 |
| CD4+ Th2 TC | | | | | 290.0 | 299.1 | 327.6 | | 155.4 | | 273.3 |
| CD16+ CD56+ NKC | | | 68 | 85 | 150 | 182 | 151 | 65 | 149 | | 151 |

Patient Finland 1-70056800221620004
Vaccinated 187 days after first dose of Mavenclad course 1 against Influenza strains H1N1
(BrisbaneA), H3N2 (KansasA), Victoria (Colorado/B) and Yamagata (Phuket/B)1

| Trial month | Scr | 0[1] | 1 | 2 | 3 | 6 | 12[2] | 14 | 15 | 18 | End |
|---|---|---|---|---|---|---|---|---|---|---|---|
| Weeks before/after vaccination | −30.7 | 26.7 | | | −14.9 | −0.9 | 28.1 | | 36.1 | 41.1 | |
| Weeks before/after first dose of previous Mavenclad course | −4.0 | 0.0 | | | 11.9 | 25.9 | 54.9 | | 8.0 | 13.0 | |
| H1N1 (BrisbaneA)* | | 80 | | | | 80 | 80 | | | 80 | |
| H3N2 (Kansas A)* | | 80 | | | | 80 | 80 | | | 80 | |
| H1N1 (MichiganA) | | 320 | | | | 320 | 320 | | | 160 | |
| H3N2 (SingaporeA) | | 160 | | | | 80 | 160 | | | 80 | |
| Victoria (Colorado/B)* | | 40 | | | | 40 | 60 | | | 40 | |
| Yamagata (Phuket/B)* | | 80 | | | | 80 | 80 | | | 80 | |
| IgG [mg/dL] | | 931 | | | 926 | 808 | 847 | | | 745 | |
| IgM [mg/dL] | | 95 | | | 75 | 72 | 73 | | | 60 | |
| ALC[2] [cells/μL] | 1690 | | | | | 580 | 1040 | 240 | | | |
| CD19+ B-cells [cells/μL] | | 290 | | | 56 | 139 | 257 | | | 88 | |
| CD20+ B-cells [cells/μL] | | 284 | | | 53 | 137 | 255 | | | 86 | |
| Memory B-cells [cells/μL] | | 44.2 | | | 2.8 | 4.2 | 6.5 | | | 1.3 | |
| CD69+ activated B-cells [cells/μL] | | 3.3 | | | 1.1 | 1.3 | 3.3 | | | 1.0 | |
| CD38+ Plasma cells [cells/μL] | | 2.8 | | | 2.2 | 0.9 | 0.6 | | | 0.3 | |
| Short-lived PCs [cells/μL] | | 2.1 | | | 1.2 | 0.5 | 0.4 | | | 0.2 | |
| CD16+ CD56+ NK-cells [cells/μL] | | 165 | | | 112 | 120 | 183 | | | 86 | |
| CD3+ T-cells [cells/μL] | | 1037 | | | 397 | 364 | 474 | | | 169 | |

Scr: Screening; End: end of trial; MAV: Mavenclad; IgG: Immunoglobulin G; IgM: Immunoglobulin M; ALC: approximate lymphocyte count; LLOQ: lower limit of quantitation
[1]Month 0 blood was collected up to 6 days before first Mavenclad dose
[2]Date of ALC measurements may vary from other measurements by up to 7 days
*vaccinated Influenza strains Patient Finland 1-70056800221620004-Extended Panel[#]
Vaccinated 187 days after first dose of Mavenclad course 1 against Influenza strains H1N1
(BrisbaneA), H3N2 (KansasA), Victoria (Colorado/B) and Yamagata (Phuket/B)

| Trial month | Scr | 0[1] | 1 | 2 | 3 | 6 | 12 | 14 | 15 | 18 | End |
|---|---|---|---|---|---|---|---|---|---|---|---|
| Weeks before/after vaccination | −30.7 | −26.7 | | | −14.9 | −0.9 | 28.1 | | 36.1 | 41.1 | |
| Weeks before/after first dose of previous Mavenclad course | −4.0 | 0.0 | | | 11.9 | 25.9 | 54.9 | | 8.0 | 13.0 | |
| H1N1 (BrisbaneA)* | | 80 | | | | 80 | 80 | | | 80 | |
| H3N2 (Kansas A)* | | 80 | | | | 80 | 80 | | | 80 | |
| H1N1(MichiganA) | | 320 | | | | 320 | 320 | | | 160 | |
| H3N2(SingaporeA) | | 160 | | | | 80 | 160 | | | 80 | |
| Victoria (Colorado/B)* | | 40 | | | | 40 | 60 | | | 40 | |
| Yamagata (Phuket/B)* | | 80 | | | | 80 | 80 | | | 80 | |
| IgG [mg/dL] | | 931 | | | 926 | 808 | 847 | | | 745 | |
| IgM [mg/dL] | | 95 | | | 75 | 72 | 73 | | | 60 | |
| ALC[2] [cells/μL] | 1,690 | | | | | 580 | 1,040 | 240 | | | |
| CD19+ B-cells | | 290 | | | 56 | 139 | 257 | | | 88 | |
| CD20+ B-cells | | 284.3 | | | 53.0 | 137.4 | 255.3 | | | 86.2 | |
| Naïve B-cells | | 235.4 | | | 49.0 | 131.6 | 245.8 | | | 83.3 | |
| Regulatory B-cells | | 6.2 | | | 35.5 | 12.8 | 6.5 | | | 30.5 | |
| Transitional B-cells | | 16.9 | | | 26.2 | 18.5 | 17.8 | | | 29.9 | |
| Memory B-cells | | 44.2 | | | 2.8 | 4.2 | 6.5 | | | 1.3 | |
| CD69+ actv. B-cells | | 3.3 | | | 1.1 | 1.3 | 3.3 | | | 1.0 | |
| CD38+ Plasma cells | | 2.8 | | | 2.2 | 0.9 | 0.6 | | | 0.3 | |
| Short-lived PCs | | 2.1 | | | 1.2 | 0.5 | 0.4 | | | 0.2 | |
| CD3+ TC | | 1,037 | | | 397 | 364 | 474 | | | 169 | |
| CD4+ TC | | 622 | | | 192 | 195 | 266 | | | 94 | |
| CD8+ TC | | 408 | | | 185 | 153 | 188 | | | 74 | |

Patient Finland 1-70056800221620004-Extended Panel[#]
Vaccinated 187 days after first dose of Mavenclad course 1 against Influenza strains H1N1
(BrisbaneA), H3N2 (KansasA), Victoria (Colorado/B) and Yamagata (Phuket/B)

| Trial month | Scr | 0[1] | 1 | 2 | 3 | 6 | 12 | 14 | 15 | 18 | End |
|---|---|---|---|---|---|---|---|---|---|---|---|
| CD4+ cent. mem. TC | | 273.6 | | | 83.9 | 101.3 | 120.0 | | | | |
| CD4+ eff. mem. TC | | 83.3 | | | 40.0 | 13.6 | 37.2 | | | | |
| CD4+ naïve TC | | 264.2 | | | 67.0 | 79.7 | 108.2 | | | | |
| CD4+ Th1 TC | | 254.6 | | | 74.7 | 74.6 | 101.1 | | | | |
| CD4+ Treg | | 44.8 | | | 27.4 | 27.8 | 28.4 | | | | |
| CD8+ naïve TC | | 220.9 | | | 46.8 | 55.1 | 71.2 | | | | |
| CD8+ cent. mem. TC | | 38.1 | | | 18.8 | 23.2 | 26.3 | | | | |
| CD8+ eff. mem. TC | | 83.3 | | | 80.7 | 41.9 | 52.0 | | | | |
| CD8+ term. diff. effector TC | | 65.7 | | | 38.7 | 32.9 | 38.5 | | | | |
| CD4+ Th 17 TC | | 4.5 | | | 2.6 | 3.0 | 5.0 | | | | |
| CD4+ Th2 TC | | 312.6 | | | 94.1 | 107.0 | 134.5 | | | | |
| CD16+ CD56+ NKC | | 165 | | | 112 | 120 | 183 | | 86 | | |

Patient France 1-70056800222010002
Vaccinated 33 days after first dose of Mavenclad course 2 against Influenza strains H1N1
(BrisbaneA), H3N2 (KansasA), Victoria (Colorado/B) and Yamagata (Phuket/B)

| Trial month | Scr | 0[1] | 1 | 2 | 3 | 6 | 12 | 14 | 15 | 18 | End |
|---|---|---|---|---|---|---|---|---|---|---|---|
| Weeks before/after vaccination | −67.0 | −56.7 | | | | −31.7 | −5.7 | 3.3 | 8.3 | 25.3 | |
| Weeks before/after first dose of previous Mavenclad course | −10.3 | 0.0 | | | | 25.0 | 51.0 | 8.0 | 13.0 | 30.0 | |
| H1N1 (BrisbaneA)* | | 160 | | | | | >1280 | | >1280 | >1280 | |
| H3N2 (Kansas A)* | | 80 | | | | | 80 | | 640 | 320 | |
| H1N1 (MichiganA) | | 320 | | | | | >1280 | | >1280 | >1280 | |
| H3N2 (SingaporeA) | | 80 | | | | | 160 | | 320 | 320 | |
| Victoria (Colorado/B)* | | 40 | | | | | 40 | | 40 | 80 | |
| Yamagata (Phuket/B)* | | 40 | | | | | 80 | | 80 | 80 | |
| IgG [mg/dL] | | 831 | | | 1060 | 1030 | 1030 | | 1060 | 1110 | |
| IgM [mg/dL] | | 59 | | | 43 | 42 | 39 | | 39 | 35 | |
| ALC[2] [cells/µL] | 2120 | | | | | | 1280 | 790 | | 1010 | |
| CD19+ B-cells [cells/µL] | | 415 | | | | 67 | 158 | | | 152 | |
| CD20+ B-cells [cells/µL] | | 406 | | | | 64 | 155 | | | 149 | |
| Memory B-cells [cells/µL] | | 103.4 | | | | 5.2 | 7.8 | | | 3.3 | |
| CD69+ activated B-cells [cells/µL] | | 4.8 | | | | 1.1 | 2.2 | | | 1.9 | |
| CD38+ Plasma cells [cells/µL] | | 5.8 | | | | 1.8 | 0.8 | | | 1.3 | |
| Short-lived PCs [cells/µL] | | 2.8 | | | | 1.9 | 0.9 | | | 1.0 | |
| CD16+ CD56+ NK-cells [cells/µL] | | 174 | | | | 63 | 75 | | | 136 | |
| CD3+ T-cells [cells/µL] | | 1801 | | | | 918 | 1109 | | | 727 | |

Scr: Screening; End: end of trial; MAV: Mavenclad; IgG: Immunoglobulin G; IgM: Immunoglobulin M; ALC: approximate lymphocyte count; LLOQ: lower limit of quantitation

[1]Month 0 blood was collected up to 6 days before first Mavenclad dose

[2]Date of ALC measurements may vary from other measurements by up to 7 days

*vaccinated Influenza strains

Patient France 1-70056800222010002-Extended Panel[#)]
Vaccinated 33 days after first dose of Mavenclad course 2 against Influenza strains H1N1
(BrisbaneA), H3N2 (KansasA), Victoria (Colorado/B) and Yamagata (Phuket/B)

| Trial month | Scr | 0[1] | 1 | 2 | 3 | 6 | 12 | 14 | 15 | 18 | End |
|---|---|---|---|---|---|---|---|---|---|---|---|
| Weeks before/after vaccination | −67.0 | −56.7 | | | −44.7 | −31.7 | −5.7 | 3.3 | 8.3 | 25.3 | |
| Weeks before/after first dose of previous Mavenclad course | −10.3 | 0.0 | | | 12.0 | 25.0 | 51.0 | 8.0 | 13.0 | 30.0 | |
| H1N1 (BrisbaneA)* | | 160 | | | | | >1280 | | >1280 | >1280 | |
| H3N2 (Kansas A)* | | 80 | | | | | 80 | | 640 | 320 | |
| H1N1(MichiganA) | | 320 | | | | | >1280 | | >1280 | >1280 | |
| H3N2(SingaporeA) | | 80 | | | | | 160 | | 320 | 320 | |
| Victoria (Colorado/B)* | | 40 | | | | | 40 | | 40 | 80 | |
| Yamagata (Phuket/B)* | | 40 | | | | | 80 | | 80 | 80 | |
| IgG [mg/dL] | | 831 | | | 1,060 | 1,030 | 1,030 | | 1,060 | 1,110 | |
| IgM [mg/dL] | | 59 | | | 43 | 42 | 39 | | 39 | 35 | |
| ALC[2] [cells/μL] | 2,120 | | | | | | 1,280 | 790 | | 1,010 | |
| CD19+ B-cells | | 415 | | | | 67 | 158 | | | 152 | |
| CD20+ B-cells | | 405.7 | | | | 63.6 | 155.1 | | | 149.0 | |
| Naïve B-cells | | 278.8 | | | | 53.4 | 143.3 | | | 141.4 | |
| Regulatory B-cells | | 0.3 | | | | 31.8 | 12.8 | | | 13.9 | |
| Transitional B-cells | | 9.7 | | | | 9.6 | 18.3 | | | 36.5 | |
| Memory B-cells | | 103.4 | | | | 5.2 | 7.8 | | | 3.3 | |
| CD69+ actv. B-cells | | 4.8 | | | | 1.1 | 2.2 | | | 1.9 | |
| CD38+ Plasma cells | | 5.8 | | | | 1.8 | 0.8 | | | 1.3 | |
| Short-lived PCs | | 2.8 | | | | 1.9 | 0.9 | | | 1.0 | |
| CD3+ TC | | 1,801 | | | | 918 | 1,109 | | | 727 | |
| CD4+ TC | | 1,295 | | | | 693 | 846 | | | 559 | |
| CD8+ TC | | 414 | | | | 194 | 206 | | | 129 | |
| CD4+ cent. mem. TC | | 620.4 | | | | 367.1 | 388.7 | | | 299.8 | |
| CD4+ eff. mem. TC | | 125.4 | | | | 65.1 | 140.8 | | | 61.8 | |
| CD4+ naïve TC | | 547.5 | | | | 260.3 | 315.3 | | | 196.5 | |
| CD4+ Th1 TC | | 441.7 | | | | 248.2 | 288.2 | | | 188.9 | |
| CD4+ Treg | | 111.8 | | | | 83.9 | 100.8 | | | 75.4 | |
| CD8+ naïve TC | | 219.6 | | | | 77.8 | 83.3 | | | 50.6 | |
| CD8+ cent. mem. TC | | 36.4 | | | | 34.5 | 36.3 | | | 21.4 | |
| CD8+ eff. mem. TC | | 125.4 | | | | 62.9 | 63.8 | | | 38.7 | |
| CD8+ term. diff. effector TC | | 32.6 | | | | 18.7 | 22.6 | | | 18.3 | |
| CD4+ Th 17 TC | | 24.2 | | | | 14.6 | 15.4 | | | 13.9 | |
| CD4+ Th2 TC | | 654.1 | | | | 343.2 | 412.0 | | | 269.2 | |
| CD16+ CD56+ NKC | | 174 | | | | 63 | 75 | | | 136 | |

Patient Australia 1-70056800221220003
Vaccinated 133 days after first dose of Mavenclad course 2 against Influenza strains H1N1
(BrisbaneA), Victoria (Colorado/B) and Yamagata (Phuket/B)

| Trial month | Scr | 0[1] | 1 | 2 | 3 | 6 | 12 | 14 | 15 | 18 | End |
|---|---|---|---|---|---|---|---|---|---|---|---|
| Weeks before/after vaccination | −79.9 | −71.3 | −65.0 | −62.1 | −58.1 | −45.1 | −20.1 | −10.4 | −7.0 | 5.9 | |
| Weeks before/after first dose of previous Mavenclad course | −8.6 | 0.0 | 6.3 | 9.1 | 13.1 | 26.1 | 51.1 | 8.6 | 12.0 | 24.9 | |
| H1N1 (BrisbaneA)* | | 160 | | | | | | | 160 | 160 | |
| H3N2 (Kansas A) | | | | | | | | | | | |
| H1N1 (MichiganA) | | | | | | | | | | | |
| H3N2 (SingaporeA) | | | | | | | | | | | |
| Victoria (Colorado/B)* | | 40 | | | | | | | 40 | 40 | |
| Yamagata (Phuket/B)* | | 60 | | | | | | | 40 | 80 | |
| IgG [mg/dL] | | 1220 | | | 1090 | 1180 | 973 | | 992 | 995 | |
| IgM [mg/dL] | | 127 | | | 106 | 100 | 74 | | 68 | 58 | |
| ALC[2] [cells/μL] | 2200 | | | | | | 1200 | 500 | | 1000 | |
| CD19+ B-cells [cells/μL] | | | 4 | 13 | 25 | 97 | | 17 | 37 | 74 | |
| CD20+ B-cells [cells/μL] | | | 3 | 12 | 25 | 93 | | 16 | 36 | 73 | |
| Memory B-cells [cells/μL] | | | 0.9 | 1.8 | 1.2 | 3.5 | | 0.4 | 0.7 | 1.6 | |
| CD69+ activated B-cells [cells/μL] | | | 0.2 | 0.7 | 0.7 | 2.9 | | 0.2 | 0.5 | 1.6 | |

| Patient Australia 1-70056800221220003 Vaccinated 133 days after first dose of Mavenclad course 2 against Influenza strains H1N1 (BrisbaneA), Victoria (Colorado/B) and Yamagata (Phuket/B) | | | | | | | | | | |
|---|---|---|---|---|---|---|---|---|---|---|
| Trial month | Scr | 0[1] | 1 | 2 | 3 | 6 | 12 | 14 | 15 | 18 | End |
| CD38+ Plasma cells [cells/μL] | | | 0.3 | 0.4 | 0.3 | 2.7 | | 0.9 | 0.3 | 0.5 | |
| Short-lived PCs [cells/μL] | | | 0.2 | 0.2 | <LLOQ | 1.4 | | 0.4 | 0.2 | 0.1 | |
| CD16+ CD56+ NK-cells [cells/μL] | | | 19 | 117 | 141 | 84 | | 126 | 109 | 105 | |
| CD3+ T-cells [cells/μL] | | | 593 | 776 | 809 | 679 | | 588 | 517 | 452 | |

Scr: Screening; End: end of trial; MAV: Mavenclad; IgG: Immunoglobulin G; IgM: Immunoglobulin M; ALC: approximate lymphocyte count; LLOQ: lower limit of quantitation
[1]Month 0 blood was collected up to 6 days before first Mavenclad dose
[2]Date of ALC measurements may vary from other measurements by up to 7 days
*vaccinated Influenza strains

20

| Patient Australia 1-70056800221220003-Extended Panel[#] Vaccinated 133 days after first dose of Mavenclad course 2 against Influenza strains H1N1 (BrisbaneA), Victoria (Colorado/B) and Yamagata (Phuket/B) | | | | | | | | | | | |
|---|---|---|---|---|---|---|---|---|---|---|---|
| Trial month | Scr | 0[1] | 1 | 2 | 3 | 6 | 12 | 14 | 15 | 18 | End |
| Weeks before/after vaccination | −79.9 | −71.3 | −65.0 | −62.1 | −58.1 | −45.1 | −20.1 | −10.4 | −7.0 | 5.9 | |
| Weeks before/after first dose of previous Mavenclad course | −8.6 | 0.0 | 6.3 | 9.1 | 13.1 | 26.1 | 51.1 | 8.6 | 12.0 | 24.9 | |
| H1N1 (BrisbaneA)* | | 160 | | | | | | | 160 | 160 | |
| H3N2 (Kansas A) | | | | | | | | | | | |
| H1N1(MichiganA) | | 160 | | | | | | | 160 | 160 | |
| H3N2(SingaporeA) | | | | | | | | | | | |
| Victoria (Colorado/B)* | | 40 | | | | | | | 40 | 40 | |
| Yamagata (Phuket/B)* | | 60 | | | | | | | 40 | 80 | |
| IgG [mg/dL] | | 1,220 | | | 1,090 | 1,180 | 973 | | 992 | 995 | |
| IgM [mg/dL] | | 127 | | | 106 | 100 | 74 | | 68 | 58 | |
| ALC[2] [cells/μL] | 2,200 | | | | | | 1,200 | 500 | | 1,000 | |
| CD19+ B-cells | | | 4 | 13 | 25 | 97 | | 17 | 37 | 74 | |
| CD20+ B-cells | | | 3.5 | 12.3 | 24.7 | 93.2 | | 15.8 | 36.4 | 73.1 | |
| Naïve B-cells | | | 1.8 | 8.8 | 21.5 | 86.0 | | 14.3 | 34.7 | 68.7 | |
| Regulatory B-cells | | | 0.9 | 6.5 | 14.2 | 9.1 | | 9.0 | 12.8 | 9.8 | |
| Transitional B-cells | | | 1.3 | 4.0 | 8.2 | 13.1 | | 8.8 | 13.9 | 12.9 | |
| Memory B-cells | | | 0.9 | 1.8 | 1.2 | 3.5 | | 0.4 | 0.7 | 1.6 | |
| CD69+ actv. B-cells | | | 0.2 | 0.7 | 0.7 | 2.9 | | 0.2 | 0.5 | 1.6 | |
| CD38+ Plasma cells | | | 0.3 | 0.4 | 0.3 | 2.7 | | 0.9 | 0.3 | 0.5 | |
| Short-lived PCs | | | 0.2 | 0.2 | <LLOQ | 1.4 | | 0.4 | 0.2 | 0.1 | |
| CD3+ TC | | | 593 | 776 | 809 | 679 | | 588 | 517 | 452 | |
| CD4+ TC | | | 379 | 448 | 436 | 431 | | 311 | 260 | 238 | |
| CD8+ TC | | | 217 | 325 | 368 | 249 | | 291 | 255 | 201 | |
| CD4+ cent. mem. TC | | | | | 127.3 | 161.8 | | 64.7 | 66.6 | 68.8 | |
| CD4+ eff. mem. TC | | | | | 125.0 | 109.8 | | 119.9 | 94.9 | 78.1 | |
| CD4+ naïve TC | | | | | 95.1 | 123.3 | | 36.4 | 29.2 | 37.1 | |
| CD4+ Th1 TC | | | | | 164.8 | 168.7 | | 119.0 | 102.5 | 101.6 | |
| CD4+ Treg | | | | | 27.4 | 31.7 | | 24.8 | 21.4 | 15.9 | |
| CD8+ naïve TC | | | | | 33.6 | 41.0 | | 12.1 | 12.4 | 12.3 | |
| CD8+ cent. mem. TC | | | | | 14.0 | 16.2 | | 7.4 | 7.1 | 6.8 | |
| CD8+ eff. mem. TC | | | | | 83.8 | 59.5 | | 92.5 | 70.6 | 53.8 | |
| CD8+ term. diff. effector TC | | | | | 236.6 | 132.4 | | 179.1 | 164.9 | 128.1 | |
| CD4+ Th 17 TC | | | | | 4.2 | 5.3 | | 4.8 | 3.2 | 2.8 | |
| CD4+ Th2 TC | | | | | 213.3 | 199.5 | | 142.7 | 127.2 | 104.2 | |
| CD16+ CD56+ NKC | | | 19 | 117 | 141 | 84 | | 126 | 109 | 105 | |

Patient Finland 2-70056800221620002
Vaccinated 42 days before first dose of Mavenclad course 2 against Influenza strains H1N1
(BrisbaneA), H3N2 (KansasA), Victoria (Colorado/B) and Yamagata (Phuket/B)

| Trial month | Scr | 0[1] | 1 | 2 | 3 | 6 | 12[2] | 14 | 15 | 18 | End |
|---|---|---|---|---|---|---|---|---|---|---|---|
| Weeks before/after vaccination | −47.0 | −46.0 | | | −33.0 | −20.0 | 6.0 | 15.0 | 20.0 | 32.0 | |
| Weeks before/after first dose of previous Mavenclad course | −1.0 | 0.0 | | | 13.0 | 26.0 | 52.0 | 8.9 | 13.7 | 26.0 | |
| H1N1 (BrisbaneA)* | | 320 | | | | 320 | 320 | | 320 | | |
| H3N2 (Kansas A)* | | 80 | | | | 80 | 160 | | 160 | | |
| H1N1 (MichiganA) | | 320 | | | | 320 | 320 | | 320 | | |
| H3N2 (SingaporeA) | | 320 | | | | 120 | 320 | | 160 | | |
| Victoria (Colorado/B)* | | 80 | | | | 80 | 40 | | 40 | | |
| Yamagata (Phuket/B)* | | 80 | | | | 80 | 80 | | 80 | | |
| IgG [mg/dL] | | 1000 | | | 1030 | 962 | 999 | | 970 | 971 | |
| IgM [mg/dL] | | 215 | | | 186 | 183 | 162 | | 164 | 156 | |
| ALC[2] [cells/μL] | 2640 | | | | | 1240 | 1610 | 750 | | 970 | |
| CD19+ B-cells [cells/μL] | | 570 | | | 42 | 98 | 306 | | 112 | 200 | |
| CD20+ B-cells [cells/μL] | | 567 | | | 40 | 97 | 304 | | 111 | 199 | |
| Memory B-cells [cells/μL] | | 72.3 | | | 1.4 | 1.7 | 4.2 | | 1.1 | 1.1 | |
| CD69+ activated B-cells [cells/μL] | | 3.9 | | | 1.1 | 1.2 | 2.1 | | 1.8 | 2.3 | |
| CD38+ Plasma cells [cells/μL] | | 0.7 | | | 1.2 | 0.3 | 0.6 | | 0.5 | 0.1 | |
| Short-lived PCs [cells/μL] | | 0.9 | | | 0.6 | 0.3 | 0.3 | | <LLOQ | <LLOQ | |
| CD16+ CD56+ NK-cells [cells/μL] | | 238 | | | 108 | 120 | 230 | | 103 | 163 | |
| CD3+ T-cells [cells/μL] | | 3053 | | | 805 | 1042 | 1374 | | 539 | 687 | |

Scr: Screening; End: end of trial; MAV: Mavenclad; IgG: Immunoglobulin G; IgM: Immunoglobulin M; ALC: approximate lymphocyte count; LLOQ: lower limit of quantitation
[1]Month 0 blood was collected up to 6 days before first Mavenclad dose
[2]Date of ALC measurements may vary from other measurements by up to 7 days
*vaccinated Influenza strains Patient Finland 2-70056800221620002-Extended Panel[#)]
Vaccinated 42 days before first dose of Mavenclad course 2 against Influenza strains H1N1
(BrisbaneA), H3N2 (KansasA), Victoria (Colorado/B) and Yamagata (Phuket/B)

| | Trial month | | | | | | | | | | |
|---|---|---|---|---|---|---|---|---|---|---|---|
| | Scr | 0[1] | 1 | 2 | 3 | 6 | 12 | 14 | 15 | 18 | End |
| Weeks before/after vaccination | −47.0 | −46.0 | | | −33.0 | −20.0 | 6.0 | 15.0 | 20.0 | 32.0 | |
| Weeks before/after first dose of previous Mavenclad course | −1.0 | 0.0 | | | 13.0 | 26.0 | 52.0 | 9.0 | 14.0 | 26.0 | |
| H1N1 (BrisbaneA)* | | 320 | | | | 320 | 320 | | 320 | | |
| H3N2 (Kansas A)* | | 80 | | | | 80 | 160 | | 160 | | |
| H1N1(MichiganA) | | 320 | | | | 320 | 320 | | 320 | | |
| H3N2(SingaporeA) | | 320 | | | | 120 | 320 | | 160 | | |
| Victoria (Colorado/B)* | | 80 | | | | 80 | 40 | | 40 | | |
| Yamagata (Phuket/B)* | | 80 | | | | 80 | 80 | | 80 | | |
| IgG [mg/dL] | | 1,000 | | | 1,030 | 962 | 999 | | 970 | 971 | |
| IgM [mg/dL] | | 215 | | | 186 | 183 | 162 | | 164 | 156 | |
| ALC[2] [cells/μL] | 2,640 | | | | | 1,240 | 1,610 | 750 | | 970 | |
| CD19+ B-cells | | 570 | | | 42 | 98 | 306 | | 112 | 200 | |
| CD20+ B-cells | | 566.6 | | | 39.7 | 96.6 | 304.2 | | 111.4 | 199.4 | |
| Naïve B-cells | | 482.5 | | | 37.2 | 93.6 | 297.1 | | 107.7 | 195.8 | |
| Regulatory B-cells | | 14.3 | | | 23.9 | 13.2 | 52.2 | | 22.9 | 27.4 | |
| Transitional B-cells | | 34.6 | | | 16.9 | 14.2 | 22.8 | | 22.2 | 43.7 | |
| Memory B-cells | | 72.3 | | | 1.4 | 1.7 | 4.2 | | 1.1 | 1.1 | |
| CD69+ actv. B-cells | | 3.9 | | | 1.1 | 1.2 | 2.1 | | 1.8 | 2.3 | |
| CD38+ Plasma cells | | 0.7 | | | 1.2 | 0.3 | 0.6 | | 0.5 | 0.1 | |
| Short-lived PCs | | 0.9 | | | 0.6 | 0.3 | 0.3 | | <LLOQ | <LLOQ | |
| CD3+ TC | | 3,053 | | | 805 | 1,042 | 1,374 | | 539 | 687 | |
| CD4+ TC | | 2,445 | | | 630 | 852 | 1,099 | | 410 | 546 | |

-continued

Patient Finland 2-70056800221620002-Extended Panel#)
Vaccinated 42 days before first dose of Mavenclad course 2 against Influenza strains H1N1
(BrisbaneA), H3N2 (KansasA), Victoria (Colorado/B) and Yamagata (Phuket/B)

|  | Scr | 0[1] | 1 | 2 | 3 | 6 | 12 | 14 | 15 | 18 | End |
|---|---|---|---|---|---|---|---|---|---|---|---|
| CD8+ TC |  | 587 |  |  | 174 | 167 | 246 |  | 122 | 120 |  |
| CD4+ cent. mem. TC |  | 595.6 |  |  | 157.1 | 198.3 | 234.8 |  | 106.9 | 112.2 |  |
| CD4+ eff. mem. TC |  | 158.4 |  |  | 54.8 | 83.0 | 83.6 |  | 62.8 | 73.6 |  |
| CD4+ naïve TC |  | 1,689 |  |  | 417.1 | 569.5 | 779.3 |  | 238.7 | 358.0 |  |
| CD4+ Th1 TC |  | 648.4 |  |  | 164.6 | 207.2 | 267.4 |  | 113.6 | 135.5 |  |
| CD4+ Treg |  | 129.1 |  |  | 61.5 | 71.2 | 91.7 |  | 46.1 | 45.3 |  |
| CD8+ naïve TC |  | 265.3 |  |  | 54.8 | 55.6 | 92.3 |  | 31.3 | 50.4 |  |
| CD8+ cent. mem. TC |  | 62.9 |  |  | 11.8 | 11.0 | 15.5 |  | 6.1 | 4.8 |  |
| CD8+ eff. mem. TC |  | 183.9 |  |  | 67.6 | 72.1 | 91.8 |  | 60.9 | 36.9 |  |
| CD8+ term. diff. effector TC |  | 74.8 |  |  | 39.9 | 28.4 | 46.4 |  | 23.7 | 27.9 |  |
| CD4+ Th 17 TC |  | 15.9 |  |  | 5.2 | 5.9 | 9.1 |  | 5.0 | 6.6 |  |
| CD4+ Th2 TC |  | 1,697 |  |  | 433.1 | 608.1 | 765.8 |  | 261.5 | 357.0 |  |
| CD16+ CD56+ NKC |  | 238 |  |  | 108 | 120 | 230 |  | 103 | 163 |  |

Patient Germany 1-70056800221100002
Vaccinated 43 days before first dose of Mavenclad course 2 against Influenza strains H1N1
(BrisbaneA), H3N2 (KansasA), Victoria (Colorado/B) and Yamagata (Phuket/B)

|  | Scr | 0[1] | 1 | 2 | 3 | 6 | 12 | 14 | 15 | 18 | End |
|---|---|---|---|---|---|---|---|---|---|---|---|---|
| Weeks before/after vaccination | -2.9 | -46.4 |  |  | -33.6 | -19.4 | 6.0 | 14.3 |  | 30.6 |  |
| Weeks before/after first dose of previous Mavenclad course | 43.6 | 0.0 |  |  | 12.9 | 27.0 | 52.4 | 8.1 |  | 24.4 |  |
| H1N1 (BrisbaneA)* |  | 160 |  |  |  | 80 | 160 |  |  | 80 |  |
| H3N2 (Kansas A)* |  | 320 |  |  |  | 320 | 320 |  |  | 320 |  |
| H1N1 (MichiganA) |  | 160 |  |  |  | 160 | 160 |  |  | 160 |  |
| H3N2 (SingaporeA) |  | 320 |  |  |  | 320 | 320 |  |  | 320 |  |
| Victoria (Colorado/B)* |  | 20 |  |  |  | 40 | 40 |  |  | 20 |  |
| Yamagata (Phuket/B)* |  | 40 |  |  |  | 40 | 40 |  |  | 40 |  |
| IgG [mg/dL] |  | 1180 |  |  | 1250 | 1210 | 1210 |  |  | 1120 |  |
| IgM [mg/dL] |  | 127 |  |  | 118 | 113 | 105 |  |  | 79 |  |
| ALC[2] [cells/μL] | 2020 |  |  |  |  | 910 | 1560 | 470 |  | 750 |  |
| CD19+ B-cells [cells/μL] |  | 186 |  |  | 37 | 100 | 223 |  |  | 130 |  |
| CD20+ B-cells [cells/μL] |  | 183 |  |  | 36 | 99 | 222 |  |  | 128 |  |
| Memory B-cells [cells/μL] |  | 80.3 |  |  | 2.1 | 2.5 | 5.1 |  |  | 2.0 |  |
| CD69+ activated B-cells [cells/μL] |  | 2.5 |  |  | 0.4 | 1.5 | 2.4 |  |  | 1.4 |  |
| CD38+ Plasma cells [cells/μL] |  | 1.3 |  |  | 0.3 | 0.5 | 0.7 |  |  | 0.4 |  |
| Short-lived PCs [cells/μL] |  | 1.1 |  |  | <LLOQ | 0.4 | 0.4 |  |  | 0.3 |  |
| CD16+ CD56+ NK-cells [cells/μL] |  | 95 |  |  | 72 | 66 | 141 |  |  | 95 |  |
| CD3+ T-cells [cells/μL] |  | 1271 |  |  | 605 | 772 | 1091 |  |  | 578 |  |

Scr: Screening; End: end of trial; MAV: Mavenclad; IgG: Immunoglobulin G; IgM: Immunoglobulin M; ALC: approximate lymphocyte count; LLOQ: lower limit of quantitation

[1]Month 0 blood was collected up to 6 days before first Mavenclad dose

[2]Date of ALC measurements may vary from other measurements by up to 7 days

*vaccinated Influenza strains

Patient Germany 1-70056800221100002-Extended Panel[#)]
Vaccinated 43 days before first dose of Mavenclad course 2 against Influenza strains H1N1
(BrisbaneA), H3N2 (KansasA), Victoria (Colorado/B) and Yamagata (Phuket/B)

|  | Scr | 0[1] | 1 | 2 | 3 | 6 | 12 | 14 | 15 | 18 | End |
|---|---|---|---|---|---|---|---|---|---|---|---|
| Weeks before/after vaccination | −2.9 | −46.4 |  |  | −33.6 | −19.4 | 6.0 | 14.3 |  | 30.6 |  |
| Weeks before/after first dose of previous Mavenclad course | 43.6 | 0.0 |  |  | 12.9 | 27.0 | 52.4 | 8.1 |  | 24.4 |  |
| H1N1 (BrisbaneA)* |  | 160 |  |  |  | 80 | 160 |  |  | 80 |  |
| H3N2 (Kansas A)* |  | 320 |  |  |  | 320 | 320 |  |  | 320 |  |
| H1N1(MichiganA) |  | 160 |  |  |  | 160 | 160 |  |  | 160 |  |
| H3N2(SingaporeA) |  | 320 |  |  |  | 320 | 320 |  |  | 320 |  |
| Victoria (Colorado/B)* |  | 20 |  |  |  | 40 | 40 |  |  | 20 |  |
| Yamagata (Phuket/B)* |  | 40 |  |  |  | 40 | 40 |  |  | 40 |  |
| IgG [mg/dL] |  | 1,180 |  |  | 1,250 | 1,210 | 1,210 |  |  | 1,120 |  |
| IgM [mg/dL] |  | 127 |  |  | 118 | 113 | 105 |  |  | 79 |  |
| ALC[2] [cells/μL] | 2,020 |  |  |  |  | 910 | 1,560 | 470 |  | 750 |  |
| CD19+ B-cells |  | 186 |  |  | 37 | 100 | 223 |  |  | 130 |  |
| CD20+ B-cells |  | 182.5 |  |  | 36.3 | 98.6 | 222.0 |  |  | 128.4 |  |
| Naïve B-cells |  | 96.3 |  |  | 32.3 | 94.8 | 214.4 |  |  | 125.0 |  |
| Regulatory B-cells |  | 3.0 |  |  | 25.7 | 20.4 | 12.6 |  |  | 12.8 |  |
| Transitional B-cells |  | 26.5 |  |  | 18.5 | 28.9 | 23.8 |  |  | 36.4 |  |
| Memory B-cells |  | 80.3 |  |  | 2.1 | 2.5 | 5.1 |  |  | 2.0 |  |
| CD69+ actv. B-cells |  | 2.5 |  |  | 0.4 | 1.5 | 2.4 |  |  | 1.4 |  |
| CD38+ Plasma cells |  | 1.3 |  |  | 0.3 | 0.5 | 0.7 |  |  | 0.4 |  |
| Short-lived PCs |  | 1.1 |  |  | <LLOQ | 0.4 | 0.4 |  |  | 0.3 |  |
| CD3+ TC |  | 1,271 |  |  | 605 | 772 | 1,091 |  |  | 578 |  |
| CD4+ TC |  | 854 |  |  | 360 | 445 | 663 |  |  | 317 |  |
| CD8+ TC |  | 388 |  |  | 211 | 304 | 398 |  |  | 245 |  |
| CD4+ cent. mem. TC |  | 328.3 |  |  | 134.3 | 159.6 | 220.5 |  |  | 84.5 |  |
| CD4+ eff. mem. TC |  | 78.6 |  |  | 65.4 | 78.9 | 77.0 |  |  | 54.9 |  |
| CD4+ naïve TC |  | 422.2 |  |  | 146.7 | 193.3 | 344.8 |  |  | 166.1 |  |
| CD4+ Th1 TC |  | 254.7 |  |  | 104.7 | 125.7 | 166.4 |  |  | 85.6 |  |
| CD4+ Treg |  | 53.2 |  |  | 43.4 | 43.9 | 50.5 |  |  | 30.7 |  |
| CD8+ naïve TC |  | 149.3 |  |  | 29.4 | 61.5 | 102.8 |  |  | 65.7 |  |
| CD8+ cent. mem. TC |  | 29.9 |  |  | 8.2 | 13.5 | 21.2 |  |  | 8.2 |  |
| CD8+ eff. mem. TC |  | 69.0 |  |  | 59.4 | 81.8 | 124.5 |  |  | 47.5 |  |
| CD8+ term. diff. effector TC |  | 139.9 |  |  | 114.1 | 147.2 | 149.5 |  |  | 123.6 |  |
| CD4+ Th 17 TC |  | 7.5 |  |  | 5.3 | 4.7 | 6.4 |  |  | 3.5 |  |
| CD4+ Th2 TC |  | 520.0 |  |  | 217.5 | 275.0 | 446.0 |  |  | 206.4 |  |
| CD16+ CD56+ NKC |  | 95 |  |  | 72 | 66 | 141 |  |  | 95 |  |

Patient UK 2-70056800229010002
Vaccinated 81 days before first dose of Mavenclad course 2 against Influenza strains H1N1
(BrisbaneA), H3N2 (KansasA), Victoria (Colorado/B) and Yamagata (Phuket/B)

|  | Scr | 0[1] | 1 | 2 | 3 | 6 | 12 | 14 | 15 | 18 | End |
|---|---|---|---|---|---|---|---|---|---|---|---|
| Weeks before/after vaccination | −48.4 | −42.1 |  | −33.3 | −29.3 | −16.3 | 9.7 | 19.6 |  | 36.7 |  |
| Weeks before/after first dose of previous Mavenclad course | −6.3 | 0.0 |  | 8.9 | 12.9 | 25.9 | 51.9 | 8.0 |  | 25.1 |  |
| H1N1 (BrisbaneA)* |  | 160 |  |  |  | 160 | 160 |  |  | 160 |  |
| H3N2 (Kansas A)* |  | 40 |  |  |  | 40 | 60 |  |  | 60 |  |
| H1N1 (MichiganA) |  | 640 |  |  |  | 640 | 640 |  |  | 640 |  |
| H3N2 (SingaporeA) |  | 80 |  |  |  | 80 | 60 |  |  | 80 |  |
| Victoria (Colorado/B)* |  | 160 |  |  |  | 160 | 120 |  |  | 160 |  |
| Yamagata (Phuket/B)* |  | 40 |  |  |  | 40 | 40 |  |  | 40 |  |
| IgG [mg/dL] |  | 931 |  |  | 1010 | 973 | 888 |  |  | 1040 |  |
| IgM [mg/dL] |  | 87 |  |  | 98 | 96 | 89 |  |  | 83 |  |
| ALC[2] [cells/μL] | 2360 |  |  | 1060 |  | 1340 | 1340 | 870 |  | 930 |  |
| CD19+ B-cells [cells/μL] |  | 489 |  |  | 53 | 118 | 177 |  |  | 130 |  |
| CD20+ B-cells [cells/μL] |  | 479 |  |  | 52 | 116 | 176 |  |  | 129 |  |
| Memory B-cells [cells/μL] |  | 234.5 |  |  | 8.6 | 7.7 | 13.1 |  |  | 3.8 |  |

-continued

Patient UK 2-70056800229010002
Vaccinated 81 days before first dose of Mavenclad course 2 against Influenza strains H1N1
(BrisbaneA), H3N2 (KansasA), Victoria (Colorado/B) and Yamagata (Phuket/B)

|  | Scr | $0^1$ | 1 | 2 | 3 | 6 | 12 | 14 | 15 | 18 | End |
|---|---|---|---|---|---|---|---|---|---|---|---|
| CD69+ activated B-cells [cells/μL] |  | 9.1 |  |  | 1.5 | 1.3 | 2.3 |  |  | 2.9 |  |
| CD38+ Plasma cells [cells/μL] |  | 1.3 |  |  | 0.4 | 0.3 | 0.8 |  |  | 0.4 |  |
| Short-lived PCs [cells/μL] |  | 1.0 |  |  | 0.6 | 0.6 | 0.6 |  |  | 0.4 |  |
| CD16+ CD56+ NK-cells [cells/μL] |  | 183 |  |  | 82 | 319 | 170 |  |  | 115 |  |
| CD3+ T-cells [cells/μL] |  | 1539 |  |  | 868 | 1149 | 940 |  |  | 687 |  |

Scr: Screening; End: end of trial; MAV: Mavenclad; IgG: Immunoglobulin G; IgM: Immunoglobulin M; ALC: approximate lymphocyte count; LLOQ: lower limit of quantitation
[1]Month 0 blood was collected up to 6 days before first Mavenclad dose
[2]Date of ALC measurements may vary from other measurements by up to 7 days
*vaccinated Influenza strains Patient UK 2-70056800229010002-Extended Panel[#]
Vaccinated 81 days before first dose of Mavenclad course 2 against Influenza strains H1N1
(BrisbaneA), H3N2 (KansasA), Victoria (Colorado/B) and Yamagata (Phuket/B)

|  | Scr | $0^1$ | 1 | 2 | 3 | 6 | 12 | 14 | 15 | 18 | End |
|---|---|---|---|---|---|---|---|---|---|---|---|
| Weeks before/after vaccination | −48.4 | −42.1 |  |  | −33.3 | −29.3 | −16.3 | 9.7 | 19.6 | 36.7 |  |
| Weeks before/after first dose of previous Mavenclad course | −6.3 | 0.0 |  |  | 8.9 | 12.9 | 25.9 | 51.9 | 8.0 | 25.1 |  |
| H1N1 (BrisbaneA)* |  | 160 |  |  |  | 160 | 160 |  |  | 160 |  |
| H3N2 (Kansas A)* |  | 40 |  |  |  | 40 | 60 |  |  | 60 |  |
| H1N1(MichiganA) |  | 640 |  |  |  | 640 | 640 |  |  | 640 |  |
| H3N2(SingaporeA) |  | 80 |  |  |  | 80 | 60 |  |  | 80 |  |
| Victoria (Colorado/B)* |  | 160 |  |  |  | 160 | 120 |  |  | 160 |  |
| Yamagata (Phuket/B)* |  | 40 |  |  |  | 40 | 40 |  |  | 40 |  |
| IgG [mg/dL] |  | 931 |  |  | 1,010 | 973 | 888 |  |  | 1,040 |  |
| IgM [mg/dL] |  | 87 |  |  | 98 | 96 | 89 |  |  | 83 |  |
| ALC[2] [cells/μL] | 2,360 |  |  | 1,060 |  | 1,340 | 1,340 | 870 |  | 930 |  |
| CD19+ B-cells |  | 489 |  |  | 53 | 118 | 177 |  |  | 130 |  |
| CD20+ B-cells |  | 479.2 |  |  | 51.7 | 116.4 | 175.7 |  |  | 128.8 |  |
| Naïve B-cells |  | 229.1 |  |  | 39.1 | 105.1 | 157.8 |  |  | 123.1 |  |
| Regulatory B-cells |  | 18.2 |  |  | 22.3 | 11.0 | 10.1 |  |  | 14.5 |  |
| Transitional B-cells |  | 30.2 |  |  | 14.0 | 12.1 | 9.8 |  |  | 12.9 |  |
| Memory B-cells |  | 234.5 |  |  | 8.6 | 7.7 | 13.1 |  |  | 3.8 |  |
| CD69+ actv. B-cells |  | 9.1 |  |  | 1.5 | 1.3 | 2.3 |  |  | 2.9 |  |
| CD38+ Plasma cells |  | 1.3 |  |  | 0.4 | 0.3 | 0.8 |  |  | 0.4 |  |
| Short-lived PCs |  | 1.0 |  |  | 0.6 | 0.6 | 0.6 |  |  | 0.4 |  |
| CD3+ TC |  | 1,539 |  |  | 868 | 1,149 | 940 |  |  | 687 |  |
| CD4+ TC |  | 922 |  |  | 414 | 488 | 452 |  |  | 306 |  |
| CD8+ TC |  | 522 |  |  | 386 | 563 | 409 |  |  | 329 |  |
| CD4+ cent. mem. TC |  | 499.0 |  |  | 202.9 | 218.8 | 232.2 |  |  | 161.6 |  |
| CD4+ eff. mem. TC |  | 191.1 |  |  | 99.2 | 157.7 | 110.3 |  |  | 70.3 |  |
| CD4+ naïve TC |  | 230.7 |  |  | 110.9 | 109.4 | 108.0 |  |  | 72.8 |  |
| CD4+ Th1 TC |  | 378.2 |  |  | 157.0 | 182.6 | 187.2 |  |  | 115.9 |  |
| CD4+ Treg |  | 79.9 |  |  | 40.4 | 55.5 | 50.2 |  |  | 44.1 |  |
| CD8+ naïve TC |  | 130.6 |  |  | 59.5 | 50.1 | 54.1 |  |  | 33.6 |  |
| CD8+ cent. mem. TC |  | 56.9 |  |  | 30.1 | 31.8 | 38.6 |  |  | 26.8 |  |
| CD8+ eff. mem. TC |  | 157.3 |  |  | 107.5 | 154.9 | 99.0 |  |  | 74.1 |  |
| CD8+ term. diff. effector TC |  | 177.3 |  |  | 188.9 | 326.3 | 217.3 |  |  | 194.5 |  |
| CD4+ Th 17 TC |  | 20.1 |  |  | 5.2 | 8.5 | 9.8 |  |  | 8.6 |  |
| CD4+ Th2 TC |  | 439.1 |  |  | 222.6 | 237.7 | 200.5 |  |  | 127.8 |  |
| CD16+ CD56+ NKC |  | 183 |  |  | 82 | 319 | 170 |  |  | 115 |  |

Patient UK 1-70056800229010001
Vaccinated 87 days before first dose of Mavenclad course 2 against Influenza strains H1N1
(BrisbaneA), H3N2 (KansasA), Victoria (Colorado/B) and Yamagata (Phuket/B)

|  | Scr | 0[1] | 1 | 2 | 3 | 6 | 12 | 14 | 15 | 18 | End |
|---|---|---|---|---|---|---|---|---|---|---|---|
| Weeks before/after vaccination | −48.6 | −42.4 |  | −34.4 | −30.4 | −16.4 | 9.6 | 20.4 |  | 37.6 |  |
| Weeks before/after first dose of previous Mavenclad course | −6.1 | 0.0 |  | 8.0 | 12.0 | 26.0 | 52.0 | 8.0 |  | 25.1 |  |
| H1N1 (BrisbaneA)* |  | 320 |  |  |  | 160 | 80 |  |  | 80 |  |
| H3N2 (Kansas A)* |  | 40 |  |  |  | 60 | 80 |  |  | 80 |  |
| H1N1 (MichiganA) |  | 960 |  |  |  | 640 | 320 |  |  | 480 |  |
| H3N2 (SingaporeA) |  | 80 |  |  |  | 40 | 40 |  |  | 40 |  |
| Victoria (Colorado/B)* |  | 80 |  |  |  | 40 | 60 |  |  | 40 |  |
| Yamagata (Phuket/B)* |  | 160 |  |  |  | 160 | 60 |  |  | 160 |  |
| IgG [mg/dL] |  | 1090 |  |  | 1010 | 1120 | 934 |  |  | 1040 |  |
| IgM [mg/dL] |  | 95 |  |  | 96 | 87 | 64 |  |  | 63 |  |
| ALC[2] [cells/μL] | 1510 |  |  | 920 |  | 840 | 690 | 710 |  | 540 |  |
| CD19+ B-cells [cells/μL] |  | 106 |  |  | 8 | 12 |  |  |  | 19 |  |
| CD20+ B-cells [cells/μL] |  | 101 |  |  | 8 | 12 |  |  |  | 18 |  |
| Memory B-cells [cells/μL] |  | 50.7 |  |  | 1.2 | 0.6 |  |  |  | 0.4 |  |
| CD69+ activated B-cells [cells/μL] |  | 2.1 |  |  | 0.2 | 0.4 |  |  |  | 0.8 |  |
| CD38+ Plasma cells [cells/μL] |  | 1.3 |  |  | 0.2 | 0.1 |  |  |  | 0.3 |  |
| Short-lived PCs [cells/μL] |  | 0.8 |  |  | 0.1 | 0.1 |  |  |  | 0.1 |  |
| CD16+ CD56+ NK-cells [cells/μL] |  | 275 |  |  | 226 | 238 |  |  |  | 184 |  |
| CD3+ T-cells [cells/μL] |  | 1016 |  |  | 736 | 582 |  |  |  | 381 |  |

Scr: Screening; End: end of trial; MAV: Mavenclad; IgG: Immunoglobulin G; IgM: Immunoglobulin M; ALC: approximate lymphocyte count; LLOQ: lower limit of quantitation
[1]Month 0 blood was collected up to 6 days before first Mavenclad dose
[2]Date of ALC measurements may vary from other measurements by up to 7 days
*vaccinated Influenza strains Patient UK 1-70056800229010001-Extended Panel[#]
Vaccinated 87 days before first dose of Mavenclad course 2 against Influenza strains H1N1
(BrisbaneA), H3N2 (KansasA), Victoria (Colorado/B) and Yamagata (Phuket/B)

|  | Scr | 0[1] | 1 | 2 | 3 | 6 | 12 | 14 | 15 | 18 | End |
|---|---|---|---|---|---|---|---|---|---|---|---|
| Weeks before/after vaccination | −48.6 | −42.4 |  | −34.4 | −30.4 | −16.4 | 9.6 | 20.4 |  | 37.6 |  |
| Weeks before/after first dose of previous Mavenclad course | −6.1 | 0.0 |  | 8.0 | 12.0 | 26.0 | 52.0 | 8.0 |  | 25.1 |  |
| H1N1 (BrisbaneA)* |  | 320 |  |  |  | 160 | 80 |  |  | 80 |  |
| H3N2 (Kansas A)* |  | 40 |  |  |  | 60 | 80 |  |  | 80 |  |
| H1N1(MichiganA) |  | 960 |  |  |  | 640 | 320 |  |  | 480 |  |
| H3N2(SingaporeA) |  | 80 |  |  |  | 40 | 40 |  |  | 40 |  |
| Victoria (Colorado/B)* |  | 80 |  |  |  | 40 | 60 |  |  | 40 |  |
| Yamagata (Phuket/B)* |  | 160 |  |  |  | 160 | 60 |  |  | 160 |  |
| IgG [mg/dL] |  | 1,090 |  |  | 1,010 | 1,120 | 934 |  |  | 1,040 |  |
| IgM [mg/dL] |  | 95 |  |  | 96 | 87 | 64 |  |  | 63 |  |
| ALC[2] [cells/μL] | 1,510 |  |  | 920 |  | 840 | 690 | 710 |  | 540 |  |
| CD19+ B-cells |  | 106 |  |  | 8 | 12 |  |  |  | 19 |  |
| CD20+ B-cells |  | 101.2 |  |  | 7.6 | 11.7 |  |  |  | 17.7 |  |
| Naïve B-cells |  | 44.7 |  |  | 5.7 | 10.6 |  |  |  | 16.8 |  |
| Regulatory B-cells |  | 1.7 |  |  | 3.2 | 6.3 |  |  |  | 4.1 |  |
| Transitional B-cells |  | 5.9 |  |  | 2.6 | 3.0 |  |  |  | 6.1 |  |
| Memory B-cells |  | 50.7 |  |  | 1.2 | 0.6 |  |  |  | 0.4 |  |
| CD69+ actv. B-cells |  | 2.1 |  |  | 0.2 | 0.4 |  |  |  | 0.8 |  |
| CD38+ Plasma cells |  | 1.3 |  |  | 0.2 | 0.1 |  |  |  | 0.3 |  |
| Short-lived PCs |  | 0.8 |  |  | 0.1 | 0.1 |  |  |  | 0.1 |  |
| CD3+ TC |  | 1,016 |  |  | 736 | 582 |  |  |  | 381 |  |

Patient UK 1-70056800229010001-Extended Panel#)
Vaccinated 87 days before first dose of Mavenclad course 2 against Influenza strains H1N1
(BrisbaneA), H3N2 (KansasA), Victoria (Colorado/B) and Yamagata (Phuket/B)

| | Trial month | | | | | | | | | | |
|---|---|---|---|---|---|---|---|---|---|---|---|
| | Scr | $0^1$ | 1 | 2 | 3 | 6 | 12 | 14 | 15 | 18 | End |
| CD4+ TC | | 751 | | | 525 | 420 | | | | 261 | |
| CD8+ TC | | 242 | | | 191 | 154 | | | | 111 | |
| CD4+ cent. mem. TC | | 335.8 | | | 222.2 | 187.8 | | | | 124.3 | |
| CD4+ eff. mem. TC | | 104.2 | | | 129.1 | 78.8 | | | | 48.4 | |
| CD4+ naïve TC | | 308.0 | | | 172.2 | 151.6 | | | | 85.7 | |
| CD4+ Th1 TC | | 292.7 | | | 193.8 | 161.7 | | | | 100.1 | |
| CD4+ Treg | | 57.1 | | | 56.9 | 47.5 | | | | 31.7 | |
| CD8+ naïve TC | | 47.5 | | | 18.9 | 20.5 | | | | 13.8 | |
| CD8+ cent. mem. TC | | 36.7 | | | 16.5 | 15.4 | | | | 13.0 | |
| CD8+ eff. mem. TC | | 102.4 | | | 112.7 | 78.2 | | | | 51.9 | |
| CD8+ term. diff. effector TC | | 55.5 | | | 42.8 | 40.0 | | | | 32.3 | |
| CD4+ Th 17 TC | | 7.4 | | | 5.9 | 6.4 | | | | 5.3 | |
| CD4+ Th2 TC | | 363.3 | | | 254.1 | 193.2 | | | | 104.7 | |
| CD16+ CD56+ NKC | | 275 | | | 226 | 238 | | | | 184 | |

Patient France 2-70056800222100003
Vaccinated 127 days before first dose of Mavenclad course 2 against Influenza strains H1N1
(BrisbaneA), H3N2 (KansasA), Victoria (Colorado/B) and Yamagata (Phuket/B)

| | Trial month | | | | | | | | | | |
|---|---|---|---|---|---|---|---|---|---|---|---|
| | Scr | $0^1$ | 1 | 2 | 3 | 6 | 12 | 14 | 15 | 18 | End |
| Weeks before/after vaccination | −41.6 | −36.9 | | | −24.6 | −10.9 | 16.4 | 26.4 | 31.1 | | |
| Weeks before/after first dose of previous Mavenclad course | −4.7 | 0.0 | | | 12.3 | 26.0 | 53.3 | 8.3 | 13.0 | | |
| H1N1 (BrisbaneA)* | | 20 | | | | 40 | 640 | | | | |
| H3N2 (Kansas A)* | | 40 | | | | 40 | 40 | | | | |
| H1N1 (MichiganA) | | 80 | | | | 80 | 640 | | | | |
| H3N2 (SingaporeA) | | 40 | | | | 80 | 40 | | | | |
| Victoria (Colorado/B)* | | 40 | | | | 40 | 40 | | | | |
| Yamagata (Phuket/B)* | | 20 | | | | 40 | 40 | | | | |
| IgG [mg/dL] | | 888 | | | 955 | 929 | 1050 | | 955 | | |
| IgM [mg/dL] | | 121 | | | 119 | 126 | 112 | | 101 | | |
| $ALC^2$ [cells/µL] | 1910 | | | | | 1120 | 820 | 440 | | | |
| CD19+ B-cells [cells/µL] | | | | | 66 | 109 | 179 | | 81 | | |
| CD20+ B-cells [cells/µL] | | | | | 64 | 107 | 171 | | 80 | | |
| Memory B-cells [cells/µL] | | | | | 3.5 | 5.9 | 8.1 | | 1.7 | | |
| CD69+ activated B-cells [cells/µL] | | | | | 0.9 | 1.3 | 1.0 | | 0.9 | | |
| CD38+ Plasma cells [cells/µL] | | | | | 0.6 | 1.1 | 1.1 | | 0.5 | | |
| Short-lived PCs [cells/µL] | | | | | 1.6 | 0.9 | 1.0 | | 0.3 | | |
| CD16+ CD56+ NK-cells [cells/µL] | | | | | 116 | 136 | 149 | | 81 | | |
| CD3+ T-cells [cells/µL] | | | | | 913 | 842 | 599 | | 328 | | |

Scr: Screening; End: end of trial; MAV: Mavenclad; IgG: Immunoglobulin G; IgM: Immunoglobulin M; ALC: approximate lymphocyte count; LLOQ: lower limit of quantitation
[1]Month 0 blood was collected up to 6 days before first Mavenclad dose
[2]Date of ALC measurements may vary from other measurements by up to 7 days
*vaccinated Influenza strains Patient France 2-70056800222100003-Extended Panel[#]
Vaccinated 127 days before first dose of Mavenclad course 2 against Influenza strains H1N1
(BrisbaneA), H3N2 (KansasA), Victoria (Colorado/B) and Yamagata (Phuket/B)

| | | Trial month | | | | | | | | | |
|---|---|---|---|---|---|---|---|---|---|---|---|
| | Scr | 0[1] | 1 | 2 | 3 | 6 | 12 | 14 | 15 | 18 | End |
| Weeks before/after vaccination | −41.6 | −36.9 | | | −24.6 | −10.9 | 16.4 | 26.4 | 31.1 | | |
| Weeks before/after first dose of previous Mavenclad course | −4.7 | 0.0 | | | 12.3 | 26.0 | 53.3 | 8.3 | 13.0 | | |
| H1N1 (BrisbaneA)* | | 20 | | | | 40 | 640 | | | | |
| H3N2 (Kansas A)* | | 40 | | | | 40 | 40 | | | | |
| H1N1(MichiganA) | | 80 | | | | 80 | 640 | | | | |
| H3N2(SingaporeA) | | 40 | | | | 80 | 40 | | | | |
| Victoria (Colorado/B)* | | 40 | | | | 40 | 40 | | | | |
| Yamagata (Phuket/B)* | | 20 | | | | 40 | 40 | | | | |
| IgG [mg/dL] | | 888 | | | 955 | 929 | 1,050 | | 955 | | |
| IgM [mg/dL] | | 121 | | | 119 | 126 | 112 | | 101 | | |
| ALC[2] [cells/µL] | 1,910 | | | | | 1,120 | 820 | 440 | | | |
| CD19+ B-cells | | | | | 66 | 109 | 179 | | 81 | | |
| CD20+ B-cells | | | | | 63.8 | 106.8 | 170.7 | | 79.6 | | |
| Naïve B-cells | | | | | 58.9 | 98.4 | 156.4 | | 75.0 | | |
| Regulatory B-cells | | | | | 34.9 | 2.4 | 14.7 | | 34.2 | | |
| Transitional B-cells | | | | | 31.8 | 3.9 | 11.3 | | 19.1 | | |
| Memory B-cells | | | | | 3.5 | 5.9 | 8.1 | | 1.7 | | |
| CD69+ actv. B-cells | | | | | 0.9 | 1.3 | 1.0 | | 0.9 | | |
| CD38+ Plasma cells | | | | | 0.6 | 1.1 | 1.1 | | 0.5 | | |
| Short-lived PCs | | | | | 1.6 | 0.9 | 1.0 | | 0.3 | | |
| CD3+ TC | | | | | 913 | 842 | 599 | | 328 | | |
| CD4+ TC | | | | | 648 | 591 | 405 | | 208 | | |
| CD8+ TC | | | | | 258 | 242 | 194 | | 110 | | |
| CD4+ cent. mem. TC | | | | | 206.5 | 229.5 | 153.3 | | | | |
| CD4+ eff. mem. TC | | | | | 221.6 | 85.0 | 100.2 | | | | |
| CD4+ naïve TC | | | | | 218.0 | 273.3 | 147.6 | | | | |
| CD4+ Th1 TC | | | | | 266.2 | 178.0 | 153.0 | | | | |
| CD4+ Treg | | | | | 57.2 | 61.4 | 39.8 | | | | |
| CD8+ naïve TC | | | | | 17.0 | 32.1 | 18.5 | | | | |
| CD8+ cent. mem. TC | | | | | 28.3 | 43.8 | 29.0 | | | | |
| CD8+ eff. mem. TC | | | | | 153.6 | 94.6 | 89.1 | | | | |
| CD8+ term. diff. effector TC | | | | | 59.1 | 71.5 | 57.5 | | | | |
| CD4+ Th 17 TC | | | | | 8.5 | 11.1 | 10.4 | | | | |
| CD4+ Th2 TC | | | | | 317.6 | 357.0 | 195.7 | | | | |
| CD16+ CD56+ NKC | | | | | 116 | 136 | 149 | | 81 | | |

Patient Canada VZV-70056800222530003
Vaccinated 68 and 8 days before first dose of Mavenclad course 1
against Varicella Zoster Virus with Shingrix ®

| | | Trial month | | | | | | | | | |
|---|---|---|---|---|---|---|---|---|---|---|---|
| | Scr | 0[1] | 1 | 2 | 3 | 6 | 12 | 14 | 15 | 18 | End |
| Weeks before/after vaccination | 1.1 | 9.7 | | | 23.0 | 37.7 | | | | | |
| Weeks before/after first dose of previous Mavenclad course | −8.6 | 0.0 | | | 13.3 | 28.0 | | | | | |
| Anti-VZV Virus IgG [IU/L] | | >4748 | | | >4748 | >4748 | | | | | |
| IgG [mg/dL] | | 1410 | | | 1510 | 1460 | | | | | |
| IgM [mg/dL] | | 190 | | | 166 | 149 | | | | | |
| ALC[2] [cells/µL] | 2100 | | | 800 | | 800 | 1110 | | | | |
| CD19+ B-cells [cells/µL] | | 504 | | | 39 | 97 | | | | | |
| CD20+ B-cells [cells/µL] | | 242.3 | | | 38.6 | 93.5 | | | | | |
| Memory B-cells [cells/µL] | | 67.0 | | | 1.9 | 1.8 | | | | | |
| CD69+ activated B-cells [cells/µL] | | 3.0 | | | 0.3 | 11.6 | | | | | |
| CD38+ Plasma cells [cells/µL] | | 230.3 | | | 0.3 | 0.2 | | | | | |

-continued

Patient Canada VZV-70056800222530003
Vaccinated 68 and 8 days before first dose of Mavenclad course 1
against Varicella Zoster Virus with Shingrix ®

|  | Scr | $0^1$ | 1 | 2 | 3 | 6 | 12 | 14 | 15 | 18 | End |
|---|---|---|---|---|---|---|---|---|---|---|---|
| Short-lived PCs [cells/μL] |  | 252.0 |  |  | <LLOQ | 0.2 |  |  |  |  |  |
| CD16+ CD56+ NK-cells [cells/μL] |  | 243 |  |  | 107 | 145 |  |  |  |  |  |
| CD3+ T-cells [cells/μL] |  | 1634 |  |  | 543 | 519 |  |  |  |  |  |

Scr: Screening; End: end of trial; MAV: Mavenclad; IgG: Immunoglobulin G; IgM: Immunoglobulin M; ALC: approximate lymphocyte count; LLOQ: lower limit of quantitation
[1]Month 0 blood was collected up to 6 days before first Mavenclad dose
[2]Date of ALC measurements may vary from other measurements by up to 7 days
*vaccinated Influenza strains Patient Canada VZV-70056800222530003-Extended Panel[#]
Vaccinated 68 and 8 days before first dose of Mavenclad course 1
against Varicella Zoster Virus with Shingrix ®

|  | Scr | $0^1$ | 1 | 2 | 3 | 6 | 12 | 14 | 15 | 18 | End |
|---|---|---|---|---|---|---|---|---|---|---|---|
| Weeks before/after vaccination | 1.1 | 9.7 |  | 18.0 | 23.0 | 37.7 |  |  |  |  |  |
| Weeks before/after first dose of previous Mavenclad course | −8.6 | 0.0 |  | 8.3 | 13.3 | 28.0 |  |  |  |  |  |
| Anti-VZV Virus IgG [IU/L] |  | >4748 |  |  | >4748 | >4748 |  |  |  |  |  |
| IgG [mg/dL] |  | 1,410 |  |  | 1,510 | 1,460 |  |  |  |  |  |
| IgM [mg/dL] |  | 190 |  |  | 166 | 149 |  |  |  |  |  |
| ALC$^2$ [cells/μL] | 2,100 |  |  | 800 |  | 800 | 1,110 |  |  |  |  |
| CD19+ B-cells |  | 504 |  |  | 39 | 97 |  |  |  |  |  |
| CD20+ B-cells |  | 242.3 |  |  | 38.6 | 93.5 |  |  |  |  |  |
| Naïve B-cells |  | 160.7 |  |  | 35.2 | 90.1 |  |  |  |  |  |
| Regulatory B-cells |  | 13.4 |  |  | 12.5 | 23.6 |  |  |  |  |  |
| Transitional B-cells |  | 18.1 |  |  | 12.2 | 10.2 |  |  |  |  |  |
| Memory B-cells |  | 67.0 |  |  | 1.9 | 1.8 |  |  |  |  |  |
| CD69+ actv. B-cells |  | 3.0 |  |  | 0.3 | 11.6 |  |  |  |  |  |
| CD38+ Plasma cells |  | 230.3 |  |  | 0.3 | 0.2 |  |  |  |  |  |
| Short-lived PCs |  | 252.0 |  |  | <LLOQ | 0.2 |  |  |  |  |  |
| CD3+ TC |  | 1,634 |  |  | 543 | 519 |  |  |  |  |  |
| CD4+ TC |  | 956 |  |  | 274 | 249 |  |  |  |  |  |
| CD8+ TC |  | 655 |  |  | 241 | 251 |  |  |  |  |  |
| CD4+ cent. mem. TC |  | 460.6 |  |  | 96.7 | 88.1 |  |  |  |  |  |
| CD4+ eff. mem. TC |  | 238.2 |  |  | 118.0 | 96.9 |  |  |  |  |  |
| CD4+ naïve TC |  | 256.4 |  |  | 59.4 | 62.8 |  |  |  |  |  |
| CD4+ Th1 TC |  | 440.8 |  |  | 121.0 | 113.8 |  |  |  |  |  |
| CD4+ Treg |  | 91.9 |  |  | 39.1 | 26.2 |  |  |  |  |  |
| CD8+ naïve TC |  | 356.1 |  |  | 45.8 | 56.5 |  |  |  |  |  |
| CD8+ cent. mem. TC |  | 73.9 |  |  | 11.9 | 11.1 |  |  |  |  |  |
| CD8+ eff. mem. TC |  | 183.9 |  |  | 135.6 | 135.7 |  |  |  |  |  |
| CD8+ term. diff. effector TC |  | 41.2 |  |  | 47.7 | 47.8 |  |  |  |  |  |
| CD4+ Th 17 TC |  | 10.2 |  |  | 7.6 | 4.2 |  |  |  |  |  |
| CD4+ Th2 TC |  | 443.1 |  |  | 110.9 | 96.1 |  |  |  |  |  |
| CD16+ CD56+ NKC |  | 243 |  |  | 107 | 145 |  |  |  |  |  |

Patient Finland VZV-70056800221620004
Vaccinated 45 days before first dose of Mavenclad course 1
against Varicella Zoster Virus with Zostavax ®

| | | | | | Trial month | | | | | | |
|---|---|---|---|---|---|---|---|---|---|---|---|
| | Scr | 0¹ | 1 | 2 | 3 | 6 | 12 | 14 | 15 | 18 | End |
| Weeks before/after vaccination | 2.4 | 6.4 | | 14.3 | 18.3 | 32.3 | 61.3 | | 74.3 | | |
| Weeks before/after first dose of previous Mavenclad course | −4.0 | 0.0 | | 7.9 | 11.9 | 25.9 | 54.9 | | 13.0 | | |
| Anti-VZV Virus IgG [IU/L] | | 2364 | | | 2028 | | | | | | |
| IgG [mg/dL] | | 931 | | | 926 | 808 | 847 | | 745 | | |
| IgM [mg/dL] | | 95 | | | 75 | 72 | 73 | | 60 | | |
| ALC² [cells/µL] | 1690 | | | 670 | | 580 | 1040 | | | | |
| CD19+ B-cells [cells/µL] | | 290 | | | 56 | 139 | 257 | | 88 | | |
| CD20+ B-cells [cells/µL] | | 284.3 | | | 53.0 | 137.4 | 255.3 | | 86.2 | | |
| Memory B-cells [cells/µL] | | 44.2 | | | 2.8 | 4.2 | 6.5 | | 1.3 | | |
| CD69+ activated B-cells [cells/µL] | | 3.3 | | | 1.1 | 1.3 | 3.3 | | 1.0 | | |
| CD38+ Plasma cells [cells/µL] | | 2.8 | | | 2.2 | 0.9 | 0.6 | | 0.3 | | |
| Short-lived PCs [cells/µL] | | 2.1 | | | 1.2 | 0.5 | 0.4 | | 0.2 | | |
| CD16+ CD56+ NK-cells [cells/µL] | | 165 | | | 112 | 120 | 183 | | 86 | | |
| CD3+ T-cells [cells/µL] | | 1037 | | | 397 | 364 | 474 | | 169 | | |

Scr: Screening; End: end of trial; MAV: Mavenclad; IgG: Immunoglobulin G; IgM: Immunoglobulin M; ALC: approximate lymphocyte count; LLOQ: lower limit of quantitation
¹Month 0 blood was collected up to 6 days before first Mavenclad dose
²Date of ALC measurements may vary from other measurements by up to 7 days
*vaccinated Influenza strains Patient Finland VZV-70056800221620004-Extended Panel[#)]
Vaccinated 45 days before first dose of Mavenclad course 1
against Varicella Zoster Virus with Zostavax ®

| | | | | | Trial month | | | | | | |
|---|---|---|---|---|---|---|---|---|---|---|---|
| | Scr | 0¹ | 1 | 2 | 3 | 6 | 12 | 14 | 15 | 18 | End |
| Weeks before/after vaccination | 2.4 | 6.4 | | 14.3 | 18.3 | 32.3 | 61.3 | | 74.3 | | |
| Weeks before/after first dose of previous Mavenclad course | −4.0 | 0.0 | | 7.9 | 11.9 | 25.9 | 54.9 | | 13.0 | | |
| Anti-VZV Virus IgG [IU/L] | | 2,364 | | | 2,028 | | | | | | |
| IgG [mg/dL] | | 931 | | | 926 | 808 | 847 | | 745 | | |
| IgM [mg/dL] | | 95 | | | 75 | 72 | 73 | | 60 | | |
| ALC² [cells/µL] | 1,690 | | | 670 | | 580 | 1,040 | | | | |
| CD19+ B-cells | | 290 | | | 56 | 139 | 257 | | 88 | | |
| CD20+ B-cells | | 284.3 | | | 53.0 | 137.4 | 255.3 | | 86.2 | | |
| Naïve B-cells | | 235.4 | | | 49.0 | 131.6 | 245.8 | | 83.3 | | |
| Regulatory B-cells | | 6.2 | | | 35.5 | 12.8 | 6.5 | | 30.5 | | |
| Transitional B-cells | | 16.9 | | | 26.2 | 18.5 | 17.8 | | 29.9 | | |
| Memory B-cells | | 44.2 | | | 2.8 | 4.2 | 6.5 | | 1.3 | | |
| CD69+ actv. B-cells | | 3.3 | | | 1.1 | 1.3 | 3.3 | | 1.0 | | |
| CD38+ Plasma cells | | 2.8 | | | 2.2 | 0.9 | 0.6 | | 0.3 | | |
| Short-lived PCs | | 2.1 | | | 1.2 | 0.5 | 0.4 | | 0.2 | | |
| CD3+ TC | | 1,037 | | | 397 | 364 | 474 | | 169 | | |
| CD4+ TC | | 622 | | | 192 | 195 | 266 | | 94 | | |
| CD8+ TC | | 408 | | | 185 | 153 | 188 | | 74 | | |
| CD4+ cent. mem. TC | | 273.6 | | | 83.9 | 101.3 | 120.0 | | 43.5 | | |
| CD4+ eff. mem. TC | | 83.3 | | | 40.0 | 13.6 | 37.2 | | 19.3 | | |
| CD4+ naïve TC | | 264.2 | | | 67.0 | 79.7 | 108.2 | | 30.6 | | |
| CD4+ Th1 TC | | 254.6 | | | 74.7 | 74.6 | 101.1 | | 38.1 | | |
| CD4+ Treg | | 44.8 | | | 27.4 | 27.8 | 28.4 | | 20.7 | | |
| CD8+ naïve TC | | 220.9 | | | 46.8 | 55.1 | 71.2 | | 25.6 | | |

Patient Finland VZV-70056800221620004-Extended Panel[#]
Vaccinated 45 days before first dose of Mavenclad course 1
against Varicella Zoster Virus with Zostavax ®

| | Trial month | | | | | | | | | | |
|---|---|---|---|---|---|---|---|---|---|---|---|
| | Scr | 0[1] | 1 | 2 | 3 | 6 | 12 | 14 | 15 | 18 | End |
| CD8+ cent. mem. TC | | 38.1 | | | 18.8 | 23.2 | 26.3 | | 9.5 | | |
| CD8+ eff. mem. TC | | 83.3 | | | 80.7 | 41.9 | 52.0 | | 18.3 | | |
| CD8+ term. diff. effector TC | | 65.7 | | | 38.7 | 32.9 | 38.5 | | 20.6 | | |
| CD4+ Th 17 TC | | 4.5 | | | 2.6 | 3.0 | 5.0 | | 3.0 | | |
| CD4+ Th2 TC | | 312.6 | | | 94.1 | 107.0 | 134.5 | | 45.7 | | |
| CD16+ CD56+ NKC | | 165 | | | 112 | 120 | 183 | | 86 | | |

Patient Australia VZV-70056800221260001
Vaccinated 69 days before first dose of Mavenclad course 1
against Varicella Zoster Virus with Zostavax ®

| | Trial month | | | | | | | | | | |
|---|---|---|---|---|---|---|---|---|---|---|---|
| | Scr | 0[1] | 1 | 2 | 3 | 6 | 12 | 14 | 15 | 18 | End |
| Weeks before/after vaccination | −6.4 | 8.6 | | 21.0 | 24.6 | | | | | | |
| Weeks before/after first dose of previous Mavenclad course | −16.3 | −1.3 | | 11.1 | 14.7 | | | | | | |
| Anti-VZV Virus IgG [IU/L] | | 2442 | | | 1403 | | | | | | |
| IgG [mg/dL] | | 1290 | | | 1370 | | | | | | |
| IgM [mg/dL] | | 71 | | | 59 | | | | | | |
| ALC[2] [cells/μL] | 1510 | | | 960 | | | | | | | |
| CD19+ B-cells [cells/μL] | | 121 | | | 18 | | | | | | |
| CD20+ B-cells [cells/μL] | | 119.1 | | | 17.5 | | | | | | |
| Memory B-cells [cells/μL] | | 29.1 | | | 2.3 | | | | | | |
| CD69+ activated B-cells [cells/μL] | | 1.9 | | | 0.3 | | | | | | |
| CD38+ Plasma cells [cells/μL] | | 1.0 | | | 0.3 | | | | | | |
| Short-lived PCs [cells/μL] | | 0.9 | | | 0.2 | | | | | | |
| CD16+ CD56+ NK-cells [cells/μL] | | 77 | | | 79 | | | | | | |
| CD3+ T-cells [cells/μL] | | 880 | | | 669 | | | | | | |

Scr: Screening; End: end of trial; MAV: Mavenclad; IgG: Immunoglobulin G; IgM: Immunoglobulin M; ALC: approximate lymphocyte count; LLOQ: lower limit of quantitation
[1]Month 0 blood was collected up to 6 days before first Mavenclad dose
[2]Date of ALC measurements may vary from other measurements by up to 7 days
*vaccinated Influenza strains Patient Australia VZV-70056800221260001-Extended Panel[#]
Vaccinated 69 days before first dose of Mavenclad course 1
against Varicella Zoster Virus with Zostavax ®

| | Trial month | | | | | | | | | | |
|---|---|---|---|---|---|---|---|---|---|---|---|
| | Scr | 0[1] | 1 | 2 | 3 | 6 | 12 | 14 | 15 | 18 | End |
| Weeks before/after vaccination | −6.4 | 8.6 | | 21.0 | 24.6 | | | | | | |
| Weeks before/after first dose of previous Mavenclad course | −16.3 | −1.3 | | 11.1 | 14.7 | | | | | | |

-continued

Patient Australia VZV-70056800221260001-Extended Panel[#)]
Vaccinated 69 days before first dose of Mavenclad course 1
against Varicella Zoster Virus with Zostavax ®

| | \multicolumn{11}{c}{Trial month} | | | | | | | | | | |
|---|---|---|---|---|---|---|---|---|---|---|---|
| | Scr | 0[1] | 1 | 2 | 3 | 6 | 12 | 14 | 15 | 18 | End |
| Anti-VZV Virus IgG [IU/L] | | 2,442 | | | 1,403 | | | | | | |
| IgG [mg/dL] | | 1,290 | | | 1,370 | | | | | | |
| IgM [mg/dL] | | 71 | | | 59 | | | | | | |
| ALC[2] [cells/µL] | 1,510 | | | 960 | | | | | | | |
| CD19+ B-cells | | 121 | | | 18 | | | | | | |
| CD20+ B-cells | | 119.1 | | | 17.5 | | | | | | |
| Naïve B-cells | | 84.6 | | | 13.7 | | | | | | |
| Regulatory B-cells | | 1.1 | | | 4.5 | | | | | | |
| Transitional B-cells | | 4.1 | | | 7.0 | | | | | | |
| Memory B-cells | | 29.1 | | | 2.3 | | | | | | |
| CD69+ actv. B-cells | | 1.9 | | | 0.3 | | | | | | |
| CD38+ Plasma cells | | 1.0 | | | 0.3 | | | | | | |
| Short-lived PCs | | 0.9 | | | 0.2 | | | | | | |
| CD3+ TC | | 880 | | | 669 | | | | | | |
| CD4+ TC | | 586 | | | 464 | | | | | | |
| CD8+ TC | | 282 | | | 196 | | | | | | |
| CD4+ cent. mem. TC | | 339.5 | | | 257.7 | | | | | | |
| CD4+ eff. mem. TC | | 134.5 | | | 132.9 | | | | | | |
| CD4+ naïve TC | | 111.3 | | | 72.3 | | | | | | |
| CD4+ Th1 TC | | 263.0 | | | 209.6 | | | | | | |
| CD4+ Treg | | 38.4 | | | 33.8 | | | | | | |
| CD8+ naïve TC | | 107.8 | | | 46.6 | | | | | | |
| CD8+ cent. mem. TC | | 34.1 | | | 27.5 | | | | | | |
| CD8+ eff. mem. TC | | 89.0 | | | 67.2 | | | | | | |
| CD8+ term. diff. effector TC | | 51.1 | | | 54.7 | | | | | | |
| CD4+ Th 17 TC | | 7.2 | | | 8.2 | | | | | | |
| CD4+ Th2 TC | | 220.8 | | | 162.8 | | | | | | |
| CD16+ CD56+ NKC | | 77 | | | 79 | | | | | | |

[#)]Extended Panel:
Scr: Screening; End: end of trial (2 years); IgG: Immunoglobulin G; IgM: Immunoglobulin M; ALC: approximate lymphocyte count; TC: T-cells; Cent. mem. TC: central memory T-cells; Eff mem TC: effector memory T-cells; Treg: regulatory T-cell; Term. diff. effector TC: terminally differentiated effector T-cells; NKC: Natural Killer Cells; LLOQ: lower limit of quantitation
All lymphocyte cell values are in [cells/µL]
[1]Month 0 blood was collected up to 6 days before first Mavenclad dose
[2]Date of ALC measurements may vary from other measurements by up to 7 days
*vaccinated Influenza strains Example 5

COVID-19 Vaccination Recommendations and the Opportunity for Sustained DMD/IMD Efficacy and Safety in Your MS Patients MS patients are typically treated with one or more Immune Modulatory Drugs (IMDs) or Disease-Modifying Drugs (DMDs), which are the current gold standard in autoimmune disorders, such as MS. Even though IMDs preferably represent a subgroup of drugs within the field of DMDs (according to the mode of action, by which said IMDs provide efficacy), IMDs and DMDs are often used as synonyms. However, in the present context, the terms "IMD" and "DMD" are preferably used interchangeably.

Previous COVID-19 Vaccination Guideline Recommendations for Patients with MS:

No Vaccination Restrictions for MS-Patients untreated, treated with IFN-β, treated with glatiramer acetate, treated with IV immunoglobulins, or treated with natalizumab.

Initiate Treatment with DMD Sufficiently Apart from the Last Vaccination, i.e. At Least 1 Moth after the Final/2nd COVID-19 Vaccine Dose Administered for e.g. The Following DMDs Alemtuzumab

MAVENCLAD®

Ocrelizumab, and

Rituximab.

TABLE 16

Clinical and demographic variables of patients with multiple sclerosis that received PfizerBNT162b2-COVID-19 vaccination

| | 1st COVID-19 vaccination dose | 2nd COVID-19 vaccination dose |
|---|---|---|
| MS Study population | 555 | *435 |
| Duration of follow-up at data cut-off date, days | | |
| Median | 38 | 20 |
| 25-75 IQR | 33-43 | 15-22 |
| Gender, n (%) | | |
| Females | 364 (65.6) | 284 (65.3) |
| Males | 191 (34.4) | 151 (34.7) |

TABLE 16-continued

Clinical and demographic variables of patients with multiple sclerosis that received PfizerBNT162b2-COVID-19 vaccination

|  | 1st COVID-19 vaccination dose | 2nd COVID-19 vaccination dose |
|---|---|---|
| Age group, n (%) | | |
| 18-55 years | 370 (66.7) | 274 (63) |
| >55 years | 185 (33.3) | 161 (37) |
| Disease duration, years | | |
| Median | 15.2 | 16.0 |
| 25-75 IQR | 8.2-22.5 | 8.4-23.4 |

*At the date of data cut-off, only 435 received the second vaccine dose; 109 patients did not complete the 21 days of inter-dose interval; 3 patients were infected by SARS-COV-2 after the first vaccine dose and 8 patients experienced an acute MS relapse and their second vaccine dose was postponed.

TABLE 17

Clinical and demographic variables of patients with multiple sclerosis that received PfizerBNT162b2-COVID-19 vaccination

|  | 1st COVID-19 vaccination dose | 2nd COVID-19 vaccination dose |
|---|---|---|
| Study population | 555 | *435 |
| Disability by EDSS, n (%) | | |
| <=3.0 | 294 (53) | 224 (51.5) |
| 3.5-5.5 | 118 (21.3) | 93 (21.4) |
| >=6.0 | 143 (25.8) | 118 (27.1) |
| Disease type, n (%) | | |
| RIS | 4 (0.7) | 3 (0.6) |
| CIS | 24 (4.3) | 15 (3.4) |
| RRMS | 388 (69.9) | 306 (70.3) |
| SPMS | 91 (16.4) | 71 (16.3) |
| PPMS | 48 (8.8) | 40 (9.2) |

*At the date of data cut-off, only 435 received the second vaccine dose; 109 patients did not complete the 21 days of inter-dose interval; 3 patients were infected by SARS-COV-2 after the first vaccine dose and 8 patients experienced an acute MS relapse and their second vaccine dose was postponed.

TABLE 18

Clinical and demographic variables of patients with multiple sclerosis that received PfizerBNT162b2-COVID-19 vaccination

|  | 1st COVID-19 vaccination dose | 2nd COVID-19 vaccination dose |
|---|---|---|
| MS Study population | 555 | *435 |
| IMD treatment, n (%) | | |
| Untreated | 141 (25.4) | 109 (25.1) |
| Beta-interferons (1a & 1b) | 59 (10.6) | 50 (11.5) |
| Glatiramer acetate | 16 (2.9) | 14 (3.2) |
| Teriflunomide | 44 (7.9) | 33 (7.6) |
| Dimethyl fumarate | 65 (11.7) | 46 (10.6) |
| Natalizumab | 52 (9.3) | 43 (9.9) |
| Fingolimod | 35 (6.3) | 27 (6.2) |
| Ocrelizumab | 62 (11.1) | 49 (11.3) |
| Alemtuzumab | 25 (4.5) | 18 (4.1) |
| Cladribine | 32 (5.8) | 28 (6.4) |
| Rituximab | 7 (1.2) | 4 (0.9) |
| IVIg | 17 (3.0) | 14 (3.2) |

*At the date of data cut-off, only 435 received the second vaccine dose; 109 patients did not complete the 21 days of inter-dose interval; 3 patients were infected by SARS-COV-2 after the first vaccine dose and 8 patients experienced an acute MS relapse and their second vaccine dose was postponed

TABLE 19

Adverse Events in MS patients following BNT162b2 COVID-19 vaccination

|  | 1st COVID-19 vaccination dose | 2nd COVID-19 vaccination dose |
|---|---|---|
| MS Study population | 555 | *435 |
| Any adverse events, n (%) | 165 (29.7) | 175 (40.2) |
| Pain at the injection site, n (%) | 89 (16) | 62 (14.2) |
| Fever/Chills, Flu-like symptoms, n (%) | 11 (2) | 52 (11.9) |
| Fatigue, n (%) | 51 (9.2) | 69 (15.9) |
| Headache, n (%) | 25 (4.5) | 32 (7.3) |

*At the date of data cut-off, only 435 received the second vaccine dose; 109 patients did not complete the 21 days of inter-dose interval; 3 patients were infected by SARS-COV-2 after the first vaccine dose and 8 patients experienced an acute MS relapse and their second vaccine dose was postponed.

TABLE 20

MS-related adverse events following BNT162b2 COVID-19 vaccination

|  | 1st COVID-19 vaccination dose | 2nd COVID-19 vaccination dose |
|---|---|---|
| MS Study population | 555 | 435* |
| Any adverse events, n (%) | 165 (29.7) | 175 (40.2) |
| New or worsening neurological symptomatology n (%)* | 11 (2) | 21 (4.8) |
| Face tingling n (%) | 3 (0.5) | 5 (1.1) |
| Acute MS relapses, n (%)* | 8 (2.1) | 5 (1.6) |
| Time to relapse, days | | |
| Median | 16 | 15 |
| Range | 10-19 | 14-21 |

Figure 17:
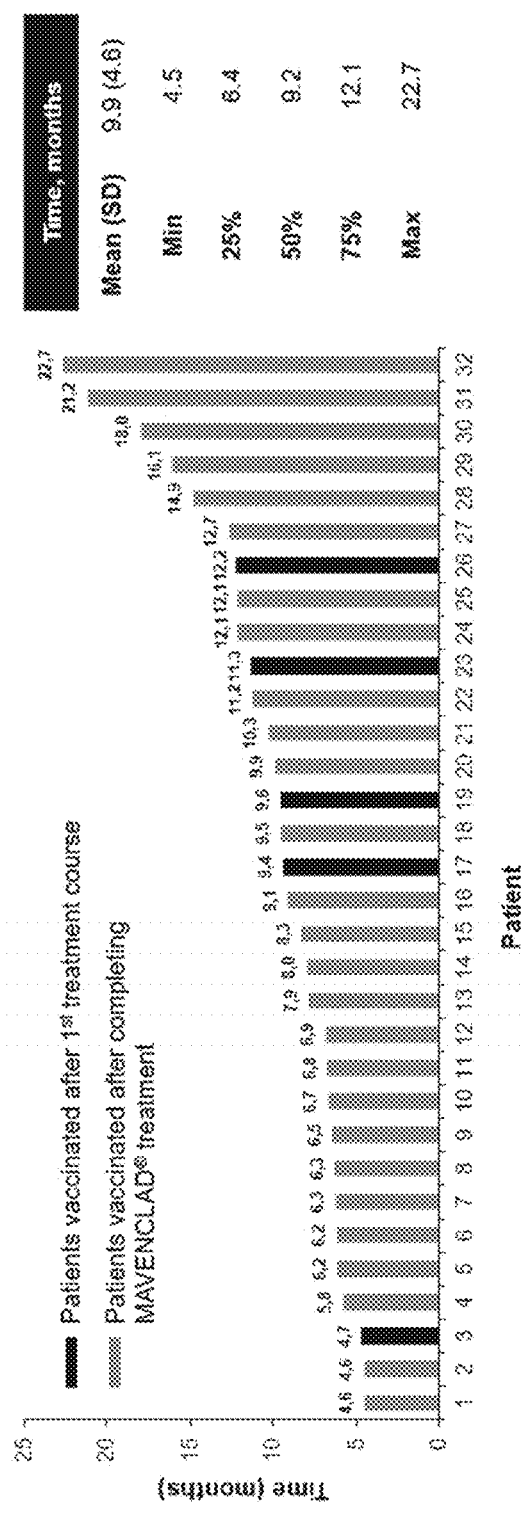
FIG. 17: Timing of COVID-19 vaccination in MAVENCLAD®-treated MS patients: time from last MAVENCLAD® treatment to COVID-19 vaccination (n=32).
Figure 18:
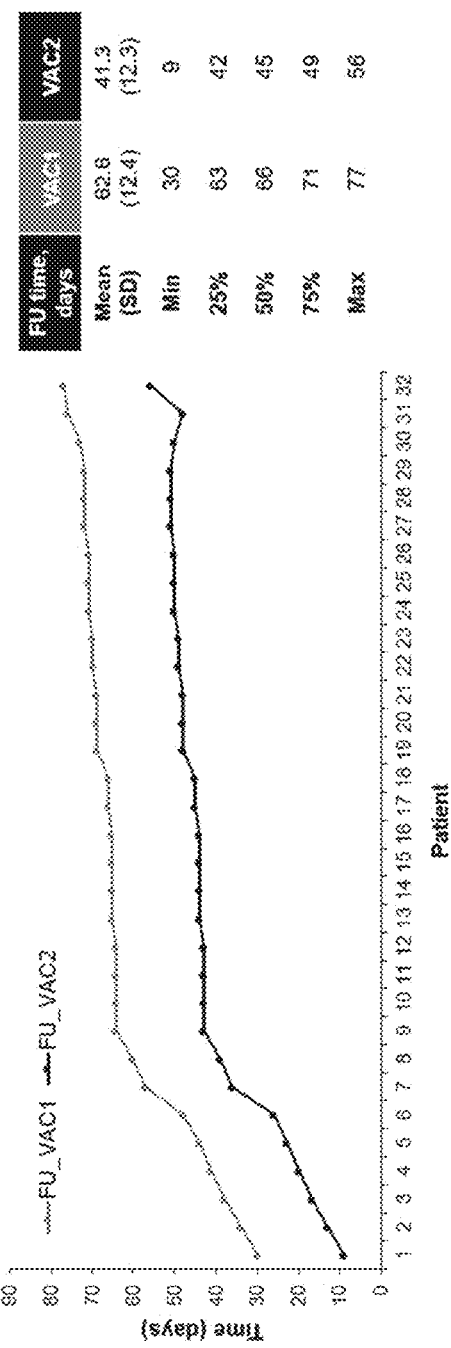
FIG. 18: Follow-up after COVID-19 vaccination in MAVENCLAD®-treated MS patients: COVID-19 vaccination follow-up time (n=32).
Figure 19:
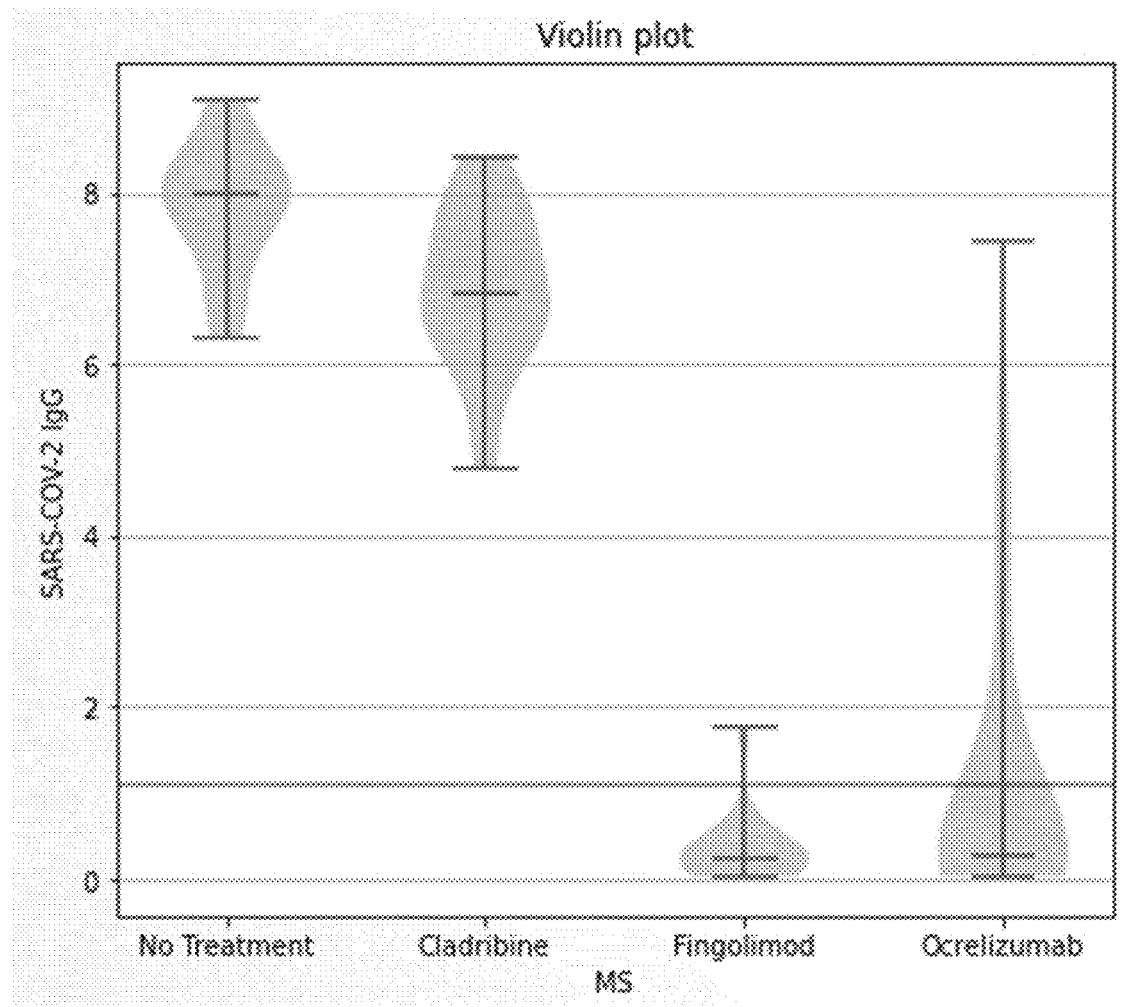
FIG. 19: Post-vaccination COV-2 IgG antibody titer by high-efficacy IMD treatments, violin plot.
Figure 20:
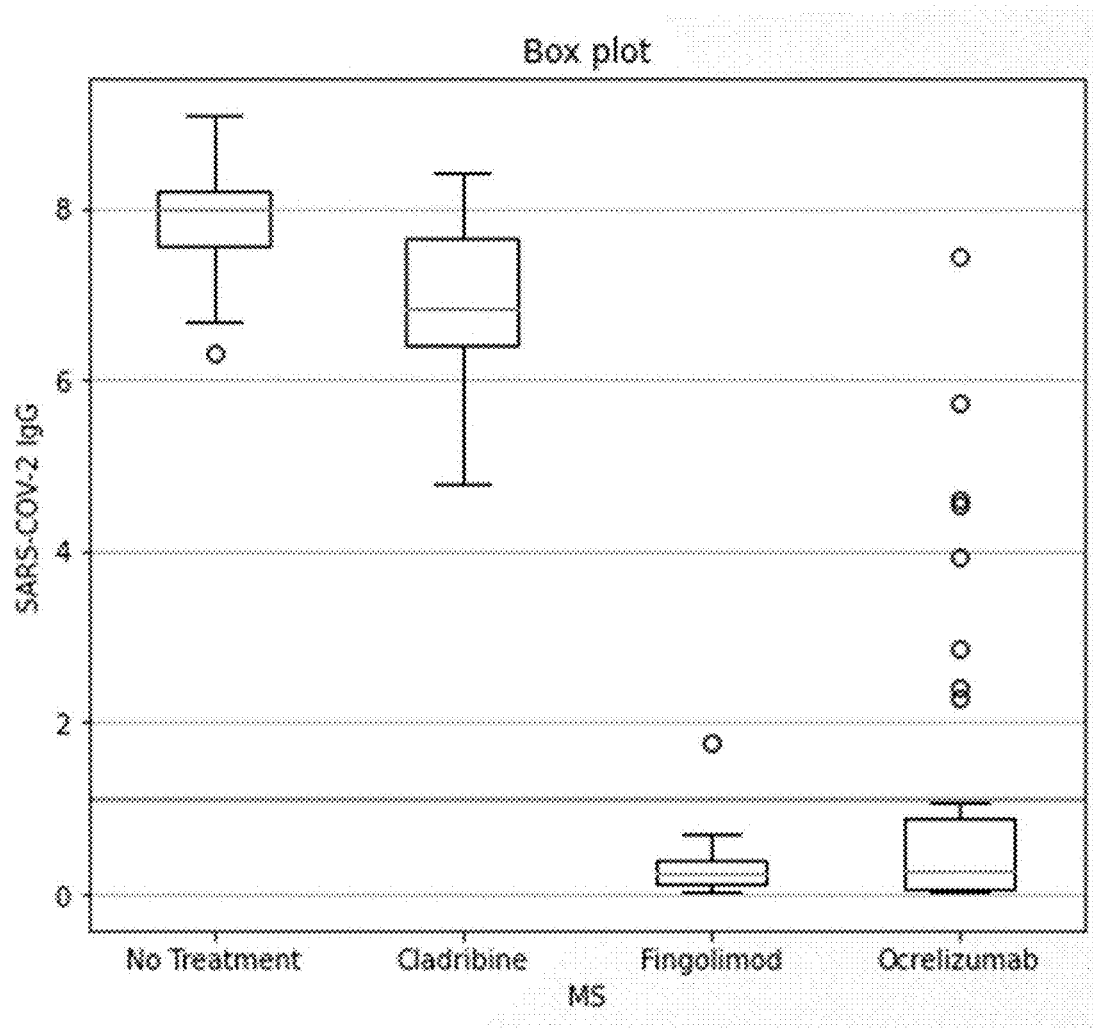
FIG. 20: Post-vaccination COV-2 IgG antibody titer by high-efficacy IMD treatments, box plot.
Figure 21:
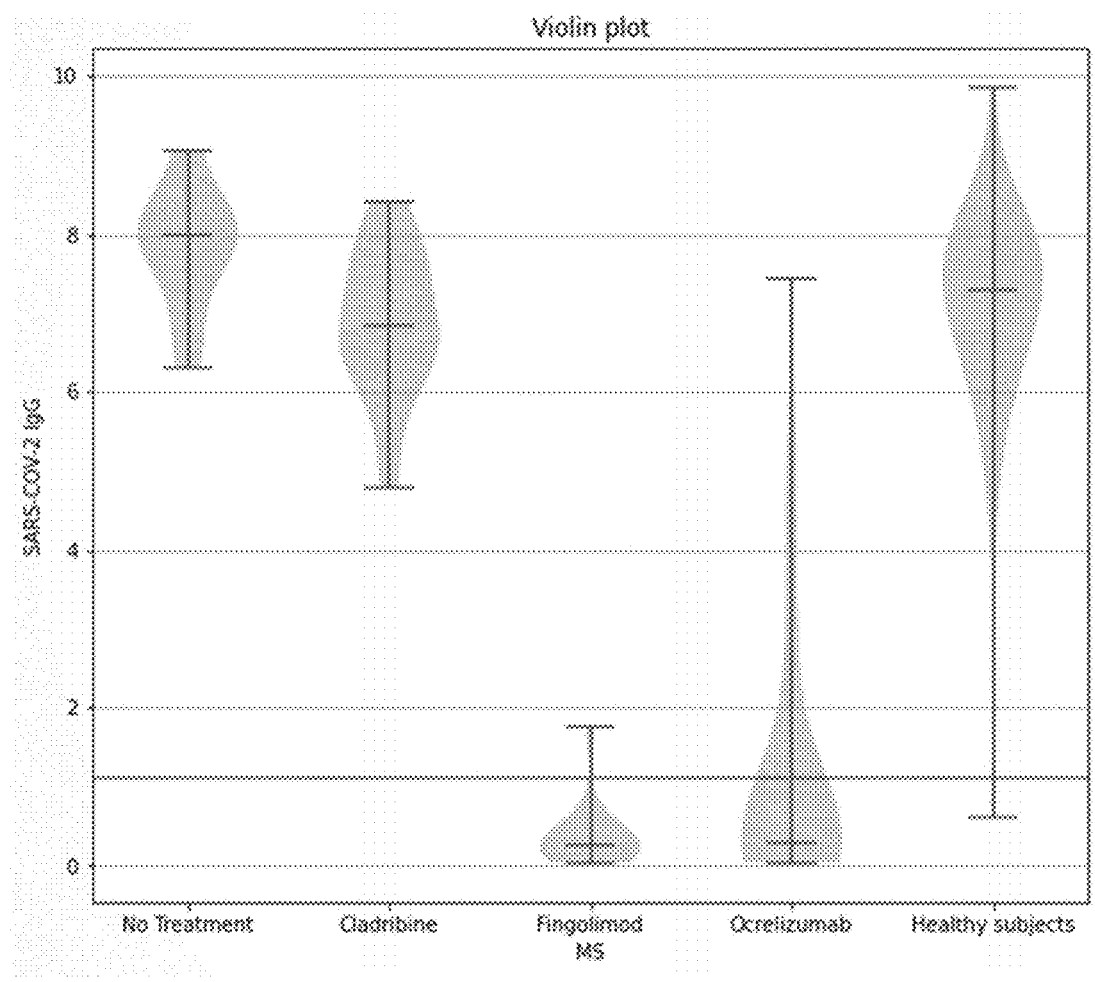
FIG. 21: Post-COVID-19 vaccination IgG antibody titer by high-efficacy IMD treatments, violin plot.
Figure 22:
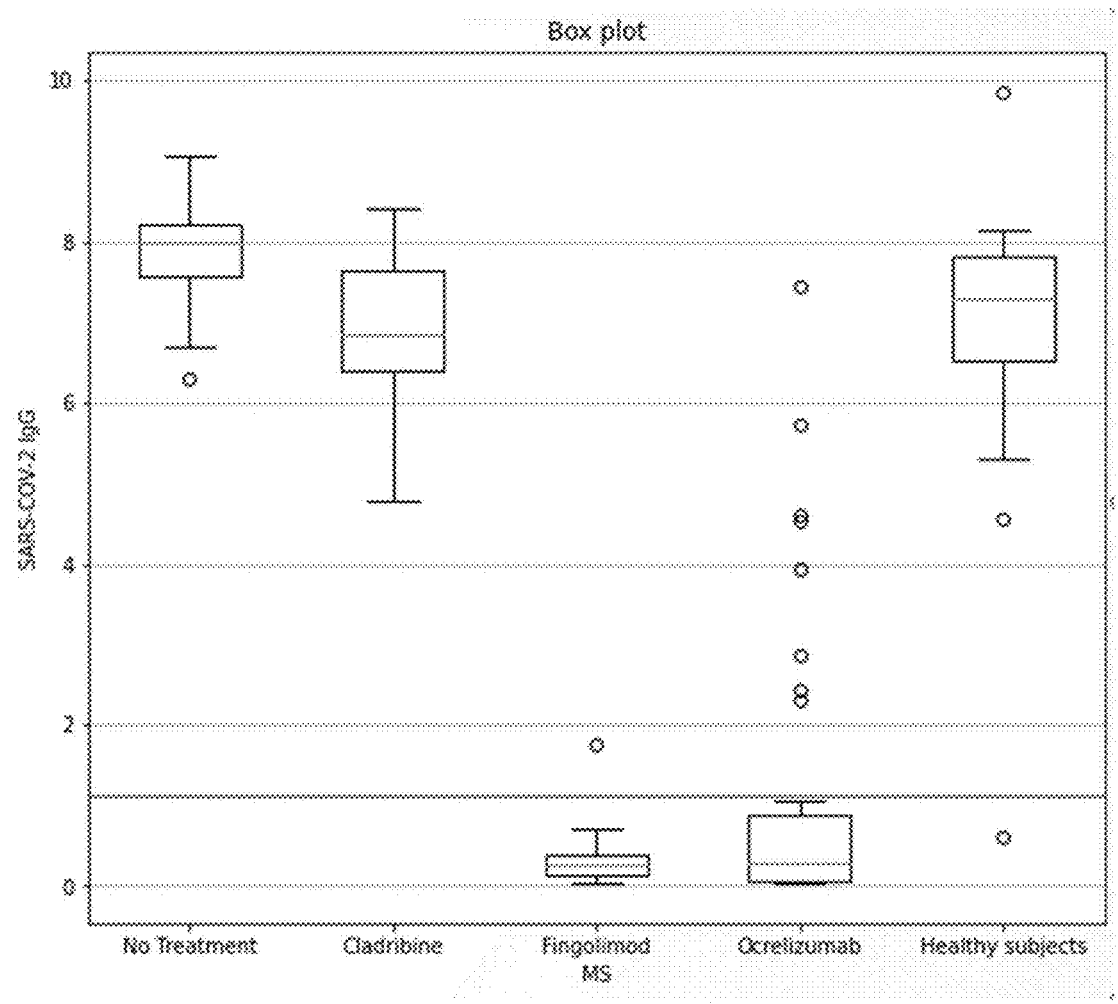
FIG. 22: Post-COVID-19 vaccination IgG antibody titer by high-efficacy IMD treatments, box plot.
Figure 23:
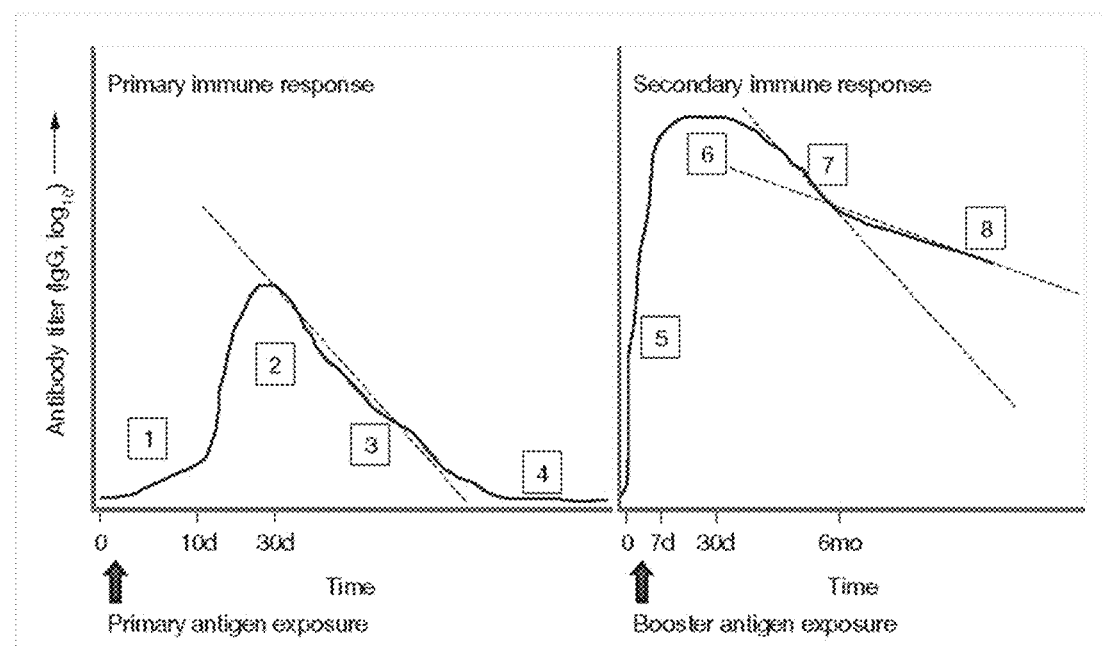
FIG. 23: Generation of B cell memory responses. Memory B cells are generated in response to T-dependent antigens (1), during the germinal center (GC) reaction (2), in parallel to plasma cells. At their exit of GCs, these B cells do not differentiate into antibody-secreting plasma cells but into memory B cells (3) that transiently migrate through the blood (4) toward the extrafollicular areas of spleen and nodes (5). They persist there as resting cells until reexposed to their specific antigens (6). On secondary antigen exposure, memory B cells readily proliferate and differentiate into plasma cells (7) secreting large amounts of high-affinity antibodies that may be detected in the serum (8) within a few days after boosting. Ag: antigen; BM: bone marrow; FDC: follicular dendritic cell; IgG: immunoglobulin G; Th: T-helper.
Figure 24:
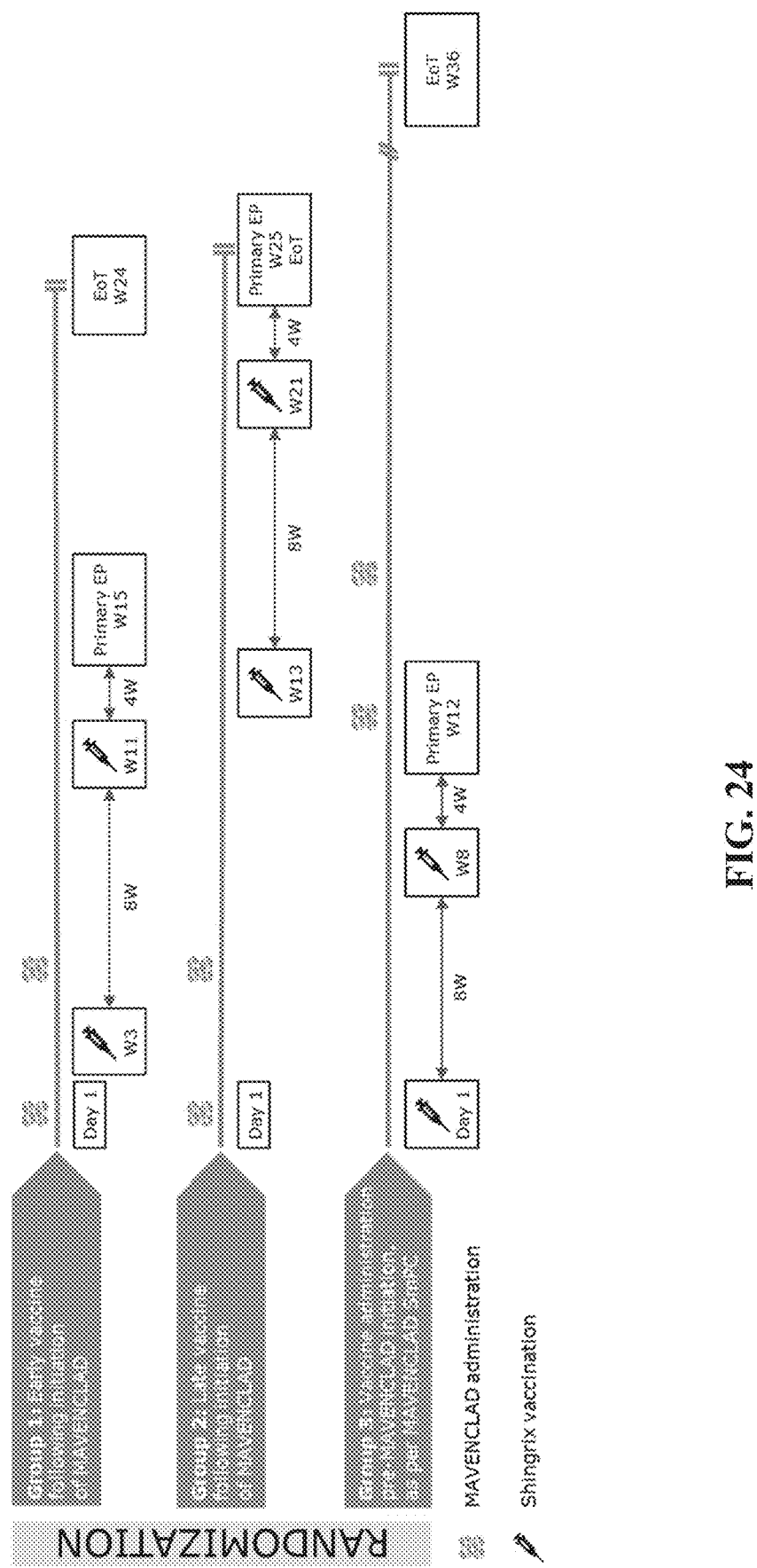
FIG. 24: Illustration of SHINGRIX® vaccination schedule for patient under treatment with MAVENCLAD® according to the invention (group 1 and Group 2), compared to vaccination schedule according to the EU SmPC, or preferably SmPC, of cladribine tablets/MAVENCLAD® valid as of 2020. Abbreviations: EP=endpoint, EoT=end of treatment, SmPC=summary of product characteristics, w=week.

*At the date of data cut-off, only 435 received the second vaccine dose; 109 patients did not complete the 21 days of inter-dose interval; 3 patients were infected by SARS-COV-2 after the first vaccine dose and 8 patients experienced an acute MS relapse and their second vaccine dose was postponed.
Results are also presented in FIGS. 17 and 18.

The invention claimed is:

1. A method for treating multiple sclerosis (MS) in a patient in need thereof, the method comprising:
 (a) administering cladribine during a first treatment period orally to the patient at a fixed dose per patient, per body weight and per treatment period, wherein said fixed dose is 1.75 mg/kg plus/minus 0.25 mg/kg,
 (b) identifying whether the patient is at risk of reactivation of latent varicella zoster virus (VZV),
 (c) vaccinating said patient at risk of reactivation of varicella zoster virus (VZV) with a vaccine against said varicella zoster virus (VZV) reactivation, wherein said vaccine is a recombinant, adjuvanted herpes zoster vaccine that comprises recombinant varicella zoster virus glycoprotein E, and
 (d) administering cladribine during a $2^{nd}$ and optionally $3^{rd}$ treatment period orally to the patient at a fixed dose per patient, per body weight and per treatment period, wherein said fixed dose is 1.75 mg/kg plus/minus 0.25 mg/kg,
 with the proviso that said fixed dose per patient is about the same in all of the two or three treatment periods of (a) and (d) wherein cladribine is administered, and wherein (a), (b), (c) and (d) are performed in the order given above, thereby treating said patient against said MS and limiting the risk of said patient of reactivation of varicella zoster virus (VZV).

2. The method according to claim 1, wherein said patient at risk is to be vaccinated is having lymphopenia Grade ≥1, lymphopenia Grade ≥2, or lymphopenia Grade ≥3, at the time said vaccination is to take place.

3. The method according to claim 1, wherein said patient at risk is to be vaccinated is having absolute lymphocyte counts (ALC) <500 cells/μL at the time said vaccination is to take place.

4. The method according to claim 1,
   i) wherein the method comprises said $1^{st}$, $2^{nd}$ and optionally $3^{rd}$ treatment periods in which cladribine is administered, each with a duration from 1 to 3 months,
   ii) wherein each of said $1^{st}$, $2^{nd}$ and optionally $3^{rd}$ treatment periods are separated by a period in which no cladribine is administered to said patient, and
   iii) wherein each of the periods in which no cladribine is administered to said patient has a duration of at least 9 months.

5. The method according to claim 4, wherein at least one of the periods in which no cladribine is administered to said patient has a duration of 9 to 18 months.

6. The method according to claim 1,
   i) wherein the method comprises the $1^{st}$ and $2^{nd}$ treatment periods in which cladribine is administered, each with a duration from 1 to 3 months,
   ii) wherein said $1^{st}$ and $2^{nd}$ treatment periods are separated by a period in which no cladribine is administered to said patient, and
   iii) wherein the periods in which no cladribine is administered to said patient has a duration of 9 to 18 months.

7. The method according to claim 1, wherein at least one of the periods in which no cladribine is administered to said patient has a duration of 10 months to 14 months.

8. The method according to claim 1, wherein vaccinating said patient according to step (c) comprises the administration of two separate doses of said vaccine and wherein the administration of the first dose and the second dose of said vaccine are least 3 weeks to about 8 months apart from each other.

* * * * *